(12) United States Patent
Mochizuki et al.

(10) Patent No.: US 11,012,903 B2
(45) Date of Patent: *May 18, 2021

(54) COMMUNICATION SYSTEM

(71) Applicant: MITSUBISHI ELECTRIC CORPORATION, Chiyoda-ku (JP)

(72) Inventors: Mitsuru Mochizuki, Tokyo (JP); Miho Maeda, Tokyo (JP); Shinsuke Uga, Tokyo (JP); Noriyuki Fukui, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,220

(22) Filed: Dec. 4, 2017

(65) Prior Publication Data

US 2018/0103400 A1 Apr. 12, 2018

Related U.S. Application Data

(63) Continuation of application No. 14/910,246, filed as application No. PCT/JP2014/070962 on Aug. 8, 2014, now Pat. No. 9,860,803.

(30) Foreign Application Priority Data

Aug. 9, 2013 (JP) ................................. 2013-166458

(51) Int. Cl.
  *H04W 36/00* (2009.01)
  *H04W 36/04* (2009.01)
  *H04W 48/16* (2009.01)

(52) U.S. Cl.
  CPC . *H04W 36/0083* (2013.01); *H04W 36/00835* (2018.08); *H04W 36/04* (2013.01); *H04W 48/16* (2013.01)

(58) Field of Classification Search
  CPC ..... H04W 36/32; H04W 48/16; H04W 84/10; H04W 36/0083; H04W 36/04; H04W 36/00835

(Continued)

(56) References Cited

U.S. PATENT DOCUMENTS

| 6,256,500 B1 | 7/2001 | Yamashita |
| 2003/0050064 A1 | 3/2003 | Davies et al. |

(Continued)

FOREIGN PATENT DOCUMENTS

| CN | 1539248 A | 10/2004 |
| CN | 103210685 A | 7/2013 |

(Continued)

OTHER PUBLICATIONS

Combined Chinese Office Action and Search Report dated Jul. 30, 2016 in Chinese Patent Application No. 201480044275.3 (with English translation), 13 pages.

(Continued)

*Primary Examiner* — Phong La
(74) *Attorney, Agent, or Firm* — Oblon, McClelland, Maier & Neustadt, L.L.P.

(57) ABSTRACT

A UE in an idle state selects any of a group A, to which a cell of which coverage its own device is in, belongs and a group different from the group A, for example, a group B, and then measures cells belonging to the selected group for selecting a cell being a re-selection destination. A UE in a connected state selects any of the group B to which a cell connected with the UE belongs and a group different from the group B, for example, the group A, and measures cells belonging to the selected group for handover.

2 Claims, 51 Drawing Sheets

(58) Field of Classification Search
USPC .......................................................... 370/331
See application file for complete search history.

(56) References Cited

U.S. PATENT DOCUMENTS

| | | |
|---|---|---|
| 2004/0029588 A1 | 2/2004 | Kikuma et al. |
| 2004/0136351 A1 | 7/2004 | Omae |
| 2008/0261597 A1 | 10/2008 | Hayama |
| 2009/0129341 A1* | 5/2009 | Balasubramanian ........................ H04W 36/0055 370/331 |
| 2009/0168687 A1 | 7/2009 | Li |
| 2009/0219900 A1 | 9/2009 | Kokkinen |
| 2010/0159927 A1 | 6/2010 | Toda et al. |
| 2011/0250891 A1* | 10/2011 | Zou ........................ H04W 36/04 455/437 |
| 2011/0287768 A1 | 11/2011 | Takamatsu et al. |
| 2012/0122515 A1 | 5/2012 | Han et al. |
| 2012/0191505 A1 | 7/2012 | Shang |
| 2013/0021929 A1 | 1/2013 | Kim |
| 2013/0083744 A1 | 4/2013 | Peng et al. |
| 2013/0084849 A1 | 4/2013 | Koskinen et al. |
| 2013/0130684 A1 | 5/2013 | Gomes |
| 2013/0210443 A1 | 8/2013 | Pedersen et al. |
| 2014/0066092 A1 | 3/2014 | Scheim |
| 2014/0146794 A1 | 5/2014 | Dalsgaard |
| 2014/0349662 A1* | 11/2014 | Ekici ........................ H04W 76/16 455/450 |
| 2014/0364156 A1 | 12/2014 | Iwai |

FOREIGN PATENT DOCUMENTS

| | | |
|---|---|---|
| EP | 2 696 625 A1 | 2/2014 |
| JP | 10-191441 A | 7/1998 |
| JP | 2002-118873 A | 4/2002 |
| JP | 2006-5597 A | 1/2006 |
| JP | 2008-85896 A | 4/2008 |
| JP | 2009-212847 | 9/2009 |
| JP | 2011-504714 A | 2/2011 |
| JP | 2013-138510 A | 7/2013 |
| WO | 2009/067700 A1 | 5/2009 |
| WO | WO 2009/119857 A1 | 10/2009 |
| WO | WO 2012/031620 A1 | 3/2012 |
| WO | WO 2012/067407 A2 | 5/2012 |
| WO | WO 2012/137041 A1 | 10/2012 |
| WO | WO 2012/137293 A1 | 10/2012 |

OTHER PUBLICATIONS

Office Action dated Apr. 24, 2018 in Japanese Patent Application No. 2015-530967 with unedited computer generated English translation, 4 pages.
"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage2 (Release 11)", 3GPP TS 36.300 v11.5.0, Mar. 2013, 209 Pages.
"3$^{rd}$ Generation Partnership Project; Technical Specification Group Radio Access Network; Evolved Universal Terrestrial Radio Access (E-UTRA); User equipment (UE) procedures in idle mode (Release 11)", 3GPP TS 36.304 v11.1.0, Sep. 2012, 33 pages.
"LS on HNB/HeNB Open Access Mode", 3GPP SA WG1, S1-083461, Oct. 2008, 2 pages.
"LS on CSG cell identification", 3GPP TSG-RAN WG 2, R2-082899, meeting #62, May 2008, 2 pages.
"3$^{rd}$ Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 v9.0.0, Mar. 2010, 104 pages.
"3$^{rd}$ Generation Partnership Project; Technical Specification Group Radio Access Network; Feasibility study for Further Advancements for E-UTRA (LTE-Advanced) (Release 10)", 3GPP TR 36.912 v10.0.0, Mar. 2011, 252 pages.
"3$^{rd}$ Generation Partnership Project; Technical Specification Group Radio Access Network; Coordinated multi-point operations for LTE physical later aspects (Release 11)", 3GPP TR 36.819 v11.1.0, Dec. 2011, 69 pages.
"3$^{rd}$ Generation Partnership Project; Technical Specification Group Radio Access Network; Evolved Universal Terrestrial Radio Access (E-UTRA); Base Station (BS) conformance testing (Release 11)", 3GPP TS 36.141 v11.1.0, Jun. 2012, 224 pages.
"Procedures for efficient discovery of small cells", CMCC, 3GPP TSG-RAN WG1, R1-131530, Apr. 2013, 5 pages.
"3$^{rd}$ Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 v11.3.0, Mar. 2013, 344 pages.
"3$^{rd}$ Generation Partnership Project; Technical Specification Group Radio Access Network; Evolved Universal Terrestrial Radio Access (E-UTRA); Study on Small Cell Enhancements for E0UTRA and E-UTRAN-Higher layer aspects (Release 12)", 3GPP TR 36.842 v0.2.0, May 2013, 38 pages.
"3$^{rd}$ Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)", 3GPP TS 37.320 v11. 3.0, Mar. 2013, 23 pages.
International Search Report dated Oct. 28, 2014 for PCT/JP2014/070962 filed on Aug. 8, 2014.
International Preliminary Report on Patentability and Written Opinion dated Feb. 18, 2016 in PCT/JP2014/070962 (with English language translation).
Extended European Search Report dated Feb. 23, 2017 in Patent Application No. 14834040.9.
Office Action dated Oct. 9, 2018 in Japanese Patent Application No. 2015-530967, 6 pages (with English language translation).
"UE mobility-based handover", 3GPP TSG-RAN WG2 #81bis, R2-131445, 7.1.1, LG Electronics Inc., Apr. 15-19, 2013, 3 pages.
Office Action dated Jul. 3, 2018 in Japanese Patent Application No. 2015-530967 (with English language translation), 5 pages.
European Office Action dated Apr. 18, 2019 in European Patent Application No. 14 834 040.9, 5 pages.
Chinese Office Action dated Mar. 8, 2019, in Patent Application No. 201480044275.3 (with English translation), 8 pages.
Office Action dated Jul. 4, 2019 in corresponding Chinese Patent Application No. 201480044275.3 (with English Translation), 9 pages.
Japanese Office Action dated Oct. 23, 2019 in Japanese Application No. 2019-001884, with English Translation, 14 pages.
European Office Action dated Nov. 27, 2019 in European Patent Application No. 14 834 040.9, 6 pages.
Office Action dated Mar. 3, 2020 in Japanese Application No. 2019-007884 with English translation, 18 pages.
Indian Office Action dated May 19, 2020 in Patent Application No. 20167004173 (with English translation), 6 pages.
Japanese Office Action (Decision of Refusal) with computer generated English translation dated Oct. 6, 2020 in corresponding Japanese Patent Application No. 2019-001884 (4 pages).
Japanese Office Action (Decision of Dismissal of Amendment) with computer generated English translation dated Oct. 6, 2020 in corresponding Japanese Patent Application No. 2019-001864, (4 pages).
Japanese Office Action dated Jun. 30, 2020 in Japanese Patent Application No. 2019-001884 (with unedited computer generated English translation), 12 pages.

* cited by examiner

F I G . 1
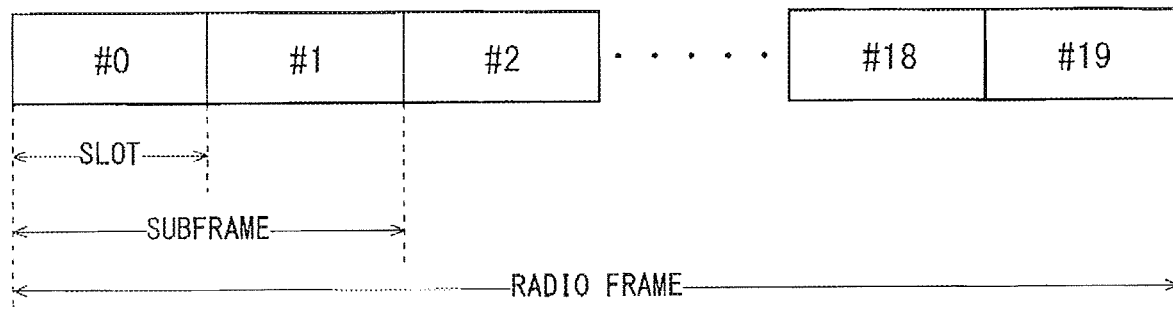

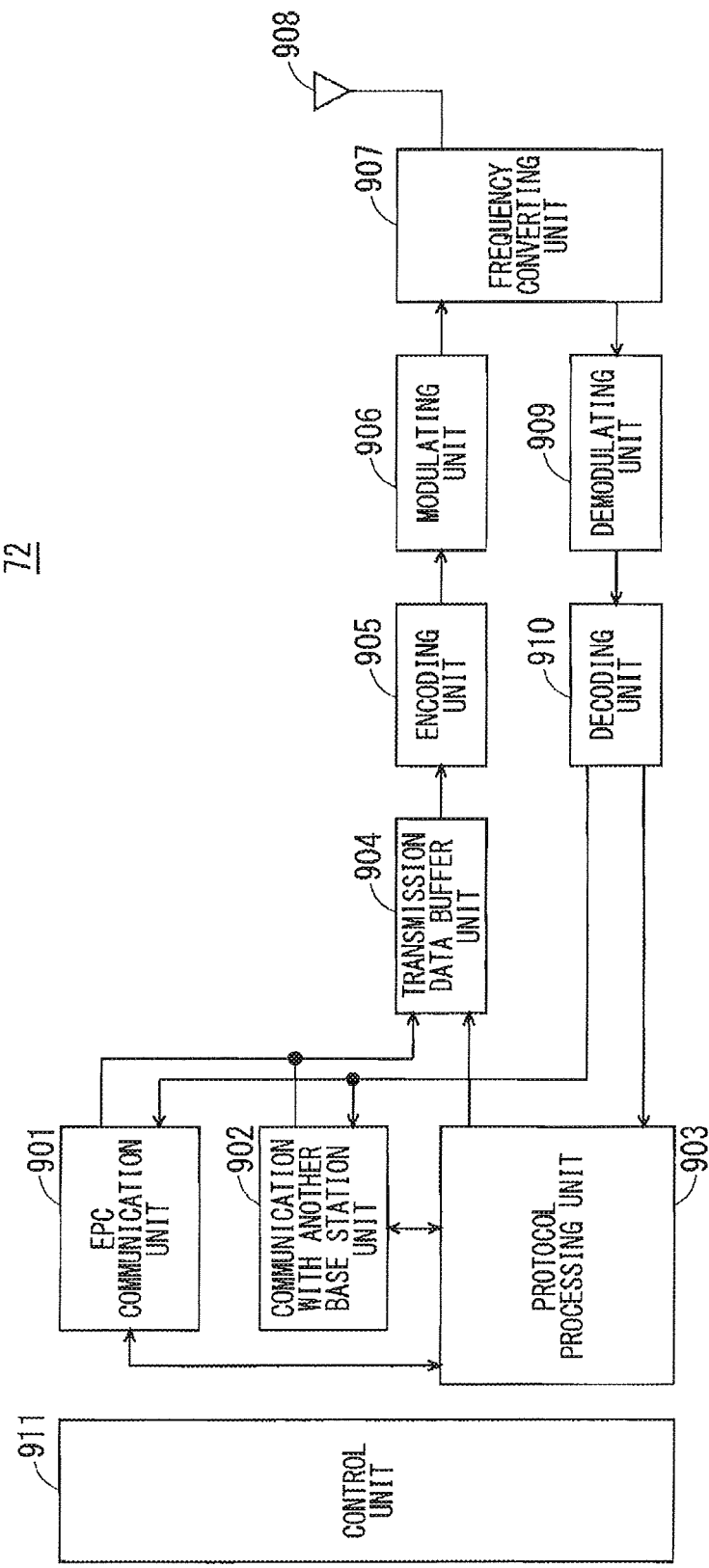

F I G. 5
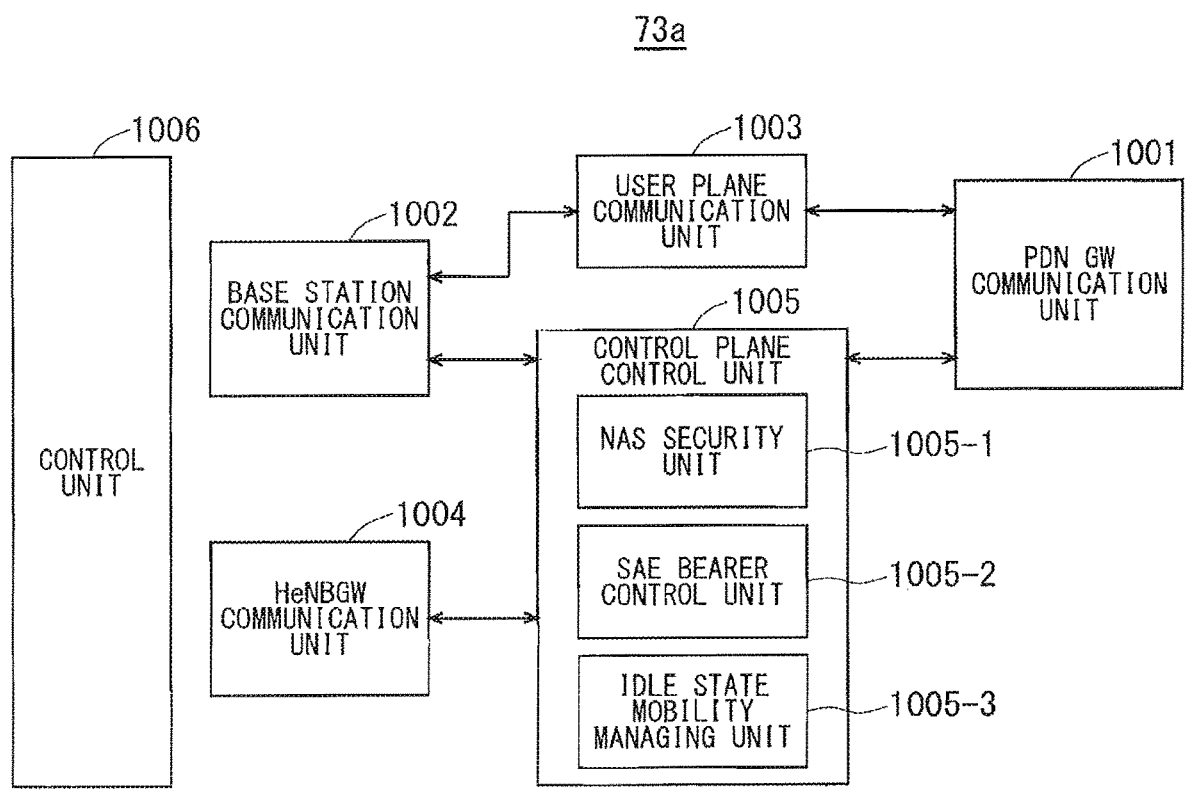

F I G. 6
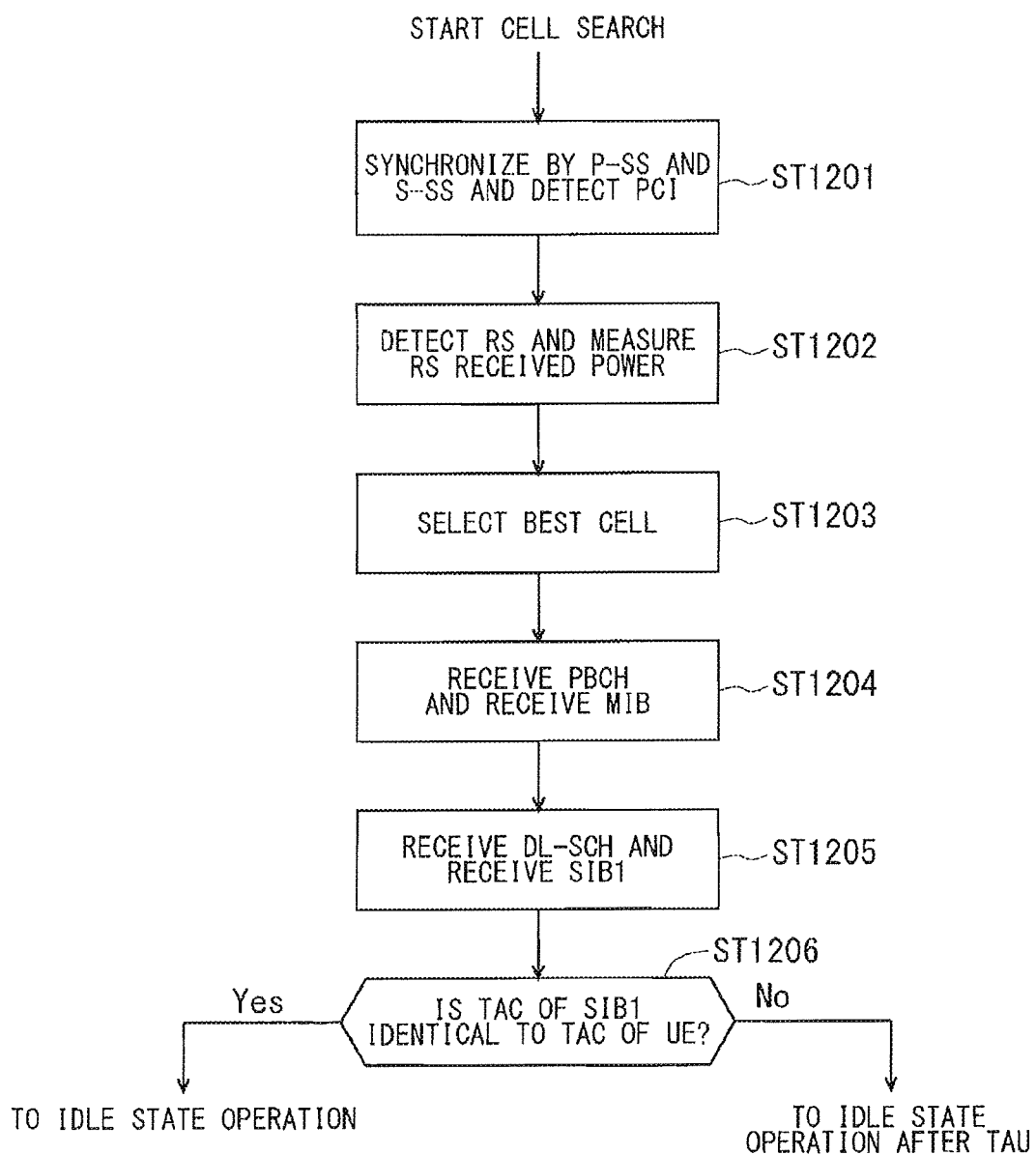

F I G . 7
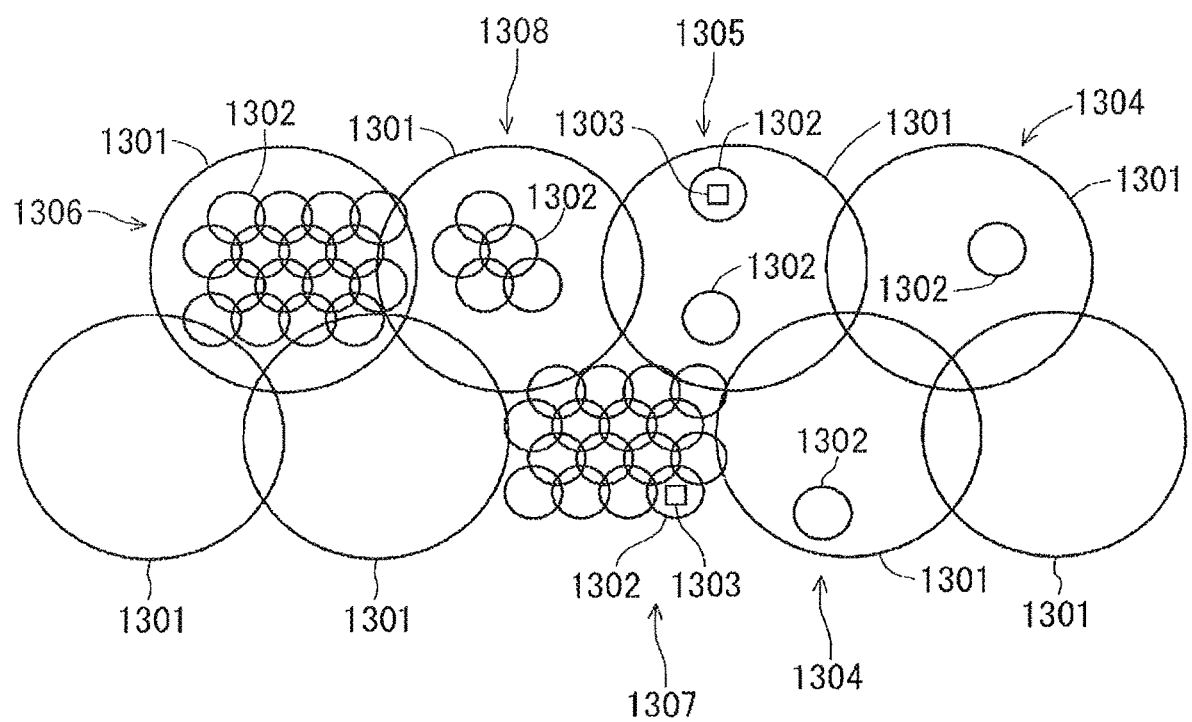

F I G. 8
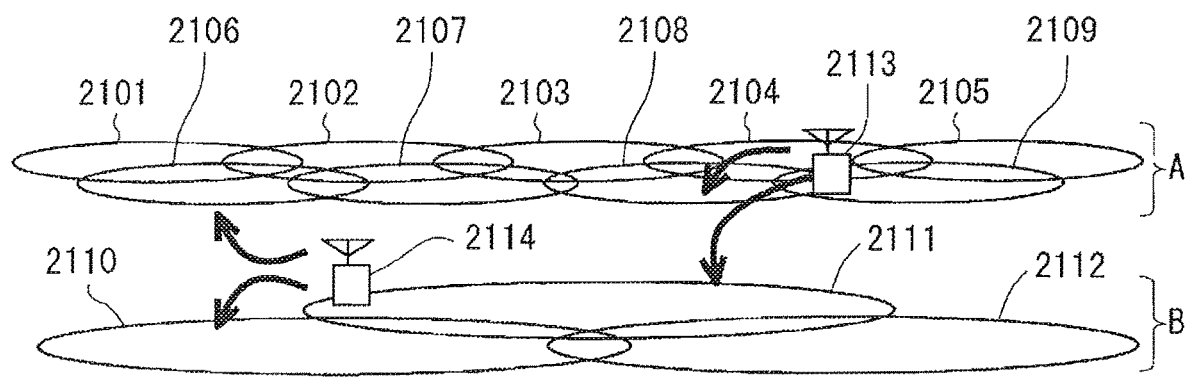
F I G. 9
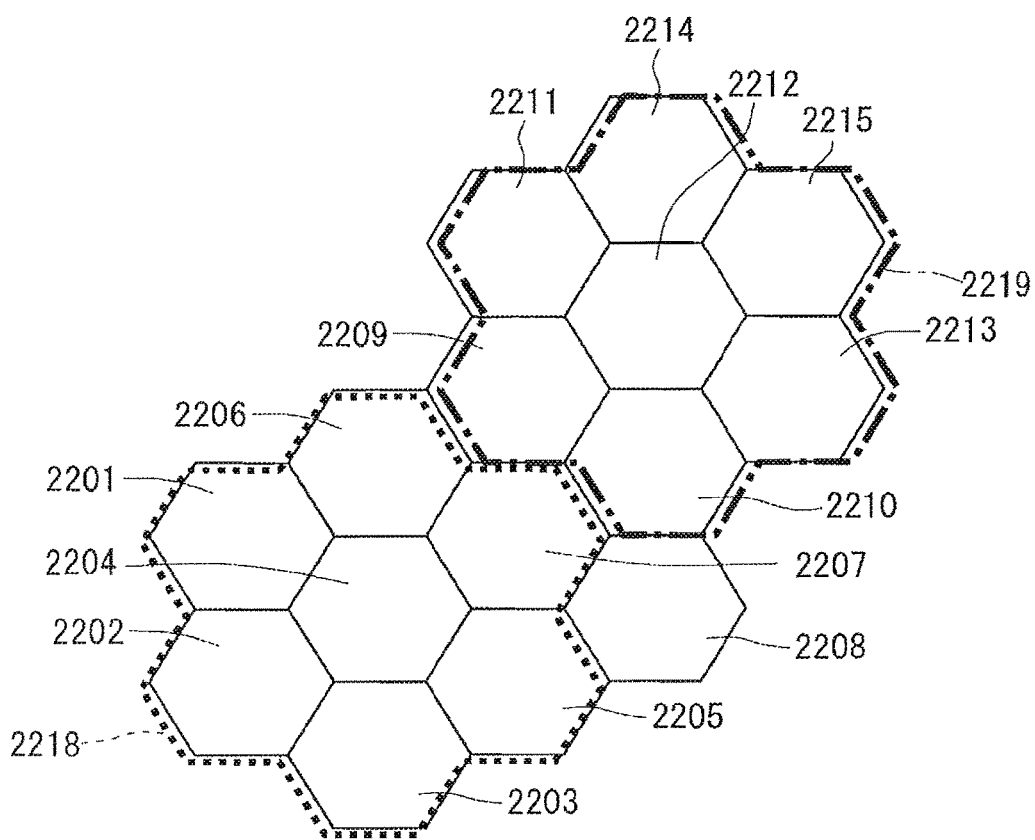

F I G. 1 1
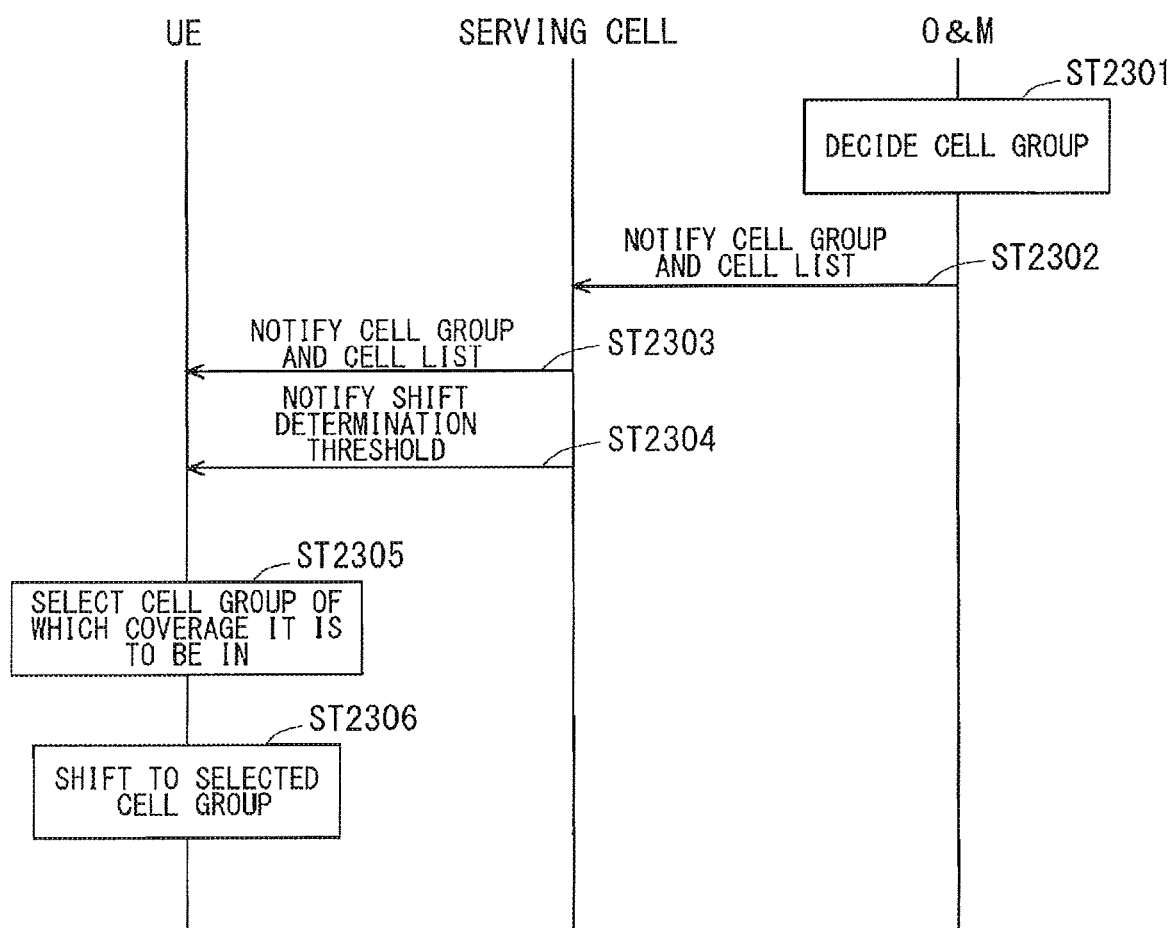

F I G. 1 2
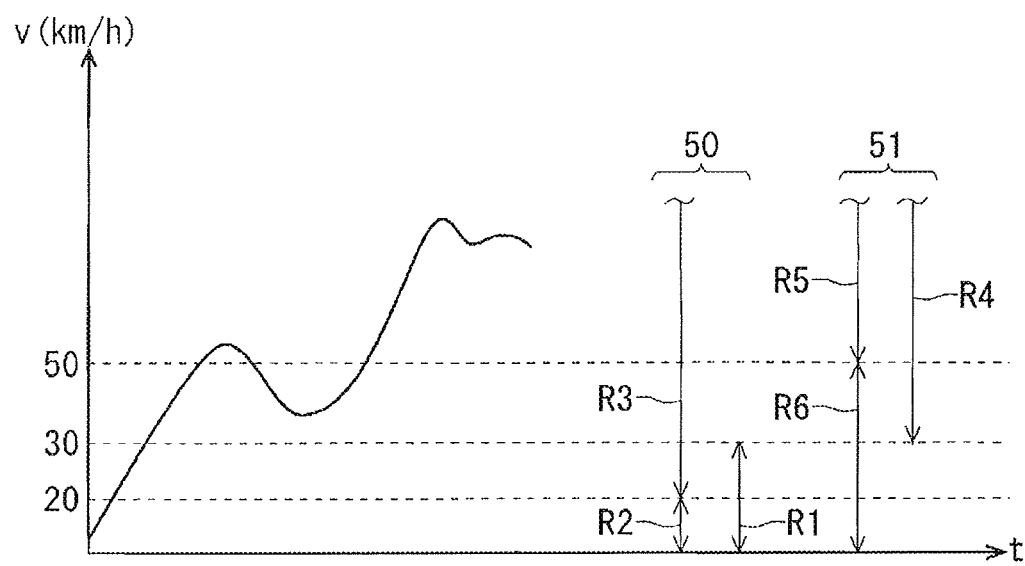
F I G. 1 3
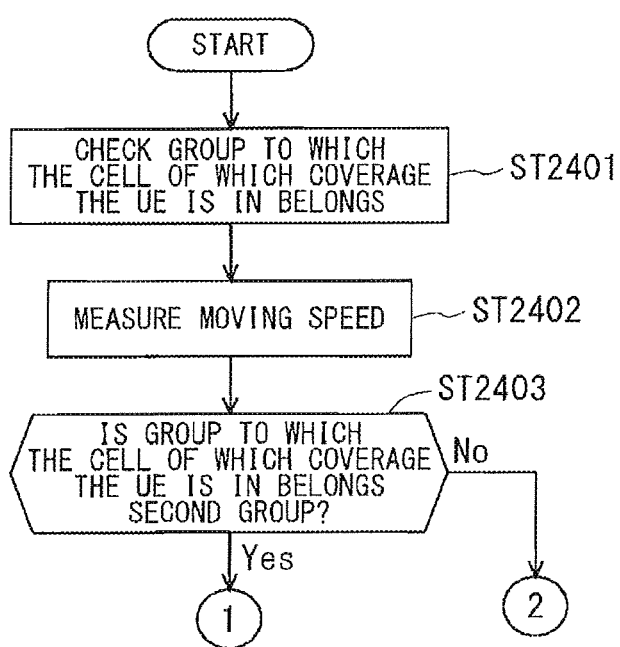

F I G . 1 7
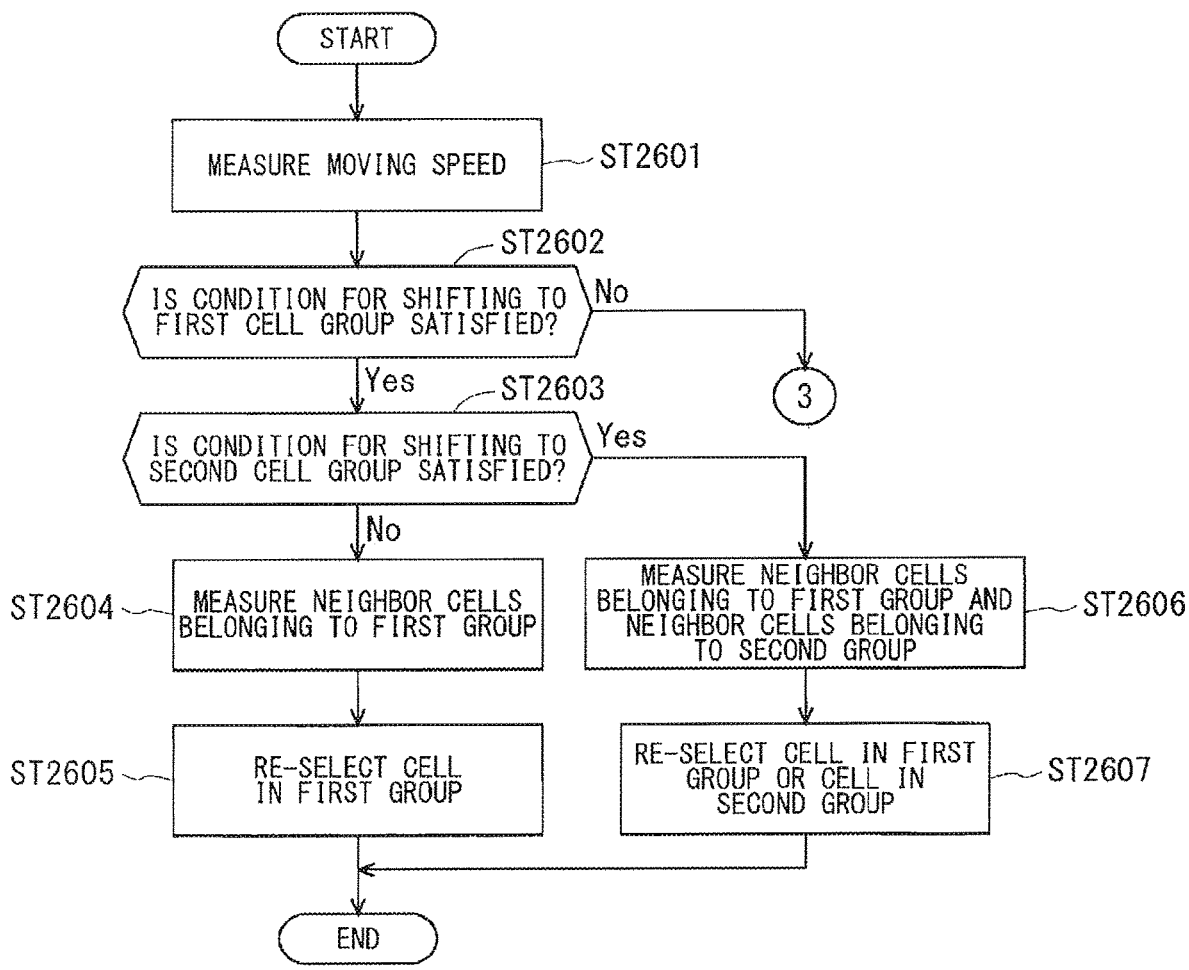

F I G. 1 8
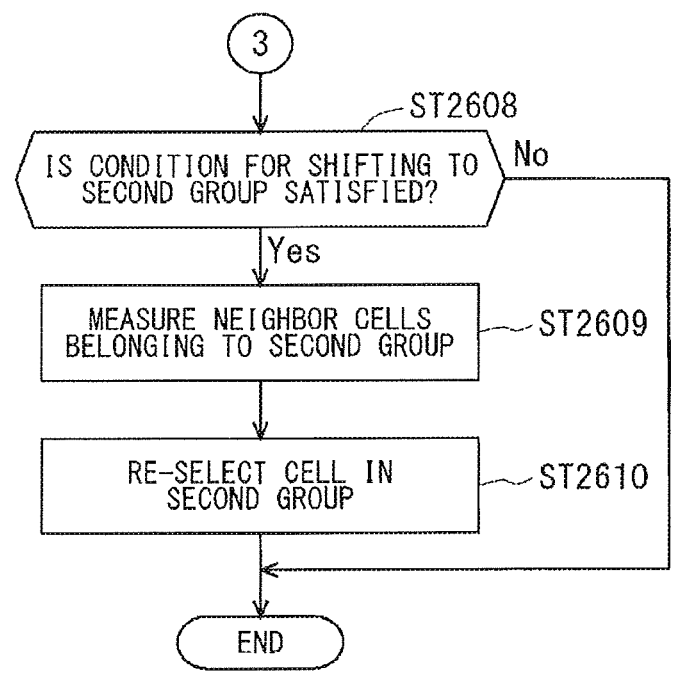

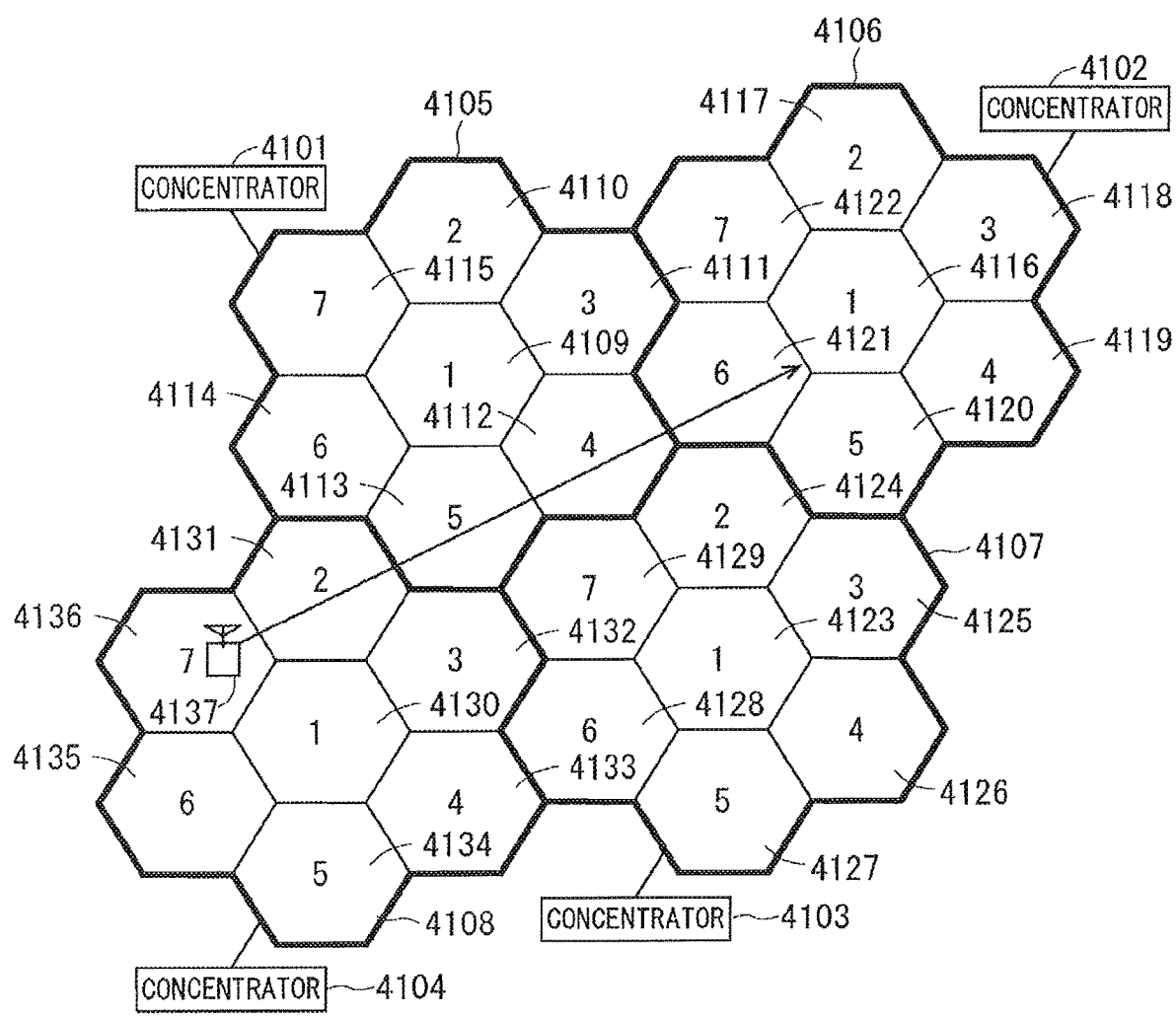
F I G . 2 0

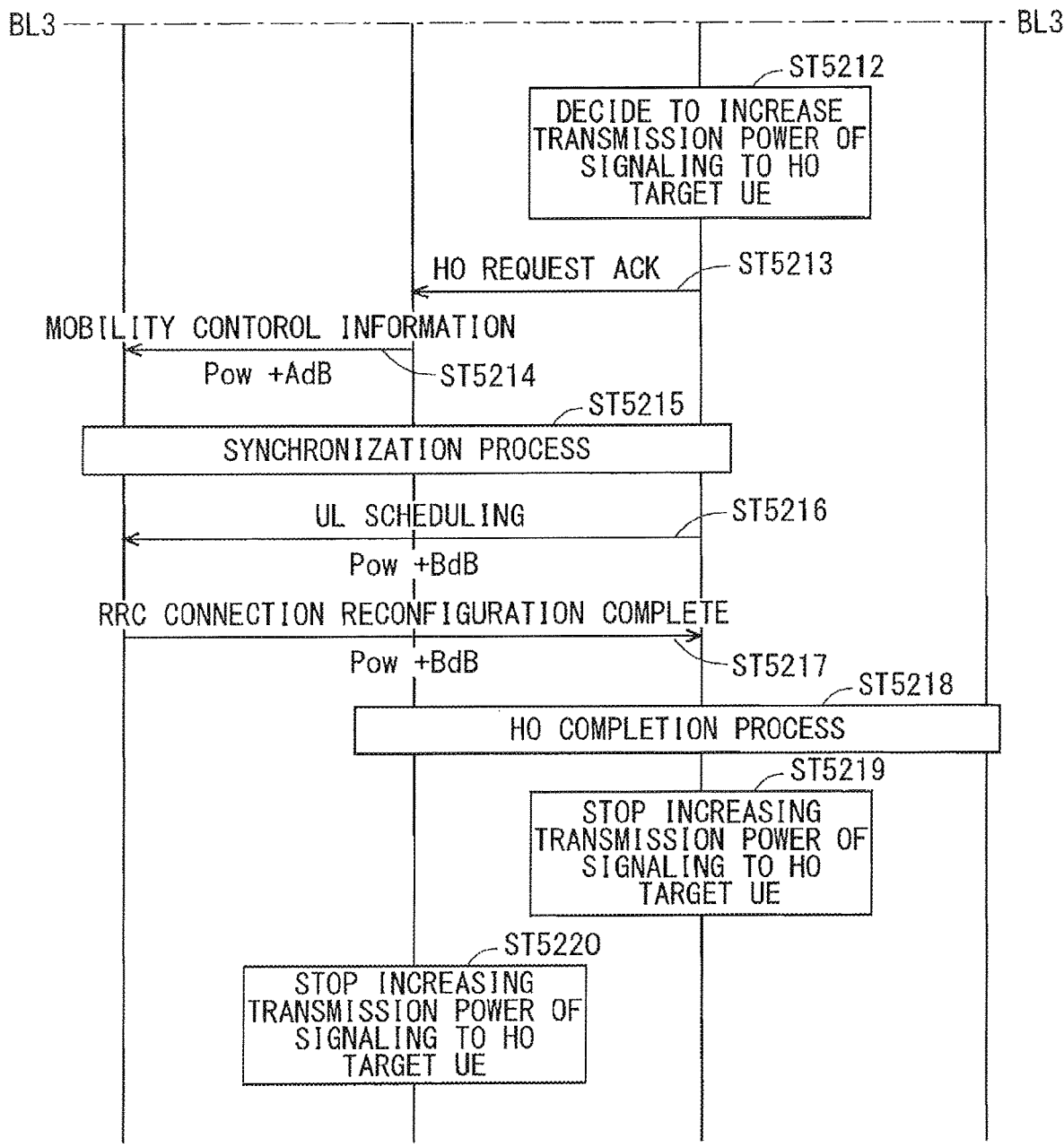

F I G . 3 2
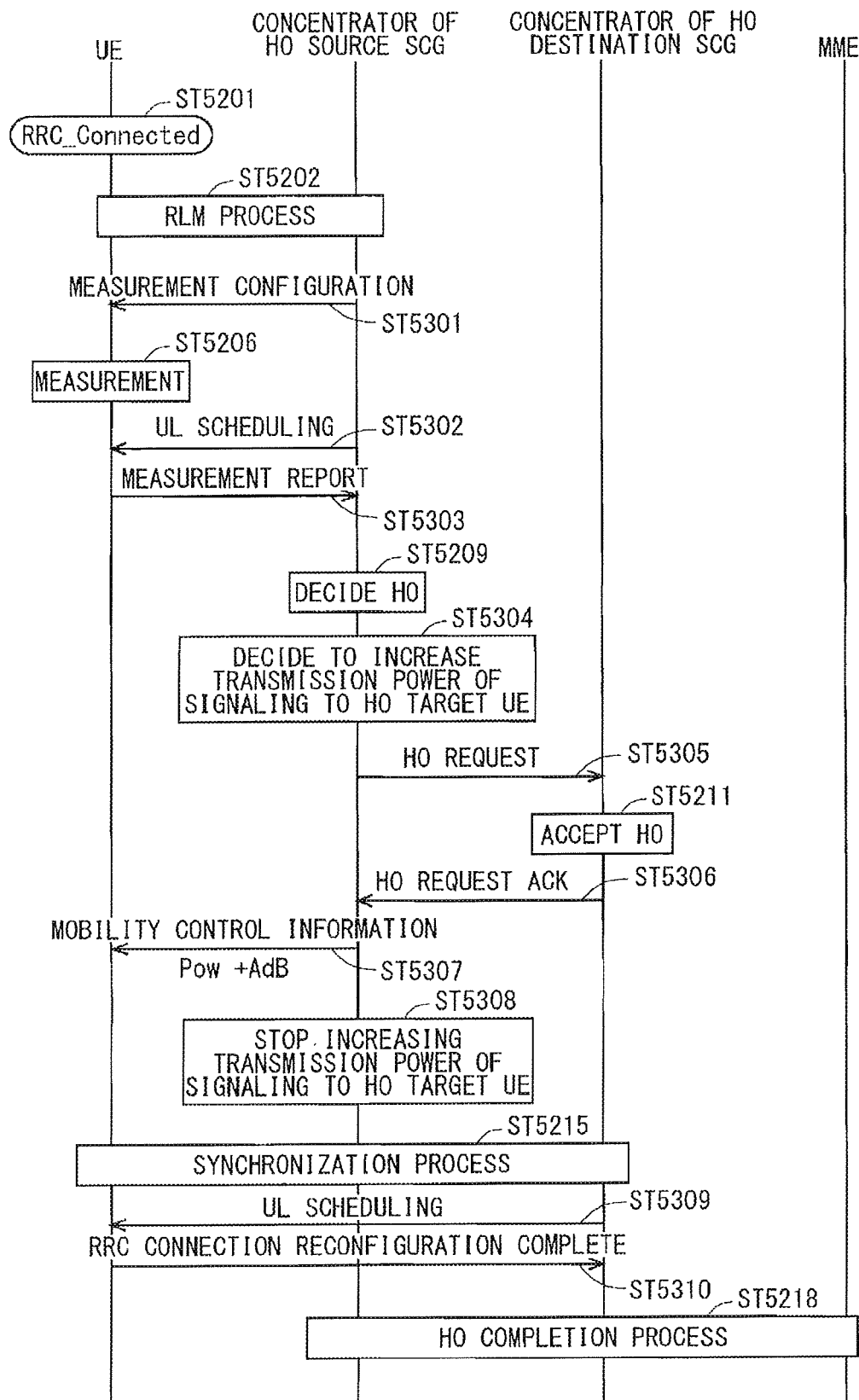

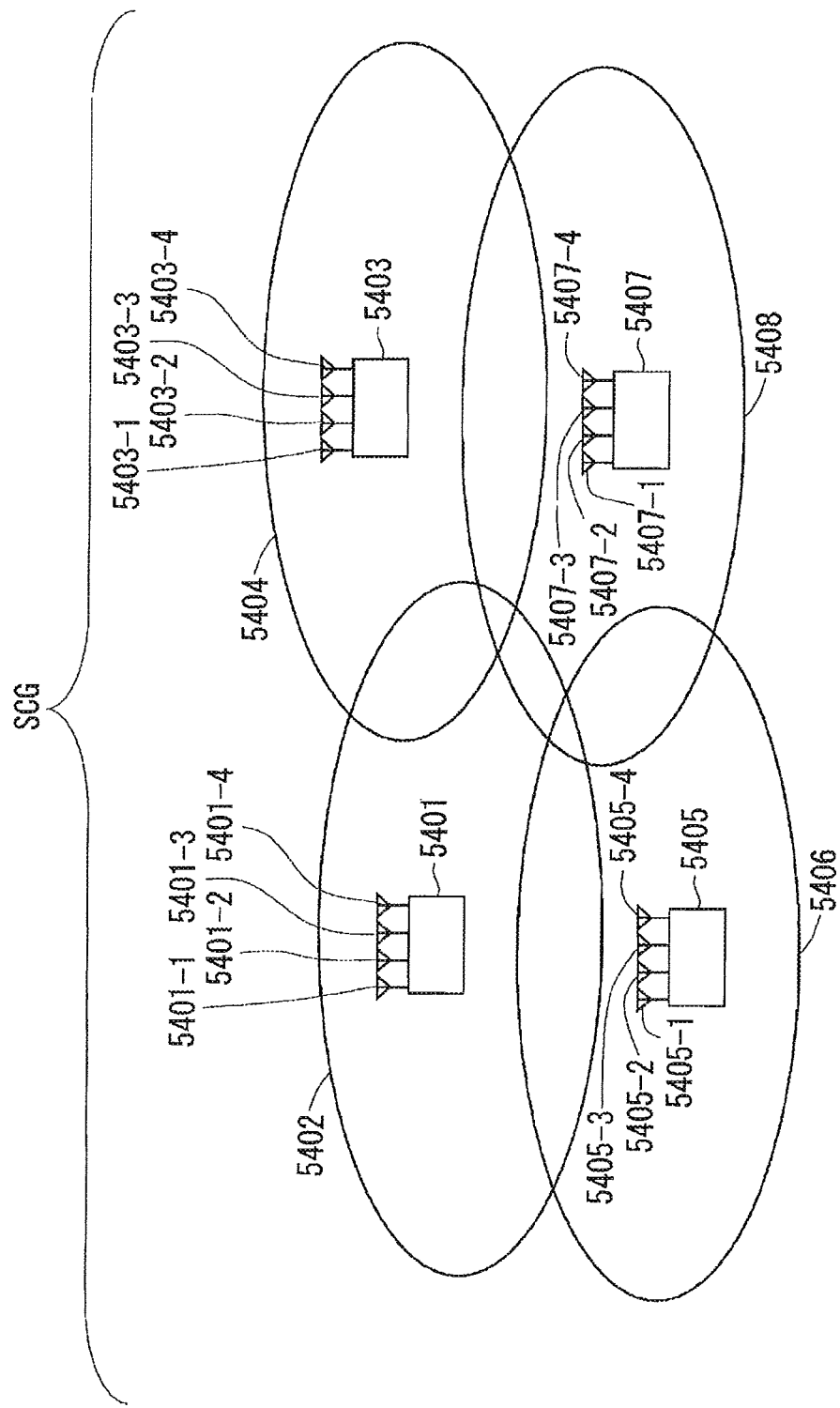

F I G . 4 8
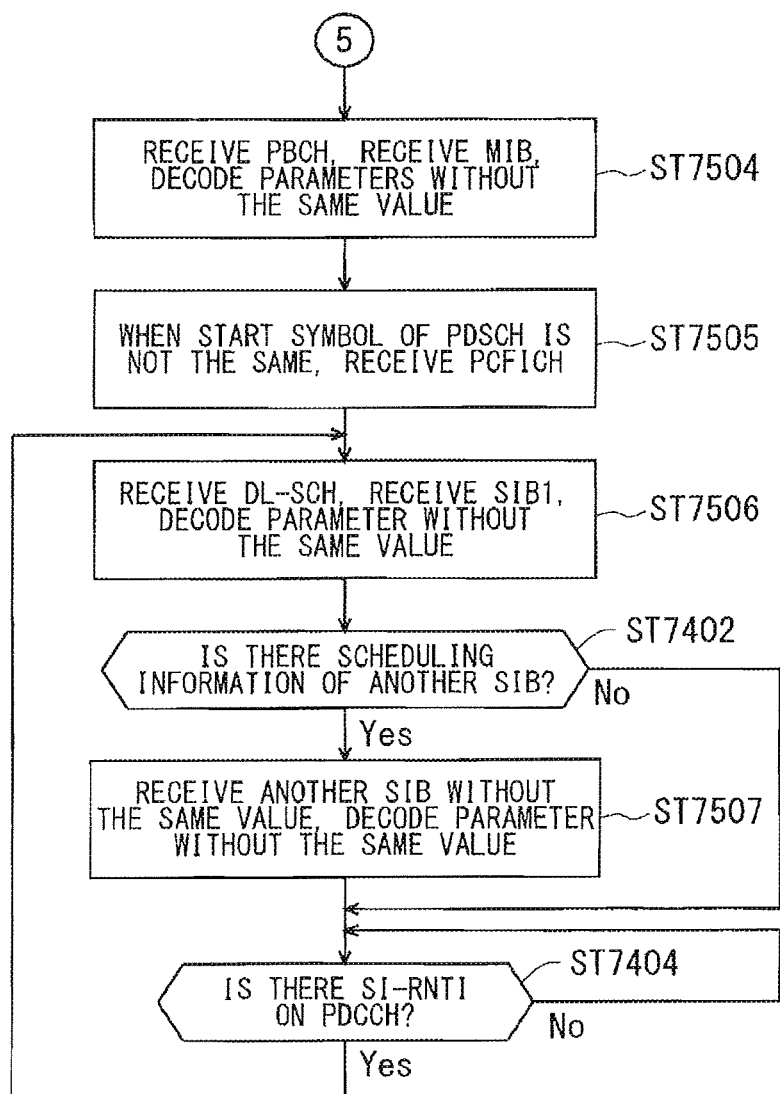

F I G . 5 1
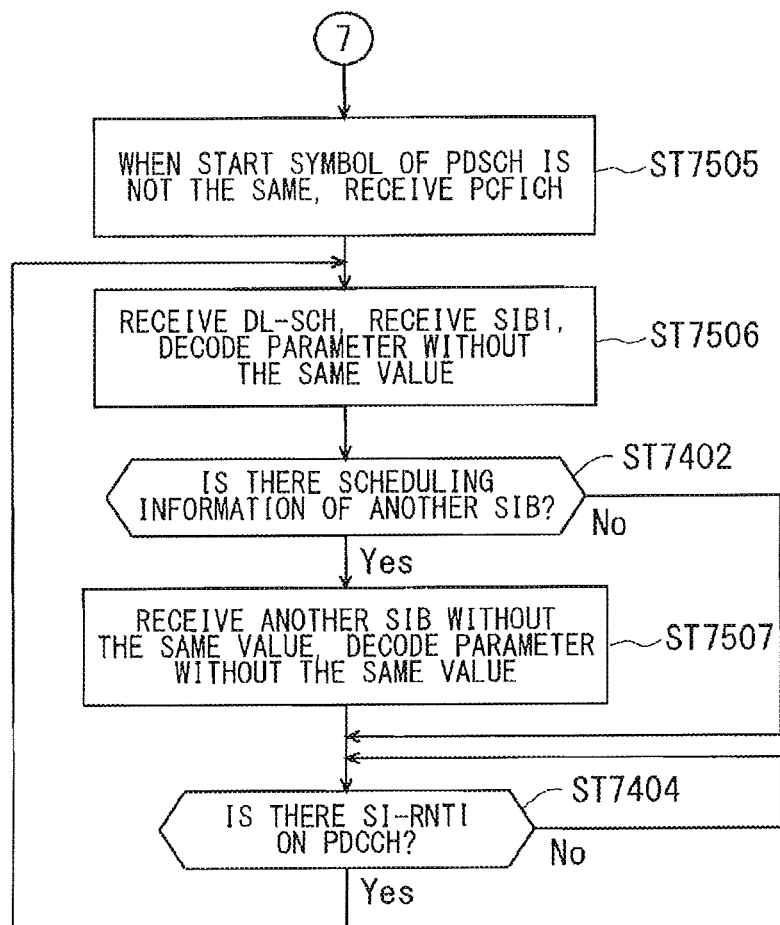

COMMUNICATION SYSTEM

CROSS-REFERENCE TO RELATED APPLICATIONS

The present continuation application is based upon and claims the benefit of priority from U.S. application Ser. No. 14/910,246, filed on Feb. 4, 2016, which is based upon and claims priority from prior International Application No. PCT/JP2014/070962, filed on Aug. 8, 2014, which claims priority from Japanese Patent Application No. 2013-166458 filed on Aug. 9, 2013; the entire contents of which are hereby incorporated by reference into this application.

TECHNICAL FIELD

The present invention relates to a communication system in which radio communication is performed between a communication terminal device and a base station device.

Background Art

The 3rd generation partnership project (3GPP), the standard organization regarding the mobile communication system, is studying new communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 12). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The current decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal (SS) per radio frame. The synchronization signals are classified into a primary synchronization signal (P-SS) and a secondary synchronization signal (S-SS).

Non-Patent Document 1 (Chapter 5) describes the current decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station to a user equipment. A BCH transport block is mapped to four subframes within a 40 ms interval. There is no explicit signaling indicating 40 ms timing.

A physical control format indicator channel (PCFICH) is a channel for downlink transmission from a base station to a user equipment. The PCFICH notifies the number of orthogonal frequency division multiplexing (OFDM) symbols used for PDCCHs from the base station to the user equipment. The PCFICH is transmitted per subframe.

A physical downlink control channel (PDCCH) is a channel for downlink transmission from a base station to a user equipment. The PDCCH notifies the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a user equipment. A downlink shared channel (DL-SCH) that is a transport channel and a PCH that is a transport channel are mapped to the PDSCH.

A physical multicast channel (PMCH) is a channel for downlink transmission from a base station to a user equipment. A multicast channel (MCH) that is a transport channel is mapped to the PMCH.

A physical uplink control channel (PUCCH) is a channel for uplink transmission from a user equipment to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a user equipment to a base station. An uplink shared channel (UL-SCH) that is one of the transport channels is mapped to the PUSCH.

A physical hybrid ARQ indicator channel (PHICH) is a channel for downlink transmission from a base station to a user equipment. The PHICH carries Ack/Nack that is a response signal to uplink transmission. A physical random access channel (PRACH) is a channel for uplink transmission from the user equipment to the base station. The PRACH carries a random access preamble.

A downlink reference signal (RS) is a known symbol in the LTE communication system. The following five types of downlink reference signals are defined: cell-specific reference signals (CRS), MBSFN reference signals, data demodulation reference signal (DM-RS) being UE-specific reference signals, positioning reference signals (PRS), and channel-state information reference signals (CSI-RS). The physical layer measurement objects of a user equipment include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power.

The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels shown in FIG. 5(B). The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in the case where the user equipments have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a channel that transmits dedicated control information between a user equipment and a network on a point-to-point basis. The DCCH is used when the user equipment has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed to use are specified by an operator (hereinafter, also referred to as a "cell for specific subscribers"). The specified subscribers are allowed to access one or more cells of a public land mobile network (PLMN). One or more cells in which the specified subscribers are allowed access are referred to as "CSG cell(s)." Note that access is limited in the PLMN.

The CSG cell is part of the PLMN that broadcasts a specific CSG identity (CSG ID; CSG-ID) and broadcasts "TRUE" in a CSG indication. The authorized members of the subscriber group who have registered in advance access the CSG cells using the CSG-ID that is the access permission information.

The CSG-ID is broadcast by the CSG cell or cells. A plurality of CSG-IDs exist in the LTE communication system. The CSG-IDs are used by user equipments (UEs) for making access from CSG-related members easier.

The locations of user equipments are tracked based on an area composed of one or more cells. The locations are tracked for enabling tracking the locations of user equipments and calling user equipments, in other words, incoming calling to user equipments even in an idle state. An area for tracking locations of user equipments is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 3 discloses three different modes of the access to the HeNB and HNB. Specifically, an open access mode, a closed access mode, and a hybrid access mode are disclosed.

The individual modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is the cell that supports both the open access mode and the closed access mode.

In 3GPP, among all physical cell identities (PCIs), there is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to user equipments being served thereby. Being served by a base station means taking the base station as a serving cell.

Non-Patent Document 4 discloses the basic operation of a user equipment using PCI split. The user equipment that does not have the PCI split information needs to perform cell search using all PCIs, for example, using all 504 codes. On the other hand, the user equipment that has the PCI split information is capable of performing cell search using the PCI split information.

Further, 3GPP is pursuing specifications standard of long term evolution advanced (LTE-A) as Release 10 (see Non-Patent Documents 5 and 6). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCell is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 7.

3GPP is pursuing specifications standard of Release 12, where the use of small eNBs configuring a small cell is studied to satisfy a tremendous volume of traffic in the future. Examples of the study include the technique of increasing spectral efficiency through installation of a large number of small eNBs to configure a large number of small cells, thereby increasing communication capacity.

The traffic flow of a mobile network is on the rise, and the communication rate is also increasing. It is expected that the communication rate will be further increased when the operations of the LTE and the LTE-A are fully initiated, leading to an increase in traffic flow.

PRIOR ART DOCUMENTS

Non-Patent Documents

Non-Patent Document 1: 3GPP TS 36.300 V11.5.0
Non-Patent Document 2: 3GPP TS 36.304 V11.1.0
Non-Patent Document 3: 3GPP S1-083461
Non-Patent Document 4: 3GPP R2-082899
Non-Patent Document 5: 3GPP TR 36.814 V9.0.0
Non-Patent Document 6: 3GPP TR 36.912 V10.0.0
Non-Patent Document 7: 3GPP TR 36.819 V11.1.0
Non-Patent Document 8: 3GPP TS 36.141 V11.1.0
Non-Patent Document 9: 3GPP R1-131530
Non-Patent Document 10: 3GPP TS 36.331 V11.3.0
Non-Patent Document 11: 3GPP TR 36.842 V0.2.0
Non-Patent Document 12: 3GPP TS 37.320 V11.3.0

SUMMARY OF INVENTION

Problem to be Solved by the Invention

When a large number of small cells are installed, the UE needs to measure a large number of cells in the measurement for cell re-selection or the measurement for handover. The measurement therefore requires an enormous amount of time.

Meanwhile, a small cell has a small cell radius and a small coverage range compared with a macro cell. When a UE moves, accordingly, a period of time when the UE stays in the small cell is shorter than a period of time when the UE stays in the macro cell.

Thus, an optimum cell as a cell re-selection destination or an optimum cell as a handover destination cannot be detected, leading to a fear that cell re-selection and handover may not be performed normally but may fail.

For normal cell re-selection and handover, a communication system that has mobility performance that can support the movement of the UE is required in a configuration in which a large number of small cells are installed. Non-Patent Documents 1 to 12 above do not disclose such a communication system.

The present invention has an object to provide a communication system having mobility performance that can support the movement of a communication terminal device in a configuration in which a large number of small cells are installed.

Means to Solve the Problem

A communication system according to the present invention is a communication system in which a plurality of communication terminal devices perform radio communication via a network configured by a network-side device including one or a plurality of base station devices. The communication system includes a plurality of cells configured by the one or the plurality of base station devices and connected to the communication terminal devices to perform radio communication with the communication terminal devices. The plurality of cells are grouped into a plurality of groups. Each of the communication terminal devices is configured to (a) in an idle state, select any of a group, to which a cell of which coverage its own device is in, belongs and a group different from the group, to which the cell of which coverage its own device is in, belongs and measure cells belonging to the selected group for selecting a cell being a re-selection destination, and (b) in a connected state, select any of a group to which a cell connected with its own device belongs and a group different from the group to which the cell connected with its own device belongs and measure cells belonging to the selected group for handover.

Effects of the Invention

According to the communication system of the present invention, when the communication terminal device is in the idle state, any of a group, to which the cell of which coverage its own device is in, belongs and a group different from that group is selected, and cells belonging to the selected group are measured for selecting a cell being a re-selection destination. When the communication terminal device is in the connected state, any of a group to which a cell connected with the communication terminal device belongs and a group different from that group is selected, and cells belonging to the selected group are measured for handover.

As described above, the cells measured by the communication terminal device are limited to the cells belonging to the group selected by the communication terminal device. This enables, even when the communication terminal device moves at a relatively high speed, detection of a cell suitable for re-selection or handover in the configuration in which a large number of small cells having a relatively small coverage are installed as a plurality of cells. Therefore, a communication system having mobility performance that can support the movement of the communication terminal device can be provided in the configuration in which a large number of small cells are installed.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 4 is a block diagram showing the configuration of a base station 72 shown in FIG. 2, which is a base station according to the present invention.

FIG. 5 is a block diagram showing the configuration of an MME according to the present invention.

FIG. 6 is a flowchart showing an outline from a cell search to an idle state operation performed by a user equipment (UE) in the LTE communication system.

FIG. 7 shows the concept of the configuration of a cell when macro eNBs and small eNBs coexist.

FIG. 8 shows the concept of a shift between cell groups of which coverage a UE is to be in when cells are grouped.

FIG. 9 shows the concept of grouping when cells are grouped in a fixed manner as a system.

FIG. 11 shows an example of the sequence of a communication system in a first embodiment.

FIG. 12 is a graph showing the concept of a specific example of a shift determination threshold.

FIG. 13 is a flowchart showing the procedure of a UE in an idle mode in a first modification of the first embodiment.

FIG. 17 is a flowchart showing a procedure of a UE in the idle mode in a second modification of the first embodiment.

FIG. 18 is a flowchart showing the procedure of the UE in the idle mode in the second modification of the first embodiment.

FIG. 20 is a diagram for explaining the concept of an SCG configuring a virtual macro cell.

FIG. 31 shows the example of the sequence of the communication system in the second modification of the second embodiment.

FIG. 32 shows another example of the sequence of the communication system in the second modification of the second embodiment.

FIG. 33 is a diagram for explaining a configuration where each cell in an SCG has four antennas.

FIG. 48 is a flowchart showing the example of the procedure of the operation of the UE in the fifth embodiment.

FIG. 51 is a flowchart showing the other example of the procedure of the operation of the UE in the fifth embodiment.

DESCRIPTION OF EMBODIMENTS

First Embodiment

Figure 2:
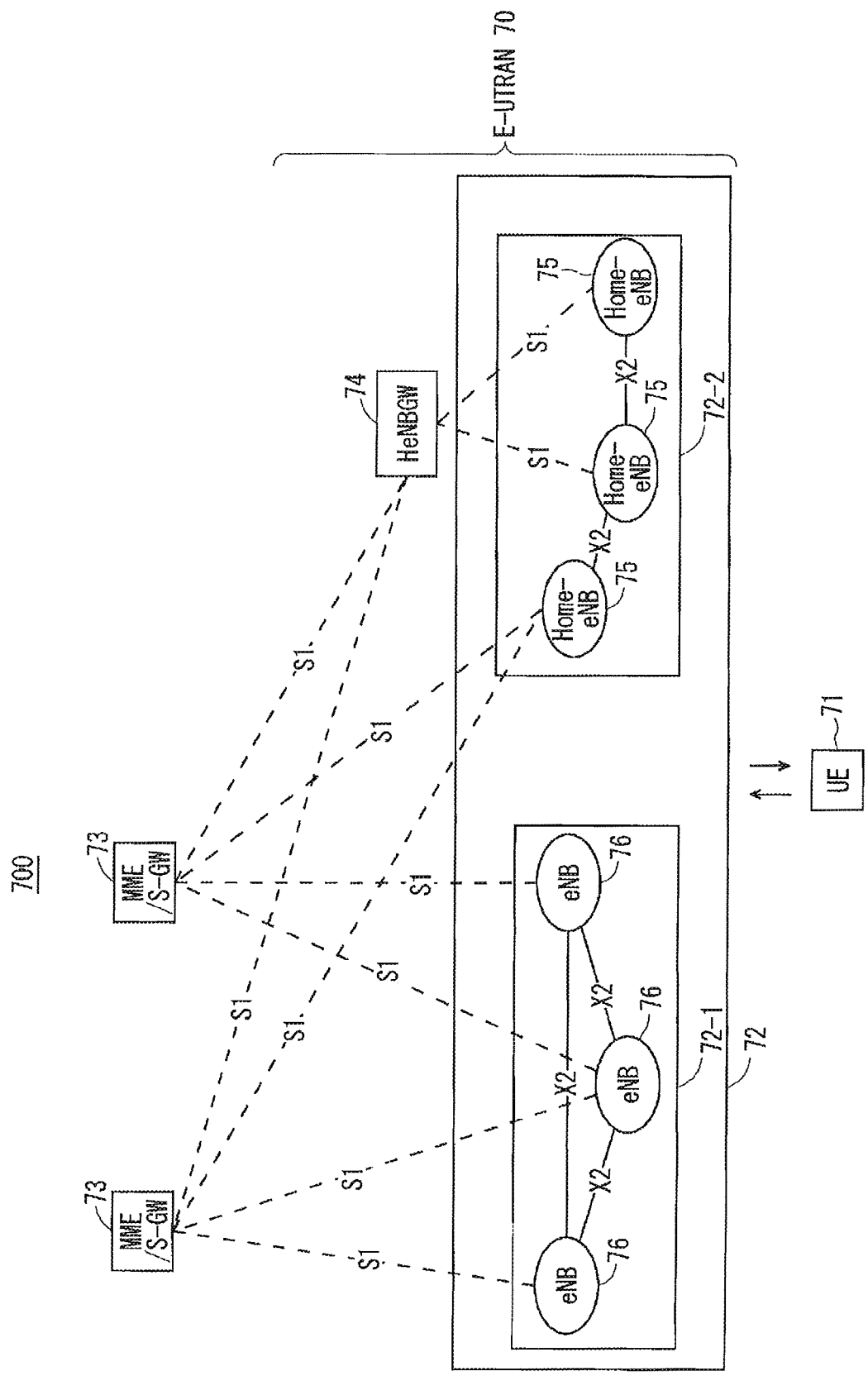
FIG. 2 is a block diagram showing the overall configuration of an LTE communication system 700 under discussion of 3GPP.

FIG. 2 is a block diagram showing an overall configuration of an LTE communication system 700, which is under discussion of 3GPP. FIG. 2 will be described. A radio access network is referred to as an evolved universal terrestrial radio access network (E-UTRAN) 70. A user equipment device (hereinafter, referred to as a "user equipment (UE)") 71 being a communication terminal device is capable of radio communication with a base station device (hereinafter, referred to as a "base station (E-UTRAN Node B: eNB)") 72 and transmits and receives signals through radio communication.

The E-UTRAN is composed of one or a plurality of base stations 72, provided that a control protocol for a user equipment 71 such as a radio resource control (RRC), and user planes such as a packet data convergence protocol (PDCP), radio link control (RLC), medium access control (MAC), or physical layer (PHY) are terminated in the base station 72.

The control protocol radio resource control (RRC) between the user equipment 71 and the base station 72 performs broadcast, paging, RRC connection management, and the like. The states of the base station 72 and the user equipment 71 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting/receiving data to/from a network. In RRC_CONNECTED, for example, handover (HO) and measurement of a neighbor cell are performed.

The base stations 72 are classified into eNBs 76 and Home-eNBs 75. The communication system 700 includes a eNB group 72-1 including a plurality of eNBs 76 and a Home-eNB group 72-2 including a plurality of Home-eNBs 75. A system, composed of an evolved packet core (EPC) being a core network and an E-UTRAN 70 being a radio access network, is referred to as an evolved packet system (EPS). The EPC being a core network and the E-UTRAN 70 being a radio access network may be collectively referred to as a "network."

The eNB 76 is connected to an MME/S-GW unit (hereinafter, also referred to as an "MME unit") 73 including a mobility management entity (MME), a serving gateway (S-GW), or an MME and an S-GW by means of an S1 interface, and control information is communicated between the eNB 76 and the MME unit 73. A plurality of MME units 73 may be connected to one eNB 76. The eNBs 76 are connected to each other by means of an X2 interface, and control information is communicated between the eNBs 76.

The Home-eNB 75 is connected to the MME unit 73 by means of an S1 interface, and control information is communicated between the Home-eNB 75 and the MME unit 73. A plurality of Home-eNBs 75 are connected to one MME unit 73. Or, the Home-eNBs 75 are connected to the MME units 73 through a Home-eNB gateway (HeNBGW) 74. The Home-eNB 75 is connected to the HeNBGW 74 by means of an S1 interface, and the HeNBGW 74 is connected to the MME unit 73 through an S1 interface.

One or a plurality of Home-eNBs 75 are connected to one HeNBGW 74, and information is communicated therebetween through an S1 interface. The HeNBGW 74 is connected to one or a plurality of MME units 73, and information is communicated therebetween through an S1 interface.

The MME units 73 and HeNBGW 74 are entities of higher layer, specifically, higher nodes, and control the connections between the user equipment (UE) 71 and the eNB 76 and the Home-eNB 75 being base stations. The MME units 73 configure an EPC being a core network. The base station 72 and the HeNBGW 74 configure an E-UTRAN 70.

Further, 3GPP is studying the configuration below. The X2 interface between the Home-eNBs 75 is supported. In other words, the Home-eNBs 75 are connected to each other by means of an X2 interface, and control information is communicated between the Home-eNBs 75. The HeNBGW 74 appears to the MME unit 73 as the Home-eNB 75. The HeNBGW 74 appears to the Home-eNB 75 as the MME unit 73.

The interfaces between the Home-eNBs 75 and the MME units 73 are the same, which are the S1 interfaces, in both cases where the Home-eNB 75 is connected to the MME unit 73 through the HeNBGW 74 and it is directly connected to the MME unit 73.

The base station device 72 may configure a single cell or a plurality of cells. Each cell has a range predetermined as a coverage in which the cell can communicate with a communication terminal device and performs radio communication with the communication terminal device within the coverage. In the case where one base station device configures a plurality of cells, every cell is configured to communicate with a user equipment.

Figure 3:
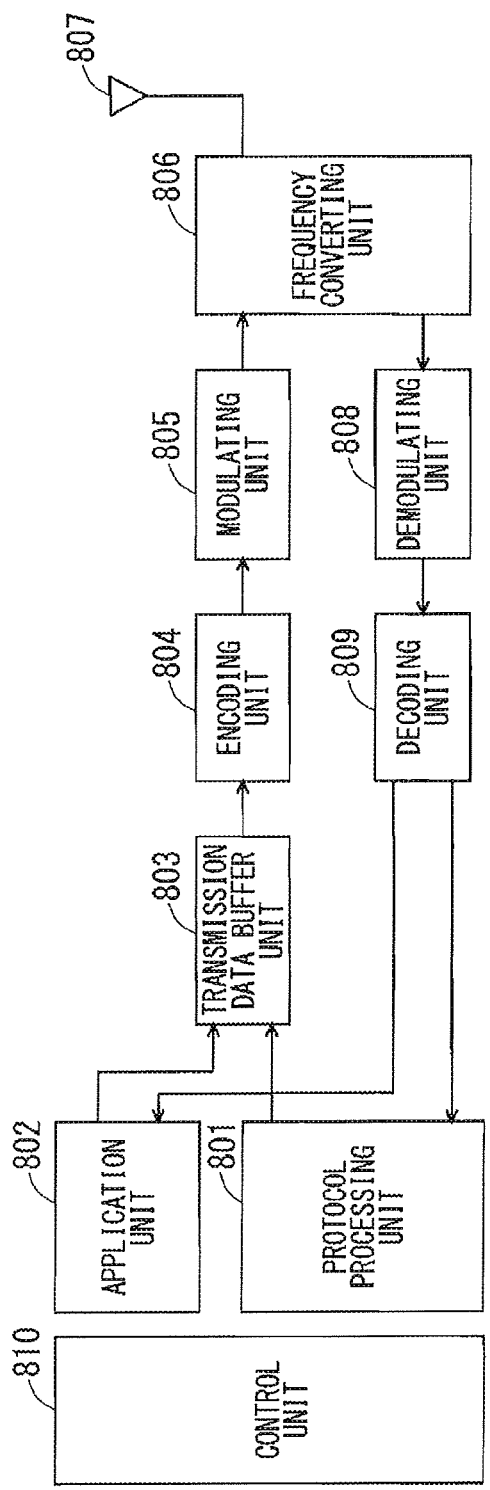
FIG. 3 is a block diagram showing the configuration of a user equipment 71 shown in FIG. 2, which is a user equipment according to the present invention.

FIG. 3 is a block diagram showing the configuration of the user equipment 71 of FIG. 2 being a user equipment according to the present invention. The transmission process of the user equipment 71 shown in FIG. 3 will be described. First, a transmission data buffer unit 803 stores the control data from a protocol processing unit 801 and the user data from an application unit 802. The data stored in the transmission data buffer unit 803 is passed to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is converted into a baseband signal, and the baseband signal is output to a frequency converting unit 806 and is then converted into a radio transmission frequency. After that, a transmission signal is transmitted from an antenna 807 to the base station 72.

The user equipment 71 executes the reception process as follows. The radio signal from the base station 72 is received through the antenna 807. The received signal is converted from a radio reception frequency into a baseband signal by the frequency converting unit 806 and is then demodulated by a demodulating unit 808. The demodulated data is passed to a decoding unit 809 and is subjected to a decoding process such as error correction. Among the pieces of decoded data, the control data is passed to the protocol processing unit 801, while the user data is passed to the application unit 802. A series of processes of the user equipment 71 is controlled by a control unit 810. This means that, though not shown in FIG. 3, the control unit 810 is connected to the individual units 801 to 809.

FIG. 4 is a block diagram showing the configuration of the base station 72 of FIG. 2 being a base station according to the present invention. The transmission process of the base station 72 shown in FIG. 4 will be described. An EPC communication unit 901 performs data transmission and reception between the base station 72 and the EPC (such as the MME unit 73), HeNBGW 74, and the like). A communication with another base station unit 902 performs data transmission and reception to and from another base station. The EPC communication unit 901 and the communication with another base station unit 902 each transmit and receive information to and from a protocol processing unit 903. The control data from the protocol processing unit 903, and the user data and the control data from the EPC communication unit 901 and the communication with another base station unit 902 are stored in a transmission data buffer unit 904.

The data stored in the transmission data buffer unit 904 is passed to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is converted into a baseband signal, and the baseband signal is output to a frequency converting unit 907 and is then converted into a radio transmission frequency. After that, a transmission signal is transmitted from an antenna 908 to one or a plurality of user equipments 71.

The reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is passed to a decoding unit 910 and is then subjected to a decoding process such as error correction. Among the pieces of decoded data, the control data is passed to the protocol processing unit 903, the EPC communication unit 901, or the communication with another base station unit 902, while the user data is passed to the EPC communication unit 901 and the communication with another base station unit 902. A series of processes by the base station 72 is controlled by a control unit 911. This means that, though not shown in FIG. 4, the control unit 911 is connected to the individual units 901 to 910.

FIG. 5 is a block diagram showing the configuration of the MME according to the present invention. FIG. 5 shows the configuration of an MME 73a included in the MME unit 73 shown in FIG. 2 described above. A PDN GW communication unit 1001 performs data transmission and reception between the MME 73a and the PDN GW. A base station communication unit 1002 performs data transmission and reception between the MME 73a and the base station 72 by means of the S1 interface. In the case where the data received from the PDN GW is user data, the user data is passed from the PDN GW communication unit 1001 to the base station communication unit 1002 via a user plane communication unit 1003 and is then transmitted to one or a plurality of base stations 72. In the case where the data received from the base station 72 is user data, the user data is passed from the base station communication unit 1002 to the PDN GW communication unit 1001 via the user plane communication unit 1003 and is then transmitted to the PDN GW.

In the case where the data received from the PDN GW is control data, the control data is passed from the PDN GW communication unit 1001 to a control plane control unit 1005. In the case where the data received from the base station 72 is control data, the control data is passed from the base station communication unit 1002 to the control plane control unit 1005.

A HeNBGW communication unit 1004 is provided in the case where the HeNBGW 74 is provided, which performs data transmission and reception between the MME 73a and the HeNBGW 74 by means of the interface (IF) according to an information type. The control data received from the HeNBGW communication unit 1004 is passed from the HeNBGW communication unit 1004 to the control plane control unit 1005. The processing results of the control plane control unit 1005 are transmitted to the PDN GW via the PDN GW communication unit 1001. The processing results of the control plane control unit 1005 are transmitted to one or a plurality of base stations 72 by means of the S1 interface via the base station communication unit 1002, and are transmitted to one or a plurality of HeNBGWs 74 via the HeNBGW communication unit 1004.

The control plane control unit 1005 includes a NAS security unit 1005-1, an SAE bearer control unit 1005-2, and an idle state mobility managing unit 1005-3, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of a paging signal in the idle state, addition, deletion, update, and search of a tracking area of one or a plurality of user equipments 71 being served thereby, and tracking area list management.

The MME 73a distributes a paging signal to one or a plurality of base stations 72. In addition, the MME 73a performs mobility control of an idle state. When the user equipment is in the idle state and an active state, the MME 73a manages a list of tracking areas. The MME 73a begins a paging protocol by transmitting a paging message to the cell belonging to a tracking area in which the UE is registered. The idle state mobility managing unit 1005-3 may manage the CSG of the Home-eNBs 72-2 to be connected to the MME 73*a*, CSG-IDs, and a whitelist.

An example of a cell search method in a mobile communication system will be described next. FIG. 6 is a flowchart showing an outline from a cell search to an idle state operation performed by a user equipment (UE) in the LTE communication system. When starting a cell search, in Step ST1201, the user equipment synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to physical cell identities (PCIs) assigned per cell, are assigned to the synchronization signal (SS). The number of PCIs is currently studied in 504 ways. The 504 ways of PCIs are used for synchronization, and the PCIs of the synchronized cells are detected (specified).

In Step ST1202, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST1201, which makes it possible to detect the RS and measure the RS received power.

In Step ST1203, next, the user equipment selects the cell having the best RS reception quality, for example, the cell having the highest RS received power, that is, the best cell, from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), the number of transmission antennas, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or larger than two). In addition, the SIB1 contains a tracking area code (TAC).

In Step ST1206, next, the user equipment compares the TAC of the SIB1 received in Step ST1205 with the TAC portion of a tracking area identity (TAI) in the tracking area list that has already been possessed by the user equipment. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST1206 shows that the TAC received in Step ST1205 is identical to the TAC included in the tracking area list, the user equipment enters an idle state operation in the cell. If the comparison shows that the TAC received in Step ST1205 is not included in the tracking area list, the user equipment requires a core network (EPC) including MME and the like to change a tracking area through the cell for performing tracking area update (TAU).

The device (hereinafter, also referred to as a "core-network-side device") configuring a core network updates the tracking area list based on an identification number (such as UE-ID) of a user equipment transmitted from the user equipment together with a TAU request signal. The core-network-side device transmits the updated tracking area list to the user equipment. The user equipment rewrites (updates) the TAC list of the user equipment based on the received tracking area list. After that, the user equipment enters the idle state operation in the cell.

Widespread use of smartphones and tablet terminals explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell configuring a relatively-wide-range coverage, that is, a cell having a relatively wide coverage area, similarly to a cell configured by a conventional eNB. A "small cell" refers to a cell configuring a relatively-narrow-range coverage, that is, a cell having a relatively narrow coverage area, and a "small eNB" refers to an eNB configuring a small cell.

The macro eNB may be, for example, a "wide area base station" described in Non-Patent Document 8.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 8.

FIG. 7 shows the concept of the cell configuration in which macro eNBs and small eNBs coexist. The macro cell configured by a macro eNB has a relatively-wide-range coverage 1301. A small cell configured by a small eNB has a coverage 1302 whose range is narrower than that of the coverage 1301 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "1304" or "1305," the coverage 1302 of the small cell configured by a small eNB may be included in the coverage 1301 of the macro cell configured by a macro eNB.

As indicated by a reference "1305," the coverages 1302 of a plurality of, for example, two small cells may be included in the coverage 1301 of one macro cell. A user equipment (UE) 1303 is included in, for example, the coverage 1302 of the small cell and performs communication via the small cell.

In the cell configuration shown in FIG. 7, as indicated by a reference "1306," the coverage 1301 of the macro cell configured by a macro eNB may overlap the coverages 1302 of the small cells configured by small eNBs in a complicated manner.

As indicated by a reference "1307," the coverage 1301 of the macro cell configured by a macro eNB may not overlap the coverages 1302 of the small cells configured by small eNBs.

Further, as indicated by a reference "1308," the coverages 1302 of a large number of small cells configured by a large number of small eNBs may be configured in the coverage 1301 of one macro cell configured by one macro eNB.

The problem solved in a first embodiment and the solution to the problem will be described below. This embodiment will describe the configuration in which the coverage of the macro cell configured by a macro eNB includes the coverage of the small cell configured by a small eNB.

As described above, to support a tremendous volume of traffic in the future, for example, the following technique is studied: a large number of small eNBs are installed to install a large number of small cells, thereby increasing spectral efficiency, which increases communication capacity.

When a large number of small cells are installed, a UE has to measure a large number of cells in the measurement for cell re-selection or the measurement for handover, and accordingly, the measurement requires a tremendous amount of time. Consequently, when a measurement time is limited, an optimum cell as a cell re-selection destination or an optimum cell as a handover destination may not be detected. When an optimum cell cannot be detected, cell re-selection may be repeated, or handover does not complete normally, resulting in a handover failure. When a large number of small cells are installed, accordingly, how to improve the measurement capability of a UE is a problem to be solved.

The solution in the first embodiment will be described below. Cells are grouped, and a UE determines a shift to a cell group of which coverage the US is to be in.

A cell of which coverage the US is in is a cell on which a UE in an idle state camps, and in the case of a UE in an active state (connected state), which is a cell connected with the UE.

In determination of a shift to a cell group, the UE in the idle state (hereinafter, also referred to as an "idle mode") determines whether to shift to be in the coverage of a cell of a group different from a group (hereinafter, also referred to as a "cell group") to which the cell, on which the UE is currently camping, belongs or to keep being in the coverage of a cell belonging to the same group as the group to which the cell, on which the UE is currently comping, belongs.

The UE in the connected state (hereinafter, also referred to as a "connected mode") determines whether to hand over to a cell belonging to a group different from a group to which the cell currently connected with the UE belongs or to hand over to a cell belonging to the same group as the group to which the cell currently connected with the UE belongs. That is to say, the UE in the connected state (connected mode) determines whether to shift to be in the coverage of a cell belonging to a group different from the group to which the cell currently connected with the UE belongs or to keep being in the coverage of the cell belonging to the same group as the group to which the cell currently connected with the UE belongs.

FIG. 8 shows the concept of a shift between cell groups of which coverage a UE is to be in when cells are grouped. Cells 2101 to 2109 belong to a cell group A, and cells 2110 to 2112 belong to a cell group B.

It is assumed that a UE 2113 is in the idle mode (idle state).

It is assumed that the UE 2113 camps on the cell 2109 belonging to the cell group A. The UE 2113 determines whether to shift to be in the coverage of a cell belonging to a group different from the group to which the cell 2109, on which the UE is currently camping, belongs or to keep being in the coverage of the cell belonging to the same group as the group to which the cell 2019, on which the UE is currently camping, belongs.

For example, when judging to shift to be in the coverage of a cell belonging to a group different from the group A being a group to which the cell 2109, on which the UE is currently camping, belongs, the UE 2113 measures the cells belonging to the cell group B for selecting a cell as a re-selection destination, thereby selecting a cell belonging to the cell group B, for example, the cell 2111 as a cell re-selection destination.

For example, when judging to keep being in the coverage of the cell belonging to the same group as the group A being a group to which the cell 2109, on which the UE is currently camping, belongs, the UE 2113 measures the cells belonging to the cell group A for selecting a cell as a re-selection destination, thereby selecting another cell belonging to the cell group A, for example, the cell 2108 as a cell re-selection destination.

As described above, in the idle mode (idle state), the UE 2113 selects any of the group, to which the cell of which coverage its own UE 2113 is in, belongs and the group different from the group, to which the cell of which coverage its own UE 2113 is in, belongs, and measures the cells belonging to the selected group for selecting a cell as a re-selection destination, that is, performs measurement for cell re-selection. The UE 2113 then selects a cell re-selection destination based on the measurement result. One example of the measurement for cell re-selection is the measurement of the received power from a cell, specifically, the measurement of the received power (reference signal received power: RSRP) of a reference signal (RS).

It is assumed that the UE 2114 is in the connected mode (connected state).

The UE 2114 is connected to the cell 2111 belonging to the cell group B. The UE 2114 determines whether to shift to be in the coverage of a cell belonging to a group different from the group to which the cell 2111 currently connected with the UE belongs or to keep being in the coverage of the cell belonging to the same group as the group to which the cell 2111 currently connected with the UE belongs.

For example, when judging to shift to be in the coverage of a cell belonging to a group different from the group B being a group to which the cell 2111 currently connected with the UE belongs, the UE 2114 measures the cells 2101 to 2109 belonging to the cell group A for handover and reports the measurement.

For example, when judging that it is to keep being in the coverage of the cell belonging to the same group as the group B being a group to which the cell 2111 currently connected with the UE belongs, the UE 2114 measures the other cells 2110 and 2112 belonging to the cell group B for handover and reports the measurement.

As described above, in the connected mode (connected state), the UE 2114 selects any of the group to which the cell connected with its own UE 2114 belongs and the group different from the group to which the cell connected with its own UE 2114 belongs, and measures the cells belonging to the selected group for handover. The UE 2114 then performs measurement report to report the measurement results. One example of the measurement for handover is the measurement of the received power from a cell, specifically, the measurement of the received power (RSRP) of a reference signal (RS).

In a specific example of grouping cells, cells are grouped based on predetermined characteristics. The following twelve, (1) to (12), will be disclosed as specific examples of the predetermined characteristics.

(1) Cells are grouped in accordance with their cell size. The following five, (1-1) to (1-5), will be disclosed as specific examples of the criteria by which the cell size is judged.

(1-1) The cell size is judged in accordance with the transmission power of a cell. The range reached by a downlink signal from the cell becomes larger with higher transmission power. Thus, the cell size is larger with higher transmission power.

(1-2) The cell size is judged in accordance with the cell range of a cell.

(1-3) The cell size is judged in accordance with the coverage radius of a cell.

(1-4) The cell size is judged in accordance with a cell type. A plurality of types may be regarded as one group. For example, small cells, pico cells, femto cells, and hotspots are classified into a group having a small cell size, and macro cells are classified into a group having a large cell size.

(1-5) Combination of (1-1) to (1-4) above.

(2) Cells are grouped in accordance with a frequency layer. For example, cells are grouped in accordance with the frequency layer to which the carrier frequency used by a cell belongs. Alternatively, for example, cells are grouped in accordance with the frequency band to which the carrier frequency used by a cell belongs.

(3) Cells are grouped by the radio access technology (RAT) supported by a cell. The following four, (3-1) to (3-4), will be disclosed as specific examples of the radio access technology.

(3-1) Universal terrestrial radio access (UTRA).

(3-2) GSM (registered trademark)/EDGE radio access network (GERAN).

(3-3) Code division multiple access 2000 (CDMA2000).

(3-4) Evolved universal terrestrial radio access network (E-UTRAN).

(4) Cells are grouped in accordance with a cell location. The following two, (4-1) and (4-2), will be disclosed as specific examples in which cells are grouped in accordance with a cell location.

(4-1) Cells are grouped in accordance with the location in which a cell is installed, irrespective of a serving cell. For example, the cells installed in 1-chome (1st street) are classified into a group A, and the cells installed in 2-chome (2nd street) are classified into a group B.

(4-2) Cells are grouped in accordance with the location in which a cell is installed relative to a serving cell. For example, cells are grouped in accordance with the distance from the serving cell to the relevant cell. Alternatively, for example, cells are grouped in accordance with the orientations of the cells in which they are installed, seen from the serving cell. Specifically, cells are grouped into, for example, a "west area cell group," and "east area cell group."

(5) Cells are grouped in accordance with a cell load. For example, cells are grouped in accordance with the processing load of a scheduler in the cell. For example, cells are grouped in accordance with the use amount or available amount of radio resources of the cell.

(6) Cells are grouped in accordance with the radio resource amount of a cell. For example, cells are grouped in accordance with a cell bandwidth.

Cells are grouped in accordance with the type of service supported by a cell. The following three, (7-1) to (7-3), will be disclosed as specific example of the supported services.

(7-1) Whether voice is supported or not supported.

(7-2) Whether data communication is supported or not supported.

(7-3) Whether MBMS service is supported or not supported.

(8) Cells are grouped in accordance with the delay level of a cell. For example, whether the backhaul link of a cell has a large delay (non-ideal) or a small delay (ideal). Cells may be grouped in accordance with a backhaul type.

(9) Cells are grouped in accordance with the quality of service (QoS) supported by a cell.

(10) Cells are grouped in accordance with a GW connected with a cell. The cells connected with the same GW are regarded as the cells belonging to the same group.

(11) Cells are grouped in accordance with a concentrator connected with a cell. The cells connected with the same concentrator are regarded as the cells belonging to the same group.

(12) Combination of (1) to (11) above.

The following three, (1) to (3), will be disclosed as specific examples of the method of deciding grouping of cells.

(1) Grouping is decided in a fixed manner or a statical manner as a system. FIG. 9 shows the concept of grouping when cells are grouped in a fixed manner as a system. It is assumed that cells 2201 to 2215 exist. For example, the cells belonging to a cell group A (2218) are the cells 2201, 2202, 2203, 2204, 2205, 2206, and 2207. The cells belonging to a cell group B (2219) are the cells 2209, 2210, 2211, 2212, 2213, 2214, and 2215. The specific example (1) is highly compatible with the specific examples (1), (2), (3), (4-1), (6), (7), and (8) of the predetermined characteristics of the grouping described above, in which cells belonging to a group can be decided in a fixed manner as a system.

Figure 10:
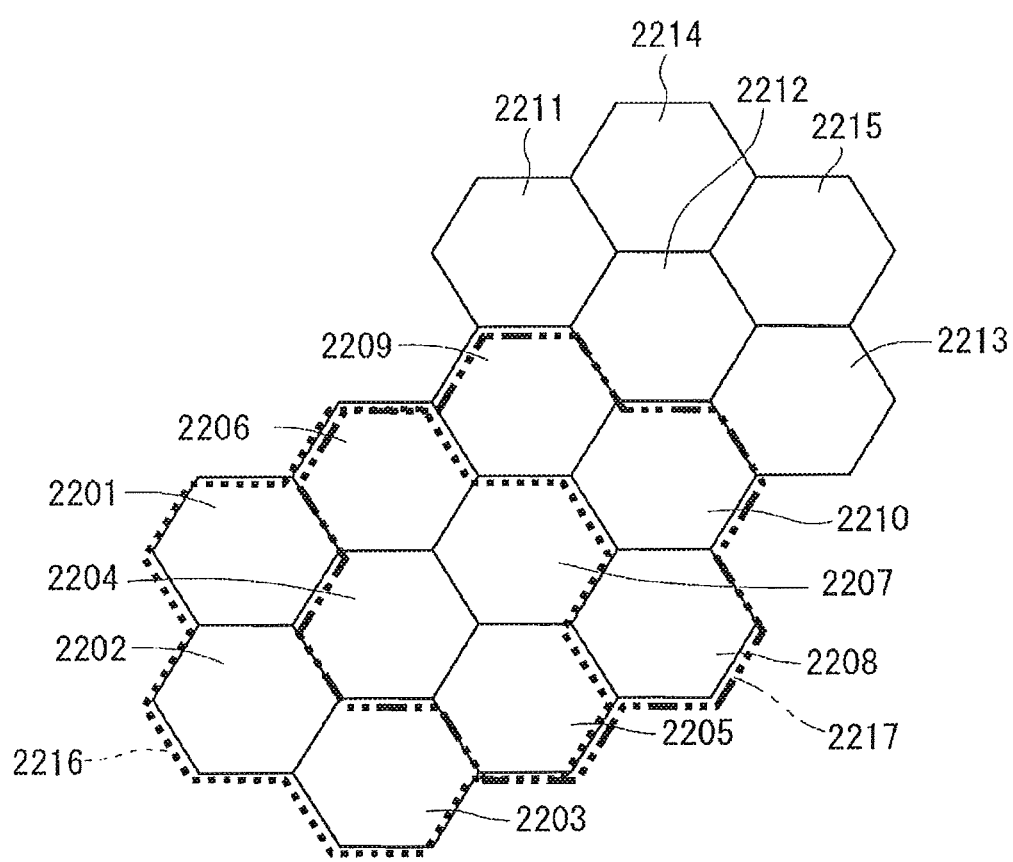
FIG. 10 shows the concept of grouping when cells are grouped in a semi-static manner as a system.

(2) Grouping is decided semi-statically. Cells are grouped per serving cell, and the cells belonging to the group are varied per serving cell. FIG. 10 shows the concept of grouping when cells are grouped by a semi-static decision as a system. It is assumed that the cells 2201 to 2215 exist. The cells belonging to a cell group A (2216) when the serving cell is the cell 2204 are the cells 2201, 2202, 2203, 2204, 2205, 2206, and 2207. The cells belonging to a cell group A (2217) when the serving cell is the cell 2207 are the cells 2204, 2205, 2206, 2207, 2208, 2209, and 2210. The specific example (2) is highly compatible with the specific example (4-2) of the predetermined characteristics of grouping described above, which is suitable for grouping per serving cell as a system.

(3) Grouping is decided dynamically. Cells are grouped per lapse of time, and the cells belonging to the group are varied per time. The specific example (3) is highly compatible with the specific example (5) of the predetermined characteristics of the grouping described above, which is the characteristic that varies per lapse of time.

The following two, (1) and (2), will be disclosed as specific examples of the entities that decide the group of a cell.

(1) An Operation and Maintenance (O&M) decides a group. The O&M notifies the cell of the decided group.

(2) A cell decides a group. When the cell is, for example, a small cell, a coverage macro cell may decide a group. When the small cell is installed within the coverage of another cell, the other cell is referred to as a "coverage macro cell." When the cell being an entity that decides a group differs from the other cell, the cell being an entity that decides a group notifies the other cell of the decided group. In this case, an X2 interface or S1 interface may be used for notification.

The method of notifying a UE of a cell group is as follows. The serving cell notifies a UE being served thereby of a plurality of cell groups. Alternatively, the serving cell notifies a UE of group identification information. The serving cell may notify a UE of a list of cells configuring a group or the cell identification information, together with the group identification information. The following three, (1) to (3), will be disclosed as specific examples of the method of notifying a UE of a cell group.

(1) A cell group is notified in the broadcast information. A cell group may be notified in the SIB.

(2) A cell group is notified by a dedicated signal. The following two, (2-1) and (2-2), will be disclosed as specific examples of the dedicated signal.

(2-1) A cell group is notified through RRC signaling. For example, a cell group is notified by a handover command.

(2-2) A cell group is notified in a measurement configuration.

(3) The notification of a cell group can be eliminated exceptionally if cell groups and predetermined characteristics in grouping are decided in advance, and each cell notifies the predetermined characteristic of its own cell by another method. For example, when the predetermined characteristic of grouping is the cell size of the specific example (1) described above, if the UE can recognize the cell size of the cell by other methods, the need for the notification of a cell group and cells configuring the group can be eliminated. The following two, (3-1) and (3-2), will be disclosed as specific examples of other methods.

(3-1) Downlink synchronization signal (SS) is used. Both or any one of a primary synchronization signal and a secondary synchronization signal may be used. The indicator as to whether its own cell is, for example, a small cell, or the indicator indicating a group to which its own cell belongs may be mapped. For example, the indicator as to whether its own cell is a small cell or indicating a group to which its own cell belongs may be shown in a sequence of a downlink synchronization signal.

(3-2) Discovery signal (discovery reference signal). Non-Patent Document 9 discloses the discovery signal. It is disclosed that a discovery signal is used to discover a small cell switched off for energy saving of an infrastructure or a small cell in normal operation (turned on). Non-Patent Document 9 also discloses that the transmission periodicity of a discovery signal is made long to reduce the interference to other cells and to reduce the transmission power of a small cell. Its own cell may map an indicator as to whether its own cell is, for example, a small cell, or an indicator indicating a group to which its own cell belongs. For example, the indicator showing whether its own cell is a small cell or indicating a group to which its own cell belongs may be shown in the sequence of a discovery signal.

Specific examples of the determination of a shift to a cell group by a UE will be described below. The UE selects a cell group of which coverage the UE is to be in from among a plurality of cell groups notified from the serving cell. In the description below, selecting a cell group of which coverage the UE is to be in from among a plurality of cell groups notified from the serving cell may be referred to as "determination of a shift to a cell group."

Alternatively, whether to perform measurement may be determined. The determination of the presence or absence of measurement execution may be provided. Whether the condition for executing measurement is satisfied may be judged. These may be referred to as "measurement determination" in the description below. "Measurement determination" may be performed before the determination of a shift to a cell group. This eliminates the need for starting measurement again after determining a shift, thereby preventing a control delay.

For example, the UE in the idle mode performs measurement determination for cell re-selection. When determining to perform measurement, the UE performs measurement for cell re-selection. The UE selects a cell group from which a cell is re-selected. In other words, the UE performs the determination of a shift to a cell group.

The UE in the connected mode performs measurement determination for handover. When determining to perform measurement, the UE performs measurement for handover. The UE selects a cell group to which the UE hands over. That is to say, the UE performs the determination of a shift to a cell group.

After the determination of a shift to a cell group, the UE in the idle mode selects a cell of which coverage the UE is to be in from among the cells belonging to the cell group of which coverage the UE is to be in. When a measurement event occurs in the cell belonging to the cell group of which coverage the UE is to be in, the UE in the connected mode reports the measurement (selects a candidate for handover destination cell and reports the measurement). In the description below, the "determination of a shift to a cell" may refer to selecting a cell of which coverage the UE is to be in from among the cells belonging to the cell group of which coverage the UE is to be in and reporting the measurement when a measurement event occurs.

For example, the UE in the idle mode measures the cells belonging to the cell group of which coverage the UE is to be in. For example, from among the cells belonging to the cell group of which coverage the UE is to be in, the UE selects a cell having the best received power, a cell having the best reception quality, or the best cell as the cell re-selection destination, or selects the cell reselection destination in accordance with the normal cell selection criteria.

The UE in the connected mode measures the cells belonging to a cell group of which coverage the UE is to be in. For example, when a measurement event occurs in the cell belonging to the cell group of which coverage the UE is to be in, the UE notifies a serving cell of the report on the measurement of the cell. The case in which a measurement event occurs is the case in which the measurement result in the UE satisfies the condition for the measurement report. The serving cell uses the measurement report notified from the UE to select a cell of which coverage the UE is to be in and notifies the UE of the cell. The serving cell selects a handover destination (target cell) and notifies the UE of the handover destination. After that, the handover process is performed between the UE, the serving cell, the target cell, and the like.

The following eight, (1) to (8), will be disclosed as specific examples of the threshold (indicator) of the determination of a shift to the cell group performed by the UE.

The thresholds of a shift determination may be provided individually for UEs in the idle mode and UEs in the connected mode.

(1) The moving speed of a UE. The UE uses the moving speed of its own UE to determine a shift to a cell group of which coverage the UE is to be in, thereby selecting a cell group of which coverage the UE is to be in. The moving speed may be varied depending on the radius of a measurement target cell. For example, the moving speed may be a function of the radius of a measurement target cell.

(2) The location of a UE or the moving direction of a UE. The UE uses at least one of the location of its own UE and the moving direction of its own UE to determine a shift to a cell group of which coverage the UE is to be in, thereby selecting a cell group of which coverage the UE is to be in.

(3) The access class of a UE. Specific examples of the access class include an access class (AC) and an extended access class (EAC) described in Non-Patent Document 10. The UE uses the category of its own UE in the AC to determine a shift to a cell group of which coverage the UE is to be in, thereby selecting a cell group of which coverage the UE is to be in. The UE uses the category of its own UE in the EAC to determine a shift to a cell group of which coverage the UE is to be in, thereby selecting a cell group of which coverage the UE is to be in.

(4) UE capability. The UE uses the UE capability to determine a shift to a cell group of which coverage the UE is to be in, thereby selecting a cell group of which coverage the UE is to be in. The following three, (4-1) to (4-3), will be disclosed as specific examples of the UE capability.

(4-1) Whether the UE is a high-speed, high-capacity communication terminal or a low-speed, low-capacity communication terminal.

(4-2) Whether the UE is a delay-tolerant terminal or not. Delay may have levels.

(4-3) Whether the UE is a normal UE or a machine type communication (MTC).

(5) Type of service. The UE, which is in the connected mode, uses the type of the service currently connected to determine a shift to a cell group of which coverage the UE is to be in. In other words, the UE selects a cell group of which coverage the UE is to be in. The following two, (5-1) and (5-2), will be disclosed as specific examples of the type of service.

(5-1) A degree of demand for real-time capability.

(5-2) Whether service is voice service or any other service.

(6) Quality of service (QoS). The UE, which is in the connected mode, uses the quality of service currently connected to determine a shift to a cell group of which coverage the UE is to be in. In other words, the UE selects a cell group of which coverage the UE is to be in.

(7) The reception quality of each cell measured by the UE. The reception quality of a serving cell. The reception quality of a neighbor cell.

(8) Combination of (1) to (7) above.

The method of notifying a UE of a threshold for determining a shift (hereinafter, also referred to as a "shift determination threshold") to a cell group is as follows. The serving cell notifies a UE being served thereby of the threshold for determining a shift to a cell group. The serving cell may notify the threshold for determining a shift to a cell group together with a cell group. The serving cell may associate the threshold for determining a shift to a cell group and a cell group and then notify them. The following three, (1) to (3), will be disclosed as specific examples of the method of notifying a UE of a threshold for determining a shift to a cell group.

(1) A shift determination threshold is notified in broadcast information. A shift determination threshold may be notified in the SIB.

(2) A shift determination threshold is notified by a dedicated signal. The following two, (2-1) and (2-2), will be disclosed as specific examples of the dedicated signal.

(2-1) A threshold is notified through RRC signaling. For example, a notification is made using a handover command.

(2-2) A threshold is notified in a measurement configuration.

(3) A threshold is decided statically in advance.

Next, a specific example of the sequence of the communication system when the solution in the first embodiment is used will be described with reference to FIG. 11. FIG. 11 shows an example of the sequence of the communication system in the first embodiment.

In Step ST2301, the O&M decides a cell group.

In Step ST2302, the O&M notifies the serving cell of a cell group. The O&M may also notify the serving cell of a list of cells configuring a group.

In Step ST2303, the serving cell notifies a UE being served thereby of the cell group. The serving cell may also notify the UE being served thereby of the list of cells configuring a group.

In Step ST2304, the serving cell notifies the UE being served thereby of a shift determination threshold. The notification of a shift determination threshold may be performed together with the notification of a cell group in Step ST2303.

In Step ST2305, the UE selects a cell group of which coverage the UE is to be in, based on the cell group and the list of cells configuring a group received in Step ST2303 and the shift determination threshold received in Step ST2304.

In Step ST2306, the UE decides to shift to the cell group selected in Step ST2305 (hereinafter, merely referred to as "shifts" as well).

The first embodiment can achieve the following effects. The measurement for selecting a cell being a cell re-selection destination or the measurement for selecting a handover destination may be limited to the cells within the cell group selected by the UE. Even when a large number of small cells are installed, thus, target cells can be limited to the cells belonging to a cell group according to the determination of a shift to a cell group by the UE. This enables easier detection of an optimum cell, thereby improving the measurement performance of a UE.

First Modification of First Embodiment

The problem to be solved in a first modification of the first embodiment will be described below. When a large number of small cells are installed, cells having different cell sizes may overlap each other. When a UE moves, the time in which the UE stays in a cell differs depending on its moving speed or cell size. The re-selection of and handover to a cell at which the UE stays for a short period of time trigger cell re-selection and handover again, leading to a problem that the processing load of a communication system increases.

Even when, for example, a UE moving at high speed detects a small cell as a handover destination (hereinafter, also referred to as a "handover-destination small cell") through measurement, the UE may pass through the handover-destination small cell while performing a handover-related process. In this case, the quality of the communication with the handover-destination small cell decreases, so that a handover may not be performed normally and may fail. Therefore, when a large number of small cells are installed, how to improve the mobility performance is a problem to be solved.

The solution in the first modification of the first embodiment will be described below. The solution in the first embodiment is used in this modification. Specifically, cells are grouped based on their cell size, and a UE uses the moving speed of its own UE to determine a shift to a cell group of which coverage the UE is to be in.

This modification will describe, of the solution in the first embodiment described above, only the characteristic portion of this modification.

A specific example of the cell group will be disclosed below. For example, a cell size group 1 (CellSizeGroup1) and a cell size group 2 (CellSizeGroup2) are provided as the groups according to the cell size.

Cells of large cell size, for example, macro cells belong to the cell size group 1. The cell size group 1 may be a cell group of big size (big size cell group).

Cells of small cell size, for example, small cells belong to the cell size group 2. The cell size group 2 may be a cell group of small size (small size cell group).

Specific examples of the criteria of judging a cell size are similar to those of the first embodiment, and thus, description thereof will be omitted. Specific examples of the method of notifying a UE of a cell group are similar to those of the first embodiment, and thus, description thereof will be omitted.

Disclosed below are specific examples of the contents of the notification of a cell group to a UE. The case in which both of group identification information and a list of cells configuring a group are notified will be disclosed below.

When a cell size group is the cell size group 1 and cells configuring the cell size group include a PCI#1, a PCI#2, a PCI#3, and a PCI#4, the group identification information is notified as "CellSizeGroup1 (PCI#1, PCI#2, PCI#3, PCI#4)".

When a cell size group is the cell size group 2 and cells configuring the cell size group include a PCI#21, a PCI#22, a PCI#23, a PCI#24, a PCI#25, a PCI#26, a PCI#27, and a PCI#28, the group identification information is notified as "CellSizeGroup2 (PCI#21, PCI#22, PCI#23, PCI#24, PCI#25, PCI#26, PCI#27, PCI#28)".

The list of cells configuring a group may include its own cell, for example, may include the identification information of its own cell. This allows the UE to recognize a cell group to which the serving cell belongs.

The cell may notify the UE being served thereby of the cell group to which the serving cell belongs. In a specific example of the notification method, the cell notifies a UE being served by thereby of the information indicating a cell group to which its own cell belongs through RRC signaling or in broadcast information. This allows the use of a separately notified cell group to which the serving cell belongs when the list of cells configuring a group does not include the serving cell.

A specific example of the determination of a shift to a cell group by a UE will be disclosed below. The UE uses the moving speed of its own UE to perform a shift determination as to whether to shift to be in the coverage of a cell size (inter-size) group different from the cell size group of the cell of which coverage the UE is currently in or to keep being in the coverage of the same cell size (intra-size) group. The above-mentioned shift determination recognizes the cell size group (cell size) of a cell of which coverage the UE is currently in, and thus, may be referred to as "relative shift determination."

The following two, (1) and (2), will be disclosed as specific examples of how to provide a threshold (indicator) of the determination to shift to a cell group performed by a UE.

(1) A threshold for determining a shift to an intra cell group and a threshold for determining a shift to an inter cell group are provided separately. Determination condition may be provided in place of the threshold for shift determination. The determination of the presence or absence of measurement execution may be provided separately. The threshold for shift determination and the determination of the presence or absence of measurement execution may be provided individually for cell re-selection and for handover.

(2) The threshold for determining a shift to an intra cell group is not provided, and the threshold for determining a shift to an inter cell group is provided. The determination condition may be provided in place of the threshold for shift determination. The determination of the presence or absence of measurement execution may be provided separately. The threshold for shift determination and the determination of the presence or absence of measurement execution may be provided individually for cell re-selection and for handover.

In place of providing a threshold for determination to shift to an intra cell group, the following may be performed. When the determination to shift to an inter cell group is not satisfied, the UE does not shift between cell groups. That is to say, the UE keeps being in the coverage of the cell belonging to the intra cell group, and when a cell belonging to the intra cell group is measured, the cell is selected, or a measurement event occurs, the UE reports the measurement (selects a handover-destination cell candidate and reports the measurement).

When only the determination of the presence or absence of measurement execution for the determination of a shift to an inter cell group is satisfied, the UE does not shift between cell groups. It is decided not to shift to an inter cell group. That is to say, the UE keeps being in the coverage of a cell belonging to an intra cell group, and when a cell belonging to the intra cell group is measured, cell is selected, or a measurement event occurs, UE reports the measurement.

When the determination of the presence or absence of measurement execution for a shift to an inter cell group is not satisfied, the UE does not shift between cell groups. The UE decides not to shift to an inter cell group. That is to say, the UE keeps being in the coverage of the cell belonging to the intra cell group, and when a cell belonging to the intra cell group is measured, the cell is selected, or a measurement event occurs, the UE reports the measurement.

When the determination to shift to an inter cell group is satisfied or the determination of the presence or absence of measurement execution for the determination to shift to an inter cell group is satisfied, the UE may or may not report the measurement as in the case where a cell belonging to the intra cell group is measured, the cell is selected, or a measurement event occurs.

Disclosed below is a specific example of a shift determination threshold in the case of the specific example (2) of how to provide a threshold (indicator) of the determination to shift to a cell group performed by a UE and in the case where the determination of the presence or absence of measurement execution for shift determination is provided separately and individually for cell re-selection and for handover. It is assumed that the cell size group 1 is a big size cell group and the cell size group 2 is a small size cell group.

The following four thresholds, (1) to (4), are provided for cell re-selection (for a UE in the idle mode).

(1) A threshold for determining the presence or absence of measurement execution of the inter cell group (cell size group 2) for re-selection, which is provided for a UE being in the coverage of the cell size group 1. For example, the moving speed is equal to or less than 30 km per hour. "S1_inter_cell_size_group1: moving speed ≤30 km/h."

(2) A threshold for determining a shift to the inter cell group (cell size group 2) for re-selection, which is provided for a UE being in the coverage of the cell size group 1. For example, the moving speed is less than 20 km per hour. "S2_inter_cell_size_group1: moving speed <20 km/h."

(3) A threshold for determining the presence or absence of measurement execution of the inter cell group (cell size group 1) for re-selection, which is provided for a UE being in the coverage of the cell size group 2. For example, the moving speed is more than 30 km per hour. "S1_inter_cell_size_group2: moving speed >30 km/h."

(4) A threshold for determining a shift to the inter cell group (cell size group 1) for re-selection, which is provided for a UE being in the coverage of the cell size group 2. For example, the moving speed is more than 50 km per hour. "S2_inter_cell_size_group2: moving speed >50 km/h."

The following four thresholds, (1) to (4), are provided for handover (for a UE in the connected mode).

(1) A threshold for determining the presence or absence of measurement execution of the inter cell group (cell size group 2) for handover, which is provided for a UE being in the coverage of the cell size group 1. For example, the moving speed is equal to or less than 30 km per hour. "T1_inter_cell_size_group1: moving speed_30 km/h."

(2) A threshold for determining a shift to the inter cell group (cell size group 2) for handover, which is provided for a UE being in the coverage of the cell size group 1. For example, the moving speed is less than 20 km per hour. "T2_inter_cell_size_group1: moving speed <20 km/h."

(3) A threshold for determining the presence or absence of measurement execution of the inter cell group (cell size group 1) for handover, which is provided for a UE being in the coverage of the cell size group 2. For example, the moving speed is more than 30 km per hour. "T1_inter_cell_size_group2: moving speed >30 km/h."

(4) A threshold for determining a shift to the inter cell group (cell size group 1) for handover, which is provided for a UE being in the coverage of the cell size group 2. For example, the moving speed is more than 50 km per hour. "T2_inter_cell_size_group2: moving speed >50 km/h."

FIG. 12 is a graph showing the concept of a specific example of the shift determination threshold. The vertical axis and the horizontal axis of FIG. 12 represent a moving speed v (km/h) and a time t, respectively. A cell size group 1 (CG1) is a big size cell group, and a cell size group 2 (CG2) is a small size cell group.

As indicated by a reference "50," the UE being in the coverage of the cell size group 1 will be described while classifying the moving speed v into a range R1, a range R2, and a range R3.

In the range R1, the moving speed v is equal to or less than 30 km per hour. The range R1 satisfies "S1_inter_cell_size_group1: moving speed_30 km/h" and "T1_inter_cell_size_group1: moving speed ≤30 km/h."

In the range R1, thus, the UE executes the measurement of the inter cell group (cell size group 2: small size cell group) for re-selection. In the range R1, the UE also executes the measurement of the inter cell group (cell size group 2: small size cell group) for handover.

That is to say, in the range R1, the UE executes the measurement of the inter cell size group (small size cell group).

In the range R2, the moving speed v is less than 20 km per hour. The range R2 satisfies "S2_inter_cell_size_group1: moving speed <20 km/h" and "T2_inter_cell_size_group1: moving speed <20 km/h."

In the range R2, thus, the UE shifts to the inter cell group (cell size group 2: small size cell group) for re-selection. When the cell belonging to the cell size group 2 separately satisfies the re-selection criteria, the UE performs a re-selection process.

In the range R2, the UE shifts to the inter cell group (cell size group 2: small size cell group) for handover. When the cell belonging to the cell size group 2 separately satisfies the condition for the measurement report, the UE reports the measurement.

That is to say, in the range R2, the UE shifts an inter cell size group (small size cell group).

In the range R3, the moving speed v is equal to or more than 20 km per hour.

The range R3 does not satisfy "S2_inter_cell_size_group1: moving speed <20 km/h" and "T2_inter_cell_size_group1: moving speed <20 km/h."

The determination of a shift to an inter cell group is not satisfied, and accordingly, the UE does not shift between cell groups. That is to say, the UE executes the measurement of the intra cell group (cell size group 1: big size cell group) for re-selection. When the cell belonging to the cell size group 1 separately satisfies the re-selection criteria, the UE performs the re-selection process.

In the range R3, the UE performs the measurement of the intra cell group (cell size group 1: big size cell group) for handover. When the cell belonging to the cell size group 1 separately satisfies the condition for the measurement report, the UE reports the measurement.

That is to say, in the range R3, the UE measures and shifts the intra cell size group (big size cell group).

As indicated by a reference "51," the UE being in the coverage of the cell size group 2 will be described while classifying a moving speed v into a range R4, a range R5, and a range R6.

In the range R4, the moving speed v is more than 30 km per hour. The range R4 satisfies "S_inter_cell_size_group2: moving speed >30 km/h" and "T1_inter_cell_size_group2: moving speed >30 km/h."

In the range R4, thus, the UE executes the measurement of the inter cell group (cell size group 1: big size cell group) for re-selection. In the range R4, the UE also executes the measurement of the inter cell group (cell size group 1: big size cell group) for handover.

That is to say, in the range R4, the UE executes the measurement of the inter cell size group (big size cell group).

In the range R5, the moving speed v is more than 50 km per hour. The range R5 satisfies "S2_inter_cell_size_group2: moving speed >50 km/h" and "T2_inter_cell_size_group2: moving speed >50 km/h."

In the range R5, thus, the UE shifts to the inter cell group (cell size group 1: big size cell group) for re-selection. When the cell belonging to the cell size group 1 separately satisfies the re-selection criteria, the UE performs the re-selection process.

In the range R5, the UE shifts to the inter cell group (cell size group 1: big size cell group) for handover. When the cell belonging to the cell size group 1 separately satisfies the condition for the measurement report, the UE reports the measurement.

That is to say, in the range R5, the UE shifts to an inter cell size group (big size cell group).

In the range R6, the moving speed v is equal to or less than 50 km per hour.

The range R6 does not satisfy "S2_inter_cell_size_group2: moving speed >50 km/h" and "T2_inter_cell_size_group2: moving speed >50 km/h."

The determination of a shift to an inter cell group is not satisfied, and thus, the UE does not shift between cell groups. That is to say, the UE executes the measurement of the intra cell group (cell size group 2: small size cell group) for re-selection. When the cell belonging to the cell size group 2 separately satisfies the re-selection criteria, the UE performs the re-selection process.

In the range R6, the UE executes the measurement of the intra cell group (cell size group 2: small size cell group) for handover. When the cell belonging to the cell size group 2 separately satisfies the condition for the measurement report, the UE reports the measurement.

That is to say, in the range R6, the UE measures and shifts the intra cell size group (small size cell group).

The UE measures (estimates) the moving speed of its own UE, irrespective of the state of the communication with a cell. As a specific example, the UE measures a moving speed irrespective of whether it is in the RRC_Idle state or RRC_Connected state.

The UE also measures a moving speed irrespective of whether it is in the ECM_Idle state or ECM Connected state.

The following two, (1) and (2), will be disclosed as specific examples of the timing to measure, by a UE, the moving speed of its own UE.

(1) The UE regularly measures a moving speed. The serving cell notifies the UE of the measurement time of a moving speed.

(2) The UE periodically measures a moving speed. The period may differ depending on the measurement result on the last moving speed. The period may be a function of the last moving speed. The serving cell notifies the UE of the period for measuring a moving speed.

The timing to measure, by a UE, the moving speed of its own UE may be notified together with the information on a cell group. The timing may be notified together with the shift determination threshold and the shift determination condition.

The following three, (1) to (3), will be disclosed as specific examples of the method of notifying the UE of the timing to measure a moving speed.

(1) The measurement timing is notified in the broadcast information, which may be notified in the SIB.

(2) The measurement timing is notified by a dedicated signal. The following two, (2-1) and (2-2), will be disclosed as specific examples of the dedicated signal.

(2-1) Notification is made through RRC signaling. For example, notification is made by a handover command.

(2-2) Notification is made in a measurement configuration.

(3) The measurement timing may be decided in advance. This eliminates the need for notification from the serving cell, reducing the processing load of the communication system, which enables efficient use of radio resources.

The following two, (1) and (2), will be disclosed as specific examples of the measurement result on a moving speed used in the shift determination by the UE.

(1) The measurement result on the last moving speed by the UE is used.

(2) The movement average of the measurement values of the moving speed by the UE is used. A movement average of measurement values of N (N is a natural number) measurements is used. The serving cell notifies the UE of the number of the measurements N. The method of notifying the number of the measurements N is similar to the above-mentioned specific example of the method of notifying the UE of the timing to measure a moving speed, and thus, description thereof will be omitted.

Figure 14:
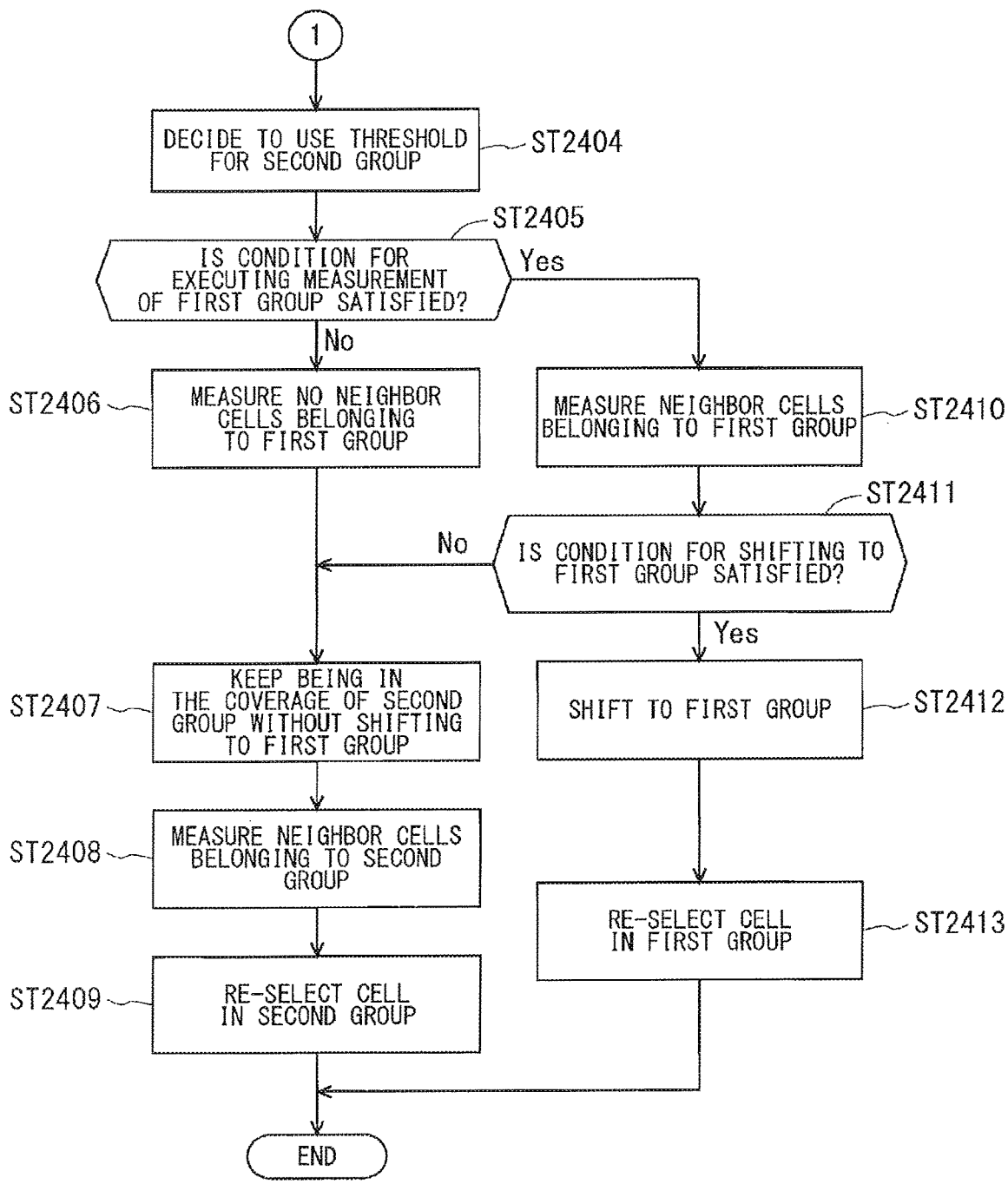
FIG. 14 is another flowchart showing the procedure of the UE in the idle mode in the first modification of the first embodiment.
Figure 15:
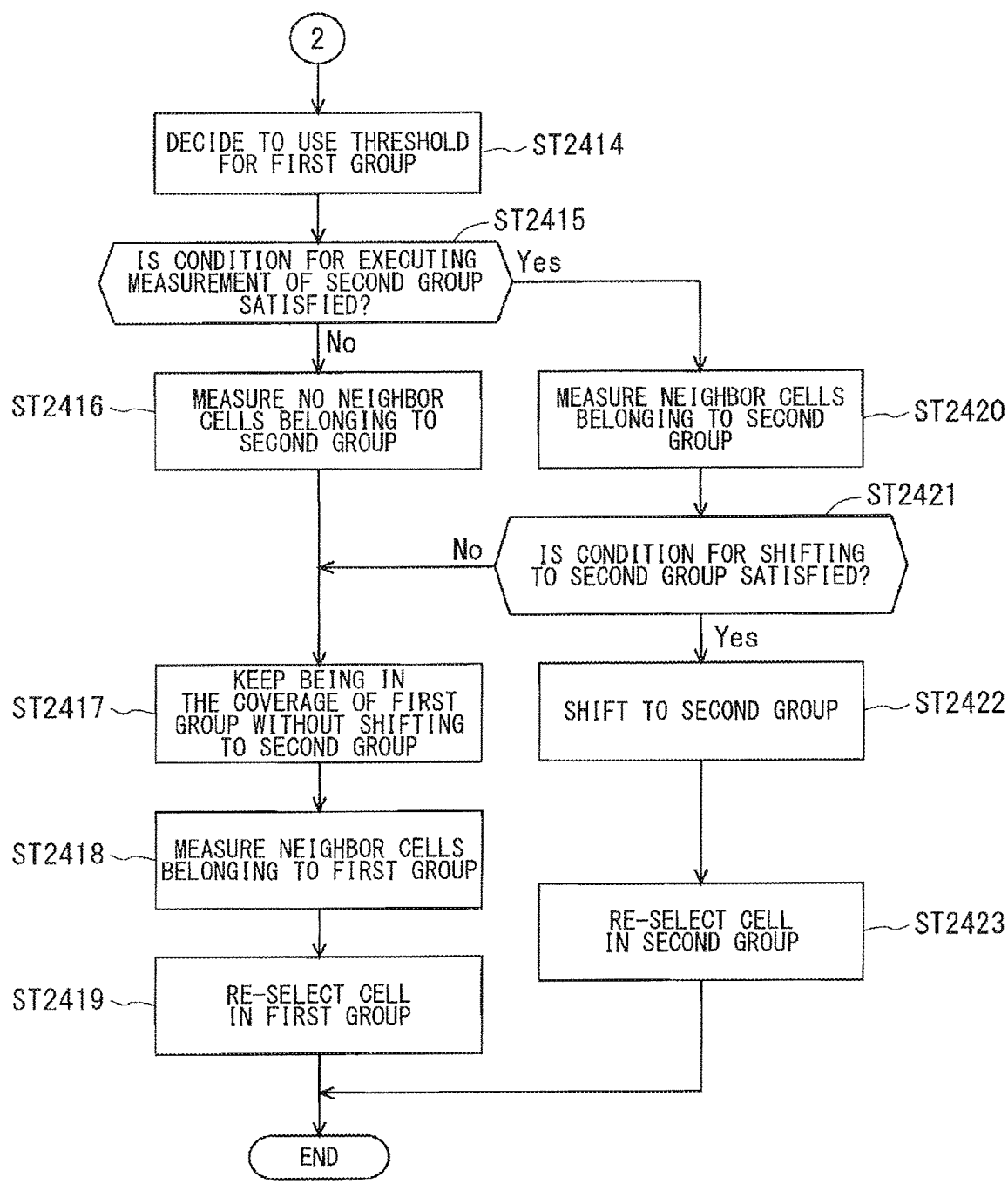
FIG. 15 is still another flowchart showing the procedure of the UE in the idle mode in the first modification of the first embodiment.

FIGS. 13 to 15 are flowcharts showing the procedure of a UE in the idle mode in the first modification of the first embodiment. FIGS. 13 to 15 show the procedure of a UE when the specific example (2) of how to provide a threshold for determining a shift to a cell group is used.

In Step ST2401, the UE checks a group to which a cell of which coverage the UE is in belongs. In Step ST2402, the UE measures the moving speed of its own UE.

In Step ST2403, the UE judges whether the group checked in Step ST2401, to which the cell of which coverage the UE is in belongs, is the cell size group 2 (small size cell group). The UE moves to Step ST2404 of FIG. 14 when judging in Step ST2403 that the group to which the cell of which coverage the UE is in belongs is the cell size group 2, or moves to Step ST2414 of FIG. 15 when judging in Step ST2403 that the group to which the cell of which coverage the UE is in belongs is not the cell size group 2.

In Step ST2404 of FIG. 14, the UE decides to use a threshold (hereinafter, also referred to as a "threshold for the second group") for a UE being in the coverage of the cell size group 2 (small size cell group).

In Step ST2405, the UE judges whether a threshold for determining the presence or absence of measurement execution of the inter cell group (cell size group 1) for re-selection "S1_inter_cell_size_group2" (threshold for determining the presence or absence of measurement execution for cell selection, which is provided for the second group), which is provided for a UE being in the coverage of the cell size group 2, is exceeded (whether the condition for executing the measurement of the inter cell group is satisfied). In other words, the UE judges whether the condition for executing the measurement of the first group is satisfied. Specifically, the UE judges whether the moving speed is more than 30 km per hour.

The UE moves to Step ST2410 when judging in Step ST2405 that the condition for executing the measurement of the first group is satisfied, that is, when judging that the moving speed is more than 30 km per hour, or moves to Step ST2406 when judging in Step ST2405 that the condition for executing the measurement of the first group is not satisfied, that is, when judging that the moving speed is equal to or less than 30 km per hour.

In Step ST2406, the UE does not execute the measurement of neighbor cells belonging to the inter cell group (big size cell group), that is, the first group and moves to Step ST2407.

Since having judged in Step ST2405 that the threshold for determining the presence or absence of measurement execution of the inter cell group (condition for executing the measurement of an inter cell group) is not satisfied, in Step ST2407, the UE does not shift between cell groups. That is to say, the UE keeps being in the coverage of the intra cell group (small size cell group) without shifting to the inter cell group (big size cell group). In other words, the UE keeps being in the coverage of the second group without shifting to the first group.

Since having judged in Step ST2405 that the threshold for determining the presence or absence of measurement execution of an inter cell group (condition for executing the measurement of an inter cell group) is not satisfied, in Step ST2408, the UE executes the measurement of the cells belonging to the intra cell group. That is to say, the UE executes the measurement of the neighbor cells belonging to the second group being an intra cell group (small size cell group).

Since having judged in Step ST2405 that the threshold for determining the presence or absence of measurement execution of the inter cell group (condition for executing the measurement of an inter cell group) is not satisfied, in Step ST2409, the UE executes the process of re-selecting a cell belonging to the intra cell group (small size cell group) when the measurement result in Step ST2408 satisfies the re-selection condition. The UE re-selects a cell in the intra cell group, that is, in the second group. After completing the process of Step ST2409, the UE ends the entire procedure.

In Step ST2410, the UE executes the measurement of the neighbor cells belonging to the first group being the inter cell group (big size cell group).

In Step ST2411, the UE judges whether the threshold for determining a shift to an inter cell group (cell size group 1) for re-selection "S2_inter_cell_size_group2" (condition for shifting to an inter cell group), which is provided for the UE being in the coverage of the cell size group 2, is satisfied. That is to say, the UE judges whether the condition for shifting to the first group is satisfied. Specifically, the UE judges whether the moving speed is more than 50 km per hour.

The UE moves to Step ST2412 when judging in Step ST2411 that the condition for shifting to the first group is satisfied, that is, when judging that the moving speed is more than 50 km per hour, or moves to Step ST2407 when judging in Step ST2411 that the condition for shifting to the first group is not satisfied, that is, when judging that the moving speed is equal to or less than 50 km per hour.

In Step ST2412, the UE shifts between cell groups. That is to say, the UE shifts to the first group being an inter cell group (big size cell group).

When the measurement result in Step ST2410 satisfies the re-selection condition, in Step ST2413, the UE executes the process of re-selecting a cell belonging to the inter cell group (big size cell group). The UE re-selects a cell in the inter cell group, that is, in the first group. Upon completion of re-selection, the UE may change the cell group of which coverage its own UE is in to the cell size group 1 (big size cell group). After the completion of the process of Step ST2413, the UE ends the entire procedure.

In Step ST2414 of FIG. 15, the UE decides to use a threshold (hereinafter, also referred to as a "threshold for the first group") for a UE being in the coverage of the cell size group 1 (big size cell group).

In Step ST2415, the UE judges whether a threshold for determining the presence or absence of measurement execution of the inter cell group (cell size group 2) for re-selection "S1_inter_cell_size_group1" (threshold for determining the presence or absence of measurement execution for cell re-selection for the first group), which is provided for the UE being in the coverage of the cell size group 1, is exceeded (whether the condition for executing the measurement of an inter cell group is satisfied). That is to say, the UE judges whether the condition for executing the measurement of a second group is satisfied. Specifically, the UE judges whether the moving speed is equal to or less than 30 km per hour.

The UE moves to Step ST2420 when judging in Step ST2415 that the condition for executing the measurement of the second group is satisfied, that is, when judging that the moving speed is equal to or less than 30 km per hour, or moves to Step ST2416 when judging in Step ST2415 that the condition for executing the measurement of the second group is not satisfied, that is, when judging that the moving speed is more than 30 km per hour.

In Step ST2416, the UE does not execute the measurement of the neighbor cells belonging to the inter cell group (inter cell size group (small size cell group)), that is, the second group and moves to Step ST2417.

Since having judged in Step ST2415 that the threshold for determining the presence or absence of measurement execution of the inter cell group (the condition for executing the measurement of an inter cell group) is not satisfied, in Step ST2417, the UE does not shift between cell groups. That is to say, the UE keeps being in the coverage of the intra cell group (intra size cell group (big size cell group)) without shifting to the inter cell group (inter cell size group (small size cell group)). In other words, the UE keeps being in the coverage of the first group without shifting to the second group.

Since having judged in Step ST2415 that the threshold for determining the presence or absence of measurement execution of the inter cell group (the condition for executing the measurement of the inter cell group) is not satisfied, in Step ST2418, the UE executes the measurement of the cells belonging to the intra cell group. That is to say, the UE executes the measurement of the neighbor cells belonging to the first group being the intra cell group (intra cell size group (big size cell group)).

Since having judged in Step ST2415 that the threshold for determining the presence or absence of measurement execution of the inter cell group (the condition for executing the measurement of the inter cell group) is not satisfied, in Step ST2419, the UE executes the process of re-selecting a cell belonging to the intra cell group (intra cell size group (big size cell group)) when the measurement result in Step ST2418 satisfies the re-selection condition. The UE re-selects the cell in the intra cell group, that is, in the first group. After ending the process of Step ST2419, the UE ends the entire procedure.

In Step ST2420, the UE executes the measurement of the neighbor cells belonging to the second group being the inter cell group (inter cell size group (small size cell group)).

In Step ST2421, the UE judges whether the threshold for determining a shift to the inter cell group (cell size group 2) for re-selection "S2_inter_cell_size_group1" (the condition for shifting to the inter cell group), which is provided for a UE being in the coverage of the cell size group 1, is satisfied. That is to say, the UE judges whether the condition for shifting to the second group is satisfied. Specifically, the UE judges whether the moving speed is less than 20 km per hour.

The UE moves to Step ST2422 when judging in Step ST2421 that the condition for shifting to the second group is satisfied, that is, when judging that the moving speed is less than 20 km per hour, or moves to Step ST2417 when judging in Step ST2421 that the condition for shifting to the second group is not satisfied, that is, when judging that the moving speed is more than 20 km per hour.

In Step ST2422, the UE shifts between cell groups. That is to say, the UE shifts to the second group being the inter cell group (inter cell size group (small size cell group)).

In Step ST2423, when the measurement result in Step ST2420 satisfies the re-selection condition, the UE executes the process of re-selecting a cell belonging to the inter cell group (inter cell size group (small size cell group)). The UE re-selects a cell in the inter cell group, that is, in the second group. Upon completion of re-selection, the UE may change the cell group of which coverage its own UE is in to the cell size group 2 (small size cell group). After ending the process of Step ST2423, the UE ends the entire procedure.

The first modification of the first embodiment can achieve the following effects in addition to the effects of the first embodiment. A cell group based on the cell size is provided, and a shift to a cell group corresponding to the moving speed of the UE is determined, so that the UE can shift to a cell of the cell size suitable for the moving speed of the UE.

Therefore, the cell re-selection of and handover to a cell at which the UE stays for a short period of time can be restricted, and another cell re-selection and another handover can be restricted, thereby reducing the processing load of the communication system. Additionally, the following situation can be restricted; the UE passes through the handover-destination small cell while performing the handover-related process, leading to the degradation of the quality of the communication with the handover-destination small cell. This restricts failed handovers, improving the mobility performance.

Second Modification of First Embodiment

A second modification of the first embodiment solves a similar problem to that of the first modification of the first embodiment. The solution in the second modification of the first embodiment will be described below. This modification will describe, of the solutions in the first embodiment and the first modification of the first embodiment described above, only the characteristic portion of this modification.

The solution in the first embodiment is used in this modification, as in the first modification of the first embodiment. Specifically, cells are grouped based on their cell size, and a UE uses the moving speed of its own UE to determine a shift to a cell group of which coverage the UE is in.

A specific example of the cell group is similar to that of the first modification of the first embodiment. For example, cells of large cell size, for example, macro cells and the like belong to the cell size group 1. The cell size group 1 maybe a big size cell group. Cells of small cell size, for example, small cells and the like belong to the cell size group 2. The cell size group 2 may be a small size cell group.

A specific example of the contents of the notification of a cell group to a UE is similar to that of the first modification of the first embodiment. Disclosed here is the case in which both of the group identification information and the list of cells configuring a group are notified.

When the cell size group 1 is provided and the cells configuring the cell size group include a PCI#1, a PCI#2, a PCI#3, and a PCI#4, the group identification information is notified as "CellSizeGroup1 (PCI#1, PCI#2, PCI#3, PCI#4)."

When the cell size group 2 is provided and the cells configuring the cell size group include a PCI#21, a PCI#22, a PCI#23, a PCI#24, a PCI#25, a PCI#26, a PCI#27, and a PCI#28, the group identification information is notified as "CellSizeGroup2 (PCI#21, PCI#22, PCI#23, PCI#24, PCI#25, PCI#26, PCI#27, PCI#28)."

The list of the cells configuring a group may include its own cell or may include the identification information of its own cell. When the list of the cells configuring a group does not include a serving cell, the cell may notify a UE being served thereby of the cell group to which the serving cell belongs.

A specific example of the determination of a shift to a cell group by the UE will be disclosed below. The UE uses the moving speed of its own UE to perform shift determination as to which cell size group the UE is to be in the coverage of. The above-mentioned shift determination is performed only from a group to which a target cell belongs, irrespective of the cell size group (cell size) of the cell of which coverage the UE is currently in, and thus may be referred to as an "absolute shift determination."

A specific example of how to provide a threshold (indicator) of the determination of a shift to a cell group, which is performed by the UE, will be disclosed below. A determination condition may be used in place of the threshold for determining a shift. The determination of the presence or absence of measurement execution for shift determination may be provided separately. The determination of the presence or absence of measurement execution for shift determination may be provided individually for cell re-selection and for handover. In this case, the cell size group 1 is a big size cell group, and the cell size group 2 is a small size cell group.

The following four thresholds, (1) to (4), are provided for cell re-selection (for a UE in the idle mode).

(1) A threshold for determining the presence or absence of measurement execution of a cell size group 1 for re-selection, which is irrelevant to, for example, a moving speed. "S1_inter_cell_sizegroup1: moving speed <∞."

(2) A threshold for determining a shift to the cell size group 1 for re-selection, which is irrelevant to, for example, a moving speed. "S2 inter_cell_size_group1moving speed <∞."

(3) A threshold for determining the presence or absence of measurement execution of the cell size group 2 for re-selection. For example, the moving speed is less than 50 km per hour. "S1_inter_cell_size_group2: moving-speed <50 km/h."

(4) A threshold for determining a shift to the cell size group 2 for re-selection. For example, the moving speed is less than 50 km per hour. "S2_inter_cell_size_group2:moving speed <50 km/h."

The following four thresholds, (1) to (4), are provided for handover (for a UE in the connected mode).

(1) A threshold for determining the presence or absence of measurement execution of the cell size group 1 for handover, which is irrelevant to, for example, a moving speed. "T1_inter_cell_size_group1: moving speed <∞."

(2) A threshold for determining a shift to the cell size group 1 for handover, which is irrelevant to, for example, a moving speed. "T2_inter_cell_size_group1: moving speed <∞."

(3) A threshold for determining the presence or absence of measurement execution of the cell size group 2 for handover. For example, the moving speed is less than 50 km per hour. "T1_inter_cell_size_group2: moving speed <50 km/h."

(4) A threshold for determining a shift to the cell size group 2 for handover. For example, the moving speed is less than 50 km per hour. "T2_inter_cell_size_group2: moving speed <50 km/h."

Figure 16:
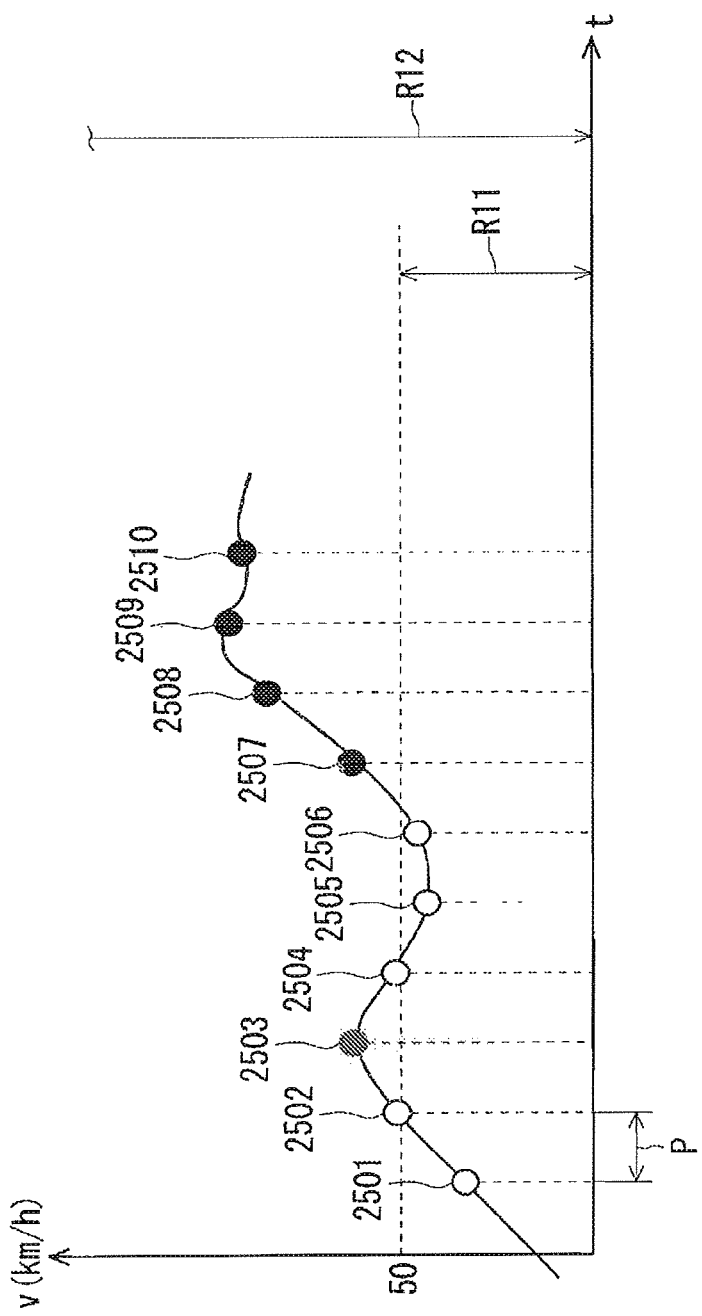
FIG. 16 is a graph showing the concept of a specific example of a shift determination threshold.

FIG. 16 is a graph showing the concept of a specific example of the shift determination threshold. The vertical axis and the horizontal axis of FIG. 16 represent a moving speed v and a time t, respectively. The cell size group 1 is a big size cell group, and the cell size group 2 is a small size cell group. The period P shown in FIG. 16 is, for example, a period in which the UE measures (estimates) a moving speed v. A period may not be set. Description will be given below while classifying the moving speed v into a range R11 and a range R12.

In the range R11, the moving speed v is less than 50 km per hour. The range R11 satisfies "S1_cell_size_group2: moving speed <50 km/h," "S2_cell size_group2: moving speed <50 km/h," "T1_cell_size_group2: moving speed <50 km/h," and "T2_cell_size_group2: moving speed <50 km/h."

In the range R11, thus, the UE executes the measurement of the cell size group 2 (small size cell group) for re-selection. The UE can shift to the cell size group 2 (small size cell group) for re-selection. When the cell belonging to the cell size group 2 separately satisfies the re-selection criteria, the UE executes the re-selection process.

In the range R11, the UE executes the measurement of the cell size group 2 (small size cell group) for handover. The UE can shift to the cell size group 2 (small size cell group) for handover. When the cell belonging to the cell size group 2 separately satisfies the measurement report condition, the UE reports the measurement.

That is to say, in the range R11, the UE executes the measurement of the cell size group 2 (small size cell group). The UE can shift to the cell size group 2 (small size cell group).

The range R12 is a range independent of a moving speed v. That is to say, the moving speed v is less than ∞. The range R12 satisfies "S1_cell_size_group1: moving speed <∞," "S2_cell_size_group1: moving speed <∞," "T1_cell_size_group1: moving speed <∞," and "T2_cell_size_group1: moving speed <∞."

In the range R12, thus, the UE executes the measurement of the cell size group 1 (big size cell group) for re-selection. The UE can shift to the cell size group 1 (big size cell group) for re-selection. When the cell belonging to the cell size group 1 separately satisfies the re-selection criteria, the UE executes the re-selection process.

In the range R12, the UE executes the measurement of the cell size group 1 (big size cell group) for handover. The UE can shift to the cell size group 1 (big size cell group) for handover. When the cell belonging to the cell size group 1 separately satisfies the measurement report condition, the UE reports the measurement.

That is to say, in the range R12, the UE executes the measurement of the cell size group 1 (big size cell group). The UE can shift to the cell size group 1 (big size cell group).

With reference to FIG. 16, a point 2501, a point 2502, a point 2504, a point 2505, and a point 2506 each indicated by a white circle "○" are included in both of the range R11 and the range R12.

Thus, the UE executes the measurement of the cell size group 2 (small size cell group) and the cell size group 1 (big size cell group). The UE can shift to the cell size group 2 (small size cell group) and the cell size group 1 (big size cell group).

With reference to FIG. 16, a point 2503, a point 2507, a point 2508, a point 2509, and a point 2510 each indicated by a black circle "●" are included in the range R12. Thus, the UE executes the measurement of the cell size group 1 (big size cell group). The UE can shift to the cell size group 1 (big size cell group).

FIGS. 17 and 18 are flowcharts showing the procedure of the UE in the idle mode in the second modification of the first embodiment. At the threshold used to describe the concept with reference to FIG. 16, the threshold for determining the presence or absence of measurement execution and the shift determination threshold have the same value. Description will therefore be given with reference to FIGS. 17 and 18 while omitting the judgment using the threshold for the presence or absence of measurement execution.

In Step ST2601, the UE measures the moving speed of its own UE. In Step ST2602, the UE judges whether the threshold for determining a shift to the cell size group 1 for re-selection "S2_inter_cell_size_group1" is satisfied (whether the condition for shifting to the first group is satisfied). Specifically, the UE judges whether the moving speed is less than the infinity (∞).

The UE moves to Step ST2603 when judging in Step ST2602 that the condition for shifting to the first group is satisfied, or moves to Step ST2608 of FIG. 18 when judging in Step ST2602 that the condition for shifting to the first group is not satisfied. In the flowchart, the shift determination threshold "S2_inter_cell_size_group1" is "moving speed <∞," and thus, the UE will not judge that this condition is not satisfied. If judging that the condition is not satisfied, however, the UE moves to Step ST2608.

In Step ST2603, the UE judges whether the threshold for determining a shift to the cell size group 2 for re-selection "S2_inter_cell_size_group2" is satisfied (whether the condition for shifting to the second group is satisfied). Specifically, the UE judges whether the moving speed is less than 50 km/h. The UE moves to Step ST2604 when judging in Step ST2603 that the condition for shifting to the second group is not satisfied, or moves to Step ST2606 when judging in Step ST2603 that the condition for shifting to the second group is satisfied.

In Step ST2604, the UE executes the measurement of the cells belonging to the cell size group 1. That is to say, the UE executes the measurement of the neighbor cells belonging to the big size cell group. In other words, the UE executes the measurement of the neighbor cells belonging to the first group.

When the measurement result in Step ST2604 satisfies the re-selection condition, in Step ST2605, the UE executes the process of re-selecting a cell belonging to the big size cell group. That is to say, the UE re-selects a cell in the first group. After ending the process of Step ST2605, the UE ends the entire procedure.

In Step ST2606, the UE executes the measurement of the cells belonging to the cell size group 1 and the cells belonging to the cell size group 2. That is to say, the UE measures the neighbor cells belonging to the big size cell group and the neighbor cells belonging to the small size cell group. In other words, the UE executes the measurement of the neighbor cells belonging to the first group and the neighbor cells belonging to the second group.

When the measurement result in Step ST2606 satisfies the re-selection criteria, in Step ST2607, the UE executes the process of re-selecting a cell belonging to the big size cell group or a cell belonging to the small size cell group. In other words, the UE re-selects a cell in the first group or a cell in the second group. The UE may select the best cell in the measurement of the cells belonging to the cell size group 1 and the cells belonging to the cell size group 2, and then, execute the re-selection process. After ending the process of Step ST2607, the UE ends the entire procedure.

In Step ST2608 shown in FIG. 18, the UE judges whether the threshold for determining a shift to the cell size group 2 for re-selection "S2_inter_cell_size_group2" is satisfied (whether the condition for shifting to the second group is satisfied). Specifically, the UE judges whether the moving speed is less than 50 km/h.

When judging in Step ST2608 that the condition for shifting to the second group is not satisfied, the UE moves to another process, which is not a characteristic portion of the present invention, and thus, description thereof will be omitted. When judging in Step ST2608 that the condition for shifting to the second group is satisfied, the UE moves to Step ST2609.

In Step ST2609, the UE executes the measurement of the cells belonging to the cell size group 2. That is to say, the UE measures the neighbor cells belonging to the small size cell group. In other words, the UE executes the measurement of the neighbor cells belonging to the second group.

When the measurement result in Step ST2609 satisfies the re-selection condition, in Step ST2610, the UE executes the process of re-selecting a cell belonging to the small size cell group. That is to say, the UE re-selects a cell in the second group. After ending the process of Step ST2610, the UE ends the entire procedure.

The second modification of the first embodiment can achieve the following effects in addition to the effects of the first embodiment and the first modification of the first embodiment.

In the first modification of the first embodiment, the shift determination by the UE is a relative shift determination. Thus, the UE needs to recognize the cell size group (cell size) of the cell of which coverage the UE is currently in.

In contrast, in the second modification of the first embodiment, the shift determination by the UE is an absolute shift determination. Thus, the UE does not need to recognize the cell size group (cell size) of the cell of which coverage the UE is currently in. Thus, the cell does not need to notify the UE being served thereby of the cell size group to which its own cell belongs. This enables efficient use of radio resources. The UE does not need to recognize the cell group to which the serving cell belongs, thereby reducing the processing load of the UE.

Third Modification of First Embodiment

In the solution of the second modification of the first embodiment, when the threshold for determining the presence or absence of measurement execution of a plurality of cell groups is satisfied, the UE measures the neighbor cells belonging to the cell group that satisfies the threshold. Depending on the threshold for determining the presence or absence of measurement execution, accordingly, the UE has to measure a large number of cells, which again causes such a problem that an enormous amount of time is required for measurement.

A third modification of the first embodiment solves a similar problem as that of the second modification of the first embodiment. The solution in the third modification of the first embodiment will be described below. This modification will describe, of the solutions in the first embodiment, the first modification of the first embodiment, and the second modification of the first embodiment described above, only a characteristic portion of this modification.

The solution in the first embodiment is used in this modification, as in the first modification of the first embodiment and the second modification of the first embodiment. Specifically, cells are grouped based on their cell size, and a UE uses the moving speed of its own UE to determine a shift to a cell group of which coverage the UE is to be in. The priority of a cell group is taken into account in the determination of a shift to a cell group.

In a plurality of cell groups, when the determination of the presence or absence of measurement execution for shift determination is satisfied, the UE measures the cells belonging to a cell group having a high priority. The UE does not measure the cells belonging to a cell group having a low priority or executes the measurement of these cells while lowering the priority.

In a plurality of cell groups, when the threshold for shift determination is satisfied, the UE shifts to the cells belonging to the cell group having a high priority. The UE does not shift to the cells belonging to a cell group having a low priority or shifts to these cells by lowering the priority.

The following three, (1) to (3), will be disclosed as specific examples of the entity that decides a priority.

(1) An operation and maintenance (O&M) decides a priority. The O&M notifies the cells belonging to each cell group of the decided priority.

(2) A cell decides a priority. When the cell is, for example, a small cell, a coverage macro cell may decide a priority. When the small cell is installed within the coverage of another cell, the other cell is referred to as a "coverage macro cell." When the cell being an entity that decides a priority differs from the other cell, the cell being an entity that decides a priority notifies the other cell of the decided priority. In this case, notification may be made by an X2 interface or S1 interface.

(3) A UE decides a priority. Specifically, the UE decides a priority based on a predetermined threshold for deciding a priority. The predetermined priority is notified from the network side to the UE.

As the method of notifying the UE of a priority, the serving cell notifies a UE being served thereby of a priority. The serving cell notifies the priority together with a cell group. A group corresponding to the cell size is provided, and a priority is added thereto. A specific example of the method of notifying a priority is similar to the specific example of the method of notifying a cell group in the first embodiment, and thus, description thereof will be omitted.

The priority will be described using the specific example of how to provide a threshold (indicator) for determining a shift to a cell group, which has been disclosed in the second modification of the first embodiment. It is assumed that the cell size group 1 is a big size cell group and the cell size group 2 is a small size cell group. It is assumed that the cell size group 1 has a priority "2" and the cell size group 2 has a priority "1." It is assumed that the priority becomes higher as the number of the priority is lower.

The concept of a specific example of a shift determination threshold will be described with reference to FIG. 16 described above. The description of the range R11 and the range R12 is similar to that of the second modification of the first embodiment, and thus, description thereof will be omitted.

With reference to FIG. 16, the point 2501, the point 2502, the point 2504, the point 2505, and the point 2506 each indicated by a white circle "○" are included in both of the range R11 and the range R12. That is to say, the determination of the presence or absence of measurement execution for shift determination is satisfied in a plurality of cell groups, and the threshold for shift determination is satisfied in a plurality of cell groups.

The cell size group 2 has a priority "1," and the cell size group 1 has a priority "2." That is to say, the cell size group 2 has a higher priority than that of the cell size group 1.

Thus, the UE preferentially executes the measurement of the cell size group 2 (small size cell group). The UE can shift to the cell size group 2 (small size cell group). The UE executes the measurement of the cell size group 1 (big size cell group) by lowering its priority. The UE can shift to the cell size group 1 (big size cell group).

With reference to FIG. 16, the point 2503, the point 2507, the point 2508, the point 2509, and the point 2510 each indicated by a black circle "●" are included in the range R12. That is to say, in a plurality of cell groups, the determination of the presence or absence of measurement execution for shift determination is not satisfied, and in a plurality of cell groups, the threshold for shift determination is not satisfied.

Thus, the UE executes the measurement of the cell size group 1 (big size cell group). The UE can shift to the cell size group 1 (big size cell group).

Figure 19:
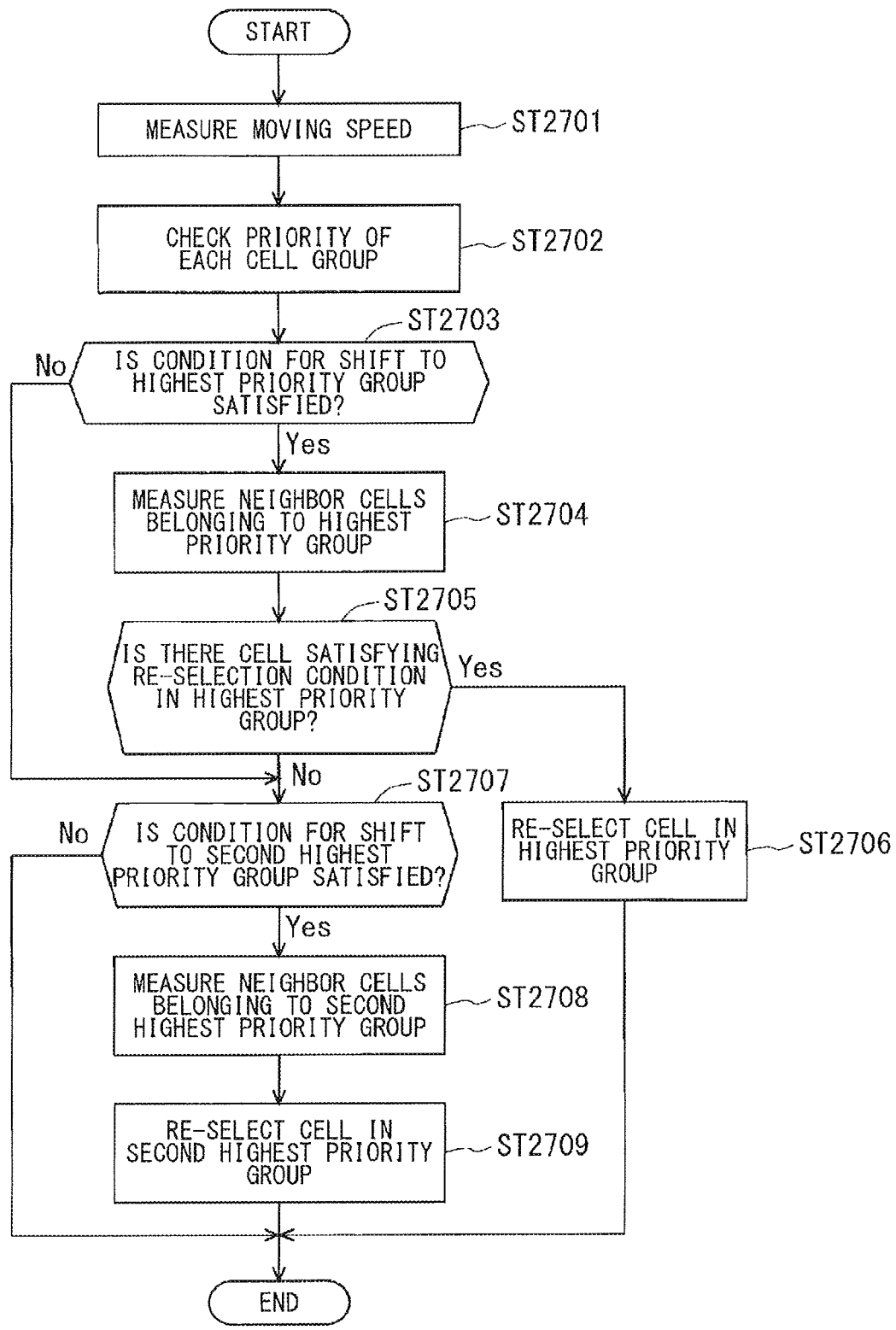
FIG. 19 is a flowchart showing a procedure of the UE in the idle mode in a third modification of the first embodiment.

FIG. 19 is a flowchart showing the procedure of a UE in the idle mode in the third modification of the first embodiment. At the thresholds used to describe the concept with reference to FIG. 16 described above, the threshold for determining the presence or absence of measurement execution and the shift determination threshold have the same value. Thus, description will be given with reference to FIG. 19 while omitting the judgment using the threshold for determining the presence or absence of measurement execution.

In Step ST2701, the UE measures the moving speed of its own UE. In Step ST2702, the UE checks the priority of each cell group.

In Step ST2703, the UE performs shift determination, starting from the cell group having the highest priority of the priorities checked in Step ST2702. In the specific example, the cell group 2 has the highest priority.

In Step ST2703, thus, the UE judges whether the threshold for determining a shift to the cell size group 2 for re-selection "S2_inter_cell_size_group2" is satisfied (whether the condition for shifting to the cell group having the highest priority, which is also referred to as a "highest priority group" below, is satisfied). Specifically, the UE judges whether the moving speed is less than 50 km/h.

The UE moves to Step ST2704 when judging in Step ST2703 that the condition for shifting to the highest priority group is satisfied, or moves to Step ST2707 when judging in Step ST2703 that the condition for shifting to the highest priority group is not satisfied.

In Step ST2704, the UE executes the measurement of the neighbor cells belonging to the cell size group 2. That is to say, the UE executes the measurement of the neighbor cells belonging to the small size cell group. In other words, the UE executes the measurement of the neighbor cells belonging to the highest priority group.

In Step ST2705, the UE judges whether there is a cell satisfying the re-selection condition from the measurement result in Step ST2704. In other words, the UE judges whether there is a cell satisfying the re-selection condition in the highest priority group. The UE moves to Step ST2706 when judging in Step ST2705 that there is a cell satisfying the re-selection condition in the highest priority group, or moves to Step ST2707 when judging in Step ST2705 that there is no cell satisfying the re-selection condition in the highest priority group.

In Step ST2706, the UE executes the process of re-selecting a cell belonging to the small size cell group and satisfying the re-selection condition. That is to say, the UE re-selects a cell in the highest priority group.

In Step ST2707, the UE performs shift determination, starting from the cell group having the second highest priority (hereinafter, also referred to as a "second priority group") of the priorities checked in Step ST2702. In the specific example, the cell group 1 has the second highest priority. In Step ST2707, thus, the UE judges whether the threshold for determining a shift to the cell size group 1 for re-selection "S2_inter_cell_size_group1" is satisfied (whether the condition for shifting to the second priority group is satisfied). Specifically, the UE judges whether the moving speed is less than the infinity (∞) of speed per hour.

When judging in Step ST2707 that the condition for shifting to the second priority group is satisfied, the UE moves to Step ST2708. Although it is not judged in this modification that the condition for shifting to the second priority group is not satisfied, if it is judged that the condition is not satisfied, the UE ends the entire procedure.

In Step ST2708, the UE executes the measurement of the cells belonging to the cell size group 1. That is to say, the UE measures the neighbor cells belonging to the big size cell group. In other words, the UE executes the measurement of the neighbor cells belonging to the second priority group.

In Step ST2709, the UE performs the process of re-selecting a cell whose measurement result in Step ST2708 satisfies the re-selection condition. That is to say, the UE re-selects a cell in the second priority group.

The third modification of the first embodiment can achieve the following effects in addition to the effects of the first embodiment, the first modification of the first embodiment, and the second modification of the first embodiment. The third modification of the first embodiment can limit the cells being measurement targets more than the second modification of the first embodiment can, thereby improving the measurement performance. Limiting the cells being measurement targets enables the re-selection process and measurement report to be performed in a short period of time. Thus, a control delay of the communication system can be prevented. Additionally, when the network side sets priorities, the UE performs measurements in accordance with the priorities designated by the network side, thereby enabling the adjustment of the load of the communication system.

Fourth Modification of First Embodiment

In the solutions of the first embodiment, the first modification of the first embodiment, the second modification of the first embodiment, and the third modification of the first embodiment, the cell group selected by the UE or the cell in the cell group may have a high load. In such a case, even when the re-selection of or handover to a cell belonging to such a cell group is performed, the user throughput of the UE is low, so that the high-speed, high-capacity communication cannot be performed.

The solution in a fourth modification of the first embodiment will be described below. Of the solutions in the first embodiment, the first modification of the first embodiment, the second modification of the first embodiment, and the third modification of the first embodiment, only the characteristic portion of this modification will be described.

In this modification, the load information on cell groups is taken into account in the determination of a shift to a cell group, which may be the information on the regulation of cell groups. The information on the regulation of cell groups may be the access class barring (ACB) information or the extended access barring (EAB) information.

In a plurality of cell groups, when the determination of the presence or absence of measurement execution for shift determination is satisfied, the cells belonging to a cell group having a low load are measured. The cells belonging to the cell group having a high load are not measured or measured by lowering the priority.

In a plurality of cell groups, when the threshold for shift determination is satisfied, a shift to the cell belonging to the cell group having a low load is performed. A shift to a cell belonging to a cell group having a high load is not performed or performed by lowering the priority.

For example, it is assumed that the load levels are "1" to "3," and that the load level "3" means the prohibition of the selection of and handover to a cell by the UE. It is assumed that load becomes higher as the number of the load level is higher.

As the method of notifying a UE of the load information, the serving cell notifies a UE being served thereby of the load information. The serving cell notifies the load information together with the cell group. A group corresponding to the cell size is provided, and the load information is added thereto. A specific example of the method of notifying the load information is similar to the specific example of the method of notifying a cell group in the first embodiment, and thus, description thereof will be omitted. The load information may be added per cell.

The following two, (1) and (2), will be disclosed as specific examples of the situation where the fourth modification of the first embodiment is used.

(1) Grouping is performed by the radio access technology (RAT) supported by a cell. For example, the cell group 1 supports an LTE system, and the cell group 2 supports a wireless LAN system (wireless LAN). For example, when the LTE system has a high load, the load of the cell group 1 is set high, and the load of the cell group 2 is set low.

Thus, in a plurality of cell groups, when the determination of the presence or absence of measurement execution for shift determination is satisfied, the cells belonging to the group of the wireless LAN system having a low load are measured, and the cells belonging to the group of the LTE system having a high load are not measured or can be measured by lowering the priority. In a plurality of cell groups, when the threshold for shift determination is satisfied, a shift to the cell belonging to the group of the wireless LAN system having a low load is performed, and a shift to the cell belonging to the cell group of the LTE system having a high load is not performed or can be performed by lowering the priority.

(2) Grouping is performed depending on the type of the backhaul link of a cell. For example, a backhaul is an optical network in the cell group 1, and a backhaul is wireless in the cell group 2. For example, when the optical network has a high load, the load of the cell group 1 is set high, and the load of the cell group 2 is set low.

In a plurality of cell groups, thus, when the determination of the presence or absence of measurement execution for shift determination is satisfied, the cells belonging to the group in which the backhaul having a low load is wireless are measured, and the cells belonging to the group in which the backhaul having a high load is the optical network are not measured or can be measured by lowering the priority. In a plurality of cell groups, when the threshold for shift determination is satisfied, a shift to a cell belonging to the group in which the backhaul having a low load is wireless is performed, and a shift to a cell belonging to the cell group in which the backhaul having a high load is an optical network is not performed or can be performed by lowering the priority.

The fourth modification of the first embodiment can achieve the following effects in addition to the effects of the first embodiment, the first modification of the first embodiment, the second modification of the first embodiment, and the third modification of the first embodiment. The cells belonging to the cell group having a low load can be the targets for measurement. This can improve a user throughput.

Second Embodiment

The problem solved in a second embodiment will be described below. Compared with a macro cell, a small cell has a small cell radius, that is, a small coverage range. When the UE moves, the UE stays in the small cell for a shorter period of time than in the macro cell. Thus, while the UE moving between small cells at high speed performs the HO-related process in a small cell being a HO source, the quality of the communication with the HO source small cell may degrade, and a HO may not be performed normally and may fail.

Even when the UE detects a suitable HO-destination small cell through measurement, while performing a HO-related process, the UE may pass through the HO-destination small cell. Also in this case, the quality of the communication with the HO-destination small cell has degraded, and thus, a HO may not be performed normally and may fail.

When a large number of small cells are installed, thus, how to improve the mobility performance when the UE moves at high speed is a problem to be solved.

As the solution to the above-mentioned problem, 3GPP proposes the method referred to as dual connectivity (see Non-Patent Document 11). In dual connectivity, the UE uses radio resources provided by at least two different network points connected by a non-ideal backhaul.

Two methods are proposed as dual connectivity: one is inter-node radio resource aggregation and the other is RRC diversity.

In inter-node radio resource aggregation, radio resources of two or more eNBs are aggregated for user plain data. The macro eNB and the small eNB whose coverages are overlaid with each other in position are studied as two or more eNBs. It is also studied in this case that the macro cell keeps the mobility anchor. This method performs mobility control in the macro cell, and thus, can reduce the above-mentioned HO failures attributable to the fact that the UE stays in the small cell for a short period of time.

However, the inter-node radio resource aggregation uses a macro cell, and thus, it can be performed only in a place where a macro cell is overlaid with a small cell. The above-mentioned problem arises in a place where only small cells are densely placed. Although it is conceivable that a macro cell overlaying a small cell may be newly installed, an enormous amount of cost is required for installing a macro cell.

In RRC diversity, HO-related RRC signaling is transmitted from or to a cell that is a possible HO destination. This method enables the UE to receive HO-related RRC signaling from at least any one of a HO source cell and a cell that is a possible HO destination.

In RRC diversity, however, a cell that is a possible HO destination is used, and accordingly, the cell may differ from an actual HO destination cell in HO. Therefore, the UE does not always receive HO-related RRC signaling from the cell being a HO destination.

To perform RRC diversity using a HO destination cell, as in the HO-related process, a HO destination needs to be identified first, and then, the UE needs to be RRC connected with the HO destination cell. It is therefore difficult to reduce HO failures attributable to the fact that the UE stays in the cell for a short period of time.

This embodiment has an object to solve the above-mentioned problem by a method different from the methods described above.

A plurality of small cells are used to constitute a cell (hereinafter, referred to as a "virtual macro cell") that configures a coverage larger than the coverage of one small cell.

A plurality of small cells configuring a virtual macro cell are referred to as a "small cell group" (hereinafter, referred to as "SCG").

The small cells within the SCG transmit and receive the same data and signal to and from the UE. The small cells within the SCG perform the same communication.

Disclosed below are the configuration and function for the individual small cells within the SCG to perform the same communication. The cell identities of the small cells within the SCG are made the same, that is, one cell identity is provided as the SCG. In other words, the individual small cells within the SCG are identified as the same cell and perform the same communication. The SCG may be identifiable by the cell identity between a high-level entity and the small cell. Alternatively, the cell identity may be one provided to conventional cells. Examples of the cell identity include CGI, ECGI, and PCI.

The conventional RRH deployment is one method that uses a plurality of small cells to increase coverage (see Non-Patent Document 7). The conventional RRHs, however, is connected to a macro cell, and the individual RRHs have different PCIs. In this embodiment, the small cells have the same PCI. The method in this embodiment differs from the conventional method in this respect.

As the technique using RRHs, RRHs in the deployment of the CoMP scenario 4 are proposed (see Non-Patent Document 7). In this scenario, the macro cell and RRHs are arranged so as to be overlaid with one another such that the RRHs have the same PCI as that of the macro cell. This embodiment describes the method in the case where the macro cell is not overlaid with the small cells, which is a difference from the conventional method.

The small cells within the SCG are synchronized. Synchronization accuracy may fall within the cyclic prefix (CP) range.

For downlink, in the UE being served by the SCG, the signals received from the small cells within the SCG may fall within the CP range. Consequently, the transmissions from a plurality of small cells can be regarded as the transmission from one macro cell. The UE can therefore treat the transmission similarly to the multipath from one macro cell.

For uplink, in each small cell, the signals received from the UE may fall within the CP range. Each small cell can therefore treat the transmission from the UE being served by the SCG similarly to the transmission from the UE being served by the conventional small cell.

The synchronization of plurality of small cells may be achieved using, for example, a global positioning system (GPS).

The configurations of the physical resources of the individual small cells within the SCG are made the same. The configurations of the physical resources of the frequency domain and the time domain are made the same. The configurations of the physical resources, such as carrier frequency, the frequency band, the number of sub-carriers, the sub-frame configuration, the number of symbols in a sub-frame, and the CP length, are made the same.

The protocols of the individual small cells within the SCG are made the same. The processes for the layer 3, the layer 2, and the layer 1 are made the same and are mapped to the same physical resource. For example, physical channels and signals such as SS, CRS, PBCH, PDCCH, PDSCH, PUCCH, and PUSCH in the layer 1 are mapped to the same physical resource. In scheduling of the layer 2, the individual small cells perform scheduling for all the UEs being served by the SCG, and the resource allocation and modulation and coding scheme (MCS) for the individual UEs are made the same in the individual small cells.

The small cells within the SCG have the configuration and function described above, allowing the small cells within the SCG to perform the same communication. The UE being served by the SCG does not need to distinguish the individual small cells and can regard the small cells as one cell. In other words, the small cells within the SCG constitute one virtual macro cell having a coverage larger than that of one small cell.

The small cells within the SCG configuring a virtual macro cell have the same PCI, and the UE cannot identify each small cell, and thus, the small cell may be accordingly referred to as a "node," which may be referred to as a "cell" in this embodiment and modifications thereof.

A concentrated control entity (hereinafter, referred to as a "concentrator") may be provided per SCG. The concentrator controls the small cells within the SCG. The concentrator is connected to each small cell within the SCG.

As described above, the small cells within the SCG perform the same operation from the higher-level layer to the mapping to the physical resource. Thus, the configuration of each small cell can be simplified by the concentrator controlling a part or the whole of the operation.

The concentrator may be provided in any of the small cells within the SCG or may be provided separately from the small cell.

For example, the concentrator may include units up to the modulation and demodulation units, and each small cell may include the units from the frequency converting unit to the antenna. The functions may be shared in another manner, and it suffices that the individual small cells can perform the same communication.

Communication performed by the UE with the small cell within the SCG configuring the virtual macro cell corresponds to the communication performed by the UE with one virtual macro cell having a coverage larger than that of one small cell. This can accordingly reduce HO failures attributable to the fact that the UE stays in a cell for a short period of time. Thus, the mobility performance of the UE can be improved.

Further, a part or the whole of the small cells within the SCG configuring the virtual macro cell may be provided with the function as each individual dedicated cell, that is, the cell configured by a dedicated eNB so as to operate as each individual dedicated cell. In other words, the small cell operates as a cell configured by a normal eNB.

The small cell operating as a dedicated cell may have a carrier frequency different from the carrier frequency in the operation as a virtual macro cell. The small cells operating as dedicated cells may have the same carrier frequency. The carrier frequency when the small cell operates as a virtual macro cell may be made the same as the carrier frequency of the macro cell. The frequency layer of the small cell operating as a dedicated cell may be made different from the frequency layer in the operation as a virtual macro cell. Consequently, interference occurring between the operation as a virtual macro cell and the operation as a dedicated cell can be eliminated.

The frequency band in the operation as a dedicated cell may be made different from the frequency band in the operation as a virtual macro cell. The frequency band in the operation as a virtual macro cell may be made the same as the frequency band of the macro cell.

The small cell operating as a dedicated cell has the cell identity in the operation as a dedicated cell and the cell identity in the operation as a virtual macro cell. The small cell uses the cell identity in the operation as a dedicated cell when operating as a dedicated cell, and uses the cell identity in the operation as a virtual macro cell when operating as a virtual macro cell. This allows the small cell to perform both of the operation of the virtual macro cell composed of small cells within the SCG and the operation as the dedicated cells including only small cells.

The O&M may configure the cell identity of each of the small cells, which may be configured via the concentrator.

The PCI selection function may be individually used to configure the individual PCIs in the small cells (see Non-Patent Document 1). The PCI when the small cell operates as a virtual macro cell may be decided using the PCI selection function on the frequency layer in the operation as a virtual macro cell, and the PCI when the small cell operates as a dedicated cell may be decided using the PCI selection function on the frequency layer in the operation as a dedicated cell.

FIG. 20 is a diagram for explaining the concept of an SCG configuring a virtual macro cell. With reference to FIG. 20, the small cells are indicated by references "4109" to "4136," and small cell groups (SCGs) are indicated by references "4105" to "4108." Each SCG is composed of seven small cells. For example, the SCG 4105 is composed of the small cells 4109 to 4115. Concentrators 4101 to 4104 are connected to the SCGs 4105 to 4108, respectively.

Each of the SCGs 4105 to 4108 configures one virtual macro cell. As described above, the small cells in each SCG perform the same communication, so that the UE being served by the SCG does not need to distinguish the individual small cells and can regard the small cells as one cell. For example, in the SCG 4105, the small cells 4109 to 4115 perform the same communication. Therefore, one small cell, for example, one virtual macro cell 4105 having a coverage larger than that of the small cell 4109 is configured.

When the SCG 4108 configures a virtual macro cell, the UE 4137 is a UE being served by the SCG 4108, that is, a UE being served by the virtual macro cell. When the UE 4137 moves in the direction indicated by the arrow, a period of time when the UE stays in the virtual macro cells respectively composed of the SCGs 4108 and 4105 is longer than a period of time when the UE stays in the small cells 4136, 4131, 4113, and 4112.

The small cell within the SCG configuring a virtual macro cell operates as a virtual macro cell and also operates as a dedicated cell.

Figure 21:
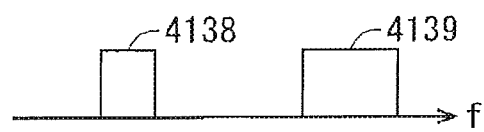
FIG. 21 shows an example of physical resources for use in a small cell.

FIG. 21 shows example physical resources for use in the small cells. FIG. 21 shows the physical resource having a carrier frequency and a bandwidth in the operation as a virtual macro cell is indicated by a reference "4138," and a physical resource having a carrier frequency and a bandwidth in the operation as a dedicated cell is indicated by a reference "4139."

The physical resource 4138 when the small cell operates as a virtual macro cell is the same among the individual small cells within the SCG. The individual small cells within the SCG perform the same communication using the physical resource 4138.

The physical resource 4139 when the small cell operates as a dedicated cell may be the same among the individual small cells within the SCG or a part or the whole of the physical resource may differ. Communication is performed per small cell using the physical resource 4139.

The small cell operating as a dedicated cell among the small cells within the SCG performs both of the operation as a virtual macro cell (hereinafter, referred to as a "virtual macro cell mode") and the operation as a dedicated cell (hereinafter, referred to as a "dedicated cell mode").

Consequently, the overlay structure of the virtual macro cell and the small cells is formed using the small cell within the SCG.

Therefore, dual connectivity can be performed with the small cell within the SCG. The inter-node radio resource aggregation, which has not been conventionally performed with small cell alone, can be performed with the small cell alone by the method disclosed in this embodiment.

The mobility anchor may be maintained using a virtual macro cell. For example, the HO-related RRC signaling may be performed between the UE and the small cell within the SCG operated in the virtual macro cell mode. The other signaling and data may be performed with the small cell operated in the dedicated cell mode. This enables mobility control in the virtual macro cell having a coverage larger than that of the small cell, thereby reducing HO failures attributable to the fact that the UE stays in a small cell for a short period of time.

Control plane (C-plane) connection may be performed with the small cell within the SCG operated in the virtual macro cell mode, and the user plane (U-plane) connection may be performed with the small cell operated in the dedicated cell mode. This can reduce HO failures, improving the mobility performance.

By limiting the communication between the virtual macro cell and the UE to predetermined signaling and the control plane (C-plane) connection or to predetermined signaling and part of data communication, the physical resources required for the virtual macro cell can be reduced. For example, the frequency bandwidth for operating the virtual macro cell mode can be made narrow.

The frequency bandwidth for operating the virtual macro cell mode may be narrower than the frequency bandwidth for operating the dedicated cell mode. This can restrict a reduction in the spectral efficiency in the operation of the virtual macro cell mode.

As the part of data communication, for example, a low delay in voice or the like is required. This reduces HO failures, thereby reducing a loss of voice data.

Figure 22:
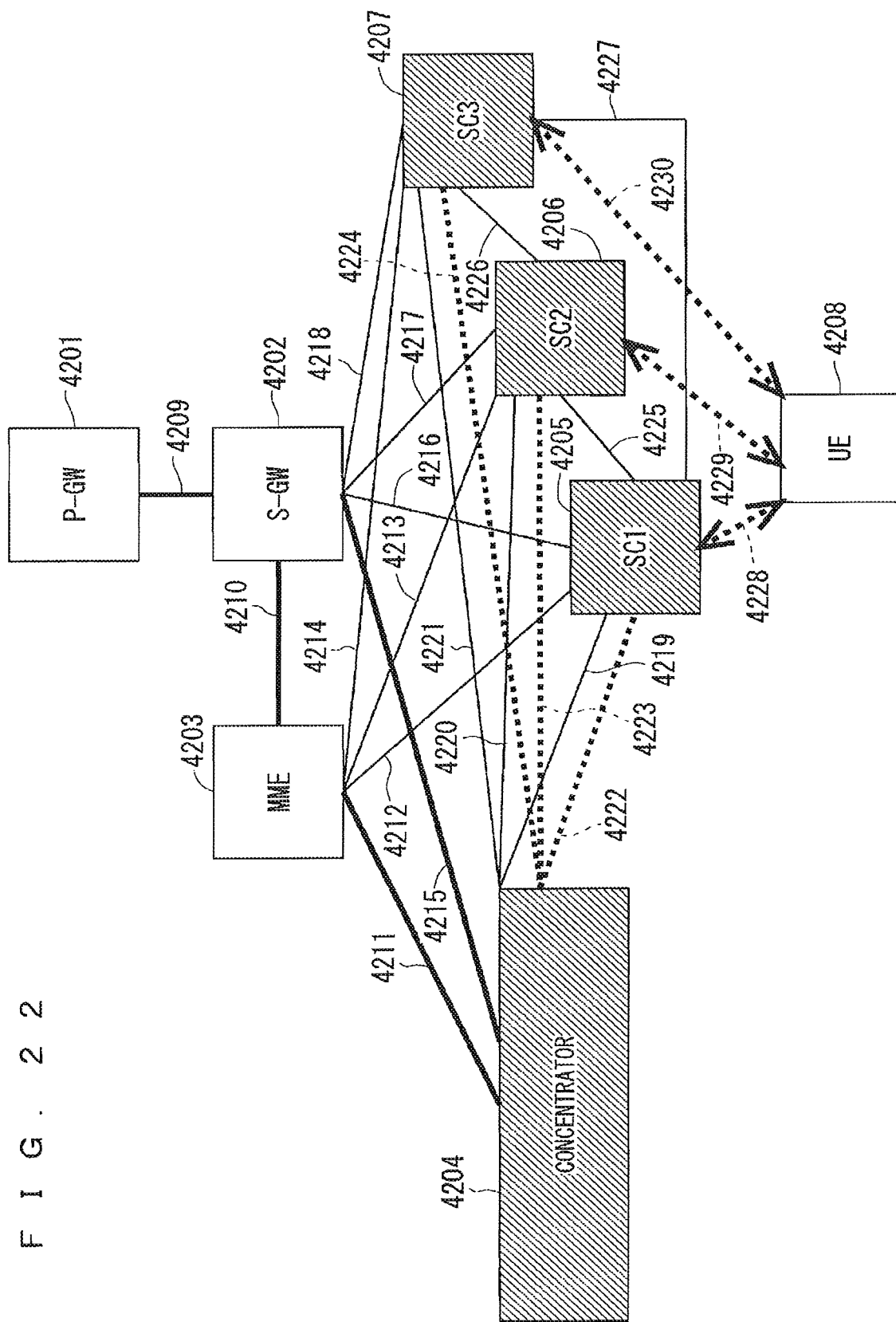
FIG. 22 shows an example of the architecture of a communication system in the operations in both of a virtual macro cell mode and a dedicated cell mode.

FIG. 22 shows an example of the architecture of the communication system when the operations in both of the virtual macro cell mode and the dedicated cell mode are performed. The communication system shown in FIG. 22 includes a P-GW 4201, a S-GW 4202, an MME 4203, a concentrator 4204, a first small cell (SC1) 4205, a second small cell (SC2) 4206, a third small cell (SC3) 4207, and a UE 4208.

The P-GW 4201 and the S-GW 4202 are connected by an interface 4209, for example, an S5 interface. The S-GW 4202 and the MME 4203 are connected by an interface 4210, for example, an S11 interface.

The MME 4203 and the concentrator 4204 are connected by an interface 4211. The MME 4203 and the first small cell (SC1) 4205 are connected by an interface 4212. The MME 4203 and the second small cell (SC2) 4206 are connected by an interface 4213. The MME 4203 and the third small cell (SC3) 4207 are connected by an interface 4214.

The interfaces 4211 to 4214 respectively connecting the MME 4203 with the concentrator 4204 and the small cells 4205 to 4207 are, for example, an S1 interface, specifically, an S1-MME interface.

The S-GW 4202 and the concentrator 4204 are connected by an interface 4215. The S-GW 4202 and the first small cell (SC1) 4205 are connected by an interface 4216. The S-GW 4202 and the second small cell (SC2) 4206 are connected by ah interface 4217. The S-GW 4202 and the third small cell (SC3) 4207 are connected by an interface 4218.

The interfaces 4215 to 4218 respectively connecting the S-GW 4202 with the concentrator 4204 and the small cells 4205 to 4207 are, for example, an S1 interface, specifically, an S1-U interface.

The concentrator 4204 and the first small cell (SC1) 4205 are connected by an interface 4219, for example, an X2 interface. The concentrator 4204 and the second small cell (SC2) 4206 are connected by an interface 4220, for example, an X2 interface. The concentrator 4204 and the third small cell (SC3) 4207 are connected by an interface 4221, for example, an X2 interface.

The concentrator 4204 and the first small cell (SC1) 4205 may be connected by an interface 4222. The concentrator 4204 and the second small cell (SC2) 4206 may be connected by an interface 4223. The concentrator 4204 and the third small cell (SC3) 4207 may be connected by an interface 4224.

The first small cell (SC1) 4205 and the second small cell (SC2) 4206 are connected by an interface 4225, for example, an X2 interface. The second small cell (SC2) 4206 and the third small cell (SC2) 4207 are connected by an interface 4226, for example, an X2 interface. The first small cell (SC1) 4205 and the third small cell (SC3) 4207 are connected by an interface 4227, for example, an X2 interface.

The UE 4208 and the first small cell (SC1) 4205 are connected by an interface 4228, for example, a Uu interface being an air interface. The UE 4208 and the second small cell (SC2) 4206 are connected by an interface 4229, for example, a Uu interface being an air interface. The UE 4208 and the third small cell (SC3) 4207 are connected by an interface 4230, for example, a Uu interface being an air interface.

The interfaces 4219 to 4221 and the interfaces 4222 to 4224 may be the same interface. For example, the X2 interface may be provided with a new function, or the X2 interface may be a new interface. The use of the same interface can simplify the control between the concentrator 4204 and each of the small cells 4205 to 4207.

The case in which the individual small cells 4205 to 4207 are operated in the virtual macro cell mode will be described with reference to FIG. 22.

The small cells 4205 to 4207 and the concentrator 4204, which are hatched in FIG. 22, constitute a virtual macro cell. The small cells 4205 to 4207 constitute one SCG. The concentrator 4204 is provided for the SCG and is connected to the small cells 4205 to 4207 in the SCG respectively by the interfaces 4222 to 4224. The small cells within the SCG are controlled by the concentrator 4204 so as to perform the same operation.

With reference to FIG. 22, a virtual macro cell is configured through the connection by the interfaces indicated by heavy lines. The same operation as the conventional operation of the macro cell is performed between the P-GW 4201 and the S-GW 4202 and between the MME 4203 and the S-GW 4202.

The small cell within the SCG in the virtual macro cell mode and the MME 4203 are connected via the concentrator 4204. The small cell within the SCG and the S-GW 4202 are connected via the concentrator 4204.

The concentrator 4204 may particularly have a function as a higher layer unit of the functions when the small cells within the SCG function as a virtual macro cell. This eliminates the need for each small cell to connect with the MME 4203 and the S-GW 4202, and the concentrator 4204 is only required to connect with the MME 4203 and the S-GW 4202.

In the virtual macro cell mode, each of the small cells 4205 to 4207 in the SCG communicates with the UE 4208. Configuring the architecture as shown in FIG. 22 leads to the configuration of a virtual macro cell including a plurality of small cells. This enables the configuration of a virtual macro cell for UEs being served by a plurality of small cells.

Figure 23:
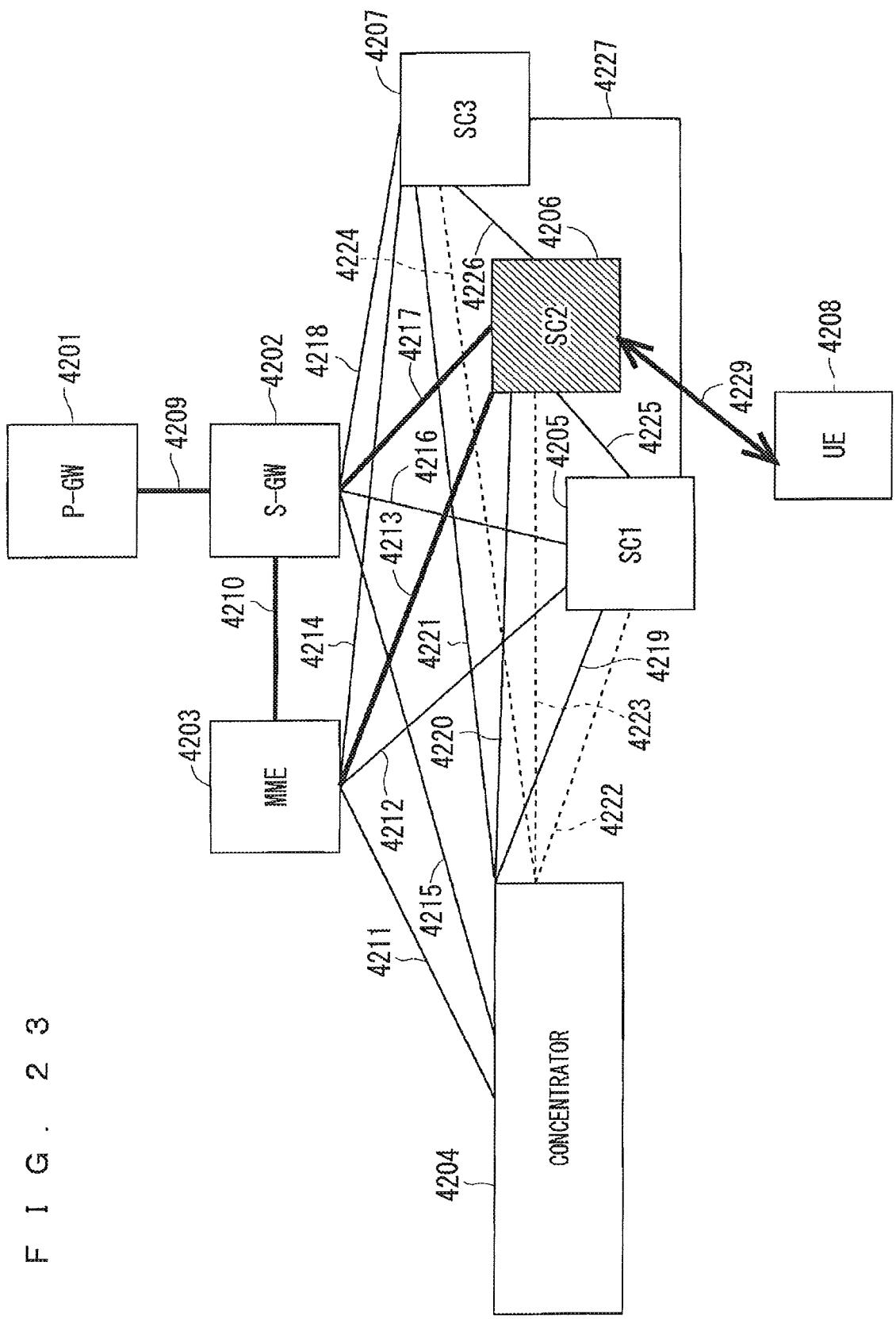
FIG. 23 shows an example of the architecture of the communication system in the operation in the dedicated cell mode.

The case in which the small cells 4205 to 4207 are operated in the dedicated cell mode will be described with reference to FIG. 23. FIG. 23 shows an example of the architecture of the communication system when the operation in the dedicated cell mode is performed. FIG. 23 is similar to FIG. 22, and thus, the same portions will be denoted by the same references, and description thereof will be omitted. FIG. 23 shows the case in which the second small cell (SC2) 4206 is operated in the dedicated cell mode.

The case in which the second small cell (SC2) 4206 is operated in the dedicated cell mode will be described below. With reference to FIG. 23, the second small cell (SC2) 4206 that is hatched operates as a dedicated cell. With reference to FIG. 23, a dedicated cell is configured through the connection by interfaces of heavy lines. The same operation as the operation of the conventional macro cell is performed between the P-GW 4201 and the S-GW 4202 and between the MME 4203 and the S-GW 4202.

The MME 4203 is directly connected to the second small cell (SC2) 4206, and the S-GW 4202 is directly connected to the second small cell (SC2) 4206. When the small cell operates in the dedicated cell mode, the small cell functions as a conventional cell. Thus, each of the small cells 4205 to 4207 is directly connected to the MME 4203 and the S-GW 4202. In the dedicated cell mode, communication is performed between the second small cell (SC2) 4206 and the UE 4208.

Configuring the architecture as shown in FIG. 23 allows the small cell to operate in the dedicated cell mode.

The small cell operates in both of the virtual macro cell mode and the dedicated cell mode using the architectures of the communication system shown in FIGS. 22 and 23, enabling the overlay structure of the virtual macro cell and the small cells.

Thus, dual connectivity can be performed with the small cells within the SCG. The use of the method disclosed in this embodiment allows the inter-node radio resource aggregation, which has not been enabled only with small cells, to be performed only with small cells.

Figure 24:
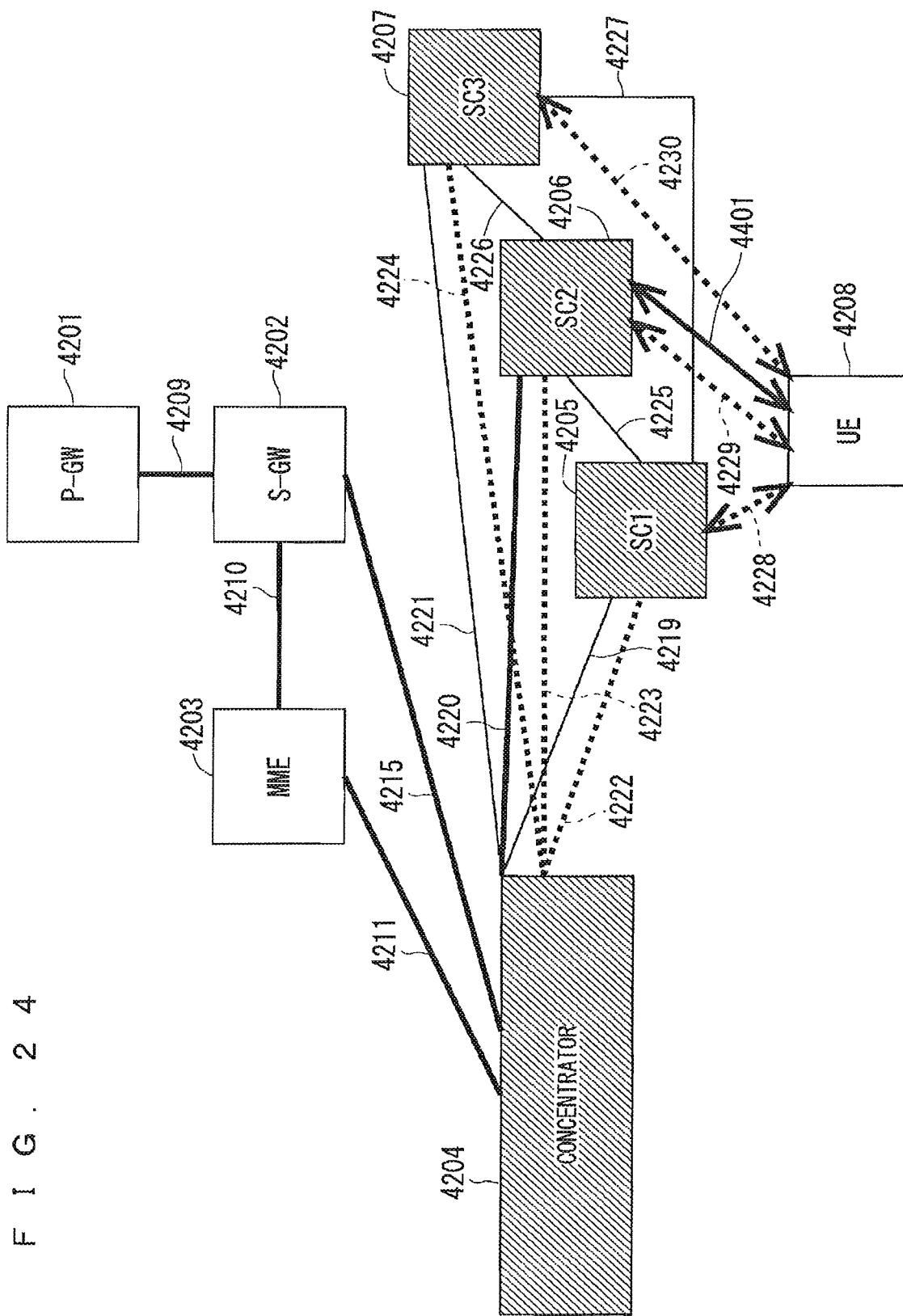
FIG. 24 shows another example of the architecture of the communication system in the operations in both of the virtual macro cell mode and the dedicated cell mode.

FIG. 24 shows another example of the architecture of the communication system when the operations in both of the virtual macro cell mode and the dedicated cell mode are performed. FIG. 24 is similar to FIG. 22, and thus, the same portions will be denoted by the same references, and description thereof will be omitted. Unlike FIGS. 22 and 23, with reference to FIG. 24, there are no interfaces from the MME 4203 or the S-GW 4202 to the small cells 4205 to 4207 in the SCG, and the small cells 4205 to 4207 in the SCG are connected to the MME 4203 and the S-GW 4202 via the concentrator 4204.

The operation in the virtual macro cell mode is the same as that of FIG. 22, and thus, description thereof will be omitted. Described as the operation in the dedicated cell mode is the case in which the second small cell (SC2) 4206 operates as a dedicated cell.

With reference to FIG. 24, a dedicated cell is configured through the connection by the interfaces 4209, 4210, 4211, 4215, 4220, and 4401 of heavy lines. The same operation as the operation of the conventional macro cell is performed between the P-GW 4201 and the S-GW 4202 and between the MME 4203 and the S-GW 4202. The concentrator 4204 may have a routing function as the function for the dedicated cell mode.

The second small cell (SC2) 4206 and the MME 4203 are connected via the concentrator 4204. In downlink, the concentrator 4204 performs routing from the MME 4203 to the small cell connected with the UE 4208 that is to serve as a communication target. In downlink, the concentrator 4204 selects a small cell connected with the UE 4208 and forwards signaling to the small cell. In uplink, the concentrator 4204 forwards signaling from the small cell connected with the UE 4208 to the MME 4203. The concentrator 4204 may select the MME 4203.

At least one of a small cell identity, a UE identity, and an MME identity being a destination may be accompanied with or included in the signaling above to be recognizable by the concentrator 4204. This enables routing in the concentrator 4204.

Similarly, the second small cell (SC2) 4206 and the S-GW 4202 are connected via the concentrator 4204. In downlink, the concentrator 4204 performs routing from the S-GW 4202 to the small cell connected with the UE 4208 that is to serve as a communication target. In downlink, the concentrator 4204 selects a small cell connected with the UE 4208 and forwards data to the small cell. In uplink, the concentrator 4204 forwards data from the small cell connected with the UE 4208 to the S-GW 4202. The concentrator 4204 may select the S-GW 4202.

At least one of a small cell identity, a UE identity, and an MME identity being a destination may be accompanied with the data above to be recognizable by the concentrator 4204. This enables routing in the concentrator 4204.

Of the interfaces between the concentrator 4204 and the small cells 4205 to 4207, the interfaces 4219 to 4221 used in the operation in the dedicated cell mode may be configured by high-delay non-ideal backhauls, and the interfaces 4222 to 4224 used in the operation in the virtual macro cell mode may be configured by low- or negligible-delay ideal backhauls. This eliminates the influence on the operation by the control delays between the concentrator 4204 and the small cells 4205 to 4207 in the operation in the virtual macro cell mode.

Providing the architecture of the communication system shown in FIG. 24 eliminates the need for interfaces directly connected from the small cells within the SCG to the MME 4203 and the S-GW 4202. This eliminates the need for actually installing physical interfaces, thereby minimizing the cost of constructing a communication system.

Figure 25:
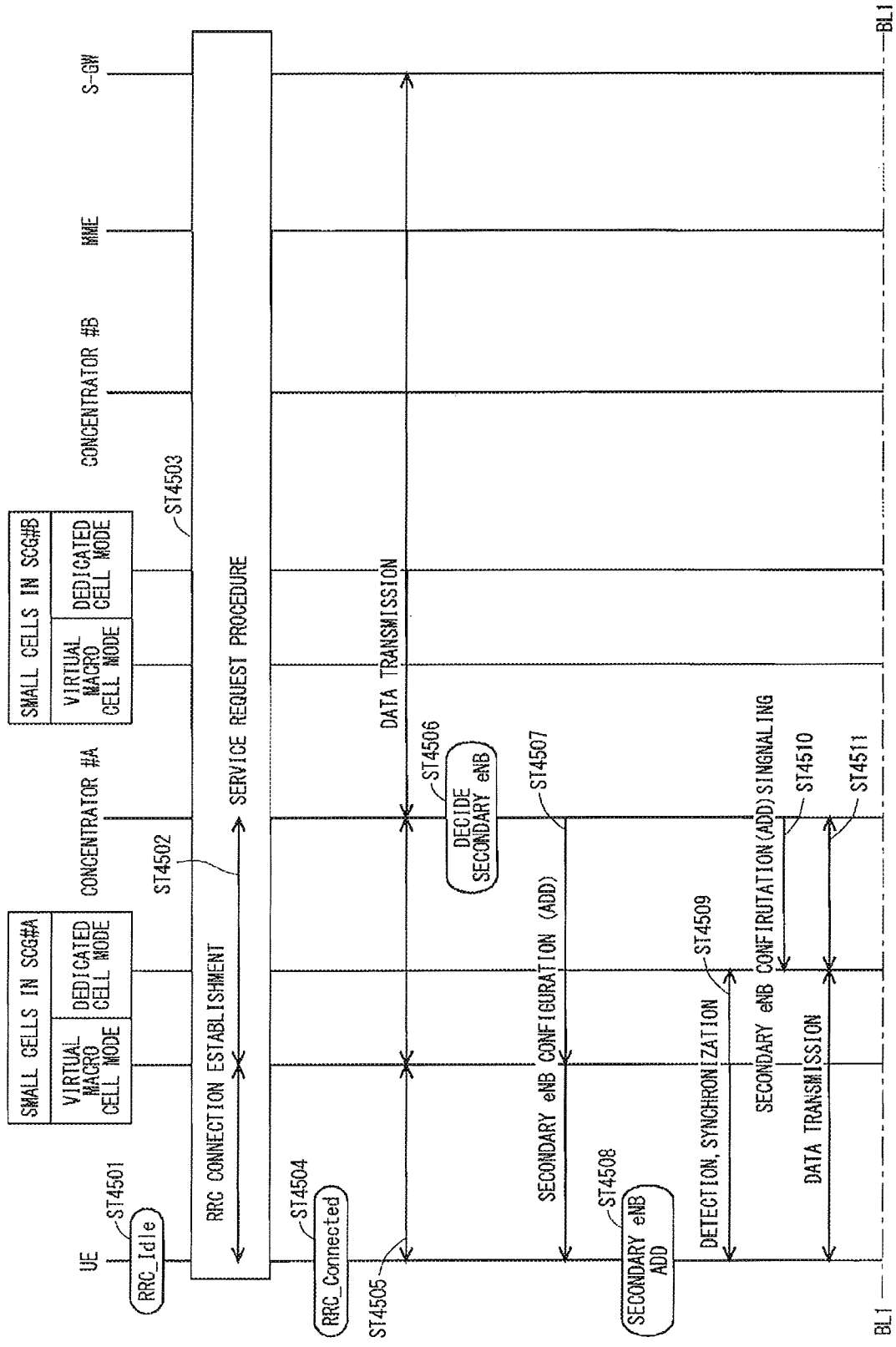
FIG. 25 shows an example of the sequence of a HO procedure in the communication system of the first embodiment.
Figure 26:
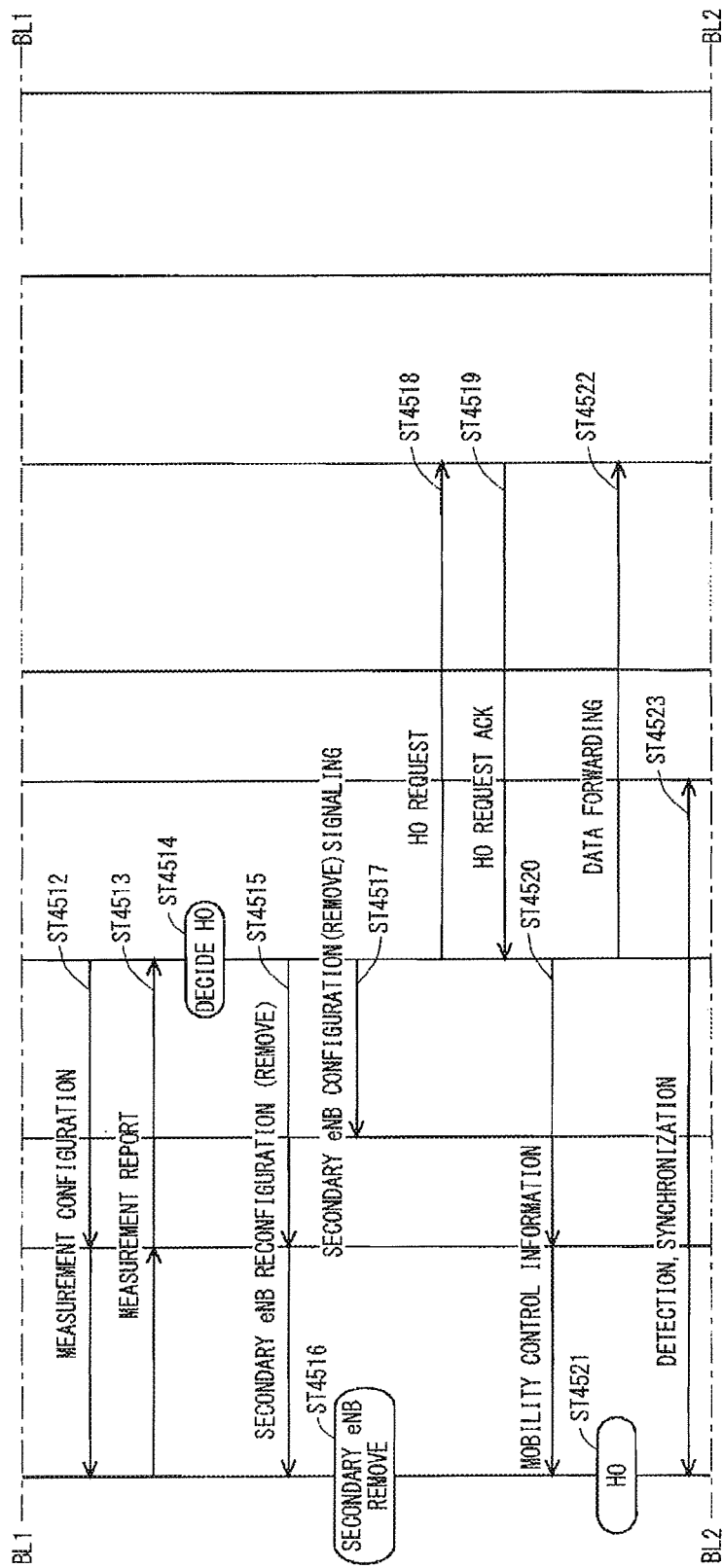
FIG. 26 shows the example of the sequence of the HO procedure in the communication system of the first embodiment.
Figure 27:
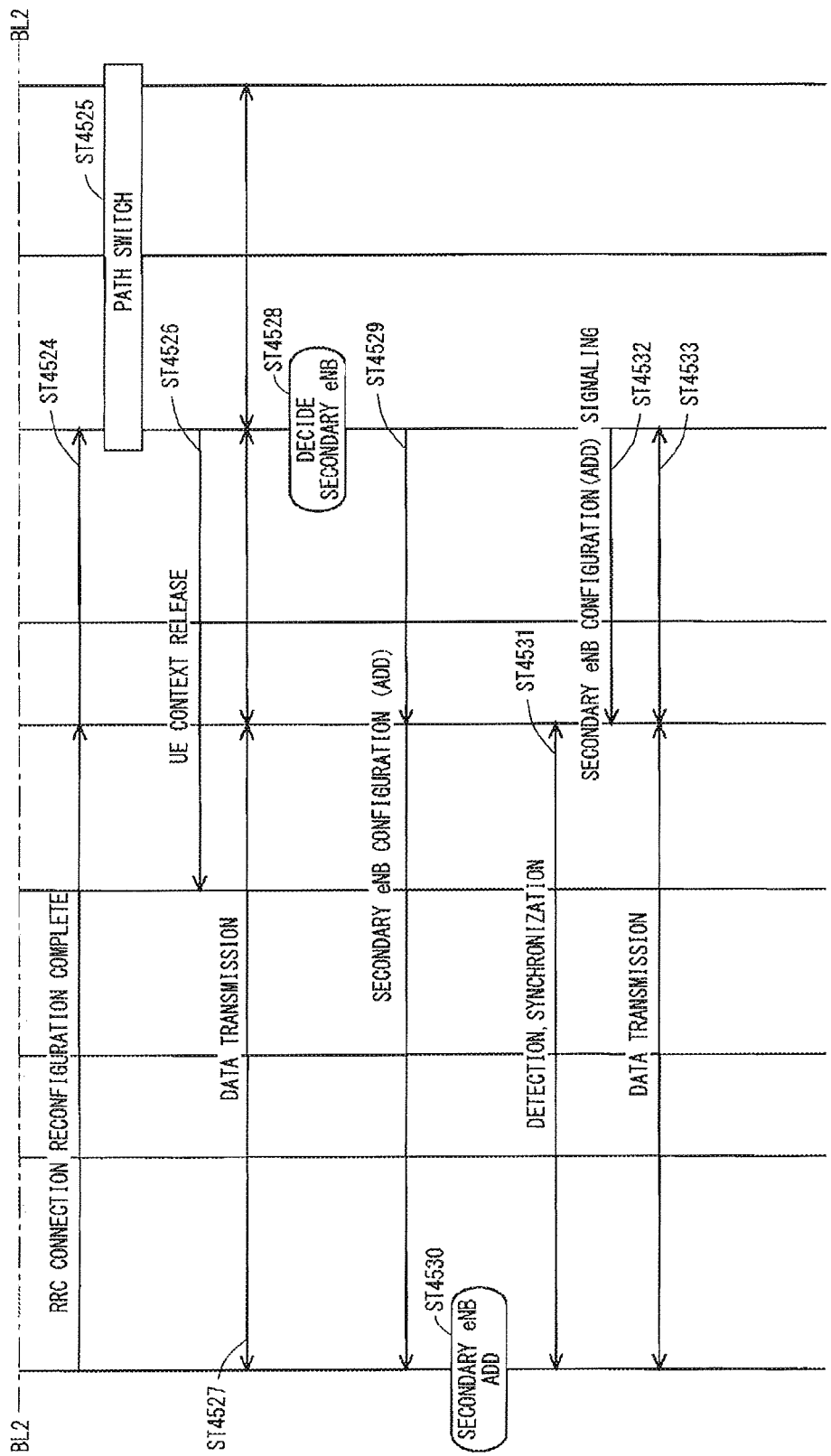
FIG. 27 shows the example of the sequence of the HO procedure in the communication system of the first embodiment.

FIGS. 25 to 27 show an example of the sequence of the HO procedure in the communication system of the first embodiment. FIG. 25 is continuous with FIG. 26 at a boundary BL1. FIG. 26 is continuous with FIG. 27 at a boundary BL2.

The small cells within an SCG#A constitute a virtual macro cell. The virtual macro cell composed of the small cells within the SCG#A are controlled by a concentrator #A. The small cells within an SCG#B constitute a virtual macro cell. The virtual macro cell composed of the small cells within the SCG#B are controlled by a concentrator #B.

The small cells within the SCG#A operate in both of the virtual macro cell mode and the dedicated cell mode. The small cells within the SCG#B operate in both of the virtual macro cell mode and the dedicated cell mode.

In Step ST4503, the UE that is in the RRC_Idle state being served by the SCG#A in Step ST4501 performs a service request procedure with the concentrator #A, the MME, and the S-GW via the small cell within the SCG#A operated in the virtual macro cell mode.

In this case, in Step ST4502, to be RRC connected with the concentrator #A, the UE first performs RRC connection establishment via the small cell within the SCG#A operated in the virtual macro cell mode.

In Step ST4504, the UE shifts to the RRC_Connected state.

In Step ST4505, data transmission is performed between the UE, the small cell within the SCG#A operated in the virtual macro cell mode, the concentrator #A, and the S-GW.

As a result, signaling is communicated between the concentrator #A and the MME via the UE and the small cell within the SCG#A operated in the virtual macro cell mode. Data is communicated between the concentrator #A and the S-GW via the UE and the small cell within the SCG#A operated in the virtual macro cell mode. Communications are performed using a so-called virtual macro cell.

The method of performing dual connectivity will be described next. In Step ST4506, to perform dual connectivity with the UE, the concentrator #A decides a secondary cell connected with the UE, specifically, an eNB (hereinafter, also referred to as a "second eNB (secondary eNB)" configuring a secondary cell. The cell with which dual connectivity is performed may be selected from the small cells within the SCG configuring a virtual macro cell connected with the UE. Herein, the secondary cell may be selected from the small cells within the SCG#A. The secondary cell may be a small cell operable in the dedicated cell mode.

In Step ST4507, the concentrator #A notifies, via the small cell within the SCG#A operated in the virtual macro cell mode, the UE that the secondary cell (secondary eNB) is to be added as a radio resource together with the configuration (secondary eNB configuration) of the secondary cell (secondary eNB) decided in Step ST4506.

This notification may be performed through RRC signaling. For example, this notification may be performed in RRC connection reconfiguration, or may be performed as the reconfiguration of a radio resource. The cell identity of the small cell operated in the dedicated cell mode, which is to serve as a secondary cell, is included in this notification. The cell identity may be, for example, PCI, EGCI, or GCI.

In Step ST4508, the UE that has received the notification that the secondary cell is to be added in Step ST4507 uses the received configuration of the secondary cell to add the secondary cell (secondary eNB) as a radio resource.

In Step ST4509, the UE detects and performs synchronization of the small cell operated in the dedicated cell mode, which has been added as a secondary cell. The notified cell identity may be used in the detection and synchronization.

In Step ST4510, meanwhile, the concentrator #A performs signaling of notifying the secondary cell of the addition of the secondary cell (secondary eNB) using the configuration (secondary eNB configuration) of the secondary cell (Secondary eNB). Thus, the concentrator #A notifies the secondary cell that the secondary cell has been added to the UE as a radio resource and requests scheduling to the UE. The UE identity is included in this notification.

In Step ST4511, consequently, data transmission is performed between the UE and one small cell within the SCG#A operated in the dedicated cell mode, which has been added as a secondary cell.

The UE is accordingly connected to both of the small cell within the SCG#A operated in the virtual macro cell mode and one small cell within the SCG#A operated in the dedicated cell mode.

The HO method will be described next. In Step ST4512, the concentrator #A notifies the measurement configuration. When notifying the measurement configuration, the concentrator #A may notify the cell identity of a neighbor SCG operated as a virtual macro cell, together with a measurement frequency. The concentrator #A may notify the cell identity of the macro cell on the same frequency layer.

This enables HO where the virtual macro cell or the macro cell is a target cell. In other words, HO between macro cells including a virtual macro cell is enabled. Also, measurement of the small cell operated in the dedicated cell mode can be avoided, reducing the measurement time of the UE and the power consumption of the UE.

Herein, for example, the cell identity of one of the small cells within the SCG#B operated as the virtual macro cell is notified. The UE uses the measurement configuration notified in Step ST4512 to perform measurement.

In Step ST4513, the UE reports the measurement to the concentrator #A when a predetermined event condition notified in the measurement configuration is satisfied, for example, when the received power or reception quality of the virtual macro cell configured by the SCG#A falls below a predetermined threshold for a predetermined period and the received power or reception quality of the virtual macro cell configured by the SCG#B exceeds a predetermined threshold for a predetermined period.

The UE notifies the concentrator #A via the small cell within the SCG#A. The measurement result on the reception quality or received power or the cell identity of the measured virtual macro cell may be included in this notification. The concentrator #A decides whether to perform HO using the measurement report.

The concentrator #A that has decided to perform HO in Step ST4514 performs the procedure of ending dual connectivity with the UE.

In Step ST4515, the concentrator #A notifies, via the small cell within the SCG#A operated in the virtual macro cell mode, the UE that the radio resource of the cell performing dual connectivity is to be removed.

This notification may be performed through RRC signaling. For example, notification may be performed by the RRC connection reconfiguration or may be performed as the reconfiguration of a radio resource. The cell identity of a to-be-removed small cell operated in the dedicated cell mode is included in this notification. The cell identity may be, for example, PCI, EGCI, or GCI.

In Step ST4517, meanwhile, the concentrator #A notifies the to-be-removed cell that the cell has been removed as a radio resource from the UE and requests to end the scheduling for the UE. The identity of the UE is included in this notification.

In Step ST4516, the UE that has received in Step ST4515 the notification that the radio resource of the cell is to be removed performs the process of removing the cell performing dual connectivity.

Consequently, data transmission between the UE and one small cell within the SCG#A operated in the dedicated cell mode, which is a cell to be removed, ends.

The UE accordingly returns to the connection only with the small cell within the SCG#A operated in the virtual macro cell mode.

In Step ST4518, the concentrator #A that has decided to perform HO in Step ST4514 notifies the concentrator #B, which has been decided as a HO destination and controls the small cell within the SCG#B operated in the virtual macro cell mode, of a HO request message. The cell identity of its own virtual macro cell and the identity of the UE being a HO target may be included in this notification.

The concentrator #B permits the acceptance of the UE, and in Step ST4519, notifies the concentrator #A of a response (HO request ack) to the HO request message. The configuration of a radio resource when the small cell within the SCG#B is operated in the virtual macro cell mode may be included in this notification. A handover command may be included in this notification.

In Step ST4520, the concentrator #A notifies, via the small cell within the SCG#A operated in the virtual macro cell mode, the UE being a HO target of the mobility control information and instructs HO. In this notification, the cell identity of one of the small cells within the SCG#B, which is the HO destination and is operated in the virtual macro cell mode, and the configuration of the radio resource are notified.

In Step ST4521, the UE that has received the mobility control information in Step ST4520 performs HO. In Step ST4523, detection and synchronization process are performed using the information on the small cell within the SCG#B that is a HO destination and is operated in the virtual macro cell mode, which has been received in Step ST4520.

In Step ST4524 of FIG. 27, the UE that has performed synchronization process notifies, via the small cell within the SCG#B operated in the virtual macro cell mode, the concentrator #B of the reconfiguration completion of RRC connection (RRC connection reconfiguration complete).

In Step ST4525, the concentrator #B that has received the notification from the UE in Step ST4524 performs a path switch procedure with the MME and the S-GW. The data path is changed from the concentrator #A to the concentrator #B. In Step ST4527, accordingly, data transmission is performed between the concentrator #B and the S-GW via the UE and the small cell within the SCG#B operated in the virtual macro cell mode.

In Step ST4526, the concentrator #B notifies the concentrator #A of a UE context release message of the UE being a HO target. Consequently, the radio resource configuration held by the concentrator #A can be released to the HO targeted UE. The radio resource can be used for another UE.

The concentrator #A may notify the small cell within the SCG#A of the notification. When the small cell within the SCG#A holds the radio resource configuration, this notification enables the release of the radio resource of the small cell within the SCG#A. The HO procedure ends as described above.

The method of performing dual connectivity again by the UE connected with the concentrator #B via the small cell within the SCG#B operated in the virtual macro cell mode will be described below.

In Step ST4528, the concentrator #B decides a secondary cell (secondary eNB) to perform dual connectivity with the UE. The secondary cell may be selected from the small cells within the SCG#B, which may be the small cell operated in the dedicated cell mode.

In Step ST4529, the concentrator #B notifies, via the small cell within the SCG#B operated in the virtual macro cell mode, the UE that the cell is to be added as a radio resource, together with the configuration of the secondary cell (Secondary eNB configuration) decided in Step ST4528.

This notification may be performed through RRC signaling, for example, in the RRC connection reconfiguration. The notification may be performed as the reconfiguration of the radio resource. The cell identity of the small cell, which is to serve as the secondary cell and is operated in the dedicated cell mode, is included in this notification. The cell identity may be, for example, PCI, EGCI, or GCI.

In Step ST4530, the UE that has received the addition of the secondary cell in Step ST4529 adds a radio resource using the received configuration of the secondary cell.

In Step ST4531, the UE detects and performs synchronization of the small cell operated in the dedicated cell mode added as a secondary cell. The notified cell identity may be used in the detection and synchronization process.

In Step ST4532, meanwhile, the concentrator #B notifies the secondary cell that the secondary cell has been added to the UE as a radio resource and requests scheduling to the UE. The identity of the UE is included in this notification.

In Step ST4533, accordingly, data transmission is performed between the UE and the one small cell within the SCG#B operated in the dedicated cell mode, which has been added as a secondary cell.

The UE is accordingly connected to both of the small cell within the SCG#B operated in the virtual macro cell mode and one small cell within the SCG#B operated in the dedicated cell mode.

Providing the sequence as shown in FIGS. 25 to 27 enables dual connectivity by the small cell within the SCG operated in the virtual macro cell mode and the small cell within the SCG operated in the dedicated cell mode. The operation of a large number of small cells improves a user throughput.

HO performed between the SCGs operated in the virtual macro cell mode can reduce, also in the operation of a large number of small cells, HO failures attributable to the fact that the UE stays in each small cell for a short period of time. This can improve the mobility performance of the UE.

Through the combination of the operations above, a user throughput and mobility performance can be improved also in the operation of a large number of small cells.

The secondary cell performing dual connectivity is removed before the execution of HO, thereby enabling the radio resource of the secondary cell to be allocated to another UE. The use efficiency of radio resources can accordingly be improved. Also, the capacity of the communication system can be increased.

Dual connectivity is performed using the small cell belonging to the SCG being a HO destination after the execution of HO, thereby reducing failed connections with the cell for dual connectivity after the execution of HO. This eliminates the need for, for example, reconnection after a failed connection, reducing a control delay. Also, a signaling amount can be reduced, and a throughput can be improved.

The method disclosed in this embodiment can configure a virtual macro cell using a plurality of small cells. Also, the operations in both of the virtual macro mode and the dedicated cell mode are performed using a plurality of small cells, thereby achieving an overlay structure. This enables dual connectivity with UEs being served by a plurality of small cells, with only by small cells.

The mobility anchor can thus be maintained using a virtual macro cell, thereby reducing the degradation in the mobility performance between small cells.

High-capacity data communication with the UE can be performed in a small cell single mode, thereby improving a throughput per UE.

There is no need to newly install a macro cell that is overlaid with a small cell, thereby greatly reducing the cost for operating a communication system.

First Modification of Second Embodiment

The problem solved in a first modification of the second embodiment will be described below. FIG. 20 above shows the concept of the small cell group (SCG) disclosed in the second embodiment. The small cells within the SCG configuring a virtual macro cell can configure a coverage larger than that of the small cell.

However, at the SCG edge where two SCGs are adjacent to each other, a small cell in one SCG and a small cell in another SCG, for example, the small cell 4111 in the SCG 4105 and the small cell 4122 in the SCG 4106 are adjacent to each other. In the end, the small cells are adjacent to each other at the SCG edge.

The small cell has lower transmission power than that of the macro cell. In some cases, the signal power at the small cell edge when small cells are adjacent to each other is lower than the signal power at the macro cell edge when macro cells are adjacent to each other.

In this case, unfortunately, the distance of the signal power that reaches the inside of the adjacent small cell is short at the small cell edge. That is to say, the coverage overlapping area at the small cell edge is small. In other words, the coverage overlapping area is smaller at the SCG edge than at a normal macro cell edge.

Figure 28:
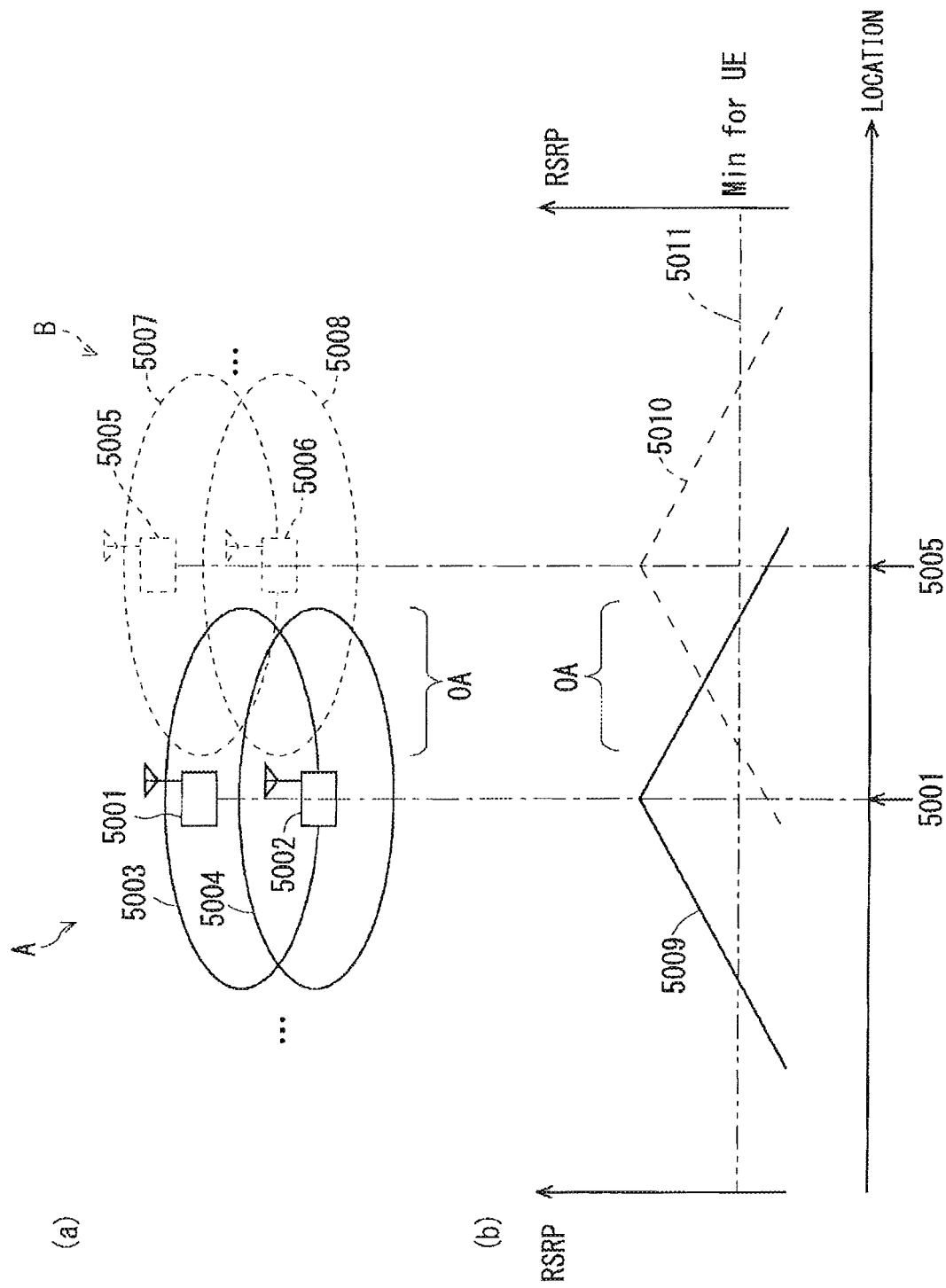
FIG. 28 is a diagram for explaining the concept of an overlapping area at an SCG edge when the arrangements of small cells do not overlap each other at an SCG edge.

FIG. 28 is a diagram for explaining the concept of an overlapping area at an SCG edge when the arrangements of the small cells do not overlap each other at the SCG edge.

With reference to FIG. 28(a), small cells of the SCG#A are indicated by references "5001" and "5002." The small cells 5001 and 5002 configure coverages 5003 and 5004, respectively. The small cells of the SCG#A are indicated by solid lines. The small cells of the SCG#B are indicated by references "5005" and "5006." The small cells 5005 and 5006 configure coverages 5007 and 5008, respectively. The small cells of the SCG#B are indicated by dashed lines.

With reference to part (b) of FIG. 28, the received power from the small cell 5001 is indicated by a reference "5009." The horizontal axis and the vertical axis of part (b) of FIG. 28 represent a location and received power (RSRP), respectively. The received power decreases with an increasing distance from the location of the small cell 5001. The received power from the small cell of the SCG#A is indicated by a solid line.

With reference to part (b) of FIG. 28, the received power from the small cell 5005 is indicated by a reference "5010." The received power decreases with an increasing distance from the location of the small cell 5005. The received power from the small cell of the SCG#B is indicated by a dashed line.

With reference to part (b) of FIG. 28, predetermined received power with which the UE can receive signals is indicated by a reference "5011." The predetermined received power with which the UE can receive signals may be a reception sensitivity point of the UE. The UE can receive signals when its received power is larger than the predetermined received power 5011.

With reference to part (b) of FIG. 28, thus, in the range in which both of the received power 5009 from the small cell 5001 and the received power 5010 from the small cell 5005 are larger than the predetermined received power 5011, the UE can receive signals from both of the small cell 5001 and the small cell 5005. This range is an overlapping area (OA).

As described above, the overlapping area at the SCG edge is narrow similarly to the overlapping area at the small cell edge. Thus, the period of time when the UE stays in the overlapping area while moving is short, and accordingly, enough time may not be obtained to perform a HO-related process. When the mobility is performed in the virtual macro cell mode, unfortunately, the mobility performance decreases between SCGs, that is, between virtual macro cells. This modification aims to solve these problems.

The arrangements of the small cells in a plurality of SCGs overlap each other. At the SCG edge, the arrangements of the small cells of the adjacent SCGs overlap each other.

As a result, the area in which the signal power at the SCG edge is larger than the predetermined power can be extended, thereby allowing the UE to secure the communication quality of any of the adjacent SCGs in the overlapping area. A virtual macro cell mode may be operated in such SCGs.

Figure 29:
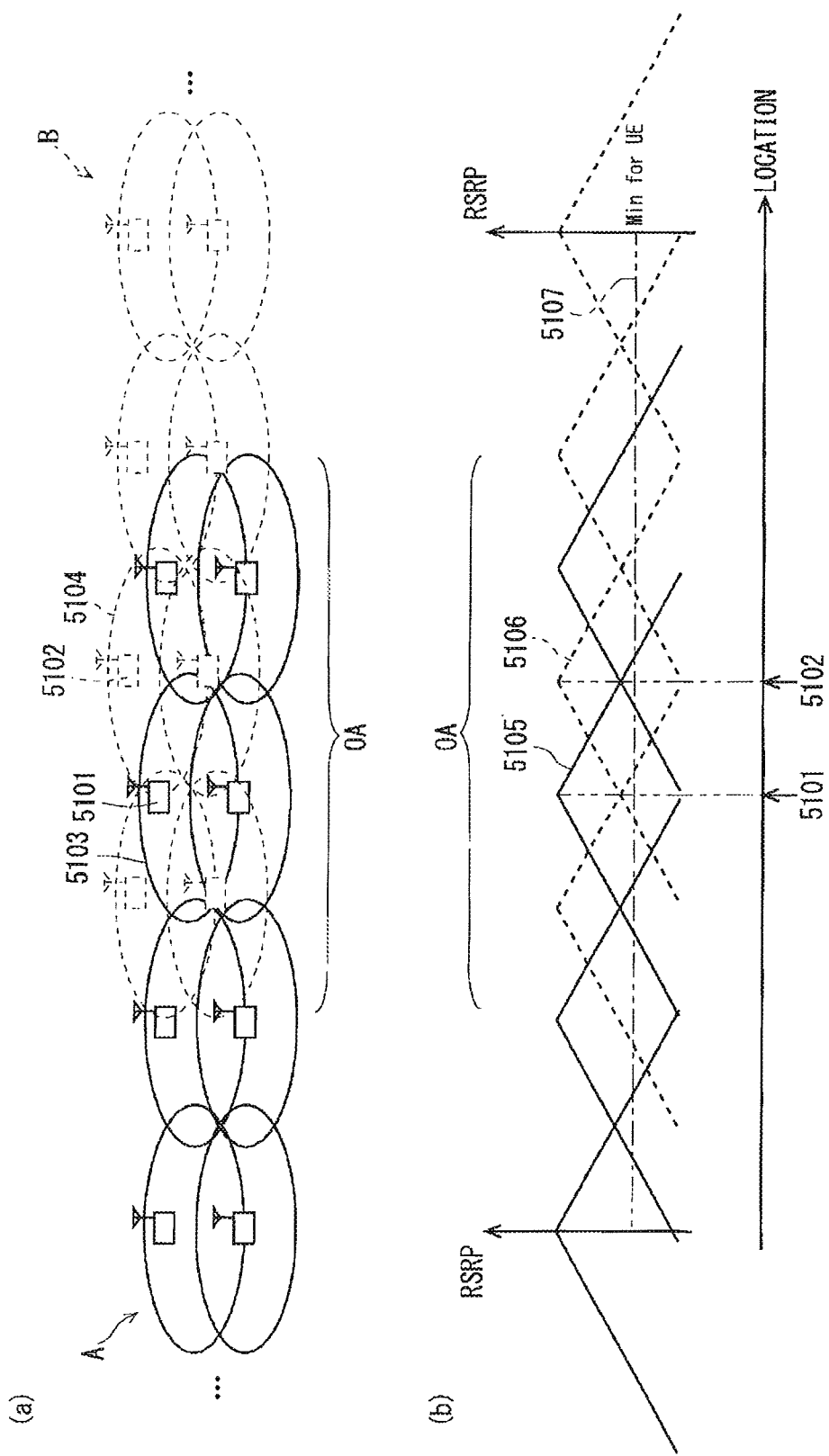
FIG. 29 is a diagram for explaining the concept of an overlapping area at an SCG edge when the arrangements of small cells overlap each other at an SCG edge.

FIG. 29 is a diagram for explaining the concept of an overlapping area at an SCG edge when the arrangements of the small cells at the SCG edge overlap each other.

With reference to part (a) of FIG. 29, the small cell of the SCG#A is indicated by a reference "5101." The small cell 5101 configures a coverage 5103. The small cell of the SCG#A is indicated by a solid line. The small cell of the SCG#B is indicated by a reference "5102." The small cell 5102 configures a coverage 5104. The small cell of the SCG#B is indicated by a dashed line.

With reference to part (b) of FIG. 29, the received power from the small cell 5101 is indicated by a reference "5105." The horizontal axis and the vertical axis of part (b) of FIG. 29 represent a location and received power (RSRP), respectively. The received power decreases with an increasing distance from the location of the small cell 5101. The received power from the small cell of the SCG#A is indicated by a solid line.

With reference to part (b) of FIG. 29, the received power from the small cell 5102 is indicated by a reference "5106." The received power decreases with an increasing distance from the location of the small cell 5102. The received power from the small cell of the SCG#B is indicated by a dashed line.

With reference to part (b) of FIG. 29, the predetermined received power with which the UE can receive signals is indicated by a reference "5107." The predetermined received power with which the UE can receive signals may be a reception sensitivity point of the UE. The UE can receive signals when its received power is larger than the predetermined received power 5107.

With reference to part (b) of FIG. 29, thus, in the range in which both of the received power from the small cells of the SCG#A including the received power 5105 from the small cell 5101 and the received power from the small cells including the received power 5106 from the small cell 5102 are larger than the predetermined received power 5107, the UE can receive signals from both of the small cells of the SCG#A and the small cells of the SCG#B. This range is an overlapping area (OA).

As shown in FIG. 29, the arrangements of the small cells of the adjacent SCGs at the SCG edge overlap each other, thereby increasing the distance of the signal power that reaches the inside of the coverage of the virtual macro cell configured by the adjacent SCG. Thus, the overlapping area of the adjacent SCGs can be extended. Therefore, the time for the UE to stay in the overlapping area while moving can be kept long, thereby securing enough time to perform a HO-related process.

The HO failures between SCGs during the operation in the virtual macro cell mode can be reduced, thereby improving the mobility performance when the UE moves between small cells.

Another method of solving the problem described in this modification will be disclosed below. A configuration may be made such that the transmission power differs between the small cells within the SCG. The transmission power of the small cell installed at an SCG edge may be increased.

For example, the transmission power of the small cell at the SCG edge may be adjusted such that the signal power at an SCG edge is as high as the signal power at a normal macro cell edge.

Thus, the overlapping area of the coverages in a plurality of adjacent small cells, whose transmission power is increased, can be increased. In other words, at the SCG edge at which the small cells are installed, the signal power equal to or higher than that obtained at a normal macro cell edge can be obtained. Thus, the overlapping area being an area up to the receiving sensitivity or predetermined received power of a terminal can be increased.

Operating the virtual macro cell mode in such an SCG can reduce HO failures between SCGs during the operation in the virtual macro cell mode, thereby improving the mobility performance when a UE moves between small cells.

A configuration may be made such that the transmission power differs between the small cells in one of the adjacent SCGs. The transmission power of the small cells installed at one SCG edge may be increased. Although the density of small cells installed at the SCG edge differs per SCG, the overlapping area of the adjacent SCGs becomes wider. Thus, similar effects to those of the method above can be achieved.

Second Modification of Second Embodiment

The following three, (1) to (3), will be disclosed as other methods of solving the problem described in the first modification of the second embodiment.

(1) The transmission power of signaling of a HO targeted UE is increased.

(2) The modulation and coding scheme (MCS) of signaling of a HO targeted UE is configured to be low.

(3) Combination of (1) and (2) above.

In the method (1) above, the signaling of a HO targeted UE may be signaling for a predetermined period. The signaling for a predetermined period may be signaling during a period in which a part of or the whole of a HO-related process is performed between the HO destination cell and at least one of the HO targeted UE and the HO source cell.

Thus, the transmission power of a part or the whole of the signaling concerning the HO-related process of a HO targeted UE can be increased. The HO targeted UE can accordingly receive signaling concerning the HO-related process at a point farther from the HO source cell or the HO destination cell in the HO-related process.

For the HO targeted UE, the coverages of the HO source cell and the HO destination cell apparently increase, resulting in a wider overlapping area. Thus, the time when the UE stays in an overlapping area while moving can be kept long, thereby securing enough time to perform the HO-related process.

Examples of the signaling concerning the HO-related process include a measurement configuration, signaling for measurement report, RRC connection reconfiguration including the mobility control information, and RRC connection reconfiguration complete. Signaling for scheduling information transmission for the signaling above may be included. Signaling for a response (Ack/Nack) to such signaling may be included.

In particular, the transmission power of the signaling of the RRC connection reconfiguration including the mobility control information may be increased. This is because in many cases, the signaling is the last procedure performed between the HO source cell and the UE in the HO-related process.

Increasing the transmission power of the signaling apparently increases the coverage of the HO source cell, thereby increasing the reception quality of the mobility control information. Consequently, failures of the HO-related process can be reduced.

Applying the method described above to the HO between SCGs during the operation in the virtual macro cell mode can reduce HO failures between the SCGs. Control is made such that at least one of the concentrator of the SCG being a HO source and the concentrator of the SCG being a HO destination increases the transmission power of the signaling concerning the HO-related process of the HO targeted UE.

Figure 30:
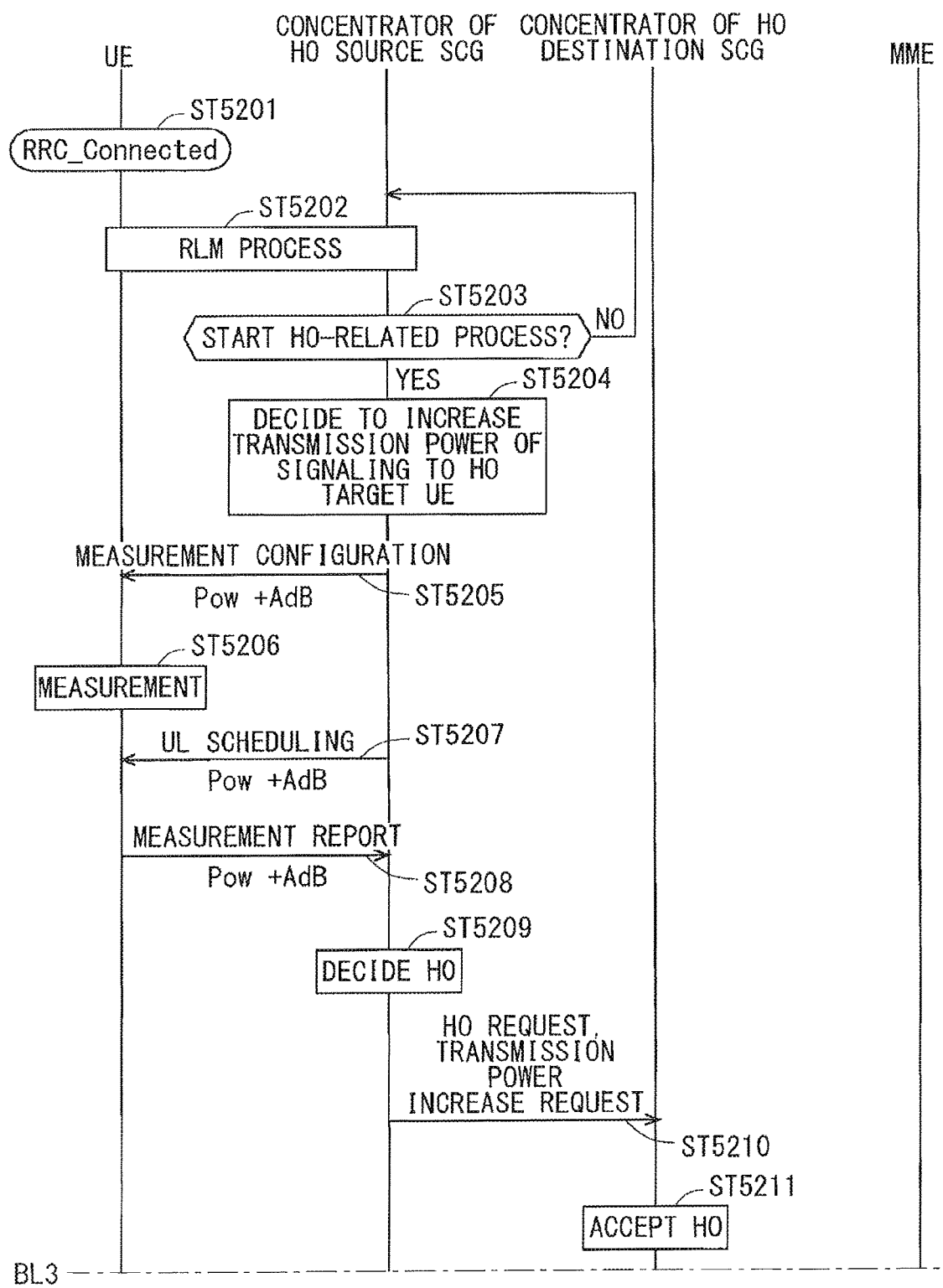
FIG. 30 shows an example of the sequence of a communication system in a second modification of a second embodiment.

FIGS. 30 and 31 show an example of the sequence of a communication system in a second modification of the second embodiment. FIGS. 30 and 31 show a sequence example of the method (1). FIG. 30 is continuous with FIG. 31 at a boundary BL3.

In Step ST5201, the UE is RRC-connected with a virtual macro cell configured by a HO source SCG.

In Step ST5202, the concentrator of the HO source SCG performs the radio link monitor (RLM) procedure of monitoring the quality of the communication with the UE.

In Step ST5203, when the communication quality falls below a predetermined value for a predetermined period and accordingly degrades, the concentrator of the HO source SCG judges whether to start the HO-related process with the UE. The concentrator moves to Step ST5204 when judging to start the HO-related process in Step ST5203 or returns to the RLM process of Step ST5202 when judging not to start the HO-related process in Step ST5203.

In Step ST5204, the concentrator of the HO source SCG decides to increase the transmission power of signaling to the UE being a HO target. The concentrator decides to increase by a predetermined amount as a transmission power increase amount. The predetermined amount may be decided statically in advance or decided dynamically in accordance with a situation. In the example shown in FIGS. 30 and 31, the concentrator decides to increase by A decibel [dB].

The concentrator of the HO source SCG thereafter increases the signaling transmission power of the HO-related process to the HO targeted UE by A decibel [dB]. Alternatively, the concentrator may increase the transmission power of signaling of the HO-related process from the HO targeted UE by A decibel [dB].

As the method of increasing the transmission power of signaling of the HO-related process from the HO targeted UE, the information instructing to increase transmission power may be included in the uplink (UL) scheduling information for the signaling. For example, the information indicative of a transmission power increase amount may be provided to the uplink control information (UCI). In this example, A decibel [dB] is set in the information indicative of a transmission power increase amount.

The UE that has received the UL scheduling information including the information instructing to increase transmission power increases the transmission power by A decibel [dB] and then transmits uplink signaling.

In the example shown in FIGS. 30 and 31, examples of the signaling of the HO-related process include signaling for notifying a measurement configuration message in Step ST5205, signaling for uplink (UP) scheduling for measurement report in Step ST5207, signaling for measurement report in Step ST5208, and signaling for notifying a mobility control information message in Step ST5214.

In Step ST5209, the concentrator of the HO source SCG that has received the measurement report from the HO targeted UE in Step ST5208 decides HO to the UE.

After deciding HO in Step ST5209, in Step ST5210, the concentrator of the HO source SCG notifies the concentrator of the HO destination SCG of a HO request message. At this time, the concentrator may notify a request to increase transmission power.

In Step ST5211, the concentrator of the HO destination SCG that has received the HO request message decides to accept HO.

In Step ST5212 of FIG. 31, the concentrator of the HO destination SCG that has decided to accept HO in Step ST5211 decides to increase the transmission power of signaling to the UE being a HO target. The concentrator decides to increase by a predetermined amount as the transmission power increase amount. The predetermined amount may be decided statically in advance or may be decided dynamically in accordance with a situation. In the example shown in FIGS. 30 and 31, the concentrator decides to increase by B decibel [dB].

The concentrator of the HO destination SCG thereafter increases the transmission power of signaling of the HO-related process to the HO targeted UE by B decibel [dB]. Alternatively, the concentrator may increase the transmission power of signaling of the HO-related process from the HO targeted UE may be increased by B decibel [dB].

The method of increasing the transmission power of signaling from the HO targeted UE to the concentrator of the HO source SCG is applicable as the method of increasing the transmission power of signaling of the HO-related process from the HO targeted UE by B decibel [dB].

The signaling of the HO-related process of increasing the transmission power is performed until the concentrator of the HO destination SCG receives RRC connection reconfiguration complete via the small cell within the HO destination SCG or until the UE recognizes that RRC connection reconfiguration complete is received properly.

In the example shown in FIGS. 30 and 31, examples of the signaling of the HO-related process include UL scheduling in Step ST5216 and signaling for RRC connection reconfiguration complete in Step ST5217.

In Step ST5213, the concentrator of the HO destination SCG that has decided to accept HO notifies the concentrator of the HO source SCG of a HO request response (HO request ack).

In Step ST5214, the concentrator of the HO source SCG notifies the HO targeted UE of the mobility control information via the small cell within the HO source SCG.

In Step ST5215, the UE detects and performs synchronization of a small cell within the HO destination SCG.

In Step ST5216, the concentrator of the HO destination SCG transmits UL scheduling to the UE via the small cell within the HO destination SCG.

In Step ST5217, the UE that has received the UL scheduling uses the scheduling information to notify, via the small cell within the HO destination SCG, the concentrator of the HO destination SCG of an RRC connection reconfiguration complete message indicating the completion of the RRC connection with the concentrator.

In Step ST5218, the concentrator of the HO destination SCG performs the HO completion process, such as path switch, with the MME and the concentrator of the HO source SCG.

When the HO completion process of Step ST5218 ends, in Steps ST5219 and ST5220, the concentrator of the HO destination SCG and the concentrator of the HO source SCG stop increasing the transmission power of signaling to the HO targeted UE.

As described above, the concentrator of the SCG being a HO source and the concentrator of the SCG being a HO destination perform, for the HO targeted UE, control so as to increase the transmission power of signaling between the UE and the small cell within the HO source SCG or the small cell within the HO destination SCG from the start of the HO-related process to the HO completion process for the HO targeted UE, thereby increasing the transmission power of signaling concerning the HO-related process of the HO targeted UE. This can reduce HO failures between SCGs.

The protocol deciding HO in the concentrator of the HO source SCG is RRC. What actually increases transmission power is a lower-layer protocol, for example, PHY or PHY/MAC protocol. Thus, the PHY or PHY/MAC protocol needs to recognize a UE whose transmission power is to be increased or an amount by which transmission power is increased.

From the above, the RRC may notify the PHY or PHY/MAC of the identity of the HO targeted UE for identifying a HO targeted UE together with a transmission power increase amount of the HO targeted UE. This enables the PHY or PHY/MAC protocol to recognize a transmission power increase amount and a HO targeted UE whose transmission power is to be increased.

In the PHY protocol, thus, the transmission power of a physical channel used in the signaling of the HO-related process for the HO targeted UE, for example, PDSCH, PDCCH, PUSCH, or PUCCH.

When the HO-related process for the HO targeted UE is started, that is, in the case of FIGS. 30 and 31, when the process of Step ST5204 is performed, or when the acceptance of HO is decided for the HO targeted UE, that is, in the case of FIGS. 30 and 31, when the process of Step ST5212 is performed, the RRC notifies the PHY or PHY/MAC of a request to increase the transmission power of the HO targeted UE. The identity of the HO targeted UE for identifying a HO targeted UE and a transmission power increase amount may be included in this notification. The PHY/MAC that has received the notification increases the transmission power of signaling of the HO targeted UE.

When the HO completion process for the HO targeted UE is performed, that is, in the case of FIGS. 30 and 31, when the processes of Steps ST5219 and ST5220 are performed, the RRC notifies the PHY or PHY/MAC of a request to stop increasing the transmission power of the HO targeted UE. In this notification, the identity of the HO targeted UE for identifying a HO targeted UE may be notified. The PHY/MAC that has received the notification stops increasing the signaling transmission power of the HO targeted UE.

As a result, if the PHY/MAC fails to recognize that the signaling is signaling of the HO-related process, the PHY/MAC can increase the transmission power of signaling of the HO-related process of the UE that is to serve as a HO target. These methods are also applicable to a UE.

FIG. 32 shows another example of the sequence of the communication system in the second modification of the second embodiment. FIG. 32 shows another sequence example of the method (1) above. FIG. 32 is similar to FIGS. 30 and 31 above, and thus, the steps corresponding to those of FIGS. 30 and 31 will be denoted by the same step numbers and common description will be omitted. FIG. 32 shows the case in which the signaling of the HO-related process of increasing transmission power is a mobility control information message that is notified from the small cell within the HO source SCG to the UE being a HO target by the concentrator of the HO source SCG.

In Step ST5301, the concentrator of the HO source SCG notifies the UE of a measurement configuration message.

In Step ST5302, the concentrator of the HO source SCG notifies the UE of UL scheduling. In Step ST5303, the UE notifies the concentrator of the HO source SCG of a measurement report message.

In Step ST5209, the concentrator of the HO source SCG that has received the measurement report message from the UE in Step ST5303 decides HO to the UE.

After deciding HO in Step ST5209, in Step ST5304, the concentrator of the HO source SCG decides to increase the transmission power of signaling to the HO targeted UE. In the example shown in FIG. 32, the concentrator decides to increase by A decibel [dB]. The signaling concerning the HO-related process of increasing transmission power is the RRC connection reconfiguration including the mobility control information in Step ST5307. The signaling for the scheduling information transmission for this signaling may be included. Alternatively, the signaling for a response (Ack/Nack) to such signaling may be included.

After deciding HO, in Step ST5305, the concentrator of the HO source SCG notifies the concentrator of the HO destination SCG of a HO request message. In this case, the concentrator does not notify a request to increase transmission power.

In Step ST5211, the concentrator of the HO destination SCG that has received the HO request message in Step ST5305 decides to accept HO.

In Step ST5306, the concentrator of the HO destination SCG that has decided to accept HO in Step ST5211 notifies the concentrator of the HO source SCG of a HO request response (HO request ack) message.

In Step ST5307, the concentrator of the HO source SCG notifies, via the small cell within the HO source SCG, the HO targeted UE of a mobility control information message.

When the process of Step ST5307 ends normally, in Step ST5308, the concentrator of the HO source SCG stops increasing the transmission power of signaling to the HO targeted UE.

Then, in Steps ST5215, ST5309, ST5310, and ST5218, the UE performs the HO process with the concentrator of the HO destination SCG and the MME via the small cell within the HO destination SCG.

As described above, the concentrator of the HO source SCG performs control so as to increase the transmission power of signaling of a mobility control information message between the small cell within the HO source SCG and the UE for the HO targeted UE, that is, HO instruction message, thereby increasing the transmission power of signaling of the mobility control information message for the HO targeted UE. This can reduce HO failures between SCGs.

As a result, the signaling for increasing transmission power can be limited. Thus, the power consumption of the UE or the small cell within the HO source SCG can be reduced.

Interference to another cell due to an increase in the transmission power of the HO source or HO-destination small cell or an increase in the transmission power of the UE can be reduced. This can increase a throughput as a communication system.

When HO to the HO targeted UE is decided, that is, in the case of FIG. 32, when the process of Step ST5304 is performed, the RRC notifies the PHY or PHY/MAC of a request to increase the transmission power the HO targeted UE. The identity of the HO targeted UE for identifying a HO targeted UE and a transmission power increase amount may be included in this notification. The PHY/MAC that has received the notification increases the transmission power of signaling of the HO targeted UE.

When the mobility control information message is normally notified to the HO targeted UE, that is, in the case of FIG. 32, when the process of Step ST5308 is performed, the RRC notifies the PHY or PHY/MAC of a request to stop increasing the transmission power of the HO targeted UE. In this notification, the identity of the HO targeted UE for identifying a HO targeted UE may be notified. The PHY/MAC that has received the notification stops increasing the signaling transmission power of the HO targeted UE.

As a result, if the PHY/MAC fails to recognize that signaling is the signaling concerning the HO-related process, the PHY/MAC can increase the transmission power of signaling of the mobility control information message of the UE that is to serve as a HO target, that is, HO instruction message. These methods are also applicable to the UE.

In the method (2) above, the signaling of the HO targeted UE may be signaling for a predetermined period. Alternatively, the signaling for a predetermined period may be signaling for a period in which a part or the whole of the HO-related process is performed between the HO destination cell and at least one of the HO targeted UE and the HO source cell. Thus, the MCS of signaling of a part or the whole of the HO-related process of a HO targeted UE can be configured to be low The use of the method (2) above improves the reception quality of the signaling concerning the HO-related process in the HO targeted UE. Thus, in the HO-related process, the HO targeted UE can receive the signaling concerning the HO-related process at a point farther from the HO source cell or the HO destination cell. For the HO targeted UE, the coverages of the HO source cell and the HO destination cell apparently increase, resulting in a wider overlapping area. Thus, the time when the UE stays in an overlapping area while moving can be kept long, thereby securing enough time to perform the HO-related process.

The signaling concerning the HO-related process is similar to the method (1) above. In particular, the MCS of the signaling of the RRC connection reconfiguration including the mobility control information may be configured to be low. This apparently increases the coverage of the HO source cell, thereby increasing the reception quality of the mobility control information, which reduces failures of the HO-related process.

Applying the method described above to HO between SCGs during the operation in the virtual macro cell mode can reduce HO failures between SCGs. At least one of the concentrator of the SCG being a HO source and the concentrator of the SCG being a HO destination performs control to configure the MCS of the signaling concerning the HO-related process of the HO targeted UE to be low. A low MCS is at least one of a low-order modulation scheme and a low coding rate.

In the sequence example of the method (2) shown in FIG. 32 described above, "increase transmission power" in the sequence example of the method (1) shown in FIGS. and 31 described above may be replaced with "configure MCS to be low." As the method of configuring the MCS to be low, a low MCS may be configured statically in advance. Alternatively, the MCS may be configured to be low depending on a situation.

For example, in downlink signaling, the MCS is configured to be n-rank lower than that of the MCS configuration notified in the CQI from the UE. Alternatively, the MCS may be configured to be n-rank lower than the MCS configured by the conventional method. The n-rank may be decided statically as an offset value in advance or may be decided, as appropriate, dynamically in accordance with the type of signaling or in accordance with the situation of communication quality. The concentrator of the SCG may decide an n-rank.

As to the uplink signaling from the HO targeted UE, as in the method (1) above, the information instructing the configuration of a low MCS may be included in the uplink scheduling information for uplink signaling. For example, the information indicative of an MCS offset amount may be included in the UCI. For example, an n-rank is configured in the information indicative of an MCS offset amount. The UE that has received the UL scheduling information including the information instructing the configuration of a low MCS transmits uplink signaling as the configuration of a low MCS.

As described above, at least one of the concentrator of the SCG being a HO source and the concentrator of the SCG being a HO destination performs control so as to configure, for the HO targeted UE, the MCS of signaling concerning the HO-related process between the UE and the small cell within the HO source SCG or the small cell within the HO destination SCG to be low. Thus, the MCS of signaling concerning the HO-related process of a HO targeted UE can be configured to be low. This reduces HO failures between SCGs.

As to increasing the transmission power of uplink signaling from the HO targeted UE or configuring a low MCS, the method of notifying the HO targeted UE with the use of the uplink scheduling information for the uplink signaling has been disclosed in the method (1) or (2). Another method will be disclosed below.

At least one of the concentrator of the HO source SCG and the concentrator of the HO destination SCG notifies, with the use of RRC signaling, the UE being a HO target of a message instructing to increase the transmission power of uplink signaling or configure a low MCS. With the use of RRC signaling, an instruction to increase the transmission power or an instruction to configure a low MCS can be notified to the UE more reliably.

As RRC signaling, a new message may be provided, or a measurement configuration may be used. Alternatively, a mobility control information message may be used.

For example, in the case where a new message is provided, at least one of the concentrator of the HO source SCG and the concentrator of the HO destination SCG notifies the HO targeted UE of a message instructing to increase the transmission power or a message instructing low MCS configuration when the HO-related process is started, that is, in the case of FIGS. 30 and 31, when the process of Step ST5204 is performed, or when HO acceptance is decided for the HO targeted UE, that is, in the case of FIGS. 30 and 31, when the process of Step ST5212 is performed. The identity of the HO targeted UE for identifying a HO targeted UE and a transmission power increase amount or an MCS reduction amount (offset amount) may be included in this notification. The HO targeted UE that has received the notification increases the transmission power of uplink signaling.

At least one of the concentrator of the HO source SCG and the concentrator of the HO destination SCG notifies the HO targeted UE of an instruction to stop increasing the transmission power of the HO targeted UE or an instruction to stop configuring a low MCS when the HO completion process for the HO targeted UE is performed, that is, in the case of FIGS. 30 and 31, when the processes of Steps ST5219 and ST5220 are performed. In this notification, the identity of a HO targeted UE for identifying a HO targeted UE may be notified. The UE that has received this notification stops increasing the transmission power of uplink signaling or configuring a low MCS.

Alternatively, the measurement configuration or mobility control information message may be used to instruct to increase the transmission power of uplink signaling or to configure a low MCS. The existing message may be newly provided with a parameter of a transmission power increase amount or MCS reduction amount (offset amount) and a parameter requesting the configuration. The use of the existing message allows the notification together with another piece of information, reducing a signaling amount.

The PDCCH has conventionally been used in scheduling of signaling of the HO-related process of the HO targeted UE. The PDCCH includes the scheduling information of all the UEs being served by a cell. Thus, when the above-mentioned method is applied to scheduling of signaling of the HO-related process of the HO targeted UE, the PDCCH transmission power for the scheduling information of all the UEs being served by an SCG increases. In this case, it becomes a useless configuration for the other UEs being served by the SCG.

To solve this problem, the EPDCCH may be used in scheduling of signaling of the HO-related process of the HO targeted UE.

The EPDCCH is a physical control channel notified to the UE using a PDSCH area. The EPDCCH for the HO targeted UE may be configured to be used in scheduling of signaling of the HO-related process. The EPDCCH transmission power may be increased, or the MCS may be configured to be low.

As a result, the reception quality of the scheduling information of signaling of the HO-related process for the HO targeted UE can be improved, reducing HO failures between SCGs.

Switching may be made to the EPDCCH when the communication quality of the scheduling of signaling of the HO-related process degrades. Increasing the EPDCCH transmission power or configuring the MCS to be low can enhance the reception quality of the scheduling information of signaling of the HO-related process for the HO targeted UE, thereby reducing HO failures between SCGs.

In contrast, when the communication quality of the scheduling of signaling of the HO-related process is good, scheduling is performed using the PDCCH. In this case, the communication quality is good, and thus, it is not necessary to increase the PDCCH transmission power or configure the MCS to be low. Scheduling using the PDCCH eliminates the need for providing the EPDCCH, thereby reducing the physical resources required for configuring the EPDCCH.

Switching can be made to the EPDCCH, thereby physical resources to be used can be optimized in accordance with the radio environment varying in time or in space due to a movement of the UE. This can improve the use efficiency of radio resources.

The methods disclosed in this modification are applicable not only to HO between SCGs during the operation in the virtual macro cell mode but also to HO between normal small cells. Even when the methods are applied to HO between normal small cells, as in this modification, HO failures between small cells can be reduced.

Third Modification of Second Embodiment

When the small cells within an SCG constitute a virtual macro cell, the individual small cells within the SCG perform the same communication. In uplink, thus, the UE performs uplink transmission as one cell without recognizing each small cell. In other words, the UE performs uplink transmission to the virtual macro cell. In this case, the method of controlling transmission power of the UE is a problem.

In the conventional transmission power control method, the transmission power of the UE is decided based on the communication quality of uplink of one cell that communicates with the UE. However, the virtual macro cell is composed of a plurality of cells, and thus, the conventional method cannot be merely applied to the virtual macro cell. This modification aims to solve this problem.

The following three, (1) to (3), will be disclosed as the method of controlling the transmission power of the UE when the small cells within the SCG, which constitute a virtual macro cell, communicate with a UE being served by the SCG.

(1) Selective combining of the received power or reception quality from the UE in individual small cells within an SCG.

(2) Equivalent combining of the received power or reception quality from the UE in individual small cells within an SCG.

(3) Maximum ratio combining of the received power or reception quality from the UE in individual small cells within an SCG.

The transmission power of the UE is set based on the result of the combining by the method (1), (2), or (3). One specific example of the reception quality is a signal to interference and noise power ratio (SINR). The concentrator that controls an SCG may combine the received power or reception quality and set the transmission power based on the combining. That is to say, uplink transmission power control may be a function of the concentrator that controls an SCG.

The individual small cells measure the received power or reception quality from the UE and notifies the concentrator of the measurement result. The concentrator obtains the measurement result on the received power or reception quality of the UE that is to serve as a target from the individual small cells, and combines the measurement results by any of the methods (1) to (3) above.

The concentrator sets the transmission power of the UE that is to serve as a target based on the results of the combining. The concentrator notifies, via the small cells within the SCG configuring the virtual macro cell, the UE of the set transmission power. The set transmission power may be notified as uplink scheduling information.

Consequently, the UE can set the transmission power as one cell (virtual macro cell) without the need for recognizing the individual small cells within the SCG, and accordingly, can perform uplink transmission.

With the use of small cells within the SCG configuring a virtual macro cell, the uplink received power or reception quality from the UE can be controlled to be optimized.

Fourth Modification of Second Embodiment

The second modification of the second embodiment has disclosed the method of configuring the MCS of signaling concerning the HO-related process of the HO targeted UE to be low to reduce HO failures between SCGs configuring a virtual macro cell.

Meanwhile, not only while moving between SCGs but also while moving between small cells within an SCG, the UE may experience a sudden change in received power. In this case, the MCS selection cannot be followed, degrading communication quality or decreasing the use efficiency of radio resources. In such a case, the SCG configures a virtual macro cell, and thus, the UE does not recognize the moves between small cells within the SCG. Thus, the method of the second modification of the second embodiment cannot be applied. This modification aims to solve this problem.

The signaling during the operation in the virtual macro cell mode is configured to a predetermined MCS in advance. The signaling is signaling on a Uu interface. The predetermined MCS may be decided statically in advance in specifications or the like or may be set semi-statically by the concentrator.

A predetermined MCS may be an MCS that can be received with conceivable minimum received power. For example, the MCS is configured at a low rate. The MCS may be configured at a minimum rate. Alternatively, the MCS may have the same configuration as a minimum MCS configuration among the MCS configurations used for control channels or control signals.

As a result, also when the UE moves between small cells within an SCG, the degradation of communication quality due to an abrupt change in received power or a decrease in use efficiency of radio resources can be restricted.

Although configuring a low MCS increases a use amount of radio resources, by limiting the communication between the virtual macro cell and UE to, for example, predetermined signaling and control plane (C-plane) connection or predetermined signaling and part of data communication, an increase in the use amount of radio resources can be restricted.

Fifth Modification of Second Embodiment

The second embodiment has disclosed that a small cell operating as a dedicated cell may have a carrier frequency different from the carrier frequency when operating as a virtual macro cell. However, it is also conceivable that as a situation in which frequencies are allocated to an operator, a plurality of carrier frequencies cannot be provided.

This modification will disclose the method of operating the virtual macro cell mode and the dedicated cell mode at the same carrier frequency.

The virtual macro mode and the dedicated small cell mode are operated based on time division using the same frequency carrier. The small cells within the SCG configuring a virtual macro cell are synchronized, and accordingly, this method can be used.

The following two, (1) and (2), will be disclosed as the method of time division.
(1) Time division is on a radio fame basis.
(2) Time division is on a subframe basis.

In the case of (1) above where time division is on a radio fame basis, radio frames operated in the virtual macro cell mode differ from the radio frames operated in the dedicated cell mode. The PCI configuration differs between the radio frames operated in the virtual macro cell mode and the radio frames operated in the dedicated cell mode. The PCI for virtual macro cells and the PCI for dedicated cells are used.

The virtual macro cell may notify the UE of the inter-mode radio frame configuration as to which radio frames are operated in the virtual macro cell mode or which radio frames are operated in the dedicated cell mode. This is suitable for the case in which the virtual macro cell serves as a master cell. The virtual macro cell may notify the UE of the configuration of a secondary cell used in dual connectivity, as well as the inter-mode radio frame configuration.

As the inter-mode radio frame configuration, the modes operated in the individual radio frames may be shown in predetermined radio frames. The configurations of the predetermined radio frames are repeatedly configured. The operation modes of the individual radio frames in predetermined radio frames may be notified in bit maps corresponding to the individual radio frames. For example, predetermined radio frames are decided as 20 radio frames, and the modes operated in individual radio frames of the 20 radio frames are shown using 20 bits; for example, "0" shows the operation in the virtual macro cell mode, and "1" shows the operation in the dedicated cell mode. These 20 radio frames are repeatedly configured.

A mode is configured per radio frame, enabling a flexible mode configuration irrespective of the configuration of subframes.

In the case of (2) above where time division is on a subframe basis, the subframes operated in the virtual macro cell mode differ from the subframes operated in the dedicated cell mode. The PCI configuration differs between the subframes operated in the virtual macro cell mode and the subframes operated in the dedicated cell mode. The PCI for virtual macro cells and the PCI for dedicated cells are used.

In this case, some subframes have a statically decided subframe number for mapping, such as SS and PBCH. In this respect, it suffices that the subframe numbers for mapping the SS and the PBCH differ in the individual modes. Alternatively, a new carrier type (NCT) that does not require mapping of the SS and PBCH may be used as another method.

As the inter-mode subframe configuration, the modes operated in individual subframes may be shown in predetermined subframes. The configurations of the predetermined subframes are repeatedly configured.

The operation modes of the individual subframes in predetermined subframes may be notified in bit maps corresponding to the individual subframes. For example, predetermined subframes are decided as 10 subframes, and the modes operated in individual subframes of the 10 subframes are shown using 10 bits; for example, "0" shows the operation in the virtual macro cell mode, and "1" shows the operation in the dedicated cell mode. The 10 subframes are repeatedly configured. The subframe numbers for mapping the SS, PBCH, and the like are also configured.

As in the method (1) above, the virtual macro cell may notify the UE of the inter-mode subframe configuration. This is suitable for the case in which the virtual macro cell serves as a master cell. The virtual macro cell may notify the UE of configuration of the secondary cell used in dual connectivity, as well as the inter-mode subframe configuration.

Configuring a mode per subframe enables mode setting on a small time basis. The use efficiency of radio resources can be accordingly improved.

Sixth Modification of Second Embodiment

The second embodiment has described that the individual small cells within the SCG configuring the virtual macro cell perform the same communication, and thus, the configurations of the physical resources of individual small cells within an SCG are made the same. The second embodiment has also described that the physical channels and signals in the layer 1 are mapped to the same physical resources.

In some cases, however, within an SCG, a UE is located within the coverage of a small cell, but no UE is located within the coverage of another small cell. In such a case, performing the same communications by the small cells within an SCG may result in unnecessary power consumption. This modification aims to solve this problem.

The small cells within an SCG configuring a virtual macro cell individually turn on/off transmission.

The small cells within an SCG configuring a virtual macro cell map the physical channels and signals to the same physical resources, but the small cells individually turn on/off the transmission of the physical resources.

The concentrator may notify on/off of transmission. For example, the concentrator obtains the location information on the UE and turns off the transmission of a small cell in which a UE being served by the SCG is not located. In this case, the concentrator may notify the small cell of a transmission turn-off instruction to turn off transmission. When the UE approaches the small cell turning off transmission, the concentrator turns on the transmission of this small cell. In this case, the concentrator may notify the small cell of a transmission turn-on instruction to turn on transmission.

As described above, the small cells within the SCG configuring a virtual macro cell individually turn on/off transmission, thereby reducing the power consumption of all of a large number of small cells when they are operated.

The transmission of a small cell placed at an SCG edge may not be required to be turn off. This allows the UE located within another SCG adjacent to the SCG to measure a virtual macro cell configured by the SCG. This enables mobility such as HO to a virtual macro cell configured by the SCG.

In place of turning on/off the transmissions of all physical resources individually for small cells, the transmission of specific physical resources, for example, a specific resource block (RB) and a physical resource to which the PBCH is mapped, may be turned on/off individually for small cells. The transmission of physical resources mapped to a specific UE may be turned on/off.

Consequently, for example, the transmission of the physical resource, to which the PDSCH scheduled for a UE not located in a small cell being served by an SCG is mapped, can be turned off. Also, unnecessary transmission to the UE can be turned off. Further, power consumption can be reduced, which is not limited to the case where no single UE is located while being served by a small cell.

In place of turning on/off transmission, transmission and reception may be turned on/off. This can reduce the power consumption of the receiver as well as the transmitter.

In such a case where UEs in the connected state with the small cell are located within the coverage of a small cell operated in the dedicated cell mode, these UEs may be caused to hand over to another small cell operated in the dedicated cell mode, and then, the transmission may be turned off. Alternatively, the UEs may be caused to hand over to a virtual macro cell, and then, the transmission may be turned off.

The UEs are caused to hand over to the small cell operated in the dedicated cell mode that will not turn off transmission or to the virtual macro cell, allowing the UEs to continue communication.

It has been described that transmission is turned off after handover. The detailed timing thereof will be disclosed below. As the timing to turn off the transmission of a small cell operated in the dedicated cell mode, which will turn off transmission, transmission may be turned off after the mobility control information is transmitted to the UEs in the connected state with the small cell.

For example, transmission may be turned off after a handover command from the small cell operated in the dedicated cell mode or the virtual macro cell, which is a target, is transmitted to the UEs. This is because, of the signalings of handover, the transmission of mobility control information is the last signaling transmitted from the cell being a handover source to the UE.

Consequently, even if the transmission of a cell being a handover source is turned off, an influence on the UE that is caused to perform handover can be minimized. This reduces the occurrence of a situation in which the UE in the connected state with the small cell that will turn off the transmission has a HOF or RLF and accordingly cannot keep the connected state.

Seventh Modification of Second Embodiment

In the second embodiment, the individual small cells within the SCG configuring a virtual macro cell perform the same communication, and thus, the cell-specific RSs of individual small cells within the SCG are mapped to the same physical resource. The RSs corresponding to the individual antennas of the individual cells are accordingly mapped to the same resource to be transmitted. When the individual antennas of the individual cells are used in transmission diversity and multiple input multiple output (MIMO), as to pieces of data from the individual antennas of the individual cells, the same data is mapped to the same physical resource to be transmitted.

FIG. 33 is a diagram for explaining the configuration where each cell in an SCG has four antennas. With reference to FIG. 33, the small cells within an SCG configuring a virtual macro cell are denoted by references "5401," "5403," "5405," and "5407."

The small cells 5401, 5403, 5405, and 5407 configure coverages 5402, 5404, 5406, and 5408, respectively. Each cell has four antennas. The small cell 5401 has four antennas 5401-1 to 5401-4. The small cell 5403 has four antennas 5403-1 to 5403-4. The small cell 5405 has four antennas 5405-1 to 5405-4. The small cell 5407 has four antennas 5407-1 to 5407-4.

In such a case, the RSs corresponding to the antennas 5401-1, 5403-1, 5405-1, and 5407-1 are mapped to the same resource to be transmitted. The same data from the antennas 5401-1, 5403-1, 5405-1, and 5407-1 is mapped to the same physical resource to be transmitted.

The transmissions from the antennas 5401-2, 5403-2, 5405-2, and 5407-2 become the same, the transmissions from the antennas 5401-3, 5403-3, 5405-3, and 5407-3 become the same, and the transmissions from the antennas 5401-4, 5403-4, 5405-4, and 5407-4 become the same.

When each of the small cells has a plurality of antennas, the small cells are thus configured as one virtual macro cell having a plurality of antennas. The UE does not need to distinguish between the individuals small cells within the SCG configuring a virtual macro cell having a plurality of antennas and can regard the small cells as one cell.

The method of combining antennas is not limited to this method, and the individual antennas of the individual small cells within the SCG configuring a virtual macro cell may be combined appropriately.

An example combination of antennas of the individual small cells within the SCG configuring a virtual macro cell will be described with reference to FIG. 33. The RSs corresponding to the antennas 5401-1, 5401-2, 5401-3, and 5401-4 are mapped to the same resource to be transmitted. The combination of antennas is configured such that the same data from the antennas 5401-1, 5401-2, 5401-3, and 5401-4 is mapped to the same physical resource to be transmitted.

Similarly, a configuration is performed such that the transmissions from the antennas 5403-1, 5403-2, 5403-3, and 5403-4 become the same, the transmissions from the antennas 5405-1, 5405-2, 5405-3, and 5405-4 become the same, and the transmissions from the antennas 5407-1, 5407-2, 5407-3, and 5407-4 become the same. Consequently, the antennas that perform different transmissions can be kept apart from each other.

A flexible antenna combination method allows a virtual macro cell to configure a plurality of antennas, thereby optimizing gains obtained by transmission diversity and MIMO.

Although the small cell operated in both of the virtual macro cell mode and the dedicated cell mode is referred to as a "cell" in this embodiment and modifications thereof, each of the small cell operated in the virtual macro cell mode (hereinafter, also referred to as a "virtual-macro-cell-mode-operated cell") and the small cell operated in the dedicated cell mode (hereinafter, also referred to as a "dedicated-cell-mode-operated cell") may be referred to as a "cell." The small eNB may be configured to configure two cells, namely, a virtual-macro-cell-mode-operated cell and a dedicated-cell-mode-operated cell.

The methods disclosed in this embodiment and modifications thereof may be appropriately combined with the methods disclosed in the first embodiment and modifications thereof to be used.

For example, when the small cell operated in both of the virtual macro cell mode and the dedicated cell mode communicates with the UE that does not perform dual connectivity, the methods disclosed in the first embodiment and the modifications thereof are applicable. The UE that does not perform dual connectivity communicates with the small cell within the SCG configuring a virtual macro cell in any one of the virtual macro cell mode and the dedicated cell mode.

In other words, the UE that does not perform dual connectivity performs communication in any of the virtual macro cell and the dedicated small cell. In such a case, the methods disclosed in the first embodiment and the modifications thereof may be combined to be used. For example, a group of virtual macro cells or macro cells and a group of dedicated small cells are provided in advance, and the UE determines a shift to a group of which coverage the UE is to be in. The cell of which coverage the UE is to be in is determined by the UE in the case of RRC_Idle, for example, in cell selection and cell re-selection or is determined by the cell in the case of RRC_Connected, for example, in HO.

As a result, even when only a large number of small cells are operated, the mobility to a group including a virtual macro cell is enabled, and further, the measurement duration for mobility can be shortened. The mobility performance can therefore be improved.

Examples of the UE that does not perform dual connectivity include a UE without the capability for dual connectivity and a legacy UE that supports the specifications preceding the specifications supporting dual connectivity.

Third Embodiment

As described in the second embodiment, dual connectivity is studied as the operation method when a large number of small cells are installed. It is studied that paging to the UE performing dual connectivity is notified from the master cell to the UE. The master cell is a cell configured by a master eNB. One or a plurality of cells may be configured by the master eNB. The master eNB is an eNB that terminates the S1-MME interface in dual connectivity.

3GPP has standardized the system (public warning system: PWS) of broadcasting emergency information, such as earthquake and tsunami warning system (ETWS) and commercial mobile alert system (CMAS), to the UE (see Non-Patent Documents 1 and 10). In the PWS, the presence of emergency information is notified to the UE through paging. The emergency information per se is included in the SIB as the system information to be broadcast. The UE that has received the presence information of the emergency information through paging receives a SIB on which predetermined emergency information is mapped. This allows the UE to receive the emergency information.

The problem solved in a third embodiment will be described below. For example, when receiving the presence information of the emergency information through paging from a macro cell, the UE being served by the macro cell receives the SIB on which the emergency information from the macro cell is mapped. In this case, the communication quality in downlink from the macro cell may degrade sharply due to a sudden change in the radio environment between the macro cell and the UE. For example, after the UE receives the paging, a large bus stops between the UE and the macro cell. In this case, the UE cannot receive the SIB on which the emergency information from the macro cell is mapped. This embodiment aims to solve this problem.

The UE performing dual connectivity receives the presence information of the emergency information through paging. When the UE cannot receive the SIB including the emergency information of the cell that has notified the paging, the UE receives the emergency information of a cell different form the cell that has notified the paging.

Specifically, the UE may receive the SIB including the emergency information of a cell different from the cell that has notified the paging. The SIB including the emergency information of a cell different from the cell that has notified the paging is, for example, SIB10, SIB11, and SIB12 in the specifications (see Non-Patent Document 10) of 3GPP. The SIB10 and the SIB11 include the emergency information of ETWS. The SIB12 includes the emergency information of CMAS. The UE decides which SIB it receives in accordance with the presence information of the emergency information included in paging. Examples of the presence information of emergency information included in paging include "etws-indication" and "cmas-indication."

To receive the SIB including the emergency information of a cell different from the cell that has notified the paging, the UE receives a SIB required for receiving the SIB. Specifically, the UE receives the SIB1. The SIB1 includes the scheduling information of SIBs. The UE receives the SIB1 to obtain the scheduling information of the SIB including the emergency information.

The UE performing dual connectivity can therefore receive the emergency information of a cell different from the cell that has notified the paging.

When receiving the presence of the emergency information through paging, the UE performing dual connectivity may immediately receive the emergency information of a cell different from the cell that has notified the paging.

The process of receiving the emergency information of the cell that has notified paging may be performed simultaneously with the process of receiving the emergency information of a cell different from the cell that has notified the paging.

Thus, the UE can receive the emergency information as soon as possible.

The emergency information is notified from the MME to the eNB. For example, the MME conventionally notifies only a predetermined macro eNB of the emergency information. In this case, even when the macro eNB is capable of dual connectivity with a predetermined small eNB, the MME does not notify the small eNB of the emergency information. Thus, in this situation, the UE fails to receive the emergency information from the small cell.

When notifying a predetermined eNB of the emergency information, thus, the MME may also notify the eNB capable of dual connectivity with the eNB of the emergency information. This allows the emergency information to be notified from all of a plurality of eNBs that perform dual connectivity. Thus, the UE performing dual connectivity can receive the emergency information from a cell different from the cell that has notified the paging.

This method is effective when the MME recognizes the information on the eNB that performs dual connectivity.

The MME may obtain, from an eNB being served thereby, the information on another eNB capable of dual connectivity. For example, the eNB may notify the MME through S1 signaling in setup and update. The S1 signaling may be, for example, an eNB configuration update message. The information on the eNB capable of dual connectivity is included in the message, and then, the message is notified to the MME. This eliminates the need for providing a new message and enables the notification together with the update information on the configuration of another eNB, reducing a signaling amount.

The MME may obtain in advance the information on an eNB capable of dual connectivity from the operation administration and maintenance (OAM). The information on an eNB capable of dual connectivity may be a list of an appropriate eNB and eNBs capable of dual connectivity with the appropriate eNB. This is effective in the case where the OAM is caused to manage the information on eNBs capable of dual connectivity.

The MME may notify an eNB being served thereby of the information on an eNB capable of dual connectivity. The information on an eNB may be notified through S1 signaling. The information on an eNB may be, for example, an eNB identity that can be recognized by the MME. One example of the eNB identity is "Global eNB ID."

Figure 34:
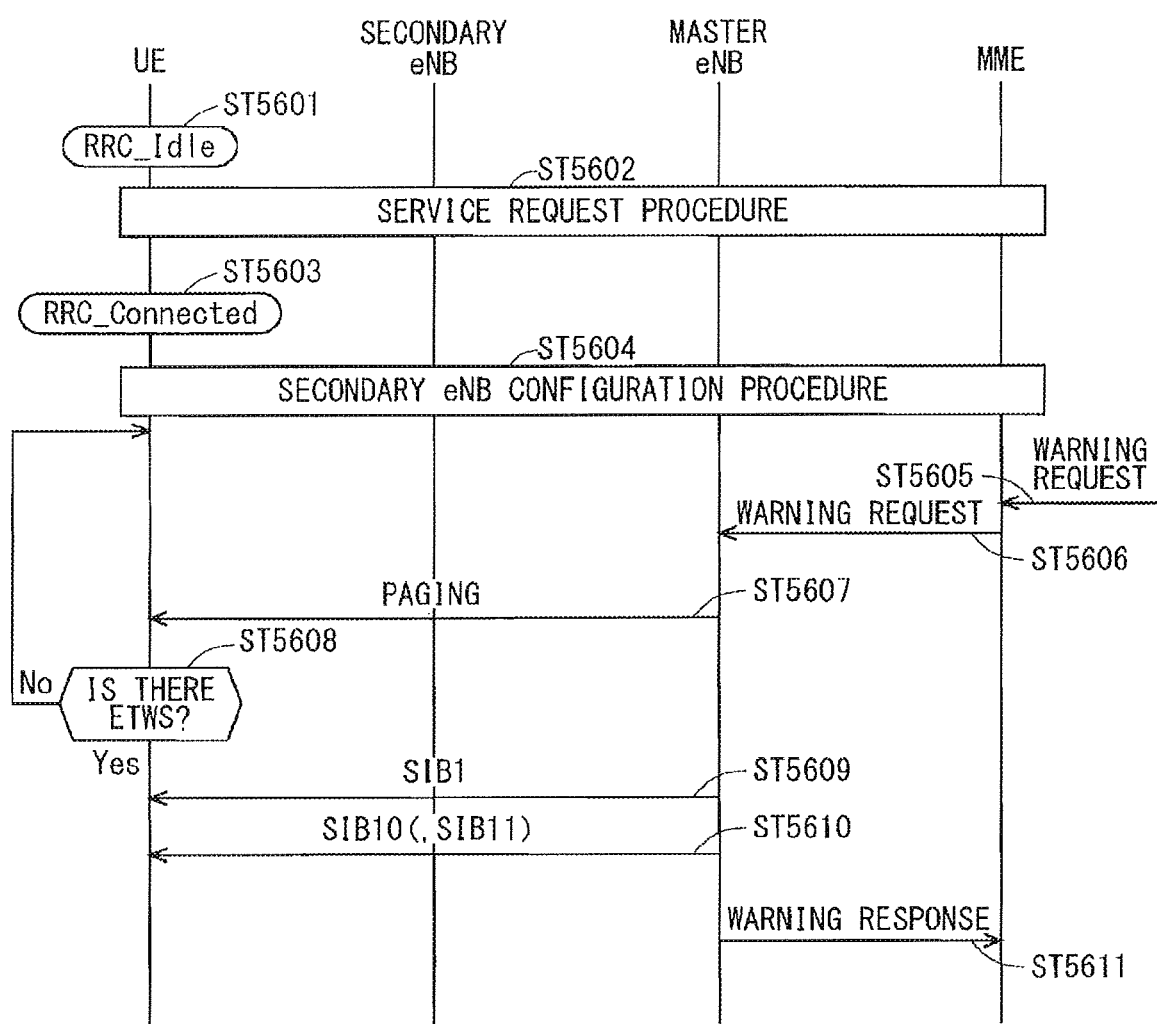
FIG. 34 shows a sequence when a conventional emergency information notification system is applied to a UE performing dual connectivity.

FIG. 34 shows the sequence when the conventional emergency information notification system is applied to the UE performing dual connectivity.

In Steps ST5601 to ST5604, the UE performs dual connectivity with the macro cell and the small cell. Shown in FIG. 34 is the case where the macro eNB configuring a macro cell is a master eNB and the small eNB configuring a small cell is a secondary eNB. The secondary eNB is a secondary cell that is connected with the UE for performing dual connectivity. With reference to FIG. 34, the UE receives paging from the macro cell.

When the emergency information occurs, in Step ST5605, the cell broadcast center (CBC) notifies the MME of emergency information. The emergency information is ETWS.

In Step ST5606, the MME that has received the emergency information in Step ST5605 notifies a predetermined eNB being served thereby, herein, the master eNB being the macro eNB configuring a macro cell of the emergency information. In the notification of the emergency information, a write-replace warning procedure is used. A write-replace warning request message is used as S1 signaling.

In Step ST5607, the master eNB that has received the emergency information in Step ST5606 includes the information indicative of the presence of the ETWS (hereinafter, also referred to as "ETWS presence information") in the paging, and then, notifies the paging from the macro cell configured by the master eNB to the UE being served thereby.

In Step ST5610, the master eNB maps the emergency information (ETWS) on at least one of the SIB10 and the SIB11 and then notifies the SIB10 or SIB11 from the macro cell configured by the master eNB to the UE being served thereby.

In Step ST5609, the master eNB includes the scheduling information of at least one of the SIB10 and SIB11 in the SIB1, and then, notifies the SIB1 from the macro cell configured by the eNB to the UE being thereby.

In Step ST5608, the UE judges whether there is ETWS in accordance with the ETWS presence information included in the paging received in Step ST5607. When judging in Step ST5608 that there is no ETWS, the UE returns to the state of normal dual connectivity. When judging in Step ST5608 that there is ETWS, the UE receives the SIB1 of Step ST5609 to obtain the scheduling information of the SIB10 and/or SIB11.

In Step ST5610, then, the UE receives the SIB10 and the SIB11 to obtain emergency information (ETWS).

In Step ST5611, the master eNB that has notified the emergency information (ETWS) at a predetermined period for a predetermined period of time notifies the MME of a warning response message as an emergency information end message.

Consequently, the UE performing dual connectivity can receive the emergency information from the macro cell.

As described above, however, when the communication quality in downlink from the macro cell degrades sharply due to a large bus stopping between the UE and the macro cell after the UE receives paging, the UE cannot receive the SIB on which the emergency information from the macro cell is mapped in Step ST5609 and the SIB being the scheduling information thereof in Step ST5610. The UE that receives emergency information only from the macro cell therefore fails to receive the emergency information.

Figure 35:
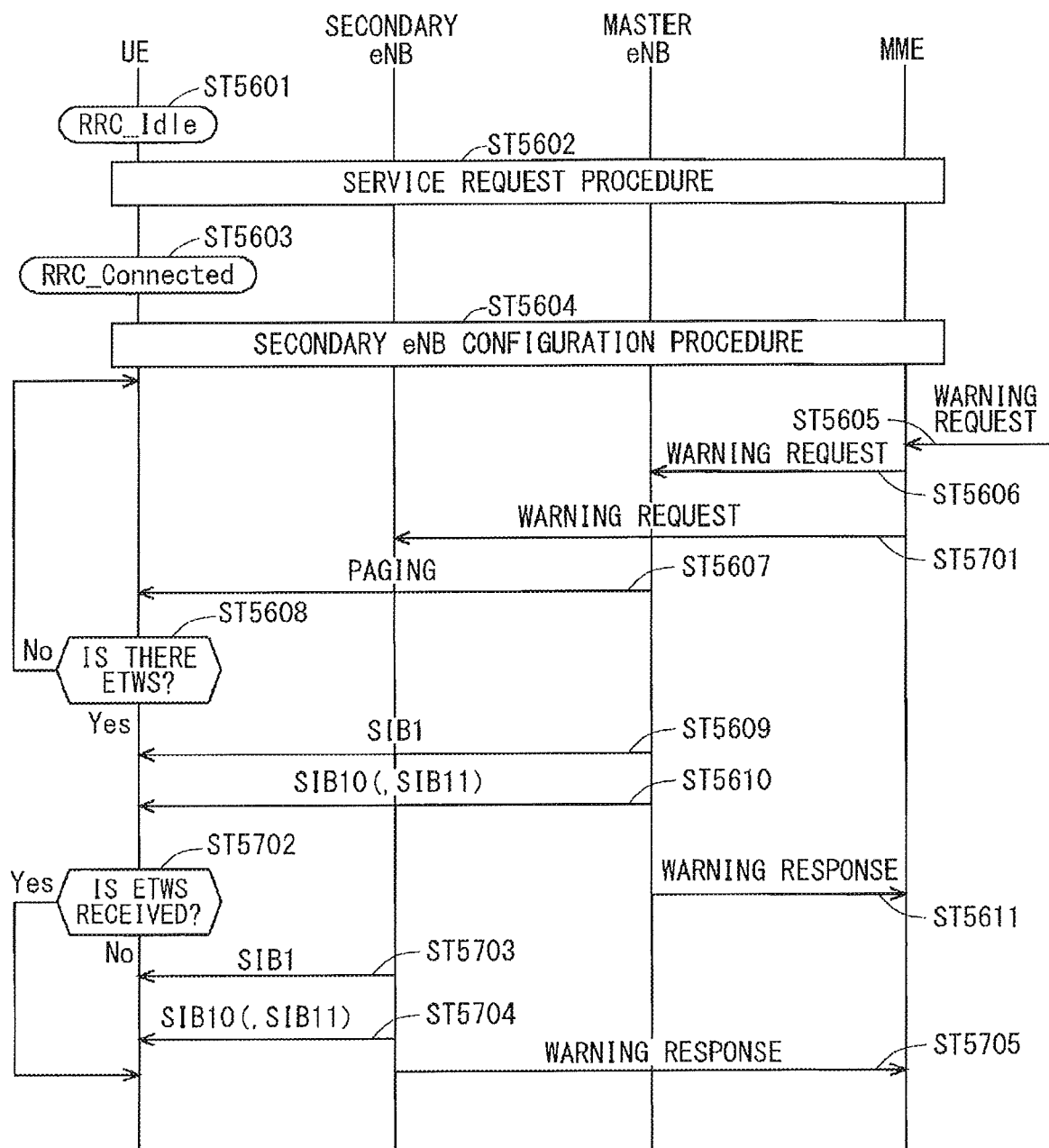
FIG. 35 shows an example of the sequence of an emergency information notification system in a third embodiment.

FIG. 35 shows an example of the sequence of an emergency information notification system in the third embodiment. FIG. 35 is similar to FIG. 34 above, and thus, the steps corresponding to those of FIG. 34 will be denoted by the same step numbers, and common description will be omitted.

In Step ST5606, the MME that has received the emergency information in Step ST5605 notifies a predetermined eNB being served thereby, herein, the master eNB being the macro eNB configuring the macro cell of the emergency information. In addition, in Step ST5701, the MME notifies the eNB capable of dual connectivity with a predetermined eNB, herein, the secondary eNB being a small eNB of the emergency information. A write-replace warning procedure may be used to notify the emergency information. A write-replace warning request message may be used as the S1 signaling.

In Step ST5703, the secondary eNB that has received the emergency information in Step ST5701 includes the ETWS presence information in paging and notifies the paging from the small cell configured by the eNB to the UE being served thereby.

In Step ST5704, the secondary eNB maps the emergency information (ETWS) on at least one of the SIB10 and the SIB11 and then notifies the SIB10 or SIB11 from the small cell configured by the eNB to the UE.

In Step ST5703, the secondary eNB includes the scheduling information of at least one of the SIB10 and SIB11 in the SIB1 and then notifies the SIB1 from the small cell configured by the eNB to the UE being served thereby.

When judging in Step ST5608 that there is the emergency information (ETWS), in Steps ST5609 and ST5610, the UE attempts to receive the emergency information from the macro cell that has transmitted the paging of Step ST5607.

In Step ST5702, the UE judges whether it has received the emergency information (ETWS) from the macro cell. When judging in Step ST5702 that it has received the emergency information (ETWS), the UE moves to the process conventionally performed when the UE receives the emergency information. When judging in Step ST5702 that it has not received the emergency information from the macro cell, in Step ST5703, the UE receives the SIB1 from the small cell to obtain the scheduling information of the SIB10 and/or SIB11. In Step ST5704, then, the UE receives the SIB10 and/or SIB11 from the small cell to obtain the emergency information (ETWS).

In Step ST5705, the secondary eNB that has notified the emergency information (ETWS) at a predetermined period for a predetermined period of time notifies the MME of a warning response message as an emergency information end message.

Consequently, when the UE performing dual connectivity fails to receive the emergency information from the macro cell, the UE can receive the emergency information from the small cell.

Another method of receiving emergency information from an MME by all of a plurality of eNBs performing dual connectivity will be disclosed below.

The MME notifies a predetermined eNB of the emergency information. The eNB that has received the emergency information from the MME may notify the eNB capable of dual connectivity with its own eNB of the emergency information. This enables the notification of the emergency information from all of a plurality of eNBs performing dual connectivity, so that the UE performing dual connectivity can receive the emergency information from a cell different from the cell that has notified the paging.

This method is effective when the eNB recognizes the information on eNBs capable of dual connectivity with its own eNB. This method is also effective when the MME does not recognize the information on eNBs that perform dual connectivity.

The eNB may obtain in advance the information on other eNBs capable of dual connectivity from the MME.

In one example, together with the emergency information notified to the eNB, the MME notifies the information on eNBs capable of dual connectivity with the eNB. This allows the eNB to notify the eNB capable of dual connectivity with its own eNB of the emergency information. In another example, the MME may notify the eNB through S1 signaling in setup and update of the eNB.

The eNB may obtain in advance the information on eNBs capable of dual connectivity from the OAM. The eNB obtains the information directly from the OAM not via the MME. This is effective in the case where the OAM is caused to manage the information on eNBs capable of dual connectivity.

The information on eNBs may be eNB identities that can be recognized by the MME. The eNB identity may be, for example, "Global eNB ID."

When the emergency information is notified to the eNB, the emergency information is also notified to an eNB capable of dual connectivity with the eNB. The eNB capable of dual connectivity that has been notified of the emergency information notifies a UE being served thereby of the emergency information.

Specifically, the emergency information is broadcast as the system information over the SIB. For example, the emergency information of the ETWS may be included in the SIB10 and/or SIB11, while the emergency information of the CMAS may be included in the SIB12.

The eNB capable of dual connectivity that has been notified of the emergency information may notify the UE being served thereby of the scheduling information of the SIB including the emergency information. Specifically, the scheduling information of the SIB including the emergency information is broadcast as the system information over the SIB. For example, the scheduling information may be included in the SIB1.

Figure 36:
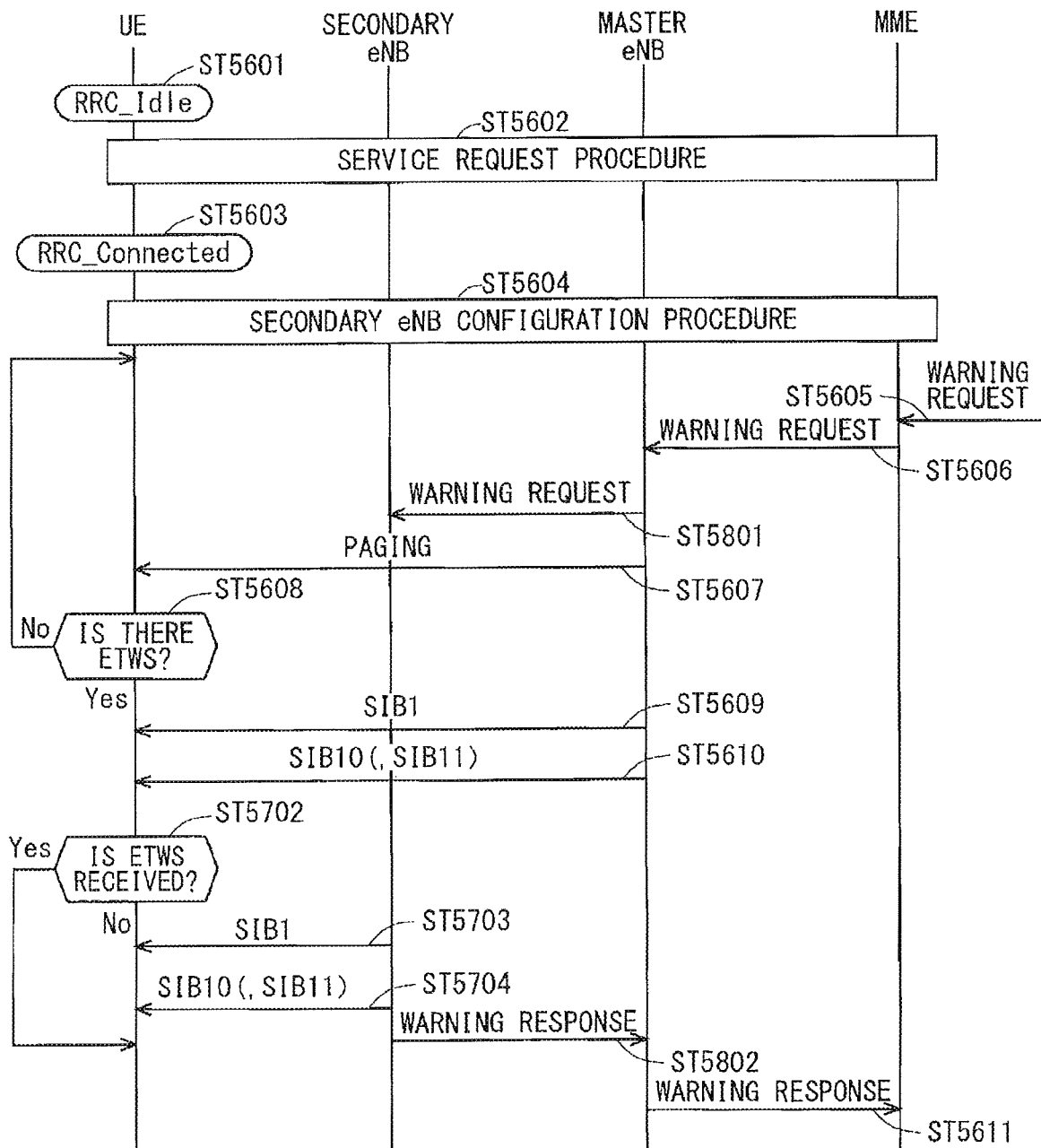
FIG. 36 shows another example of the sequence of the emergency information notification system in the third embodiment.

FIG. 36 shows another example of the sequence of the emergency information notification system in the third embodiment. FIG. 36 is similar to FIGS. 34 and 35 above, and thus, the steps corresponding to those of FIGS. 34 and 35 will be denoted by the same step numbers, and common description will be omitted.

In Step ST5801, the master eNB that has received the emergency information in Step ST5606 notifies an eNB capable of dual connectivity with its own eNB, for example, the secondary eNB of the emergency information. For this notification, an X2 signaling may be used, or any other interface may be provided.

In Step ST5703, the secondary eNB that has received the emergency information in Step ST5801 includes the ETWS presence information in paging and then notifies the paging from the small cell configured by the eNB to the UE being served thereby.

In Step ST5704, the secondary eNB maps the emergency information (ETWS) on at least one of the SIB10 and SIB11 and then notifies the SIB10 or SIB11 from the small cell configured by the secondary eNB to the UE being served thereby.

In Step ST5703, the secondary eNB includes the scheduling information of at least one of the SIB10 and SIB11 in the SIB1 and then notifies the SIB1 from the small cell configured by the eNB to the UE being served thereby.

In Step ST5802, the secondary eNB that has notified the emergency information (ETWS) at a predetermined period for a predetermined period of time notifies the master eNB of a warning response message as an emergency information end message.

In Step ST5611, the master eNB that has notified the emergency information (ETWS) at a predetermined period for a predetermined period of time in Steps ST5607, ST5609, and ST5610 and has received the emergency information end message in Step ST5802 notifies the MME of a warning response message as an emergency information end message.

Consequently, when the UE performing dual connectivity fails to receive the emergency information from the macro cell, the UE can receive the emergency information from the small cell.

The method disclosed in this embodiment allows the UE performing dual connectivity to receive the emergency information from the cell configured by the secondary eNB even when the UE receives the presence information of the emergency information through paging from the cell configured by the master eNB, and then, the reception quality from the cell degrades sharply. Thus, the UE can be notified of the emergency information as soon as possible.

The UE can receive the emergency information from the small cell configured by the small eNB being the secondary eNB even when the UE receives the presence information of the emergency information through paging, and then, the macro cell configured by the macro eNB serving as a master eNB stops its operation due to a disaster. The UE can receive the emergency information from the small cell while avoiding the macro cell that has stopped its operation. Therefore, a system that can also support an occurrence of a disaster can be configured.

First Modification of Third Embodiment

The problem solved in a first modification of the third embodiment will be described below. When a plurality of eNBs with which dual connectivity is performed are operated in the same frequency layer while dual connectivity is being performed as the operation method in the case where a large number of small cells are installed, interference may occur between the eNBs.

If emergency information occurs in the eNBs, the UE fails to receive the emergency information due to the interference. For example, in the case where RRC diversity is performed between the macro cell configured by a master eNB and the small cell configured by a secondary eNB, the UE being served by the macro cell suffers from the interference from the small cell with which dual connectivity is performed when receiving the emergency information from the macro cell. As a result, the reception quality from the macro cell degrades, and the UE fails to receive the emergency information. This modification aims to solve this problem.

While the cell configured by the master eNB is broadcasting the emergency information, the transmission and reception operation of the cell configured by the secondary eNB that performs dual connectivity with the master eNB is stopped. The transmission and reception operation may be the operation of transmitting and receiving by a Uu interface. The cell configured by the secondary eNB is a cell dedicated to dual connectivity.

Alternatively, the transmission and reception operation at the carrier frequency dedicated to dual connectivity of the cell configured by the secondary eNB that performs dual connectivity may be stopped.

Consequently, the interference from the cell configured by the secondary eNB can be eliminated. Thus, the reception quality from the cell configured by the master eNB improves, and accordingly, the UE can receive the emergency information. The UE performing dual connectivity may receive the emergency information from the cell configured by the master eNB. This allows the UE to receive the emergency information with good reception quality.

The cell configured by the secondary eNB may stop transmission, in place of stopping transmission and reception. The cell may operate without stopping reception. The cell may shift to a dormant mode, in place of stopping transmission and reception. Examples of the dormant mode include the method of transmitting only specific signals in a long period.

The following three, (1) to (3), will be disclosed as a trigger upon which the secondary eNB stops transmission and reception.

(1) When the secondary eNB receives the paging message indicative of the presence of the emergency information from the MME or master eNB.

(2) When the master eNB receives the emergency information from the MME, the master eNB notifies the secondary eNB of the message to stop transmission and reception. When the secondary eNB receives the message to stop transmission and reception from the master eNB.

(3) When notifying the macro eNB of the emergency information, the MME notifies the secondary eNB of a message to stop transmission and reception. When the secondary eNB receives the message to stop transmission and reception from the MME.

The following four, (1) to (4), will be disclosed as a trigger upon which the secondary eNB restarts transmission and reception.

(1) When an emergency information notification end message is transmitted to the MME or the master eNB.

(2) When the master eNB transmits the emergency information notification end message to the MME, the master eNB notifies the secondary eNB of a message to restart transmission and reception. When the secondary eNB receives the message to restart transmission and reception from the master eNB.

(3) When receiving the emergency information notification end message from the macro eNB, the MME notifies the secondary eNB of a message to restart transmission and reception. When the secondary eNB receives the message to restart transmission and reception from the MME.

(4) After a lapse of a predetermined period since the secondary eNB's reception of the message to stop transmission and reception from the MME or the master eNB.

Figure 37:
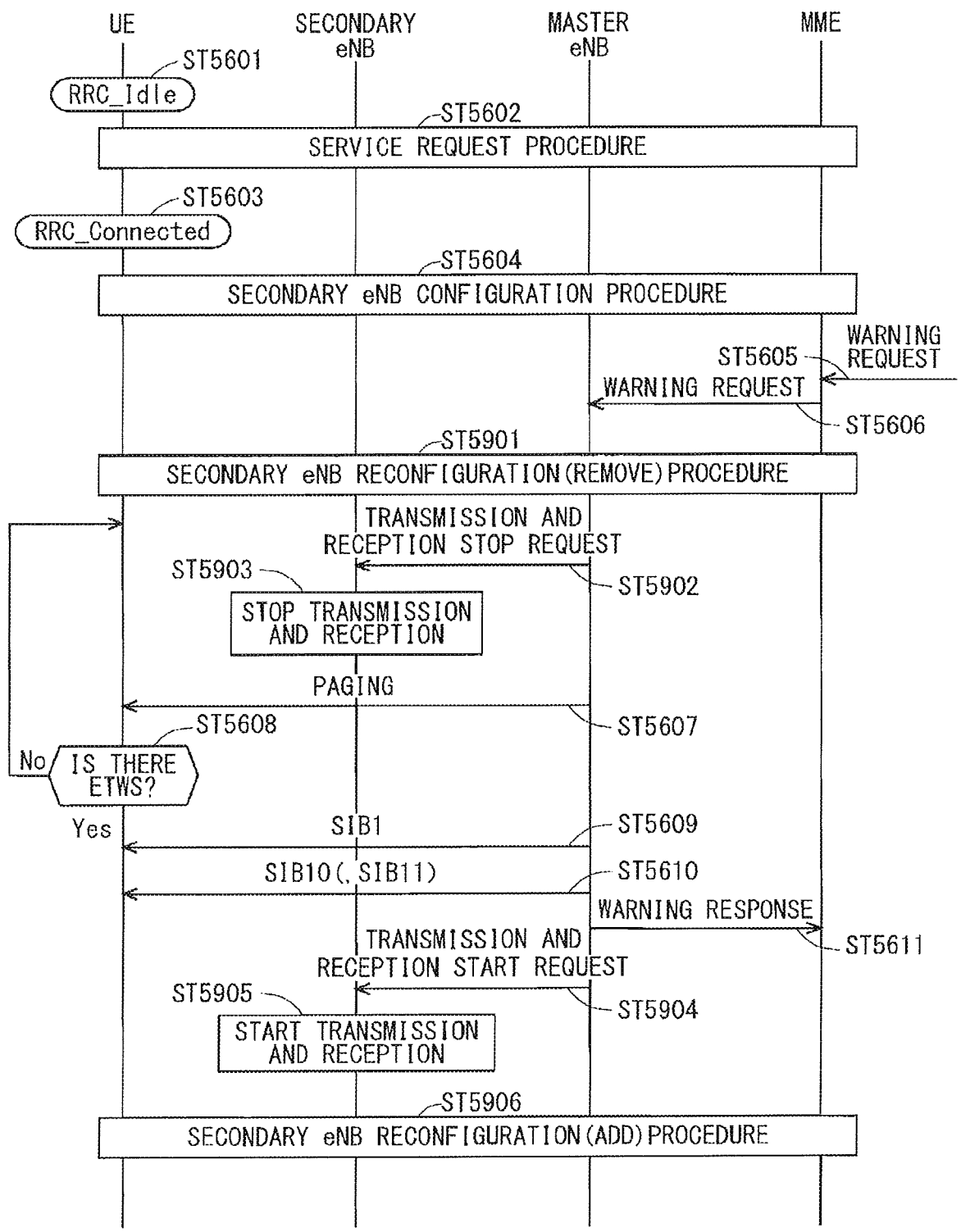
FIG. 37 shows an example of the sequence of a communication system in a first modification of the third embodiment.

FIG. 37 shows an example of the sequence of a communication system in the first modification of the third embodiment. FIG. 37 is similar to FIG. 34 above, and thus, the steps corresponding to those of FIG. 34 will be denoted by the same step numbers, and common description will be omitted.

In Step ST5901, the master eNB that has received the emergency information from the MME in Step ST5606 performs, on the UE performing dual connectivity being served thereby, the procedure of releasing the dual connectivity, specifically, the procedure of removing the reconfiguration of the secondary cell (secondary eNB reconfiguration (remove) procedure).

For example, the master eNB notifies the cell performing dual connectivity of the release of the dual connectivity process for the UE. Together with this notification, the master eNB stops forwarding the data, which is to be transmitted to the UE, to the cell. The cell notified of the release of the dual connectivity procedure performs the process of ending the connection with the UE, thereby ending the transmission to the UE.

Meanwhile, the master eNB notifies the UE of the removal of the cell that performs dual connectivity. This removal may be notified in an RRC connection reconfiguration message. The UE that has been notified of the removal ends the transmission and reception of the cell that performs dual connectivity. Consequently, the secondary eNB ends the dual connectivity, and accordingly, the UE that has performed dual connectivity is connected only to the cell configured by the master eNB.

After releasing the dual connectivity procedure of the secondary eNB, in Step ST5902, the master eNB requests the secondary eNB to stop the transmission and reception operation. In Step ST5903, the secondary eNB stops the transmission and reception operation. As a result, the secondary eNB does not perform transmission and reception, eliminating interference with the master eNB.

After broadcasting the emergency information at a predetermined period for a predetermined period of time, in Step ST5611, the master eNB notifies the MME of an emergency information notification end message, and in Step ST5904, requests the secondary eNB to start the transmission and reception operation. In Step ST5905, the secondary eNB that has received the request to start the transmission and reception operation starts transmission and reception.

After that, in Step ST5906, as required, the master eNB performs dual connectivity with the UE being served thereby, using the cell configured by the secondary eNB. For example, the master eNB notifies the cell that performs dual connectivity of a dual connectivity addition procedure for a desired UE. After notifying the dual connectivity addition procedure, the master eNB starts forwarding the data for the UE to the cell with which dual connectivity is performed. The cell notified of the dual connectivity addition procedure performs the procedure of starting connection with the UE, thereby starting the transmission to the UE.

Meanwhile, the master eNB notifies the UE of the addition of a cell that performs dual connectivity. The cell with which dual connectivity is performed may be added in an RRC connection reconfiguration message. The UE notified of the addition starts transmission and reception of the cell to be subjected to dual connectivity. This allows the secondary eNB to restart dual connectivity with a desired UE.

Consequently, interference from the cell configured by the secondary eNB with which dual connectivity is performed can be eliminated when the UE being served by the cell configured by the master eNB receives the emergency information from the cell. This enables the reception of the emergency information without degradation in the reception quality from the cell.

The dual connectivity procedure of the secondary eNB is temporarily released for the UE with which dual connectivity is being performed, and thus, for example, an occurrence of a packet loss between the UE and the secondary eNB can be prevented while the transmission and reception operation of the secondary eNB is being stopped.

Figure 38:
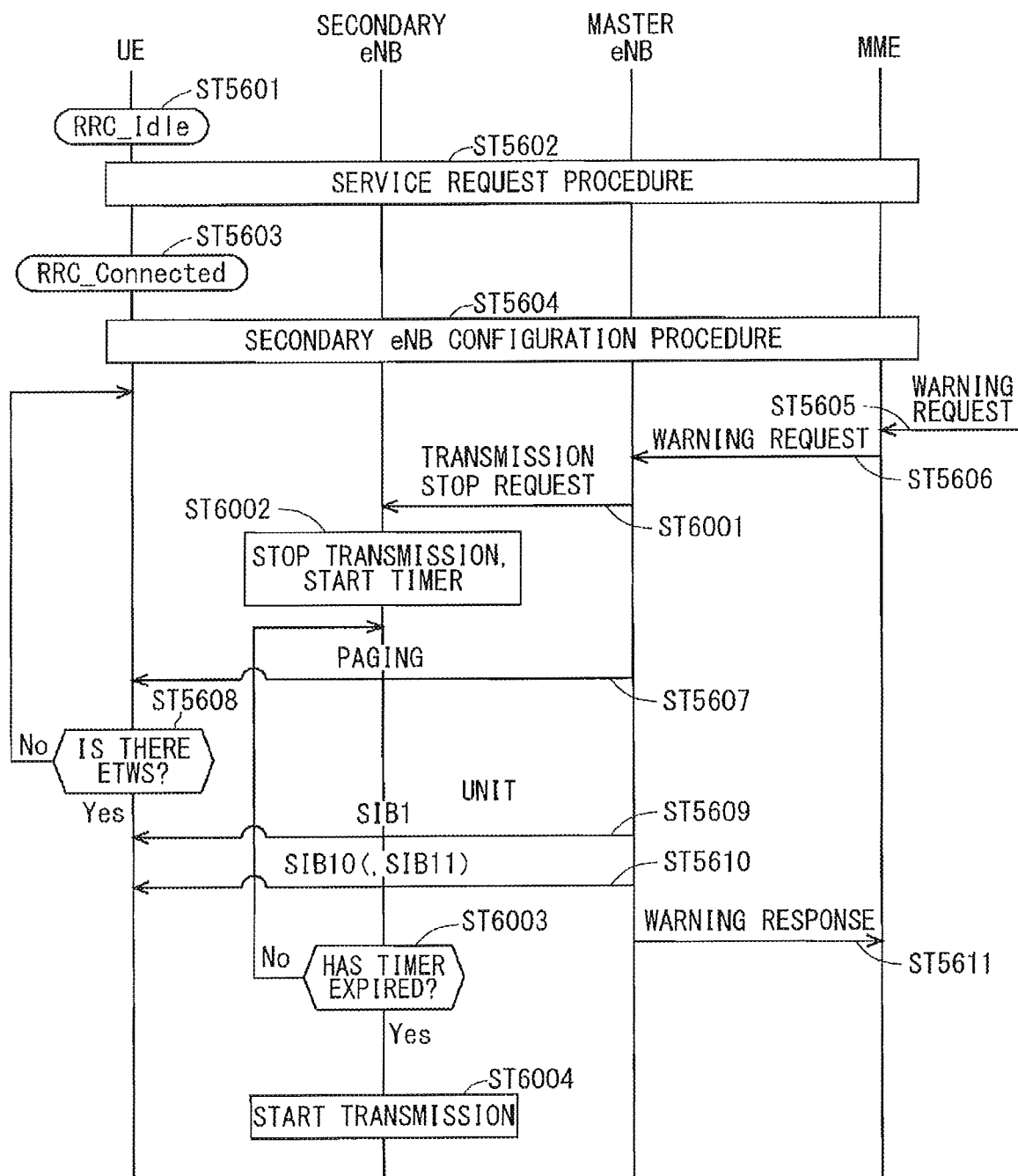
FIG. 38 shows another example of the sequence of the communication system in the first modification of the third embodiment.

FIG. 38 shows another example of the sequence of the communication system in the first modification of the third embodiment. FIG. 38 is similar to FIG. 34 above, and thus, the steps corresponding to those of FIG. 34 will be denoted by the same step numbers, and common description will be omitted.

In Step ST6001, the master eNB that has received the emergency information from the MME in Step ST5606 requests the secondary eNB performing dual connectivity to stop the transmission operation. In Step ST6002, the secondary eNB stops the transmission operation. As a result, the secondary eNB does not perform transmission, thereby eliminating interference with the master eNB.

The secondary eNB that has stopped the transmission operation in Step ST6002 starts a timer for a stop period. The value of the stop period may be decided statically or may be notified from the master eNB. In consideration of the predetermined period in which the emergency information is notified, the master eNB may set the value of the stop period and then notify the secondary eNB.

In Step ST6003, the secondary eNB judges whether the timer for the stop period has expired. When judging in Step ST6003 that the timer for the stop period has expired, the secondary eNB moves to Step ST6004, or waits until the timer for the predetermined period expires when judging in Step ST6003 that the timer for the predetermined period has not expired. In Step ST6004, the secondary eNB that has judged that the timer for the stop period has expired in Step ST6003 restarts the transmission operation. This allows the secondary eNB to restart dual connectivity with a desired UE.

As a result, when the UE being served by the cell configured by the master eNB receives the emergency information from the cell, interference from the cell configured by the secondary eNB with which dual connectivity is performed can be eliminated. This enables the reception of the emergency information without degradation in the reception quality from the cell.

Unlike the sequence shown in FIG. 37 above, the procedure of temporarily releasing dual connectivity of the secondary eNB is not performed for the UE that performs dual connectivity, thereby allowing the master eNB to notify the UE being served thereby of the emergency information as soon as possible. This allows the UE to receive the emergency information as soon as possible.

Fourth Embodiment

As described in the second embodiment, dual connectivity is studied as the operation method when a large number of small cells are installed.

3GPP has standardized the function of restricting access when, for example, the cell load increases. The information for access restriction is access class barring (ACB) information and extended access barring (EAB) information. An access class is set for the UE. The access class is stored in, for example, the SIM. The cell broadcasts the information about access restriction to the UEs being served thereby as the system information. The UE restricts access to the cell in accordance with the received access restriction information.

The problem solved in a fourth embodiment will be described below. Examples of the existing method of performing dual connectivity include CA using a macro cell and an RRH connected thereto. In such CA, the macro cell and the RRH are configured within the same eNB, and scheduling of individual eNBs is performed intensively. The nodes are connected with an ideal backhaul whose delay is negligible. In such CA, the eNB can adjust the loads of individual nodes, and thus, an access restriction may be the same among the individual nodes. In this case, the UE is only required to recognize the access restriction of the cell on which the UE has camped.

In dual connectivity using the radio resources of different eNBs, a delay between eNBs is not negligible, and the eNBs are connected by a non-ideal backhaul. Thus, scheduling of individual eNBs cannot be performed intensively. The load status normally differs among eNBs, and thus, when the same access restriction is provided among the eNBs, the use efficiency of radio resources decreases. This embodiment aims to solve this problem.

For the UE with which dual connectivity is performed, the cell configured by a master eNB sets the cell with the same ACB/EAB information as that of its own cell as a cell for dual connectivity.

Figure 39:
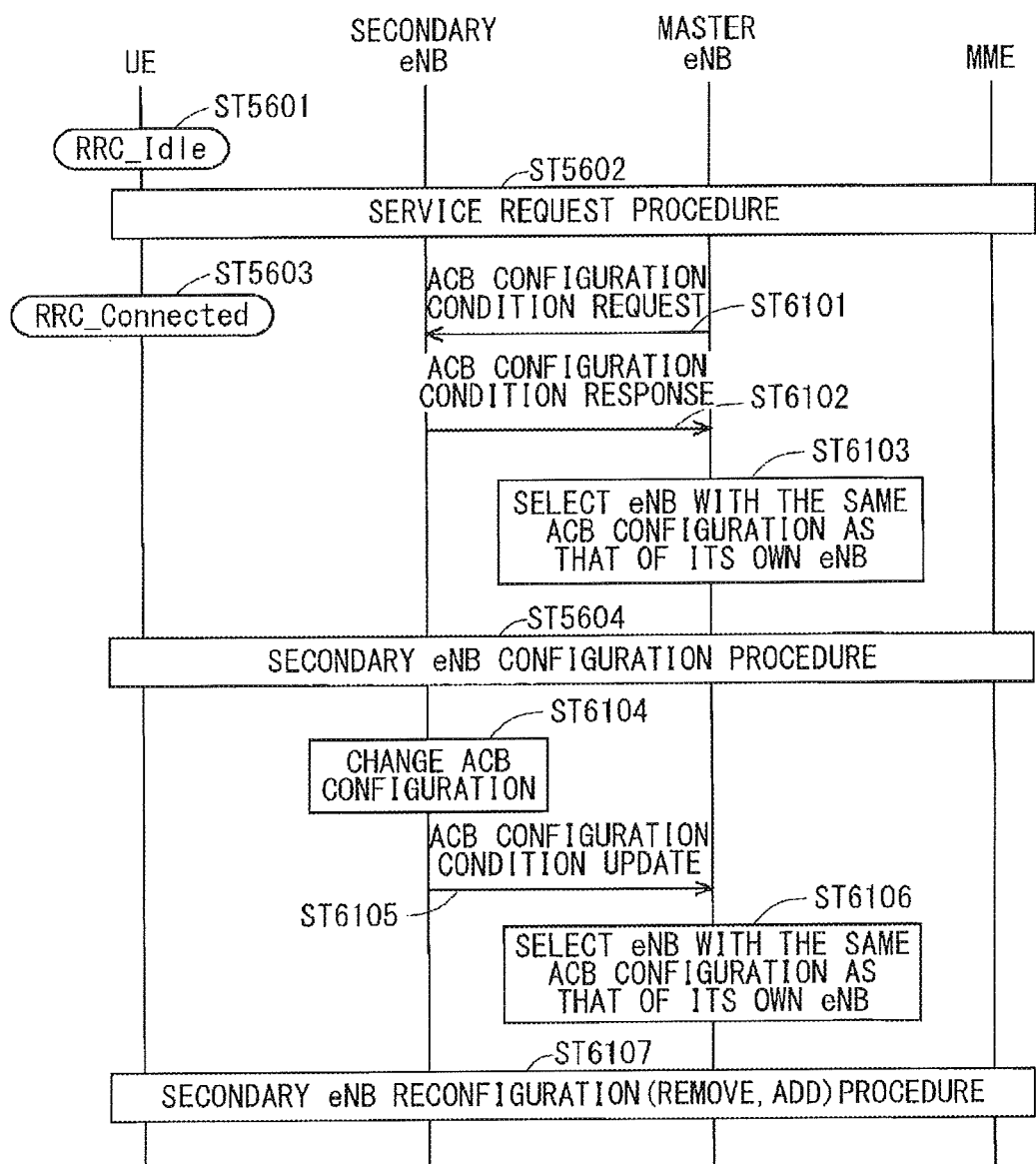
FIG. 39 shows an example of the sequence of a communication system in a fourth embodiment.

FIG. 39 shows an example of the sequence of a communication system in the fourth embodiment. FIG. 39 is similar to FIG. 34 above, and thus, the steps corresponding to those of FIG. 34 will be denoted by the same step numbers, and common description will be omitted.

In Step ST5604, the UE that has shifted to the RRC connected state in Steps ST5601 to ST5603 performs the secondary eNB configuration procedure between the cell configured by the master eNB and itself as the procedure of configuring dual connectivity with another cell. The eNB configuring the cell is the secondary eNB for the UE.

Before the procedure of Step ST5604, the cell configured by the master eNB needs to recognize in advance an eNB (cell) with the same ACB/EAB information as that of its own cell. Thus, the cell configured by the master eNB obtains in advance the ACB/EAB information of the cell configured by an eNB capable of dual connectivity.

In Step ST6101, the master eNB notifies the eNB capable of dual connectivity of a message requesting the configuration condition of at least one of the ACB and the EAB of the cell. A new interface may be provided for this message. Alternatively, an X2 interface may be used. For example, a resource status request message may be used. In this case, the need for providing a new interface is eliminated, thereby simplifying control. In another method, an S1 interface may be used. The master eNB may notify the eNB capable of dual connectivity via the MME.

In Step ST6102, the secondary eNB that has received the request for the ACB/EAB configuration condition in Step ST6101 notifies the master eNB of the configuration information of at least one of the ACB and EAB of the cell. This allows the master eNB to obtain the configuration condition of at least one of the ACB and EAB of the cell configured by the eNB capable of dual connectivity.

For this message, a new interface may be provided. Alternatively, an X2 interface may be used. For example, a resource status response message may be used. In this case, the need for providing a new interface is eliminated, thereby simplifying control. In another method, an S interface may be used. The secondary eNB may notify the master eNB via the MME.

In Step ST6103, the master eNB selects the eNB with the same ACB/EAB as that of the cell configured by its own eNB, specifically, the cell configured by this eNB.

This cell is used in the secondary eNB configuration procedure for the UE that performs dual connectivity in Step ST5604.

Consequently, the UE is only required to recognize the ACB/EAB information of the cell configured by the master eNB and is not required to recognize the ACB/EAB information of the cell configured by the secondary eNB. The cell configured by the master eNB is also not required to notify the UE of the ACB/EAB information of the cell configured by the secondary eNB.

The method described above can take into account different load statuses of eNBs but cannot take into account temporal variations in the load statuses of the eNBs. Thus, a mechanism is provided that takes into account the case in which the ACB/EAB configuration is changed due to the variations in the load statuses of the eNBs.

When the ACB/EAB configuration of the cell configured by the eNB capable of dual connectivity is changed in Step ST6104, in Step ST6105, the secondary eNB notifies (the cell configured by) the master eNB of the changed ACB/EAB configuration information.

For this message, a new interface may be provided. Alternatively, an X2 interface may be used. For example, it may be a resource status update message or an eNB configuration update message. In this case, the need for providing a new interface is eliminated, thereby simplifying control. In another method, an S1 interface may be used. The secondary eNB may notify the master eNB via the MME.

Consequently, if the ACB/EAB configuration of the eNB capable of dual connectivity is changed, the master eNB can obtain the changed ACB/EAB configuration information.

In Step ST6106, the master eNB selects (the cell configured by) the eNB with the same ACB/EAB as that of the cell configured by its own eNB. In Step ST6107, then, the master eNB performs the procedure of changing the secondary eNB (secondary eNB reconfiguration (remove, add) procedure) on the UE that performs dual connectivity. The master eNB performs a configuration, for the UE that performs dual connectivity, to remove (the cell configured by) the eNB with different ACB/EAB from that of the cell configured by the master eNB and to add (the cell configured by) the eNB with the same ACB/EAB as that of the cell configured by the master eNB.

Consequently, if the ACB/EAB configuration of the eNB capable of dual connectivity is changed, for the UE that performs dual connectivity, the master eNB can configure a suitable eNB as (the cell configured by) the eNB for dual connectivity in consideration of the changed ACB/EAB configuration information.

Even when the load status of each eNB varies in time, thus, dual connectivity can be performed while minimizing a decrease in use efficiency of radio resources.

In the method above, after changing the ACB/EAB configuration in Step ST6104, in Step ST6105, the secondary eNB notifies the master eNB of the changed ACB/EAB configuration condition.

In this case, also after the ACB/EAB of the secondary eNB is changed, even when the condition configuration of the AC and EAB of the UE differs from the changed ACB/EAB configuration of the secondary eNB, the UE is continuously connected to the secondary eNB until the process of changing the secondary eNB that performs dual connectivity with the UE in Step ST6107 is performed. A large procedure delay in Steps ST6105 and ST6106 leads to the state in which the configuration of the UE mismatches the configuration of the secondary eNB for a long period of time.

To reduce the occurrence of such a state, the secondary eNB may merely decide to change the ACB/EAB configuration in place of changing the ACB/EAB configuration in Step ST6104, and when deciding to change the ACB/EAB configuration, may notify the master eNB of the decided ACB/EAB configuration in Step ST6105.

The secondary eNB decides to change the ACB/EAB configuration, and after a lapse of a predetermined period, changes the ACB/EAB configuration. The predetermined period may be decided statically in advance or may be changed semi-statically. When the predetermined period is decided statically, control can be simplified as a system. When the predetermined period is changed semi-statically, the congestion status of the interface between the secondary eNB and the master eNB and a time variance of a control delay in the master eNB can be taken into account.

The predetermined period may differ per cell or may be the same value among all the cells. When the predetermined period differs per cell, a control delay in each cell can be taken into account. When the predetermined period is the same value among all the cells, control can be simplified as a system.

The ACB/EAB configuration is changed after a lapse of the predetermined period, thereby reducing the time from the change of the ACB/EAB configuration to the procedure of Step ST6107. Alternatively, the ACB/EAB configuration can be changed after the procedure of Step ST6107.

Consequently, the occurrence of the state in which the condition configuration of the AC and EAB of the UE mismatches the ACB/EAB configuration of the secondary eNB can be reduced.

The method disclosed in this embodiment enables dual connectivity while minimizing a decrease in use efficiency of radio resources even when the load status differs between eNBs and varies in time. The capacity of the system can accordingly be increased.

The situation in which the server will go down due to an excessively high load status can be avoided, and therefore, a stable communication system can be constructed.

First Modification of Fourth Embodiment

Another method of solving the problem described in the fourth embodiment will be disclosed. The cell configured by the master eNB configures, for the UE that performs dual connectivity, a cell accessible by the UE as the cell for dual connectivity.

Figure 40:
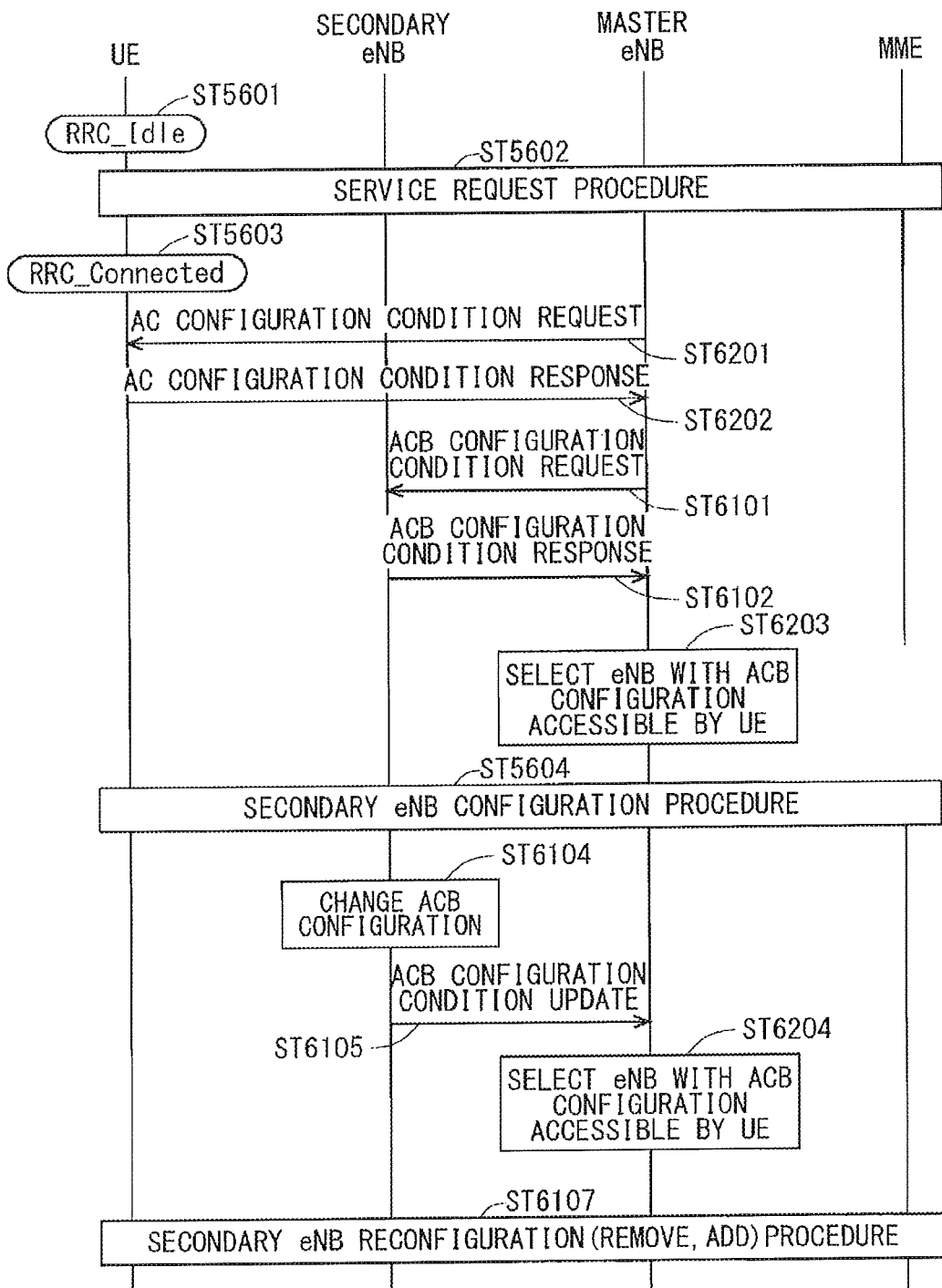
FIG. 40 shows an example of the sequence of a communication system in a first modification of the fourth embodiment.

FIG. 40 shows an example of the sequence of a communication system of a first modification of the fourth embodiment. FIG. 40 is similar to FIGS. 34 and 39 above, and thus, the steps corresponding to those of FIGS. 34 and 39 will be denoted by the same step numbers, and common description will be omitted.

In Step ST5604, the UE that has shifted to the RRC connected state in Steps ST5601 to ST5603 performs the secondary eNB configuration procedure between the cell configured by the master eNB and itself as the procedure of configuring dual connectivity with another cell. The eNB configuring the other cell serves as a secondary eNB for the UE.

Before the procedure of Step ST5604, the cell configured by the master eNB needs to recognize a cell accessible by the UE that performs dual connectivity. The cell configured by the master eNB accordingly obtains in advance the ACB/EAB information of the cell configured by the eNB capable of dual connectivity and also obtains the AC configuration information of the UE.

In Step ST6201, the master eNB notifies the UE that performs dual connectivity of the message requesting the AC configuration information. RRC signaling may be used for the notification of the message requesting the AC configuration information. Alternatively, dedicated signaling may be used for notification. For example, the existing UE capability enquiry message may be used.

In Step ST6202, the UE that has received the AC configuration information request in Step ST6201 notifies (the cell configured by) the master eNB of the AC configuration information of its own UE. RRC signaling may be used for the notification of the AC configuration information. Alternatively, dedicated signaling may be used for notification. For example, the existing UE capability information message may be used. This allows the master eNB to obtain the AC configuration information of the UE that performs dual connectivity.

The procedure of requesting the AC configuration condition in Step ST6201 may be omitted. In that case, in the establishment of the RRC connection with the cell configured by the master eNB, the UE may notify the cell configured by the master eNB of the AC configuration information in Step ST6202.

In Step ST6203, the master eNB selects (the cell configured by) the eNB with the ACB/EAB configuration accessible by the UE, using the AC configuration information of the UE that performs dual connectivity obtained in Step ST6202 and the ACB/EAB configuration information of the eNB capable of dual connectivity obtained in Step ST6102.

This cell is used in the secondary eNB configuration procedure for the UE that performs dual connectivity in Step ST5604.

Consequently, the UE is only required to recognize the ACB/EAB configuration of the cell configured by the master eNB and is not required to recognize the ACB/EAB information of the cell configured by the secondary eNB. The cell configured by the master eNB is also not required to notify the UE of the ACB/EAB information of the cell configured by the secondary eNB.

To take into account temporal variations in the load status at each eNB, a mechanism in which the case where the ACB/EAB configuration is changed due to the variations in the load status of the eNBs is taken into account, disclosed in the fourth embodiment, may be provided. In Steps ST6104 and ST6105, the master eNB obtains the ACB/EAB configuration information of the eNB capable of dual connectivity, whose ACB/EAB configuration has been changed.

In Step ST6204, the master eNB selects (the cell configured by) the eNB with the ACB/EAB configuration accessible by the UE, using the AC configuration information of the UE that performs dual connectivity obtained in Step ST6202, the ACB/EAB configuration information of the eNB capable of dual connectivity obtained in Step ST6102, and the ACB/EAB configuration of the eNB capable of dual connectivity, whose ACB/EAB configuration has been changed, obtained in Step ST6105.

In Step ST6107, the process of changing the secondary eNB is performed on the UE that performs dual connectivity. The master eNB performs a configuration, for the UE that performs dual connectivity, to remove (the cell configured by) the eNB with different ACB/EAB from that of the cell configured by the master eNB and to add (the cell configured by) the eNB with the same ACB/EAB as that of the cell configured by the master eNB.

As a result, if the ACB/EAB configuration of the eNB capable of dual connectivity is changed, for the UE that performs dual connectivity, the master eNB can configure a suitable eNB as (the cell configured by) the eNB in consideration of the changed ACB/EAB configuration information.

Consequently, even when the load status at each eNB varies in time, dual connectivity can be performed while preventing a decrease in use efficiency of radio resources.

The method disclosed in this modification can achieve similar effects to those of the fourth embodiment, and also, the master eNB can recognize the AC configuration of the UE that performs dual connectivity. This allows a larger number of eNBs to serve as candidates for the secondary eNB for dual connectivity. Therefore, the UE that performs dual connectivity can perform dual connectivity with the cell having optimum communication quality.

Second Modification of Fourth Embodiment

Another method of solving the problem described in the fourth embodiment will be disclosed. When configuring the cell for dual connectivity, the master eNB notifies the UE that performs dual connectivity of the ACB/EAB information of the cell for dual connectivity.

Figure 41:
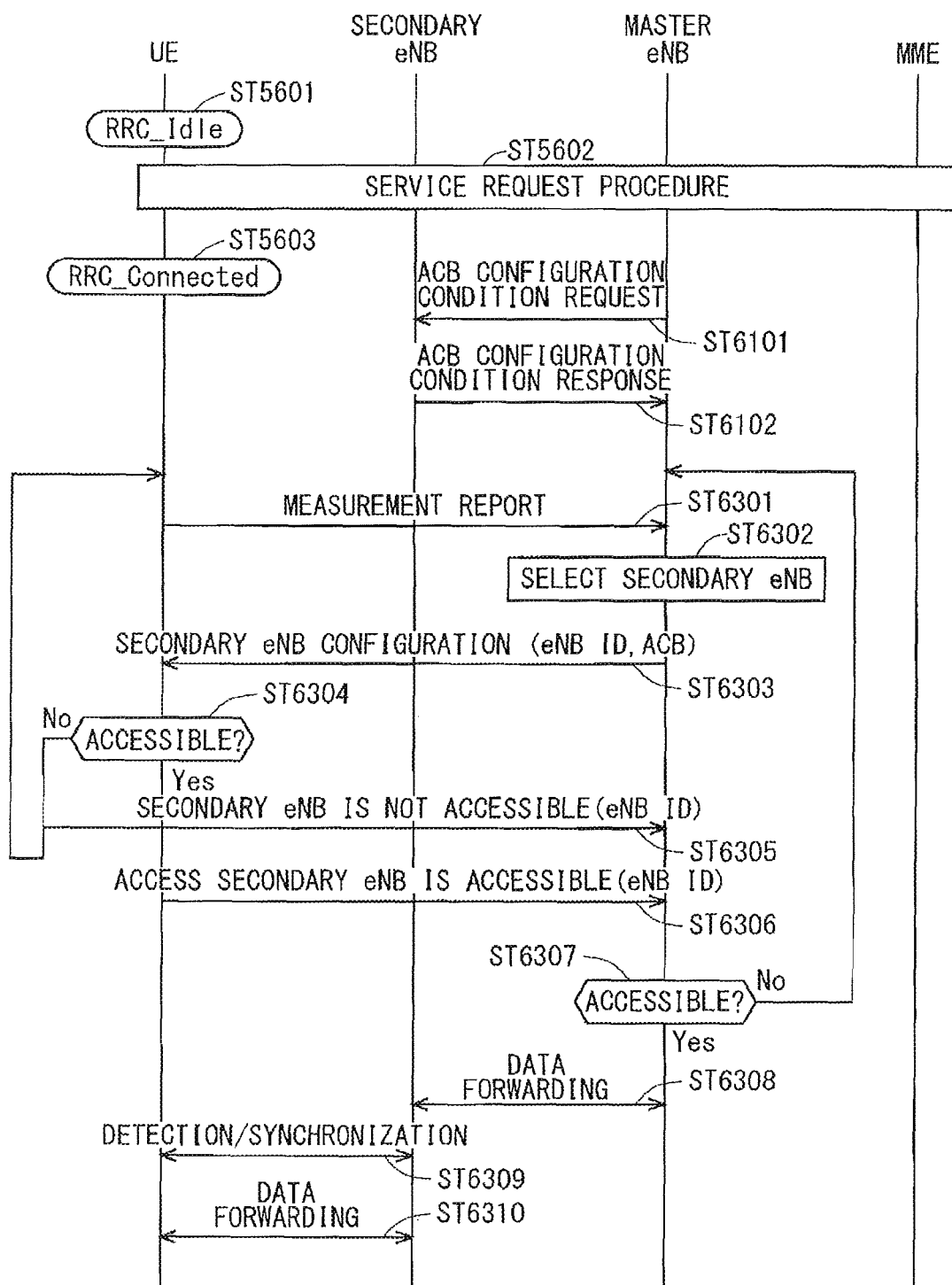
FIG. 41 shows an example of the sequence of a communication system in a second modification of the fourth embodiment.

FIG. 41 shows an example of the sequence of a communication system in a second modification of the fourth embodiment. FIG. 41 is similar to FIGS. 34 and 39 above, and thus, the steps corresponding to those of FIGS. 34 and 39 will be denoted by the same step numbers, and common description will be omitted.

In Steps ST5601 to ST5603, the UE shifts to the RRC connected state.

When the master eNB configures the cell for dual connectivity, to notify the ACB/EAB information of the cell, before the notification, the cell configured by the master eNB obtains in advance the ACB/EAB information of the cell configured by the eNB capable of dual connectivity.

In Step ST6101, thus, the master eNB notifies the eNB capable of dual connectivity of a message requesting the configuration condition of at least one of the ACB and EAB of the cell.

In Step ST6102, the eNB capable of dual connectivity that has received the request for the ACB/EAB configuration condition in Step ST6101 notifies the master eNB of the configuration information of at least one of the ACB and EAB of the cell. This allows the master eNB to obtain the configuration condition of at least one of the ACB and EAB of the cell configured by the eNB capable of dual connectivity.

In Step ST6302, the cell configured by the master eNB selects a cell that performs dual connectivity using the measurement report message from the UE in Step ST6301.

In Step ST6303, the cell configured by the master eNB notifies the UE that performs dual connectivity of the configuration of the cell with which dual connectivity is performed. Examples of the information included in the configuration of the cell that performs dual connectivity include the identity of the cell, the identity of the eNB configuring the cell, and the ACB/EAB configuration information of the cell.

In Step ST6304, the UE that has received the configuration of the cell with which dual connectivity is performed and has received the ACB/EAB information of the cell in Step ST6303 judges whether the cell is accessible. When judging in Step ST6304 that the cell is not accessible, the UE moves to Step ST6305. In Step ST6305, the UE notifies the cell configured by the master eNB that the cell is not accessible and then returns to the normal RRC_CONNECTED state. The UE may perform measurement again.

Meanwhile, when judging in Step ST6304 that the cell is accessible, the UE moves to Step ST6306. In Step ST6306, the UE notifies the cell configured by the master eNB that the cell is accessible.

In Step ST6307, (the cell configured by) the master eNB judges whether the UE that performs dual connectivity can access the cell configured for dual connectivity. When judging in Step ST6307 that the cell is not accessible, the master eNB returns to Step ST6302 and again executes the procedure of selecting a cell that performs dual connectivity. When again receiving a measurement report from the UE in Step ST6301, the master eNB may select a cell that performs dual connectivity in Step ST6302.

When judging in Step ST6307 that the cell is accessible, the master eNB moves to Step ST6308. In Step ST6308, the cell configured by the master eNB starts forwarding data to the eNB for dual connectivity.

The UE that has notified the master eNB that the cell configured for dual connectivity is accessible in Step ST6306 detects and performs synchronization of the cell in Step ST6309 and starts data communication in Step ST6310.

Consequently, the UE that performs dual connectivity can recognize the ACB/EAB information of the cell configured by the secondary eNB. The UE can judge whether the cell configured by the secondary eNB is accessible, separately from the cell configured by the master eNB.

Even when the load status differs among eNBs, dual connectivity can be performed while minimizing a decrease in use efficiency of radio resources, thereby increasing the capacity of a system.

The situation in which the server will go down due to an excessively high load status can be avoided, and therefore, a stable communication system can be constructed.

To take into account temporal variations in the load status at each eNB, a mechanism in which the case where the ACB/EAB configuration is changed due to the variations in the load status of the eNBs is taken into account, disclosed in the fourth embodiment, may be provided. The procedures of Steps ST6104 and ST6105 of FIG. 39 described above may be performed after the procedure of the sequence shown in FIG. 41 is performed, and then, the procedures starting from Step ST6302 or ST6303 may be performed again.

Even when the load status of each eNB varies in time, thus, dual connectivity can be performed while minimizing a decrease in use efficiency of radio resources.

The methods disclosed in the fourth embodiment and the second modification of the fourth embodiment are also applicable to the cell barred information. The ACB/EAB configuration information of the cell may be replaced with the cell barred information. In the second modification of the fourth embodiment, in Step ST6303 of FIG. 41, the cell barred information, included as the configuration information of the cell for dual connectivity, may be notified to the UE. In Step ST6304, the UE judges whether the cell is accessible using the barred information.

Therefore, even when the barred information differs among eNBs, dual connectivity can be performed while minimizing a decrease in use efficiency of radio resources. The capacity of a system can accordingly increase.

Fifth Embodiment

The problem to be solved in a fifth embodiment will be described below. When small cells are grouped to be handled, without any contrivance, even the small cells included in the same group individually have different parameters. A small cell has a narrow coverage, and thus, a large number of small cells will be conceivably installed. Thus, a method of configuring optimum parameters for small cells will be disclosed.

The solution in the fifth embodiment will be described below. Partial parameters are set to the same value among the small cells included in the same group. That is to say, partial parameters are set to a common value. This is because by setting partial parameters of the small cells included in the same group to the same value, an efficient communication system can be constructed.

The following two, (1) and (2), will be disclosed as specific examples of the groups.

(1) A small cell cluster. That is to say, partial parameters are set to the same value among the small cells included in the same cell cluster.

(2) Small cells installed within the coverage of another cell when the small cells are installed within the coverage of the other cell. The other cell is referred to as a "coverage macro cell." That is to say, partial parameters are set to the same value among the small cells installed within the coverage of the same coverage macro cell.

The following seventeen, (1) to (17), will be disclosed as specific examples of the parameters that are set to the same value.

(1) Downlink transmission bandwidth (dl-Bandwidth). This parameter is a parameter included in the MIB (see Non-Patent Document 10). The downlink transmission bandwidth is set to the same value among the small cells included in the same group, thereby achieving the following effects.

A small cell has a narrow coverage, and thus, a large number of small cells will be conceivably installed. Considering the number of cells that can be measured by the UE at the same place, when the number of macro cells and the number of small cells are compared, the number of small cells will be conceivably higher. Measuring the cells in different downlink transmission bandwidths may require a change in the reception configuration of the UE. For example, it is conceivable that the configuration of a frequency converting unit in the conversion of the reception signal received through an antenna into a baseband signal will be changed in accordance with a downlink transmission bandwidth.

According to the specific example (1), by setting the downlink transmission bandwidths (dl-Bandwidths) of the small cells included in the same group to the same value, in the measurement of the small cells included in the same group, the reception configuration of the UE does not need to be changed and can be kept constant. For example, the configuration of the frequency converting unit in the conversion of the reception signal received through an antenna into a baseband signal does not need to be changed in accordance with a downlink transmission bandwidth and can be kept constant. This can reduce the processing load of the UE.

Further, the downlink carrier frequencies of the small cells included in the same group may be included in the same frequency band. The downlink carrier frequencies with the small cells included in the same group may be set to the same value. This can achieve the following effects. In the measurement of the cells with the downlink carrier frequencies included in different frequency bands or different downlink carrier frequencies, the reception configuration of the UE may need to be changed. For example, it is conceivable that the configuration of the frequency converting unit in the conversion of a reception signal received through an antenna into a baseband signal will be changed in accordance with the frequency band including the downlink carrier frequency or in accordance with the downlink carrier frequency.

According to the specific example (1), by causing the downlink carrier frequencies of the small cells in the same group to be included in the same frequency band, or by setting the downlink carrier frequencies to the same value, in the measurement of the small cells included in the same group, the reception configuration of the UE does not need to be changed and can be kept constant. For example, the configuration of the frequency converting unit in the conversion of the reception signal received through an antenna into a baseband signal is not required to be changed in accordance with the frequency band including the downlink carrier frequency or in accordance with the downlink carrier frequency and can be kept constant. This can reduce the processing load of the UE.

(2) TAC. This parameter is a parameter included in the SIB1 (see Non-Patent Document 10). By setting the TACs to the same value among the small cells included in the same group, the following effects can be achieved. A small cell has a narrow coverage, and thus, a large number of small cells will be conceivably installed. It is accordingly conceivable that the UE will frequently move between the small cells. The TAU procedure occurs every time the UE moves between the small cells with different TACs.

According to the specific example (2), by setting the TACs of the small cells included in the same group to the same value, in the movement of the UE between the small cells included in the same group, the occurrence of the TAU procedure can be prevented. This can reduce the processing load of the UE. Also, the TAU procedures can be reduced, thereby reducing the processing load of the entire system. Further, radio signals for TAU can be reduced, thereby effectively using radio resources.

(3) CSG identity. This parameter is a parameter included in the SIB1 (see Non-Patent Document 10). The small cells included in the same group may belong to the same closed subscriber group (CSG). By setting the CSG identity to the same value among the small cells included in the same group, the following effects can be achieved.

A small cell has a narrow coverage, and thus, a large number of small cells will be conceivably installed. It is accordingly conceivable that the UE will frequently move between the small cells. Every time the UE selects a small cell belonging to a different CSG or a small cell with a different CSG identity (cell re-selection), the UE needs to check whether the small cell is a CSG cell on which the UE can camp or whether the small cell is a suitable CSG cell (see Non-Patent Document 2). As the condition of the CSG cells on which the UE can camp, the UE is required to belong to the CSG to which the CSG cell belongs.

By setting the CSG identity to the same value among the small cells included in the same group, in the movement between the small cells being CSG cells included in the same group, the UE is not required to check whether the small cell is a CSG cell on which the UE can camp or the cell is a suitable CSG cell. This can reduce the processing load of the UE.

(4) Uplink transmission bandwidth (UL-Bandwidth). The parameter is a parameter included in the SIB2 (see Non-Patent Document 10). By setting the uplink transmission bandwidth to the same value among the small cells included in the same group, the following effects can be achieved. A small cell has a narrow coverage, and thus, a large number of small cells will be conceivably installed. It is accordingly conceivable that the UE will frequently move between the small cells. In some cases, when the UE supports the transmissions of different uplink transmission bandwidths, the transmission configuration of the UE needs to be changed. For example, the configuration of the frequency converting unit will be conceivably changed in accordance with an uplink transmission bandwidth.

According to the specific example (4), by setting the uplink transmission bandwidths (UL-Bandwidths) of the small cells included in the same group to the same value, in transmission to the small cells included in the same group, the transmission configuration of the UE is not required to be changed and can be kept constant. For example, the configuration of the frequency converting unit is not required to be changed in accordance with an uplink transmission bandwidth and can be kept constant. This can reduce the processing load of the UE.

Further, the uplink carrier frequencies of the small cells included in the same group may be included in the same frequency band. The uplink carrier frequencies of the small cells included in the same group may be set to the same value. This can achieve the following effects.

When transmission is performed to the cells of the uplink carrier frequencies included in different frequency bands or different uplink carrier frequencies, in some cases, the transmission configuration of the UE needs to be changed. For example, it is conceivable that the configuration of the frequency converting unit may be changed in accordance with the frequency band including uplink carrier frequencies or in accordance with the uplink carrier frequency.

According to the specific example (4), by causing the uplink carrier frequencies of the small cells included in the same group to be included in the same frequency band, or by setting the uplink carrier frequencies to the same value, in the transmission to the small cells included in the same group, the transmission configuration of the UE is not required to be changed and can be kept constant. For example, the configuration of the frequency converting unit is not required to be changed in accordance with the frequency band including uplink carrier frequencies or in accordance with the uplink carrier frequency and can be kept constant. This can reduce the processing load of the UE.

(5) SIB4. The SIB4's of the small cells included in the same group are set to the same value. That is to say, the neighbor-cell-related information for use in intra-frequency cell re-selection is made the same among the small cells included in the same group. When the transmission (configuration) of the SIB4 is not required, the transmissions of the SIB4's of the small cells included in the same group may be eliminated. By setting the SIB4's of the small cells included in the same group to the same value, the following effects can be achieved.

A small cell has a narrow coverage, and thus, a large number of small cells will be conceivably installed. It is accordingly conceivable that the UE will frequently move between the small cells. Every time the UE moves between the small cells, the procedure of reconfiguring the neighbor-cell-related information for use in intra-frequency cell re-selection occurs.

According to the specific example (5), by setting the SIB4's of the small cells included in the same group to the same value, in the movement of the UE between the small cells included in the same group, the procedure of reconfiguring the neighbor-cell-related information for use in intra-frequency cell re-selection can be eliminated. This can reduce the processing load of the UE.

The UE does not need to receive the SIB4 from the small cells included in the same group. That is to say, when re-selecting (or handing over to) the small cell included in the same group, the UE does not need to receive the SIB4 again. This eliminates the need of the UE to perform a reception procedure even at the timing at which the SIB4 is scheduled. The power consumption of the UE can thus be reduced.

Partial parameters included in the SIB4 may be set to the same value. The following four, (5-1) to (5-4), will be disclosed as specific examples of the parameters set to the same value. However, setting the other parameters included in the SIB4 to the same value is not excluded.

(5-1) Intra-frequency neighbor cell list (intraFreqNeighCellList). In the measurement concerning the intra-frequency cell re-selection when the UE camps on the small cell included in the same group, the UE can perform measurement using the same neighbor cell list. This can reduce the processing load of the UE. The list includes the information on the serving cell, unlike the conventional intra-frequency neighbor cell list. It suffices that the use of the information on the serving cell is avoided in the measurement concerning intra-frequency cell re-selection.

(5-2) PCIs of neighbor cells. In the measurement concerning intra-frequency cell re-selection when the UE camps on the small cell included in the same group, the UE can perform measurement using the same PCI. This can reduce the processing load of the UE.

(5-3) Intra-frequency black list (intraFreqBlackCellList). The cells included in the black list are not candidates for cell re-selection. In the measurement concerning intra-frequency cell re-selection when the UE camps on the small cell included in the same group, the cells satisfying the same condition can be excluded from the candidates for cell re-selection. Specific examples of the same condition include the cells included in the PCI range included in the intra-frequency black list. This can reduce the processing load of the UE.

(5-4) Combination of (5-1) to (5-3) above.

(6) SIB5. The SIB5's of the small cells included in the same group are set to the same value. That is to say, the neighbor-cell-related information for use in inter-frequency cell re-selection is made the same among the small cells included in the same group. When the transmission (configuration) of the SIB5 is not required, the transmissions of the SIB5S's of the small cells included in the same group may be eliminated. By setting the SIB5's of the small cells included in the same group to the same value, the following effects can be achieved.

A small cell has a narrow coverage, and thus, a large number of small cells will be conceivably installed. It is accordingly conceivable that the UE will frequently move between the small cells. Every time the UE moves between the small cells, the procedure of reconfiguring the neighbor-cell-related information for use in inter-frequency cell re-selection occurs.

According to the specific example (6), by setting the SIB5's of the small cells included in the same group to the same value, in the movement of the UE between the small cells included in the same group, the procedure of reconfiguring the neighbor-cell-related information for use in inter-frequency cell re-selection can be eliminated. This can reduce the processing load of the UE.

The UE does not need to receive the SIB5 from the small cells included in the same group. That is to say, when re-selecting (or handing over to) the small cell included in the same group, the UE does not need to receive the SIB5 again. This eliminates the need of the UE to perform a reception procedure even at the timing at which the SIB5 is scheduled. The power consumption of the UE can thus be reduced.

Partial parameters included in the SIB5 may be set to the same value. The following seven, (6-1) to (6-7), will be disclosed as specific examples of the parameters set to the same value. However, setting the other parameters included in the SIB5 to the same value is not excluded.

(6-1) Inter-frequency carrier frequency list (interFreqCarrierFreqList). In the measurement concerning intra-frequency cell re-selection when the UE camps on the small cell included in the same group, the UE can perform measurement using the same inter-frequency carrier frequency list. Thus, for example, the frequency configuration for inter-frequency measurement is not required, thereby reducing the processing load of the UE.

(6-2) Downlink carrier frequency (dl-CarrierFreq). In the measurement concerning inter-frequency cell re-selection when the UE camps on the small cells included in the same group, the UE can perform measurement using the same downlink carrier frequency. Thus, the frequency configuration for inter-frequency measurement or the like is eliminated, thereby reducing the processing load of the UE.

(6-3) Inter-frequency neighbor cell list (interFreqNeighCellList). In the measurement concerning inter-frequency cell re-selection when the UE camps on the small cell included in the same group, the UE can perform measurement using the same neighbor cell list. This can reduce the processing load of the UE.

(6-4) Inter-frequency black list (interFreqBlackCellList). The cells included in the black list are not candidates for cell re-selection. In the measurement concerning inter-frequency cell re-selection when the UE camps on the small cell included in the same group, the cells satisfying the same condition can be removed from the candidates for cell re-selection. Specific examples of the same condition include the cells included in the PCI range included in the inter-frequency black list. This can reduce the processing load of the UE.

(6-5) Inter-frequency neighbor cell information (InterFreqNeighCellInfo). In the measurement concerning inter-frequency cell re-selection when the UE camps on the small cell included in the same group, the UE can perform measurement using the same neighbor cell information. This can reduce the processing load of the UE.

(6-6) PCIs of neighbor cells. In the measurement concerning inter-frequency cell re-selection when the UE camps on the small cells included in the same group, the UE can measure the cells using the same PCI. This can reduce the processing load of the UE.

(6-7) Combination of (6-1) to (6-6) above.

(7) SIB6. The SIB6's of the small cells included in the same group are set to the same value. That is to say, the neighbor-cell-related information for use in inter-system (UTRA) cell re-selection (inter-RAT cell re-selection) is made the same among the small cells included in the same group. When the transmission (configuration) of the SIB6 is not required, the transmissions of the SIB6's of the small cells included in the same group may be eliminated. By setting the SIB6's of the small cells included in the same group to the same value, the following effects can be achieved.

A small cell has a narrow coverage, and thus, a large number of small cells will be conceivably installed. It is accordingly conceivable that the UE will frequently move between the small cells. Every time the UE moves between the small cells, the procedure of reconfiguring the neighbor-cell-related information for use in different inter-system (UTRA) cell re-selection occurs.

According to the specific example (7), by setting the STB6's of the small cells included in the same group to the same value, in the movement of the UE between the small cells, the need for the procedure of reconfiguring the neighbor-cell-related information for use in inter-system (UTRA) cell re-selection can be eliminated. This can reduce the processing load of the UE.

The UE does not need to receive the SIB6 from the small cell included in the same group. That is to say, when selecting (or handing over to) the small cells included in the same group, the UE is not required to receive the SIB6 again. This eliminates the need of the UE to perform the reception procedure even at the timing at which the schedule the SIB6 is scheduled. The power consumption of the UE can thus be reduced.

Partial parameters included in the SIB6 may be set to the same value. The following five, (7-1) to (7-5), will be disclosed as specific examples of the parameters set to the same value. However, setting the other parameters included in the SIB6 to the same value is not excluded.

(7-1) UTRA (FDD) carrier frequency list (carrierFreqListUTRA-FDD). In the measurement concerning the inter-system (UTRA) cell re-selection when the UE camps on the small cell included in the same group, the UE can perform measurement using the same UTRA (FDD) carrier frequency list. Thus, for example, the frequency configuration for inter-system (UTRA) measurement is not required, thereby reducing the processing load of the UE.

(7-2) UTRA (TDD) carrier frequency list (carrierFreqListUTRA-TDD). In the measurement concerning inter-system (UTRA) cell re-selection when the UE camps on the small cell included in the same group, the UE can perform measurement using the same UTRA (TDD) carrier frequency list. Thus, for example, the frequency configuration for inter-system (UTRA) measurement is not required, thereby reducing the processing load of the UE.

(7-3) Carrier frequency (carrierFreq). In the measurement concerning inter-system (UTRA) cell re-selection when the UE camps on the small cell included in the same group, the UE can perform measurement using the same carrier frequency. Thus, for example, the frequency configuration for inter-system (UTRA) measurement is not required, thereby reducing the processing load of the UE.

(7-4) UTRA (FDD) frequency band indicator (FreqBandIndicator-UTRA-FDD). In the measurement concerning inter-system (UTRA) cell re-selection when the UE camps on the small cell included in the same group, the UE can perform measurement using the same UTRA (FDD) frequency band. Thus, for example, the frequency configuration for inter-system (UTRA) measurement is not required, thereby reducing the processing load of the UE.

(7-5) Combination of (7-1) to (7-4) above.

(8) SIB7. The SIB7Is of the small cells included in the same group are set to the same value. That is to say, the neighbor-cell-related information for use in inter-system (GERAN) cell re-selection (inter-RAT cell re-selection) is made the same among the small cells included in the same group. When the transmission (configuration) of the SIB7 is not required, the transmissions of the SIB7's of the small cells included in the same group may be eliminated. By setting the SIB7's of the small cells included in the same group to the same value, the following effects can be achieved.

A small cell has a narrow coverage, and thus, a large number of small cells will be conceivably installed. It is accordingly conceivable that the UE will frequently move between the small cells. Every time the UE moves between the small cells, the procedure of reconfiguring the neighbor-cell-related information for use in different inter-system (GERAN) cell re-selection occurs.

According to the specific example (8), by setting the SIB7's of the small cells included in the same group to the same value, in the movement of the UE between the small cells, the procedure of reconfiguring the neighbor-cell-related information for use in inter-system (GERAN) cell re-selection can be eliminated. This can reduce the processing load of the UE.

The UE does not need to receive the SIB7 from the small cells included in the same group. That is to say, when re-selecting (or handing over to) the small cell included in the same group, the UE is not required to receive the SIB7 again. This eliminates the need of the UE to perform the reception procedure even at the timing at which the SIB7 is scheduled. The power consumption of the UE can thus be reduced.

Partial parameters included in the SIB7 may be set to the same value. The following three, (8-1) to (8-3), will be disclosed as specific examples of the parameters set to the same value. However, setting the other parameters included in the SIB7 to the same value is not excluded.

(8-1) Carrier frequency information list (carrierFreqsInfoList). In the measurement concerning the inter-system (GERAN) cell re-selection when the UE camps on the small cells included in the same group, the UE can perform measurement using the same carrier frequency information list. Thus, for example, the frequency configuration for inter-system (GERAN) measurement is not required, thereby reducing the processing load of the UE.

(8-2) Carrier frequency (carrierFreq). In the measurement concerning inter-system (UTRA) cell re-selection when the UE camps on the small cell included in the same group, the UE can measure the cells using the same carrier frequency list. Thus, for example, the frequency configuration for inter-system (GERAN) measurement or the like is eliminated, thereby reducing the processing load of the UE.

(8-3) Combination of (8-1) and (8-2) above.

(9) SIB8. The SIB8's of the small cells included in the same group are set to the same value. That is to say, the neighbor-cell-related information for use in inter-system (CDMA2000) cell re-selection (inter-RAT cell re-selection) is made the same among the small cells included in the same group. When the transmission (configuration) of the SIB8 is not required, the transmissions of the SIB8's of the small cells included in the same group may not be required. By setting the SIB8's of the small cells included in the same group to the same value, the following effects can be achieved.

A small cell has a narrow coverage, and thus, a large number of small cells will be conceivably installed. It is accordingly conceivable that the UE will frequently move between the small cells. Every time the UE moves between the small cells, the procedure of reconfiguring the neighbor-cell-related information for use in different inter-system (CDMA2000) cell re-selection occurs.

According to the specific example (9), by setting the SIB8's of the small cells included in the same group to the same value, in the movement of the UE between the small cells, the procedure of reconfiguring the neighbor-cell-related information for use in inter-system (CDMA2000) cell re-selection can be eliminated. This can reduce the processing load of the UE.

The UE does not need to receive the SIB8 from the small cells included in the same group. That is to say, when re-selecting (or handing over to) the small cells included in the same group, the UE is not required to receive the SIB8 again. This eliminates the need of the UE to perform the reception procedure even at the timing at which the SIB8 is scheduled. The power consumption of the UE can thus be reduced.

Partial parameters included in the SIB8 may be set to the same value. The following five, (9-1) to (9-5), will be disclosed as specific examples of the parameters set to the same value. However, setting the other parameters included in the SIB8 to the same value is not excluded.

(9-1) Search window size (searchWindowSize), which is the parameter of CDMA2000 used to search for a neighbor pilot. In the measurement concerning inter-system (CDMA2000) cell re-selection when the UE camps on the small cell included in the same group, the UE can perform measurement using the same search window size. This eliminates, for example, the configuration of the search window size for inter-system (CDMA2000) measurement, thereby reducing the processing load of the UE.

(9-2) Band class list (bandClassList), which is a frequency band identification list. In the measurement concerning inter-system (CDMA2000) cell re-selection when the UE camps on the small cell included in the same group, the UE can perform measurement using the same band class list. Thus, for example, the frequency configuration for inter-system (CDMA2000) measurement is not required, thereby reducing the processing load of the UE.

(9-3) PCI list (physCellIdList). In the measurement concerning inter-system (CDMA2000) cell re-selection when the UE camps on the small cell included in the same group, the UE can perform measurement using the same PCI. This can reduce the processing load of the UE.

(9-4) Access class barring configuration (AC-BarringConfig). In measurement concerning inter-system (CDMA2000) cell re-selection when the UE camps on the small cells included in the same group, the UE can measure cells using the same access class barring configuration. This can reduce the processing load of the UE.

(9-5) Combination of (9-1) to (9-4) above.

(10) SIB13. The SIB13's of the small cells included in the same group are set to the same value. That is to say, the information required for receiving the MBMS control information, which is transmitted from the small cells included in the same group, is made the same. When the transmission (configuration) of the SIB13 is not required, the transmissions of the SIB13's of the small cells included in the same group may be eliminated.

Figure 42:
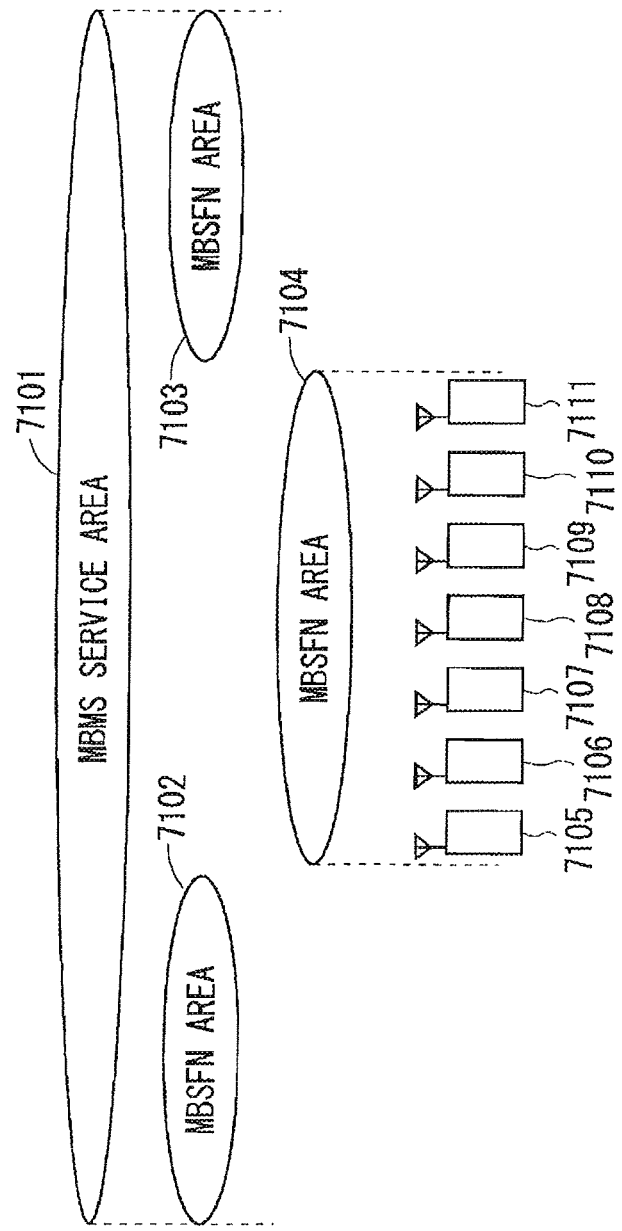
FIG. 42 is a diagram for explaining an MBMS.

The general matters of the MBMS will be described with reference to FIG. 42 (see Chapter 15 of Non-Patent Document 1). FIG. 42 is a diagram for explaining the MBMS. The MBSFN synchronization area is an area of the network where all base stations (eNBs, cells) can be synchronized and perform MBSFN transmissions.

The MBSFN synchronization area can support one or more MBSFN areas, for example, MBSFN areas 7102, 7103, and 7104 shown in FIG. 42. On one frequency layer, the base station belongs to one MBSFN synchronization area.

The MBSFN synchronization area is defined independent of the MBMS service area, for example, an MBMS service area 7101 shown in FIG. 42. An MBSFN area consists of a group of cells within the MBSFN synchronization area. All base stations within an MBSFN area, for example, base stations 7105 to 7111 shown in FIG. 42 contribute to the MBSFN transmission.

The small cells included in the same group may belong to the same MBSFN synchronization area. Further, the small cells included in the same group may belong to the same MBSFN area. By setting the SIB13's of the small cells included in the same group to the same value, the following effects can be achieved.

A small cell has a narrow coverage, and thus, a large number of small cells will be conceivably installed. It is accordingly conceivable that the UE will frequently move between the small cells. Every time the UE moves between the small cells, the procedure of reconfiguring the information required for receiving the MBMS control information occurs.

According to the specific example (10), by setting the SIB13's of the small cells included in the same group to the same value, in the movement of the UE between the small cells included in the same group, the procedure of reconfiguring the information required for receiving the MBMS control information can be eliminated. This can reduce the processing load of the UE.

The UE does not need to receive the SIB13 from the small cells included in the same group. That is to say, the UE does not need to receive the SIB13 again when re-selecting (or handing over to) the small cell included in the same group. This eliminates the need of the UE to perform the reception procedure even at the timing at which the SIB13 is scheduled. The power consumption of the UE can thus be reduced.

Partial parameters included in the SIB13 may be set to the same value. The following three, (10-1) to (10-3), will be disclosed as specific examples of the parameters set to the same value. However, setting the other parameters included in the SIB13 to the same value is not excluded.

(10-1) MBSFN area information list (mbsfn-AreaInfoList). In the MBMS reception when the UE camps on the small cell included in the same group, the UE can use the same MBSFN area information list. This can reduce the processing load of the UE.

(10-2) Notification configuration (notificationConfig). In the MBMS reception when the UE camps on the small cell included in the same group, the UE can use the same notification configuration. This can reduce the processing load of the UE.

(10-3) Combination of (10-1) and (10-2) above.

Small cells are conceivably suitable for providing MBMS service from the following three reasons. Thus, when the MBMS service using small cells is performed, achieving the effect of reducing the power consumption of the UE using the specific example (10) is effective for the entire communication system.

As the first reason, a small cell has a narrow coverage, and accordingly, fewer UEs are connected to the small cell than to the macro cell. The small cell accordingly has sufficient radio resources compared with the macro cell. Therefore, many MBSFN subframes are provided for MBSFN transmissions.

As the second reason, a small cell has a narrow coverage, and accordingly, the small cell is suitable for an MBMS which is required as an area-limited service.

As the third reason, it is conceivable to differ the carrier frequency between small cells and macro cells.

(11) SIB15. The SIB15's of the small cells included in the same group are set to the same value. That is to say, the MBMS service area identification information and neighbor carrier frequency, which are transmitted from the small cells included in the same group, are made the same. When the transmission (configuration) of the SIB15 may not be required, the transmissions of the SIB15's of the small cells included in the same group is not required. The small cells included in the same group may belong to the same MBMS service area. The following effects can be achieved by setting the SIB15's of the small cells included in the same group to the same value.

A small cell has a narrow coverage, and thus, a large number of small cells will be conceivably installed. It is accordingly conceivable that the UE will frequently move between the small cells. Every time the UE moves between the small cells with different MBMS service area identification information, the UE needs to check whether it can continuously obtain the current MBMS service. Every time the UE moves between the small cells with different neighbor carrier frequency information, the procedure of reconfiguring the neighbor carrier frequency information occurs.

According to the specific example (11), by setting the SIB15's of the small cells included in the same group to the same value, in the movement of the UE between the small cells, the UE is not required to check whether it can continuously obtain the current MBMS service. By setting the SIB15's of the small cells included in the same group to the same value, in the movement of the UE between the small cells included in the same group, the procedure of reconfiguring the neighbor carrier frequency information can be eliminated. This can reduce the processing load of the UE.

The UE does not need to receive the SIB15 from the small cells included in the same group. That is to say, when re-selecting (or handing over to) the small cell included in the same group, the UE does not need to receive the SIB15 again. This eliminates the need of the UE to perform the reception procedure even at the timing at which the SIB15 is scheduled. The power consumption of the UE can thus be reduced.

Partial parameters included in the SIB15 may be set to the same value. The following four, (11-1) to (11-4), will be disclosed as specific examples of the parameters set to the same value. However, setting the other parameters included in the SIB15 to the same value is not excluded.

(11-1) MBMS service area identification information inter-frequency list (mbms-SAI-InterFreqList), which is a list of frequencies at which MBMS services are provided and the corresponding MBMS service area identification information. In the reception of the MBMS when the UE camps on the small cell included in the same group, the UE can use the same MBMS service area identification information inter-frequency list. In the movement of the UE between the small cells included in the same group, the procedure of reconfiguring the carrier frequency information for receiving the MBMS can be eliminated. This can reduce the processing load of the UE.

(11-2) Downlink carrier frequency (dl-CarrierFreq). In the movement of the UE between the small cells included in the same group, the procedure of reconfiguring the carrier frequency information for receiving the MBMS can be eliminated. This can reduce the processing load of the UE.

(11-3) MBMS service area identification information list (mbms-SAI-List-r11).

In the reception of the MBMS when the UE camps on the small cell included in the same group, the same MBMS service area identification information intra-frequency list can be used. This can reduce the processing load of the UE.

(11-4) Combination of (11-1) to (11-3) above.

(12) The start symbols of the PDSCH are made the same. That is to say, the PDSCH start symbols are made the same among the small cells included in the same group.

The start symbol of the PDSCHs will be described (see Non-Patent Document 1). The PDCCH is transmitted using the first n OFDM symbols of each subframe, where n is a value smaller than four. The PDSCH is transmitted using the OFDM symbols succeeding the OFDM symbols used for PDCCH. The number of OFDM symbols used for PDCCH is notified from a base station to a user equipment over the PCFICH. That is to say, the start OFDM symbols of the PDSCH vary depending on the number of OFDM symbols used for the PDCCH.

The number of OFDM symbols of the PDCCH may be the same among the small cells included in the same group. By setting the same number of OFDM symbols of the PDCCH, the small cells included in the same group may receive the PDCCH and the PDSCH of the small cells included in the same group on the same condition. As to the same condition, for example, reception may be performed by setting the number of OFDM symbols for the PDCCH to the same configuration and setting the start OFDM symbols for the PDSCH to the same. This can reduce the processing load of the UE.

The UE does not need to receive the PCFICH from the small cells included in the same group. That is to say, when re-selecting (handing over to) the small cell included in the same group, the UE does not need to receive the PCFICH again. This eliminates the need of the UE to perform the reception procedure even at the timing at which the PCFICH is scheduled. The power consumption of the UE can thus be reduced.

A small cell has a narrow coverage, and thus, fewer small cells will be conceivably served by the small cell than by the macro cell. In this embodiment, thus, the OFDM symbols of the PDCCH used in the small cell may be fewer than the OFDM symbols of the PDCCH used in the macro cell.

The number of OFDM symbols of the PDCCH of one small cell may not be varied in time but may be kept constant. That is to say, the number of start OFDM symbols for the PDSCH of one small cell may not be varied in time but may be kept constant.

Consequently, the UE may receive the PDCCH and the PDSCH of the same small cell on the same condition. As to the same condition, for example, reception may be performed by setting the number of OFDM symbols of the PDCCH to the same configuration and setting the start OFDM symbol of the PDSCH to the same.

While being served by one small cell, the UE does not need to receive the PCFICH again. This eliminates the need of the UE to perform the reception procedure even at the timing at which the PCFICH is scheduled. The power consumption of the UE can thus be reduced.

Moreover, the number of OFDM symbols of the PDCCH of the small cell may be kept constant in time. That is to say, moreover, the number of start OFDM symbols of the PDSCH of the small cell may be kept constant.

Thus, when performing re-selection (or handover) from one small cell to another small cell, the UE may perform reception on the same condition. As to the same condition, for example, reception may be performed by setting the number of OFDM symbols of the PDCCH to the same configuration and setting the start OFDM symbol of the PDSCH the same.

The UE does not need to receive the PCFICH again. This eliminates the need of the UE to perform the reception procedure even at the timing at which the PCFICH is scheduled. The power consumption of the UE can thus be reduced.

(13) MBSFN subframe configuration (MBSFN-SubframeConfigList). That is to say, the MBSFN subframe configuration is made the same among the small cells included in the same group. This parameter is a parameter included in the SIB2 (see Non-Patent Document 10).

The MBSFN subframe will be described. The channels for multimedia broadcast multicast service single frequency network (MBSFN) and the channels for the network other than the MBSFN are multiplexed on a subframe basis. The MBSFN transmission is a simulcast transmission technique realized by the transmission with the same waveforms from a plurality of cells.

The UE recognizes the MBSFN transmissions from a plurality of cells in an MBSFN area as one transmission. The subframe for MBSFN transmission is referred to as an MBSFN subframe. In the MBSFN subframe, the PDSCH is not transmitted.

By setting the same MBSFN subframe configuration, the small cells included in the same group may receive the PDSCHs of the small cells included in the same group on the same condition. As to the same condition, for example, the same subframes may be recognized as the MBSFN subframe and the PDSCH may be received in the subframe other than the MBSFN subframe. This can reduce the processing load of the UE.

When a specific example of the group is the specific example (2) "small cells installed within the coverage of the same coverage macro cell," the following effects can be further achieved.

The MBSFN subframe can be used for time domain-inter cell interference coordination (TD-ICIC). This is because the presence or absence of the PDSCH can be configured on a subframe basis. Specifically, the subframe from which the transmission of the PDSCH is eliminated may be configured as an MBSFN subframe.

With the use of this embodiment, the MBSFN subframe configuration is the same among the small cells installed within the coverage of the same coverage macro cell. Consequently, all the small cells installed within the coverage of the coverage macro cell do not transmit the PDSCH in this MBSFN subframe. That is to say, in this MBSFN subframe, interference due to the PDSCH does not occur from all the small cells installed within the coverage of the coverage macro cell. This enables TD-ICIC between the macro cell and the small cell installed within the coverage of the macro cell.

The MBSFN subframe configuration is the same among the small cells installed within the coverage of the same coverage macro cell, so that the execution of avoiding interference between each small cell and the macro cell is not required. When the macro cell and the small cell are operated at the same frequency, enabling TD-ICIC using this embodiment is a particularly remarkable method of solving interference.

(14) Paging frame (PF) for receiving paging. That is to say, the PF for receiving paging is made the same among the small cells included in the same group.

The timing to receive paging will be described (see Non-Patent Document 2). The UE in the idle state supports discontinuous reception (DRX) to reduce power consumption. The UE monitors the paging frame (PF), which is one radio frame per DRX cycle, and receives the paging occasion(s) (PO) present on a subframe basis in the paging frame.

The PF is obtained by Equation (1) below.

$$SFN \bmod T = (T \operatorname{div} N) \times (UE\_ID \bmod N) \qquad (1)$$

In Equation (1), SFN is a system frame number. T represents the DRX cycle in the UE. T is decided by a minimum value of the UE specific DRX values allocated from a higher layer and by a default DRX value broadcast in the SIB2. With no UE specific DRX configuration from a higher layer, a default DRX value is applied. N represents min(T, nB). That is to say, N is a smaller value of T and nB. nB is 4T, 2T, T, T/2, T/4, T/8, T/16, and T/32.

In this embodiment, to make the PF for receiving paging the same among the small cells included in the same group, a default DRX value and an SFN are made the same among the small cells included in the same group. The default DRX value is a parameter included in the SIB2. The SFN is a parameter included in the MIB (see Non-Patent Document 10).

By making the PF for receiving paging the same among the small cells included in the same group, the paging may be received by the small cells included in the same group on the same condition. As to the same condition, for example, the procedure of receiving paging may be executed at the same timing (PF). The PDSCH may be received on the same condition. As to the same condition, for example, the procedure of receiving paging may be executed at the same timing (PF). This can reduce the processing load of the UE.

When a specific example of the group is the specific example (2) "small cells installed within the coverage of the same coverage macro cell," the parameters may be set to the same value among a coverage macro cell and the small cells installed within the coverage of the coverage macro cell. This can achieve the following effects when the UE receives the pagings from a coverage macro cell and a small cell installed within the coverage of the coverage macro cell.

The UE needs only to perform the procedure of receiving paging at the one same timing (PF). This can reduce the power consumption of the UE.

(15) Earthquake and tsunami warning system notification (ETWS notification). That is to say, the notifications of the ETWS from the small cells included in the same group are made the same. This notification is included in the SIB10 and the SIB11 (see Non-Patent Document 10). A small cell has a narrow coverage. Thus, compared with a macro cell, the UE is highly likely to be located at the coverage edge in the small cell. The reception of the notification of the ETWS by the UE located at the coverage edge may conceivably fail. By making the notifications of the ETWS from the small cells included in the same group the same, failed receptions of the notification of the ETWS by the UE can be reduced.

(16) Commercial mobile alert service notification (CMAS notification). That is to say, the notifications of the CMAS from the small cells included in the same group are made the same. This notification is included in the SIB12 (see Non-Patent Document 10). A small cell has a narrow coverage. Thus, compared with a macro cell, the UE is highly likely to be located at the coverage edge in the small cell. The reception of the notification of the CMAS by the UE located at the coverage edge may conceivably fail. By making the notifications of the CMAS from the small cells included in the same group the same, failed receptions of the notification of the CMAS by the UE can be reduced.

(17) Combination of (1) to (16) above.

As the method in which a small cell notifies a UE of a group to which its own cell belongs, the small cell notifies the UE being served thereby of an indicator of the group to which its own cell belongs. The following five, (1) to (5), will be disclosed as specific examples of the notification method.

(1) A downlink synchronization signal (SS) is used. A primary synchronization signal and a secondary synchronization signal may be used, or any one of them may be used. The indicator of a group may be mapped. A group to which its own cell belongs may be indicated in the sequence of the downlink synchronization signal.

(2) Discovery reference signal. The discovery signal is disclosed in Non-Patent Document 9. It is disclosed that the discovery signal is used to discover a small cell switched off for energy saving of an infrastructure and a small cell that operates normally (that is switched on). Non-Patent Document 9 also discloses that the transmission periodicity of discovery signals is increased to reduce the interference to other cells and the transmission power of small cells. The indicator of a group may be mapped. The group to which its own cell belongs may be indicated in the sequence of the discovery signals.

(3) MIB. The indicator of a group is mapped to the MIB.
(4) SIB1. The indicator of a group is mapped to the SIB1.
(5) Combination of (1) to (4) above.

The following two, (1) and (2), will be disclosed as specific examples of the method of notifying which parameters have the same value among the small cells included in the same group.

(1) Which parameters have the same value among the small cells included in the same group may be decided statically in advance. The method (1) differs from the method (2) below in that it does not need to notify the UE in each case, and can prevent the communication system from becoming complicated, thereby effectively using radio resources.

(2) Which parameters have the same value among the small cells included in the same group is decided semi-statically. The parameters are accompanied with an indicator as to whether the parameters have the same value among the small cells included in the same group and then may be notified to the UE. Parameters accompanied with an indicator may be only the parameters that are likely to have the same value among the small cells included in the same group. When all the parameters included in the same SIB are made the same, the scheduling information of the SIB2 and the succeeding SIBs included in the SIB1 may be accompanied with an indicator. In this case, unlike the cases in which the SIB2 and the succeeding SIBs are accompanied with an indicator, the following effects can be achieved.

The UE can judge whether it receives each of the SIB2 and the succeeding SIBs before receiving each of the SB2 and the succeeding SIBs in accordance with the scheduling information, and thus, the power consumption of the UE can be reduced when judging not to receive each of the SIB2 and the succeeding SIBs.

The following two, (1) and (2), will be disclosed as specific examples of the method of deciding to which group the small cell belongs.

(1) An operation and maintenance (O&M) makes a decision. The following four, (1-1) to (1-4), will be disclosed as the criteria of judgment.

(1-1) A decision is made in accordance with the location information on the installed small cell. The small cell may report the location information to the O&M.

(1-2) A decision is made in accordance with the measurement results on neighbor cells of the installed small cell. The small cell may report the measurement results on the neighbor cells to the O&M.

(1-3) The operator or the owner of the small cell makes a decision and configures for the O&M.

(1-4) Combination of (1-1) to (1-3) above.

(2) A small cell makes a decision. The following three, (2-1) to (2-3), will be disclosed as the judgment criteria in decision.

(2-1) A decision is made in accordance with the measurement results on the neighbor cells of the installed small cell.

(2-2) The operator or the owner of the small cell makes a decision and configures for the small cell.

(2-3) Combination of (2-1) and (2-2) above.

The following two, (1) and (2), will be disclosed as specific examples of the method of setting partial parameters to the same value among the small cells included in the same group.

Figure 43:
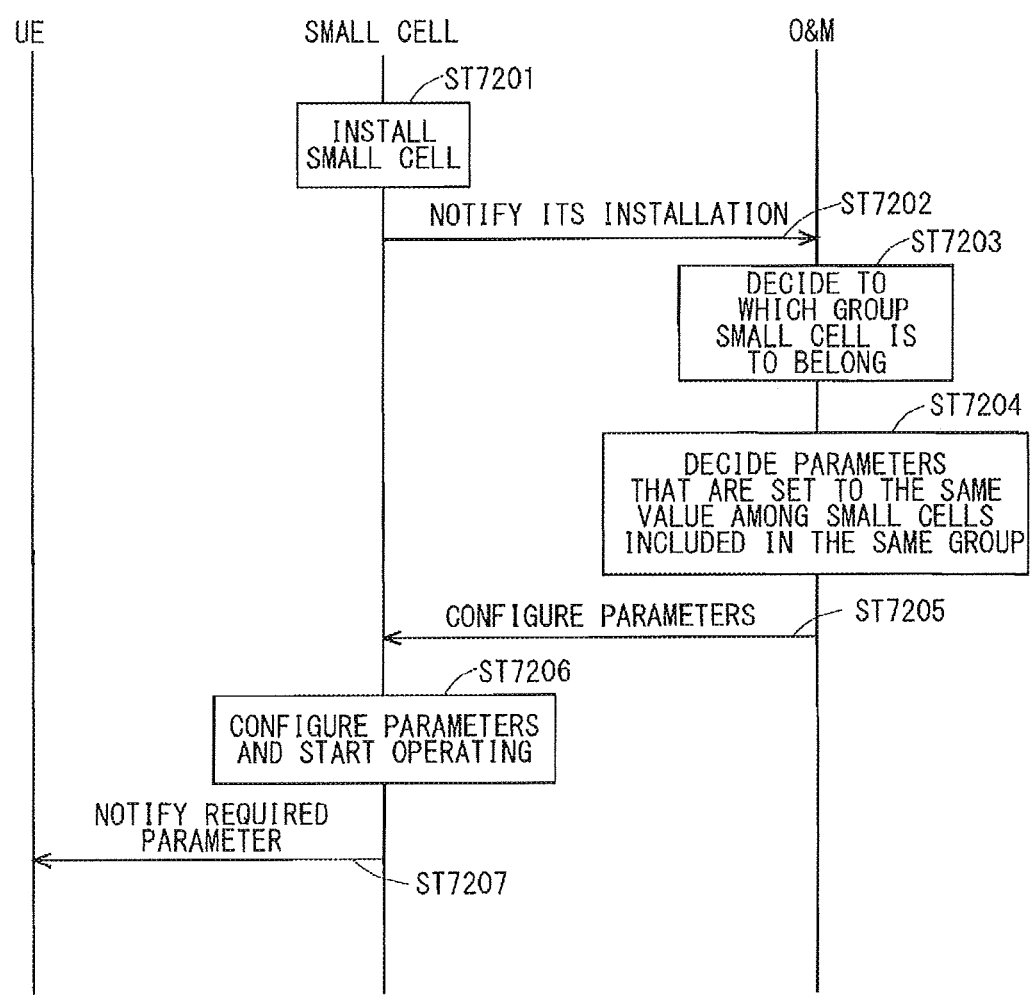
FIG. 43 shows an example of the sequence of a communication system in a fifth embodiment.

(1) The O&M makes adjustment. The O&M sets partial parameters of the small cells included in the same group to the same value. A specific example of the sequence of the communication system when the solution in the fifth embodiment is used will be described with reference to FIG. 43. FIG. 43 shows an example of the sequence of the communication system in the fifth embodiment. FIG. 43 shows the sequence when the O&M sets partial parameters of the small cells included in the same group to the same value.

In Step ST7201, a small cell is installed. In Step ST7202, the small cell notifies the O&M that the small cell has been installed. The small cell may also notify the location information on an installation place. Alternatively, the small cell may also notify the measurement results on neighbor cells. Still alternatively, the small cell may also notify the information about to which group the small cell belongs, which has been decided by the operator or the owner of the small cell and configured for the small cell.

In Step ST7203, the O&M decides to which group the small cell that has notified its installation in Step ST7202 is to belong. The O&M may decide to which group the small cell is to belong, in accordance with the location information on the installation place received in Step ST7202. Alternatively, the O&M may decide to which group the small cell is to belong, in accordance with the measurement results on neighbor cells received in Step ST7202. Further, the O&M may decide to which group the small cell belongs, in accordance with the information about to which group the small cell is to belong, which has been decided by the operator or the owner of the small cell and configured for the small cell, received in Step ST7202.

In Step ST7204, the O&M decides parameters set to the same value among the small cells included in the same group. The O&M may decide to set only the partial parameters, which can be set to the same value among the small cells included in the same group, to the same value.

In Step ST7205, the O&M configures the parameters for the small cell. At that time, the parameters that have been decided to be set to the same value among the small cells included in the same group in Step ST7204 are configured to the value that is the same among the small cells included in the same group. In the case where, for example, only the partial parameters that can be set to the same value among the small cells included in the same group are set to the same value, the parameter may be accompanied with an indicator as to whether the same value is set among the small cells included in the same group and then may be notified.

In Step ST7206, the small cell configures each parameter received from the O&M in Step ST7205 and then starts operating.

In Step ST7207, the small cell notifies the UE being served thereby of a required parameter among the parameters received from the O&M in Step ST7205. In the case where, for example, only the partial parameters that can be set to the same value among the small cells included in the same group are set to the same value, the parameter may be accompanied with an indicator as to whether the same value is set among the small cells included in the same group and then may be notified.

(2) A concentrator makes an adjustment. The concentrator configures partial parameters of the small cells included in the same group to the same value. The concentrator may overwrite the values of the parameters, whose values are set to the same value among the small cells included in the same group, among the parameters configured for the small cell by the O&M.

The following two, (2-1) and (2-2), will be disclosed as specific examples of the concentrator.

(2-1) Small cell concentrator. A concentrator may be provided per small cell cluster.

(2-2) Macro cell, which may be a coverage macro cell for the small cell.

Figure 44:
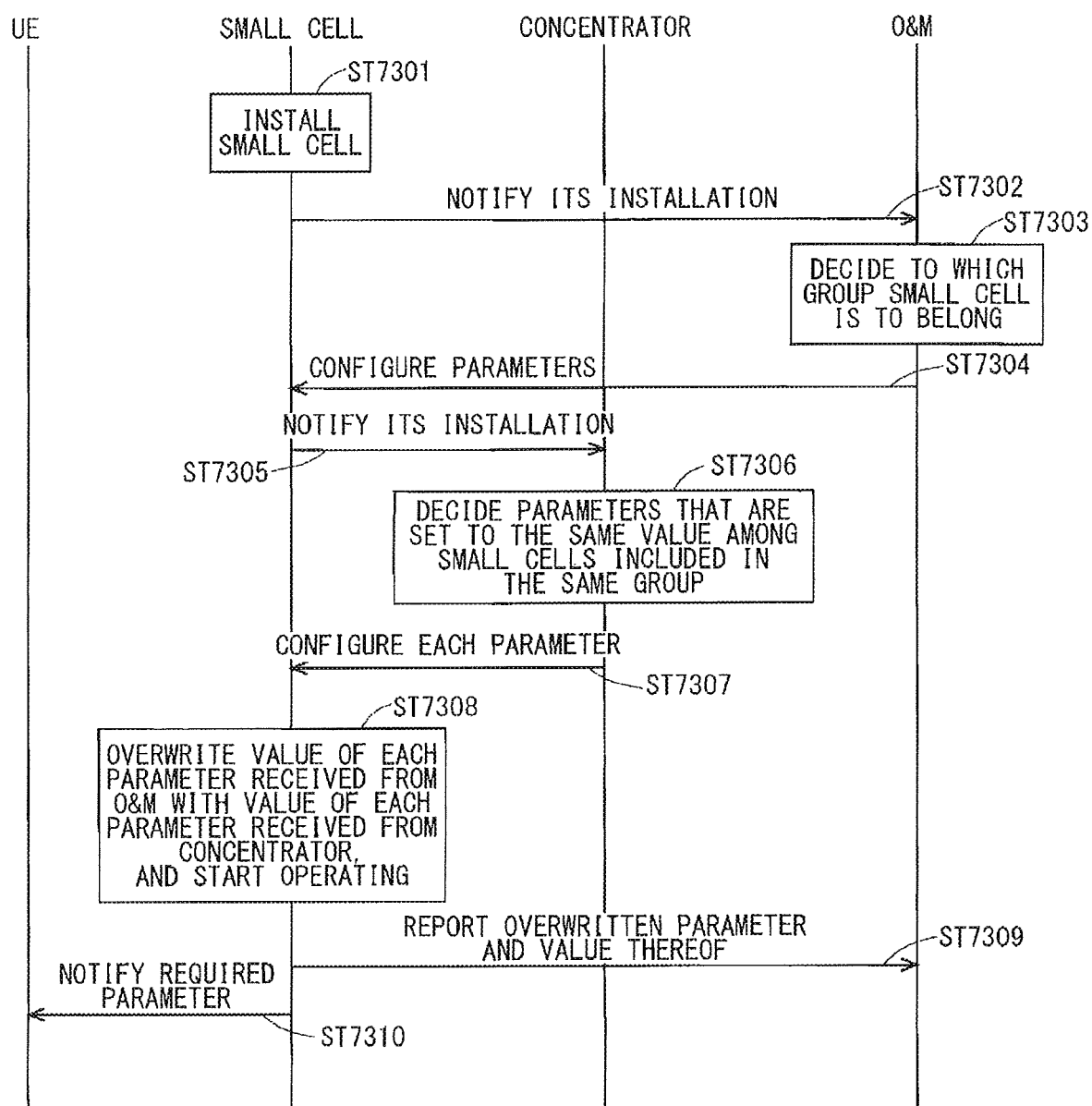
FIG. 44 shows another example of the sequence of the communication system in the fifth embodiment.

A specific example of the sequence of the communication system when the solution in the fifth embodiment is used will be described with reference to FIG. 44. FIG. 44 shows another example of the sequence of the communication system in the fifth embodiment. FIG. 44 shows the sequence when the concentrator configures partial parameters of the small cells included in the same group to the same value.

In Step ST7301, a small cell is installed. In Step ST7302, the small cell notifies the O&M that the small cell has been installed. In this case, when the O&M decides to which group the small cell belongs, the small cell may also notify the location information on the installation place. The small cell may also notify the measurement results on neighbor cells. Further, the small cell may also notify the information concerning to which group the small cell belongs, which has been decided by the operator or the owner of the small cell and configured for the small cell.

When the O&M decides to which group the small cell belongs in Step ST7303, the O&M decides to which group the small cell that has notified its installation in Step ST7302 is to belong.

The O&M may decide to which group the small cell is to belong in accordance with the location information on an installation place received in Step ST7302. The O&M may decide to which group the small cell is to belong, in accordance with the measurement result on neighbor cells received in Step ST7302. Moreover, the O&M may decide to which group the small cell is to belong in accordance with the information concerning to which group the small cell belongs, which has been decided by the operator or the owner of the small cell and configured for the small cell, received in Step ST7302

In Step ST7304, the O&M configures each parameter for the small cell. When the O&M decides to which group the small cell belongs, the O&M may also notify the information on the group decided in Step ST7303. When a specific example of the group is a small cell cluster, the O&M may also notify the information on the concentrator corresponding to the small cell cluster, that is, a small cell concentrator. When a specific example of the group is a coverage macro cell, the O&M may also notify the information on the coverage macro cell which is a concentrator.

In Step ST7305, the small cell notifies the concentrator that the small cell has been installed. The small cell may decide which concentrator is to be notified in accordance with the location information on the installation or in accordance with the measurement results on neighbor cells. Alternatively, when receiving the information on the concentrator in Step ST7304, the small cell may notify the concentrator that the small cell has been installed. When the O&M decides to which group the small cell is to belong, the O&M also notifies the information on the group received in Step ST7304. When the small cell decides to which group the small cell is to belong, the small cell also notifies the information on the decided group.

In Step ST7306, the concentrator decides parameters to be set to the same value among the small cells included in the same group. The concentrator may decide to set only partial parameters, which can be set to the same value among the small cells included in the same group, to the same value.

In Step ST7307, the concentrator sets, for the small cell, the parameters decided to be set to the same value among the small cells included in the same group in Step ST7306. The concentrator configures the same value among the small cells included in the same group. In the case where, for example, only the partial parameters that can be set to the same value among the small cells included in the same group are set to the same value, the parameter may be accompanied with an indicator as to whether the same value is set among the small cells included in the same group and then may be notified.

In Step ST7308, the small cell overwrites each parameter received from the O&M in Step ST7304 with the value of each parameter received from the concentrator in Step ST7307, and starts operating.

In Step ST7309, the small cell notifies the O&M of a parameter set to a different value among the parameters received from the O&M in Step ST7304. The small cell may also notify a parameter value. That is to say, the small cell notifies each parameter and the value of each parameter received from the concentrator in Step ST7307.

In Step ST7310, the small cell notifies the UE being served thereby of a required parameter among the parameters. In the case where, for example, only the partial parameters that can be set to the same value among the small cells included in the same group are set to the same value, the parameter may be accompanied with an indicator as to whether the same value is set among the small cells included in the same group and then may be notified.

Figure 45:
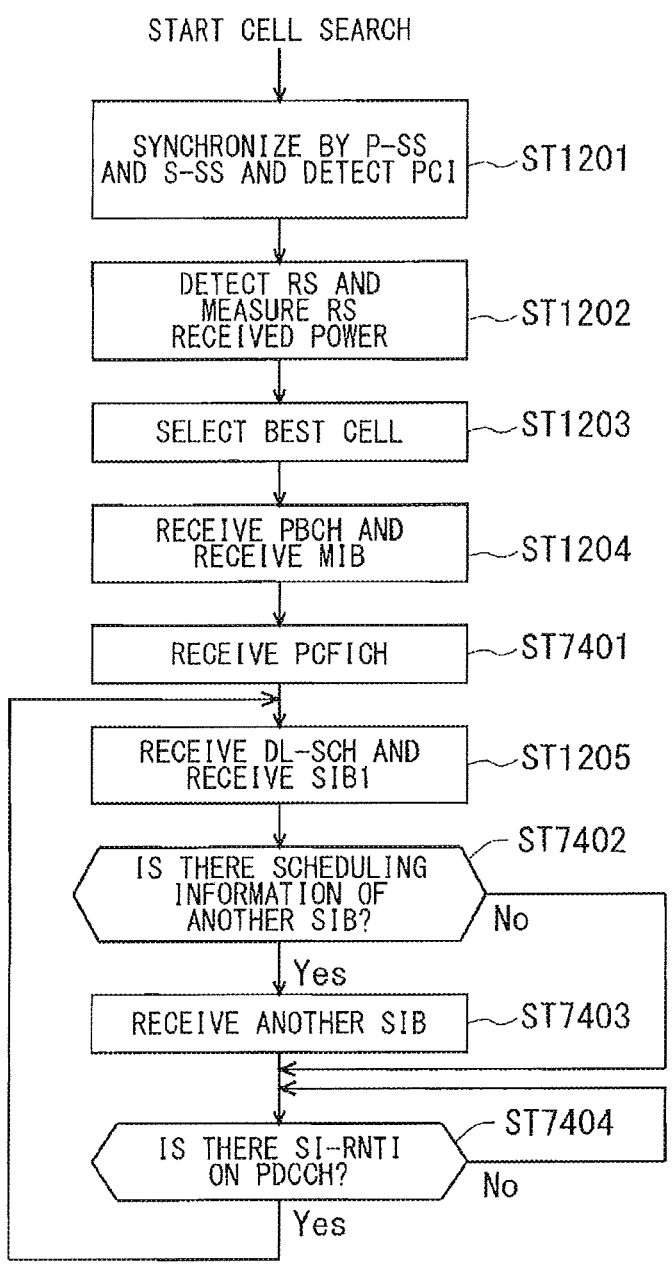
FIG. 45 is a flowchart showing an outline from a cell search to an idle state operation conventionally performed by a user equipment (UE).

Next, an operation example of the UE in the solution of the fifth embodiment will be described. FIG. 45 is a flowchart showing the outline of a cell search to an idle state operation conventionally performed by a UE. FIG. 45 is similar to FIG. 6 above, and thus, the steps corresponding to those of FIG. 6 will be denoted by the same step numbers, and common description will be omitted.

In Step ST7401, the UE receives the PCFICH using the information such as the DL system bandwidth obtained in Step ST1204. The PCFICH reveals the number of OFDM symbols used for PDCCHs. The UE accordingly recognizes the start symbol of the PDSCH.

In Step ST1205, the UE receives the DL-SCH of the cell based on the cell configuration information of the MIB obtained in Step ST1204 and the start symbol of the PDSCH recognized in Step ST7401, thereby obtaining a system information block (SIB) 1 of the broadcast information BCCH.

In Step ST7402, the UE judges whether the SIB1 obtained in Step ST1205 includes the scheduling information of another SIB. The UE moves to Step ST7403 when judging in Step ST7402 that the scheduling information of another SIB is included, or moves to Step ST7404 when judging in Step ST7402 that the scheduling information of another SIB is not included.

In Step ST7403, the UE receives another SIB in accordance with the scheduling information of the other SIB (SIBk; k is an integer equal to or larger than 2) obtained in Step STI 205.

In Step ST7404, the UE judges whether the system information RNTI (SI-RNTI) is mapped on the PDCCH. The SI-RNTI is used to notify the UE being served when a change occurs in the SIB. When judging in Step ST7404 that the SI-RNTI is mapped on the PDCCH, the UE returns to Step ST1205 and repeats the process described above. When judging in Step ST7404 that the SI-RNTI is not mapped to the PDCCH, the UE repeats the procedure of Step ST7404.

Figure 46:
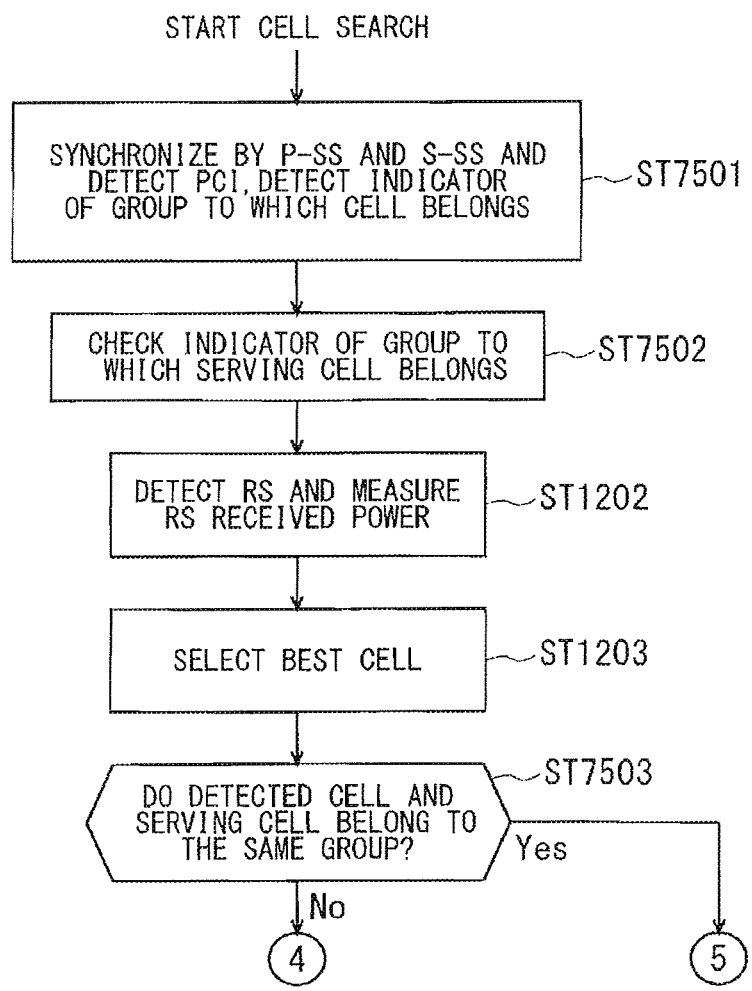
FIG. 46 is a flowchart showing an example of the procedure of the operation of a UE in the fifth embodiment.
Figure 47:
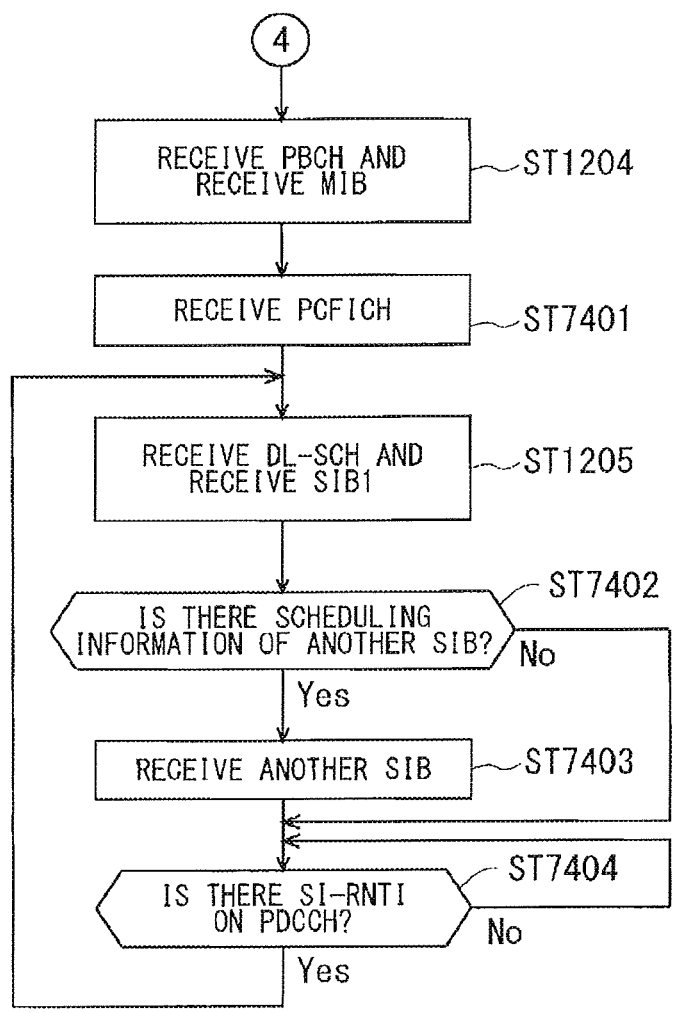
FIG. 47 is a flowchart showing the example of the procedure of the operation of the UE in the fifth embodiment.

FIGS. 46 to 48 are flowcharts showing an example of the procedure of the UE's operation in the fifth embodiment. FIGS. 46 to 48 show the operation example of the UE when the downlink synchronization signal of the specific example (1) above is used as the method of notifying the UE of the group to which its own cell belongs. FIGS. 46 to 48 are similar to FIGS. 6 and 45 above, and thus, the steps corresponding to those of FIGS. 6 and 45 will be denoted by the same step numbers, and common description will be omitted.

In Step ST7501 of FIG. 46, the UE synchronizes the slot timing and frame timing by a primary synchronization signal (P-SS) and a secondary synchronization signal (S-SS) transmitted from a nearby base station. The P-SS and S-SS are collectively referred to as a synchronization signals (SS). Synchronization codes, which correspond one-to-one to physical cell identities (PCIs) assigned per cell, are assigned to the synchronization signals(SS). The number of PCIs is currently studied in 504 ways, and these 504 ways are used for synchronization, and the PCIs of the synchronized cells are detected (identified).

The UE recognizes the group to which the small cell belong using the primary synchronization signal and the secondary synchronization signal or using any one of them. The UE may detect the indicator to which the group belongs using the primary synchronization signal and the secondary synchronization signal or from any one of them. Alternatively, the UE recognizes the group to which the small cell belongs from the sequence of the synchronization codes.

In Step ST7502, the UE recognizes the indicator of the group to which the serving cell belongs.

In Step ST7503, the UE judges whether the group to which the best cell (detection cell) selected in Step ST1203 belongs and the group to which the serving cell belongs belong to the same group. The UE moves to Step ST7504 of FIG. 48 when judging in Step ST7503 that the group to which the best cell belongs and the group to which the serving cell belongs belong to the same group, or moves to Step ST1204 of FIG. 47 when judging in Step ST7503 that the group to which the best cell belongs and the group to which the serving cell belongs do not belong to the same group.

In Step ST7504 of FIG. 48, the UE receives the PBCH of the best cell, thereby obtaining the BCCH being the broadcast information. The master information block (MIB) including the cell configuration information is mapped to the BCCH on the PBCH.

When the parameters mapped to the MIB include parameters statically decided to have the same value among the small cells included in the same group, these parameters are not decoded.

When the parameters mapped to the MIB include a parameter that is likely to have the same value among the small cells included in the same group and the indicator as to whether the parameter has the same value among the small cells included in the same group which is accompanied with this parameter, indicates that the parameter has the same value, the UE does not decode this parameter. In contrast, when the indicator as to whether the parameter has the same value does not indicate that the parameter has the same value, the UE decodes this parameter as usual.

In Step ST7505, the UE receives the PCFICH using the information such as the DL system bandwidth obtained in Step ST7504. When it is statically decided that the start symbol of the PDSCH is the same among the small cells included in the same group, the UE does not need to receive the PCFICH.

In Step ST7506, the UE receives the DL-SCH of the cell based on the cell configuration information of the MIB obtained in Step ST7504 and the start symbol of the PDSCH recognized in Step ST7505, thereby obtaining the system information block (SIB) 1 in the broadcast information BCCH.

When the parameters mapped to the SIB1 include a parameter statically decided to have the same value among the small cells included in the same group, the UE does not decode this parameter.

When the parameters mapped to the SIB1 include the parameters that are likely to have the same value among the small cells included in the same group and the indicator as to whether the parameters have the same value among the small cells included in the same group, which is accompanied with the parameter, indicates that they have the same value, the UE does not decode these parameters. In contrast, when the indicator as to whether the parameters have the same value does not indicate that they have the same value, the UE decodes these parameters as usual.

In Step ST7507, the UE receives another SIB in accordance with the scheduling information of the other SIB (SIBk; k is an integer equal to or larger than 2) obtained in Step ST7506.

When the other SIBs scheduled have other SIBs statically decided to have the same value among the small cells included in the same group, the UE does not receive the other SIB irrespective of the presence or absence of the scheduling information.

When the other SIBs scheduled have another SIB that is likely to have the same value among the small cells included in the same group and the indicator as to whether the SIB has the same value among the small cells included in the same group, which is accompanied with the other SIB, indicates that the SIB has the same value, the UE does not receive the other SIB irrespective of the presence or absence of the scheduling information. In contrast, when the indicator as to whether the SIB has the same value does not indicate that the SIB has the same value, the UE receives the other SIB as usual.

When the other SIB has a parameter statically decided to have the same value among the small cells included in the same group, the UE does not decode this parameter.

When the parameters mapped to the other SIB include a parameter that may have the same value among the small cells included in the same group and the indicator as to whether the parameter has the same value among the small cells included in the same group, which is accompanied with the parameter, indicates that the parameter has the same value, the UE does not decode this parameter. In contrast, when the indicator as to whether the parameter has the same value does not indicate that the parameter has the same value, the UE normally decode this parameter.

The operation example of the UE in the solution of the fifth embodiment when a discovery signal of the specific example (2) is used as the method of nitifying the UE of the group to which its own cell belongs is similar to the operation example of the UE in the solution of the fifth embodiment when a downlink synchronization signal is used in the specific example (1), and thus, detailed description thereof will not be given.

In Step S17501, the UE detects the indicator to which the group belongs from the discovery signal. Alternatively, the UE may recognize the group to which the small cell belongs from the sequence of the discovery signals.

Figure 49:
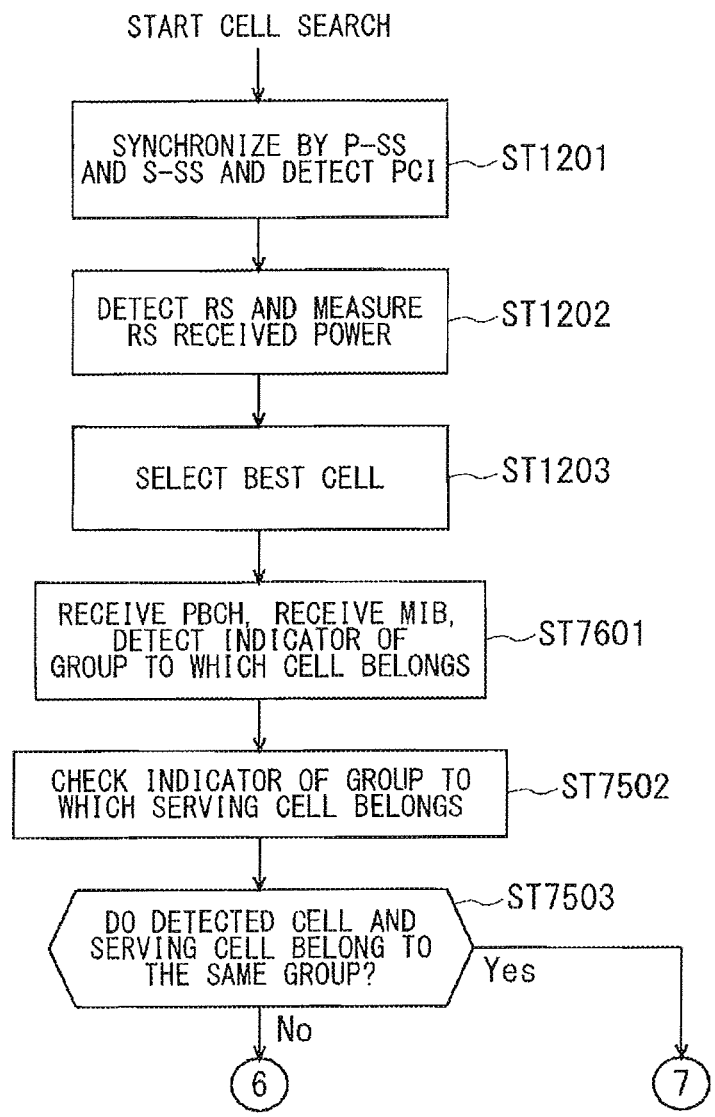
FIG. 49 is a flowchart showing another example of the procedure of the operation of the UE in the fifth embodiment.
Figure 50:
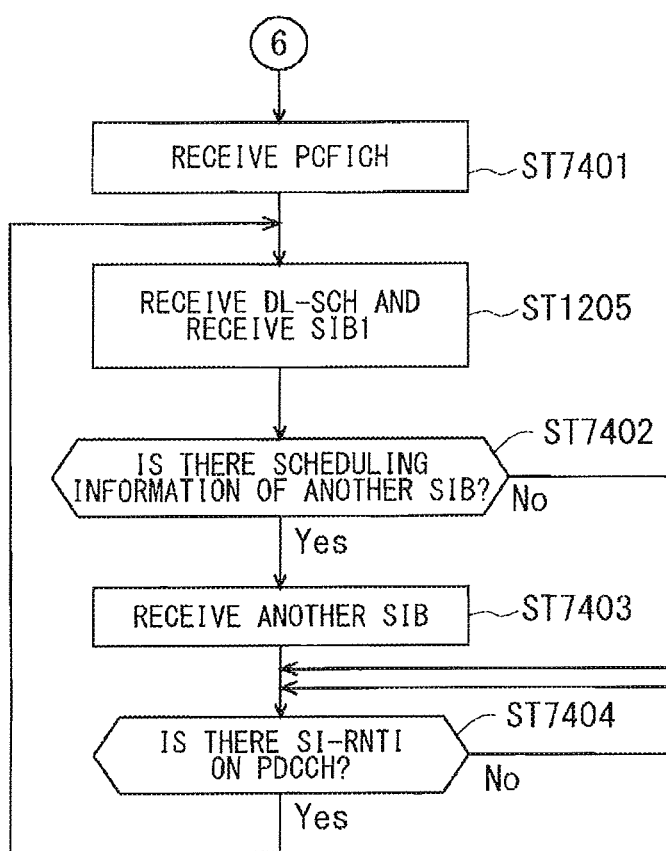
FIG. 50 is a flowchart showing the other example of the procedure of the operation of the UE in the fifth embodiment.

FIGS. 49 to 51 are flowcharts showing another example of the procedure of the operation of the UE in the fifth embodiment. FIGS. 49 to 51 show an operation example of the UE when the MIB of the specific example (3) above is used as the method of notifying the UE of the group to which its own cell belongs. FIGS. 49 to 51 are similar to FIGS. 6, 45, and 46 to 48 above, and thus, the steps corresponding to those of FIGS. 6, 45, and 46 to 48 will be denoted by the same step numbers, and common description will be omitted.

In Step ST7601 of FIG. 49, the UE detects the indicator to which the group belongs from the MIB.

Figure 52:
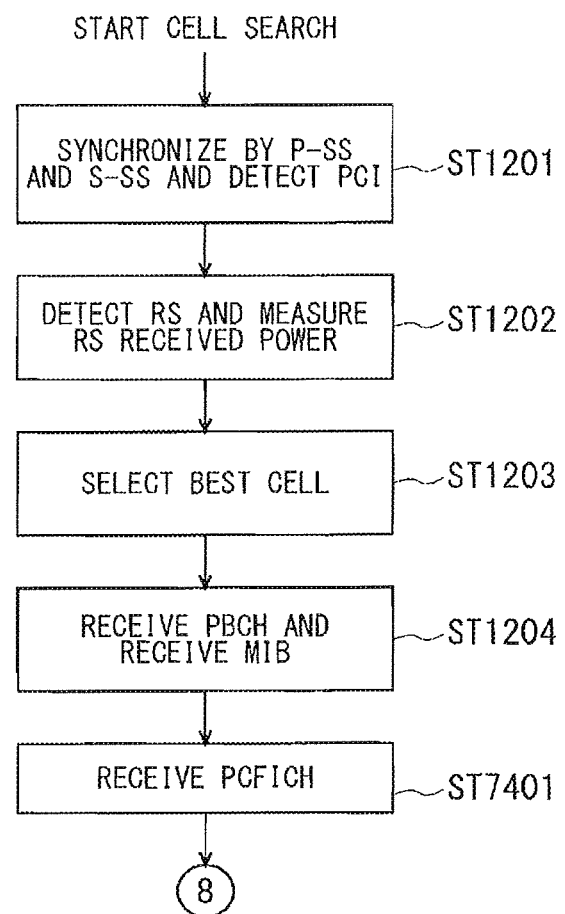
FIG. 52 is a flowchart showing another example of the procedure of the operation of the UE in the fifth embodiment.
Figure 53:
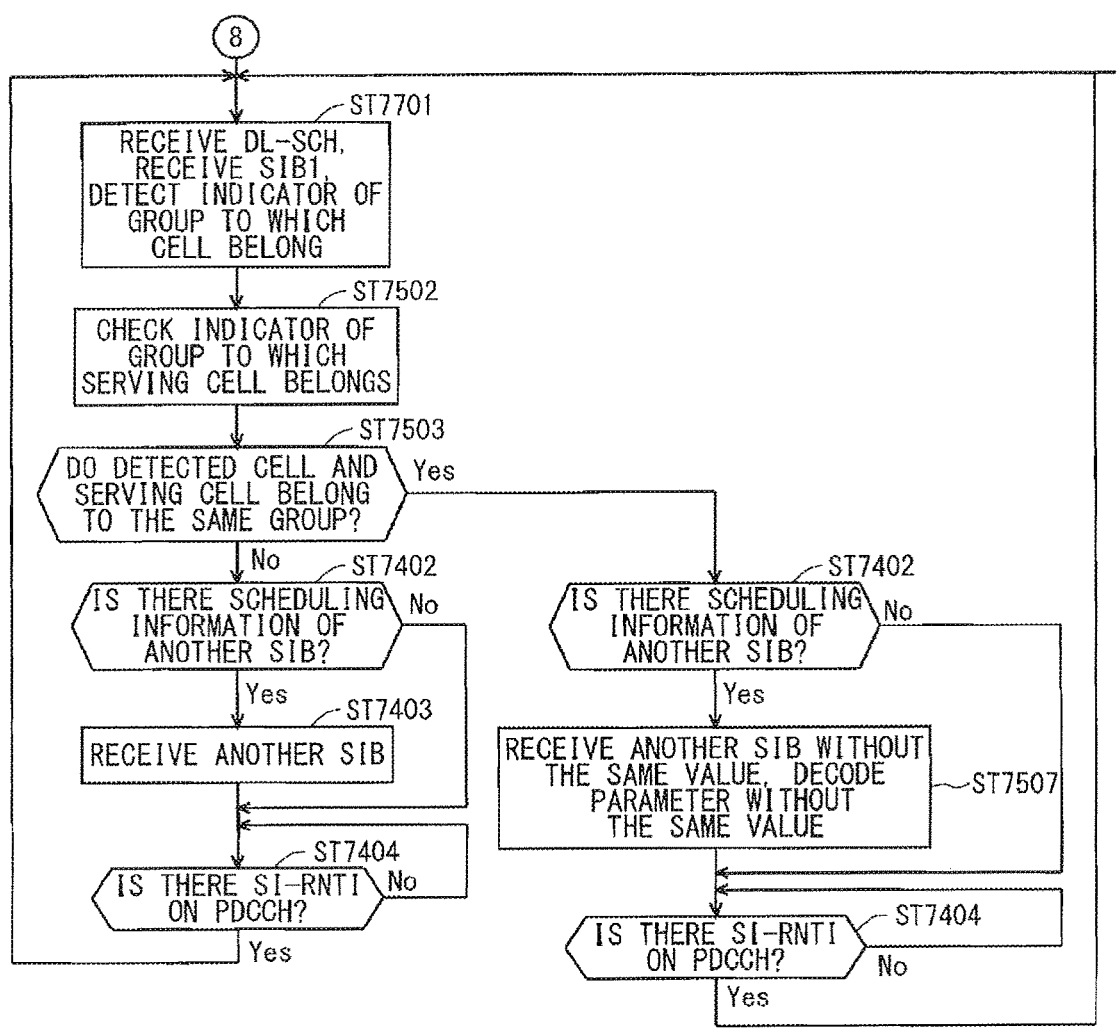
FIG. 53 is a flowchart showing the other example of the procedure of the operation of the UE in the fifth embodiment.

FIGS. 52 and 53 are flowcharts showing another example of the procedure of the operation of the UE in the fifth embodiment. FIGS. 52 and 53 show an operation example of the UE when the SIB1 of the specific example (4) is used as the method of notifying the UE of the group to which its own cell belongs. FIGS. 52 and 53 are similar to FIGS. 6, 45, and 46 to 48 above, and thus, the steps corresponding to those of FIGS. 6, 45, and 46 to 48 will be denoted by the same step numbers, and common description will be omitted.

In Step ST7701 of FIG. 53, the UE detects the indicator to which the group belongs from the SIB1.

The fifth embodiment can achieve the following effects. By setting the parameters of the small cells included in the same group to the same value, an efficient communication system can be constructed. Besides, the power consumption of the UE can be reduced.

Although this embodiment has described the small cells, similar effects can be achieved by applying this embodiment as long as the cells are included in the same group.

Sixth Embodiment

3GPP is studying logged measurement (see Non-Patent Document 12). In the logged measurement, the UE in the idle state logs only the measurement results on the intensity of a downlink reference signal. In the logged measurement, the measurement results are logged periodically. This period is configurable. A logged measurement area is configurable. When a logged measurement area is configured by the logged measurement configuration notified from the E-UTRAN to the UE, the UE located in that area performs logged measurement.

The logged measurement areas are (1) up to 32 types of global cell identities (GCIs), (2) up to eight types of tracking areas (TAs), (3) up to eight types of location areas (LAs), and (4) up to eight types of routing areas (RAs). The UE continues logged measurement in accordance with the logged measurement configuration until the information amount stored in the memory for a minimization of drive tests (MDT) within the UE reaches the storage capacity of the memory.

The problem to be solved in a sixth embodiment will be described below. A small cell has a narrow coverage, and thus, a large number of small cells will be conceivably installed. Considering the number of cells that can be measured by the UE from the same place, when the number of macro cells and the number of small cells are compared, the number of small cells will be conceivably higher. Therefore, the UE that has entered the logged measurement period in the place where a large number of small cells are installed measures the intensities of the downlink reference signals from the large number of small cells and store them in the memory for MDT.

It is accordingly conceivable that compared with the place where a large number of small cells are not installed, in the place where a large number of small cells are installed, the information amount stored in the memory for MDT will conceivably reach the storage capacity of the memory in a relatively short period of time. Consequently, the network side may fail to obtain the logged measurement of the expected UE. When the network side uses the logged measurement of the UE to construct an efficient communication system, an efficient communication system cannot be constructed.

The following four, (1) to (4), will be described as the solution in the sixth embodiment.

(1) A cell targeted for logged measurement is decided. This allows the network side to obtain the logged measurement of the expected UE. The following two, (1-1) and (1-2), will be disclosed as specific examples of the cell targeted for logged measurement.

(1-1) The cell targeted for logged measurement is a macro cell.

(1-2) The cell targeted for logged measurement is a small cell.

(2) Logged measurement is provided individually for macro cells and for small cells. Logged measurement configuration and logged measurement reporting are provided individually for macro cells and for small cells. Without providing individually for macro cells and for small cells, a plurality of types may be provided so as to be used differently by the network side in each case.

(3) A maximum number of target cells whose measurement results in one period are stored in the memory for MDT is decided. A maximum number of cells targeted for logged measurement in one period is decided. At that time, the measurement results for an amount of the maximum number may be stored in the memory for MDT in order from the cell having the highest downlink reference signal intensity in the measurement results. A maximum number of target cells may be provided individually for macro cells and for small cells. Alternatively, without providing individually for macro cells and for small cells, a plurality of types may be provided so as to be used differently by the network side in each case.

When the measurement results on the small cells included in the same group are stored in the memory for MDT, a maximum number of target cells stored in the memory for MDT may be decided in the small cells included in the same group. Also in this case, the measurement results for an amount of the maximum number may be stored in the memory for MDT in the order from the cell having the highest downlink reference signal intensity in the measurement results. As in the fifth embodiment, specific examples of the group include the same small cell cluster and the same coverage macro cell.

When a maximum number of target cells stored in the memory for MDT is decided in the small cells belonging to the same small cell cluster, the UE may also notify, in a measurement report, the indicator of a small cell cluster. When a maxim number of target cells stored in the memory for MDT is decided in the small cells within the coverage of the same coverage macro cell, the UE may also notify, in a measurement report, the identity of the coverage macro cell. The method in which a small cell notifies a UE of the group to which its own cell belongs is similar to that of the fifth embodiment, and thus, description thereof will be omitted.

(4) A measurement duration in which measurement is performed in one period is decided. After a lapse of the measurement duration, logged measurement is not performed. The measurement duration in which measurement is performed in one period may be provided individually for macro cells and for small cells. Without providing individually for macro cells and for small cells, a plurality of types may be provided so as to be used differently by the network side in each case.

Switching off a small cell relatively frequently is also studied for energy saving of an infrastructure. The use of a discovery signal is studied to discover a switched-off small cell. The classification between macro cells and small cells of the solutions (1) to (4) in the sixth embodiment may be applied as the classification between the cells in the dormant mode (switched-off cells) and the cells in the normal operation (active mode). The information for the UE to identify whether the target cell is in the dormant mode or the active mode may be notified from the cell.

The classification between macro cells and small cells of the solutions (1) to (4) in the sixth embodiment may be applied as the classification between cells using NCT and cells not using NCT. The information for the UE to identify whether a target cell is using an NCT or is not using an NCT may be notified from the cell.

The following two, (1) and (2), will be described as specific examples of the method of notifying the UE of a maximum number of target cells whose measurement results in one period are stored in the memory for MDT, a measurement duration in which measurement is performed in one period, or cells targeted for logged measurement.

(1) Decision is made statically in advance. The method (1) differs from the method (2) below in that the UE does not need not to be notified in each case. The method (1) can prevent the communication system from becoming complicated and can effectively use radio resources.

(2) Decision is made semi-statically. The maximum number or measurement duration is notified using the logged measurement configuration.

The sixth embodiment can achieve the following effects. Even in a place where a large number of small cells are installed, with the configuration of the network side, the number of cells targeted for measurement results stored in the memory for MDT can be controlled. This enables the network side to obtain the logged measurement of the expected UE. When the network side uses the logged measurement of the UE to construct an efficient communication system, an efficient communication system can be constructed.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS 2101 to 2112, 2201 to 2215 cell, 2113, 2114, 4137, 4208 UE, 2216 to 2219 cell group, 4109 to 4136, 4140, 5001, 5002, 5005, 5006, 5101, 5102, 5401, 5403, 5405, 5407 small cell, 4101 to 4104, 4204 concentrator, 4105 to 4108 small cell group (SCG), 4141, 5003, 5004, 5007, 5008, 5103, 5104, 5402, 5404, 5406, 5408 coverage, 4201 P-GW, 4202 S-GW, 4203 MME, 4205 first small cell (SC1), 4206 second small cell (SC2), 4207 third small cell (SC3).

The invention claimed is:

1. A communication system in which a plurality of communication terminal devices perform radio communication via a network configured by a network-side device including at least one base station device, the communication system comprising:
   a plurality of cells configured by the at least one base station device and connected to the plurality of communication terminal devices to perform radio communication with the plurality of communication terminal devices,
   wherein the plurality of cells are grouped into a plurality of groups before measurement by a communication terminal device of a moving speed of the communication terminal device to perform a shift determination of shifting from a first group to a second group of the plurality of groups based on at least one threshold value of the moving speed of the communication terminal device,
   wherein the communication terminal device of the plurality of communication terminal devices is configured to:
      (a) in an idle state, select one of the plurality of groups including at least (i) a first group that includes a cell on which the communication terminal device is currently camping, and (ii) a second group that is different from the first group, and measure cells belonging to the selected group of the plurality of groups including at least the first group and the second group for selecting a cell as a re-selection destination, and
      (b) in a connected state, select one of the plurality of groups including at least (i) a third group that includes a cell to which the communication terminal device is currently connected, and (ii) a fourth group that is different from the third group, and measure cells belonging to the selected group of the plurality of groups including at least the third group and the fourth group for handover, and
   wherein the communication terminal device is configured to select the group to be measured based on priorities of the plurality of groups.

2. A communication system in which a plurality of communication terminal devices perform radio communication via a network configured by a network-side device including at least one base station device, the communication system comprising:
   a plurality of cells configured by the at least one base station device and connected to the plurality of communication terminal devices to perform radio communication with the plurality of communication terminal devices,
   wherein the plurality of cells are grouped into a plurality of groups before measurement by a communication terminal device of a moving speed of the communication terminal device to perform a shift determination for shifting from a first group to a second group of the plurality of groups based on at least one threshold value of the moving speed of the communication device,
   wherein the communication terminal device of the plurality of communication terminal devices is configured to:
      (a) in an idle state, select one of the plurality of groups including at least (i) a first group that includes a cell on which the communication terminal device is currently camping, and (ii) a second group that is different from the first group, and measure cells belonging to the selected group of the plurality of groups including at least the first group and the second group for selecting a cell as a re-selection destination, and
      (b) in a connected state, select one of the plurality of groups including at least (i) a third group that includes a cell to which the communication terminal device is currently connected, and (ii) a fourth group that is different from the third group, and measure cells belonging to the selected group of the plurality of groups including at least the third group and the fourth group for handover, and
   wherein the communication terminal device is configured to select the group to be measured based on load information on the plurality of groups or information on a regulation of the plurality of groups.

* * * * *